United States Patent [19]

Burk et al.

[11] 4,445,176
[45] Apr. 24, 1984

[54] BLOCK TRANSFERS OF INFORMATION IN DATA PROCESSING NETWORKS

[75] Inventors: John L. Burk, Poughkeepsie; Roger L. Cormier, Pleasant Valley, both of N.Y.; Michael H. Hartung, Tucson, Ariz.; Ray A. Larner, Georgetown, Tex.; Donald J. Lucas, Poughkeepsie, N.Y.; Kenneth R. Lynch, Rhinebeck, N.Y.; Brian B. Moore, Poughkeepsie, N.Y.; Howard L. Page, Charlotte, N.C.; David H. Wansor, Hyde Park; Carl Zeitler, Jr., Poughkeepsie, both of N.Y.

[73] Assignee: International Business Machines Corp., Armonk, N.Y.

[21] Appl. No.: 107,806
[22] Filed: Dec. 28, 1979
[51] Int. Cl.³ ............................................. G06F 13/00
[52] U.S. Cl. ................................................... 364/200
[58] Field of Search ... 364/200 MS File, 900 MS File

[56] References Cited

U.S. PATENT DOCUMENTS

| 2,856,595 | 10/1958 | Selmer | 364/200 |
|---|---|---|---|
| 3,242,467 | 3/1966 | Lamy | 364/200 |
| 3,314,051 | 4/1967 | Willcox et al. | 364/900 |
| 3,333,251 | 7/1967 | Brenza et al. | 364/200 |
| 3,437,998 | 4/1969 | Bennett et al. | 364/200 |
| 3,439,340 | 4/1969 | Gallaher | 364/900 |
| 3,510,844 | 5/1970 | Aranyl et al. | 364/200 |
| 3,566,358 | 2/1971 | Hasbrouck | 364/200 |
| 3,647,348 | 3/1972 | Smith et al. | 364/200 |
| 3,662,401 | 5/1972 | Collins et al. | 364/900 |
| 3,725,864 | 4/1973 | Clark et al. | 364/200 |
| 3,913,074 | 10/1975 | Homberg et al. | 364/200 |
| 3,962,706 | 6/1976 | Dennis | 364/900 |
| 4,032,899 | 6/1977 | Jenny et al. | 364/200 |
| 4,070,704 | 1/1978 | Calle et al. | 364/200 |
| 4,101,969 | 7/1979 | Lawson et al. | 364/900 |
| 4,130,885 | 12/1978 | Dennis | 364/900 |
| 4,148,098 | 4/1979 | McCreight et al. | 364/200 |
| 4,162,520 | 7/1979 | Cook et al. | 364/200 |
| 4,181,936 | 1/1980 | Kober | 364/200 |
| 4,224,665 | 9/1980 | Bijl et al. | 364/200 |
| 4,224,667 | 9/1980 | Lewis et al. | 364/200 |
| 4,262,332 | 4/1981 | Bass et al. | 364/200 |

OTHER PUBLICATIONS

IBM Technical Disclosure Bulletin, D. Stark, Data Processing Subsystems, 5/1977, vol. 19, No. 12, pp. 4525-4527.
IBM Technical Disclosure Bulletin, L. Yates, New Channel Command Word Command, 3/1976, vol. 18, No. 10, p. 3430.
IBM Technical Disclosure Bulletin, A. Johnson, Processing Multiple Records in a Disk Storage Sys. 3/76, vol. 18, No. 10, p. 3428.
M. Wilkes, Time-Sharing Computer Sys. 1968, American Elsevier Publishing Co. New York, p. 61.

Primary Examiner—James D. Thomas
Assistant Examiner—David Y. Eng
Attorney, Agent, or Firm—R. Lieber

[57] ABSTRACT

Secondary storage subsystems exchange messages and data with host data processing systems and also forward messages between host systems. Host systems thereby communicate with each other in addition to having access to data in subsystem storage. Access to subsystem storage is initiated by a "request" sent from a host to the subsystem. Each request is a message containing an array of one or more commands, each command specifying a transfer of data or a control function to be performed by the subsystem. A subsystem may process more than one request at a time. It also may process the commands in a request in an arbitrary sequence suited to the availability of subsystem resources and data links to host systems. After all commands in a request have been processed the subsystem transmits an associated "completion" message to the host system which originated the request. The completion message indicates the status of completion or abnormal termination of each command in the associated request. An "adapter" processor associated with each host and subsystem operates on an asynchronous basis to transfer messages and data relative to the associated host or subsystem. One or more processing "engines" in each adapter communicates with one or more CPU's in the associated host or subsystem through an associated "adapter store". A portion of each adapter store is used as a buffer pool for constructing "subchannel control spaces" to control transers of messages and data. Elements of each subchannel control space are returned to free status as soon as they are not needed for sustaining associated transfers.

13 Claims, 120 Drawing Figures

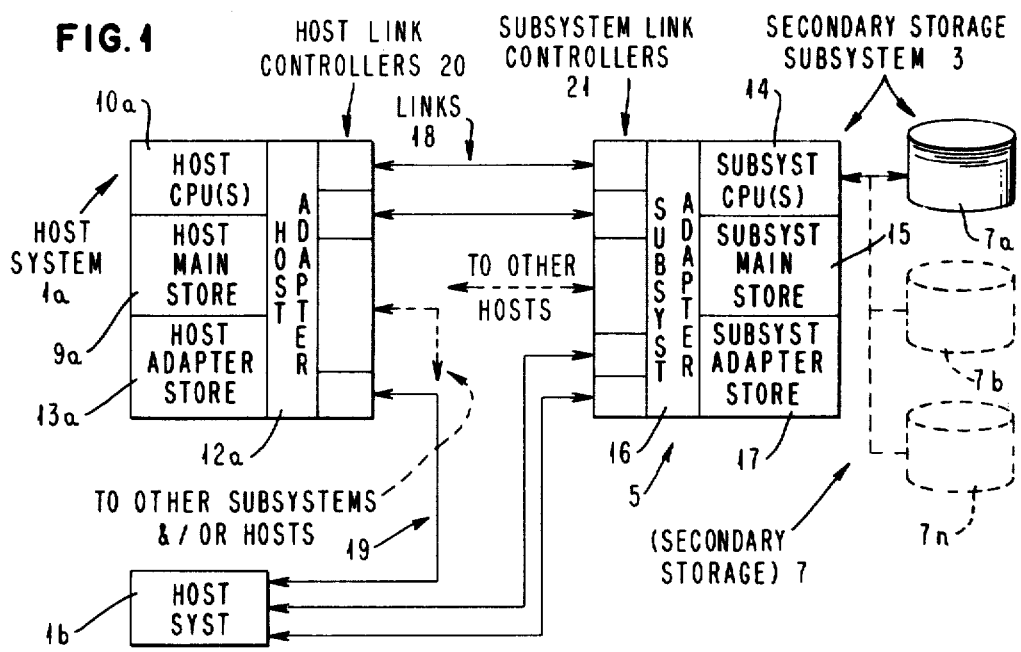
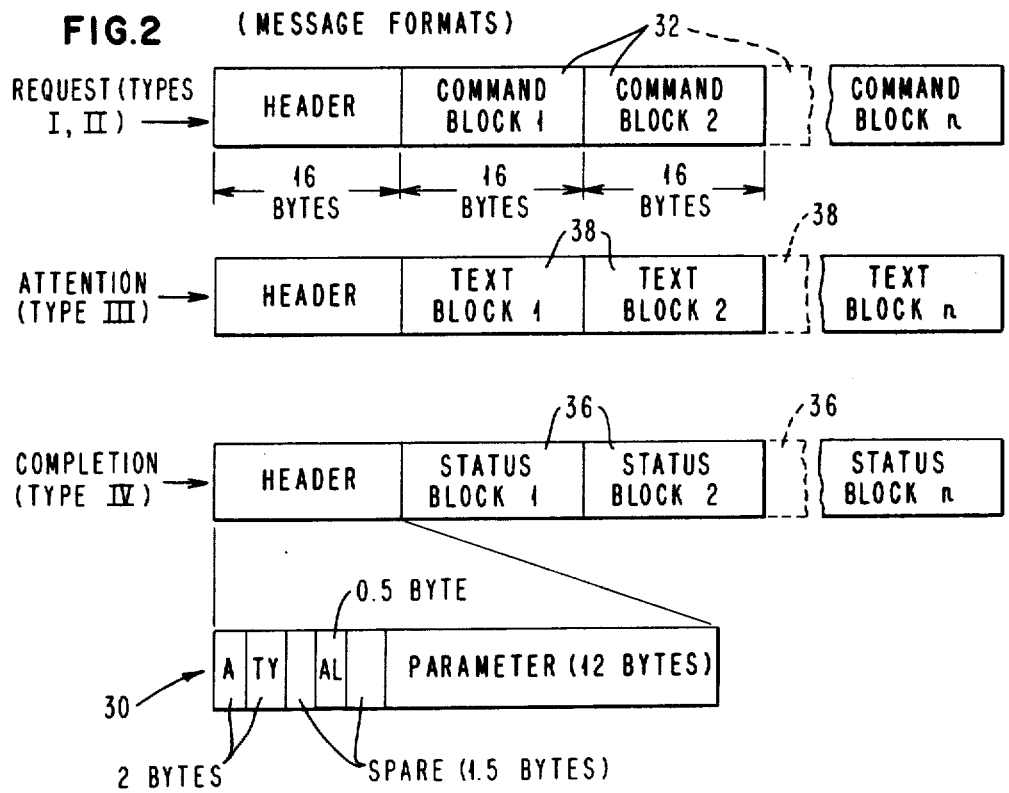

FIG. 3
DATA TRANSFER
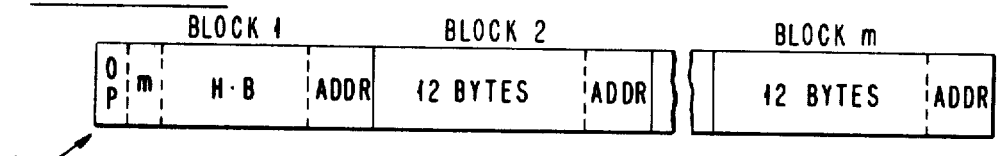
42
CONTROL
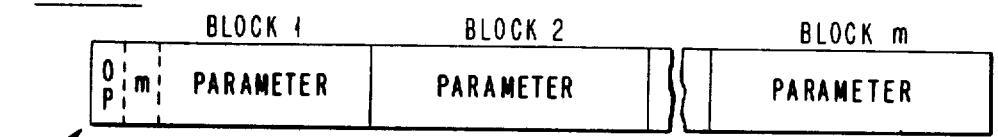
44
"MIXED" DATA TRANSFER & CONTROL IN ONE REQUEST
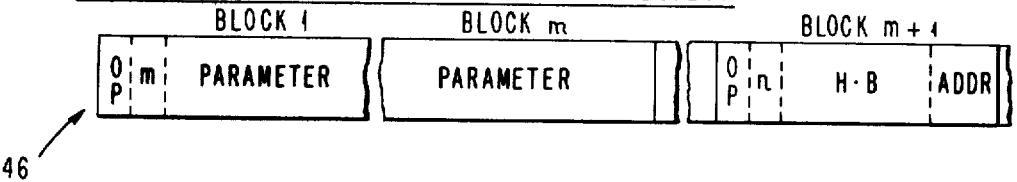
46
FIG. 4
START SUBSYSTEM TRANSFER (SST)
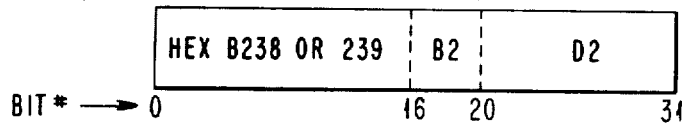
SIGNAL ADAPTER (SIGA)
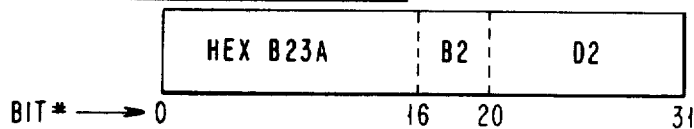

FIG. 9

WORK QUEUE

| BYTES | | |
|---|---|---|
| 0 | CPU LOCK ||
| 4 | RESERVED | CPU CURSOR |
| 8 | ADAPTER LOCK ||
| 12 | CONTROL HALFWORD | ADAPTER CURSOR |
| 16 | SSA \| RESERVED | MCE FIELD |
| 20 | WORK ELEMENT 0 | WORK ELEMENT 1 |
| 24 | WORK ELEMENT 2 | WORK ELEMENT 3 |
| ... | ... | ... |
| 504 | WORK ELEMENT 242 | WORK ELEMENT 243 |
| 508 | RESERVED | RESERVED |

FIG. 11

INTERRUPTION QUEUE

| BYTES | | |
|---|---|---|
| 512 | CPU LOCK ||
| 516 | RESERVED | CPU CURSOR |
| 520 | RESERVED ||
| 524 | RESERVED | ADAPTER CURSOR |
| 528 | INTERRUPTION ELEMENT 0 | INTERRUPTION ELEMENT 1 |
| 532 | INTERRUPTION ELEMENT 2 | INTERRUPTION ELEMENT 3 |
| ... | ... | ... |
| 1504 | INTERRUPTION ELEMENT 488 | INTERRUPTION ELEMENT 489 |
| 1508 | RESERVED ||
| 1532 | 28 BYTES ||

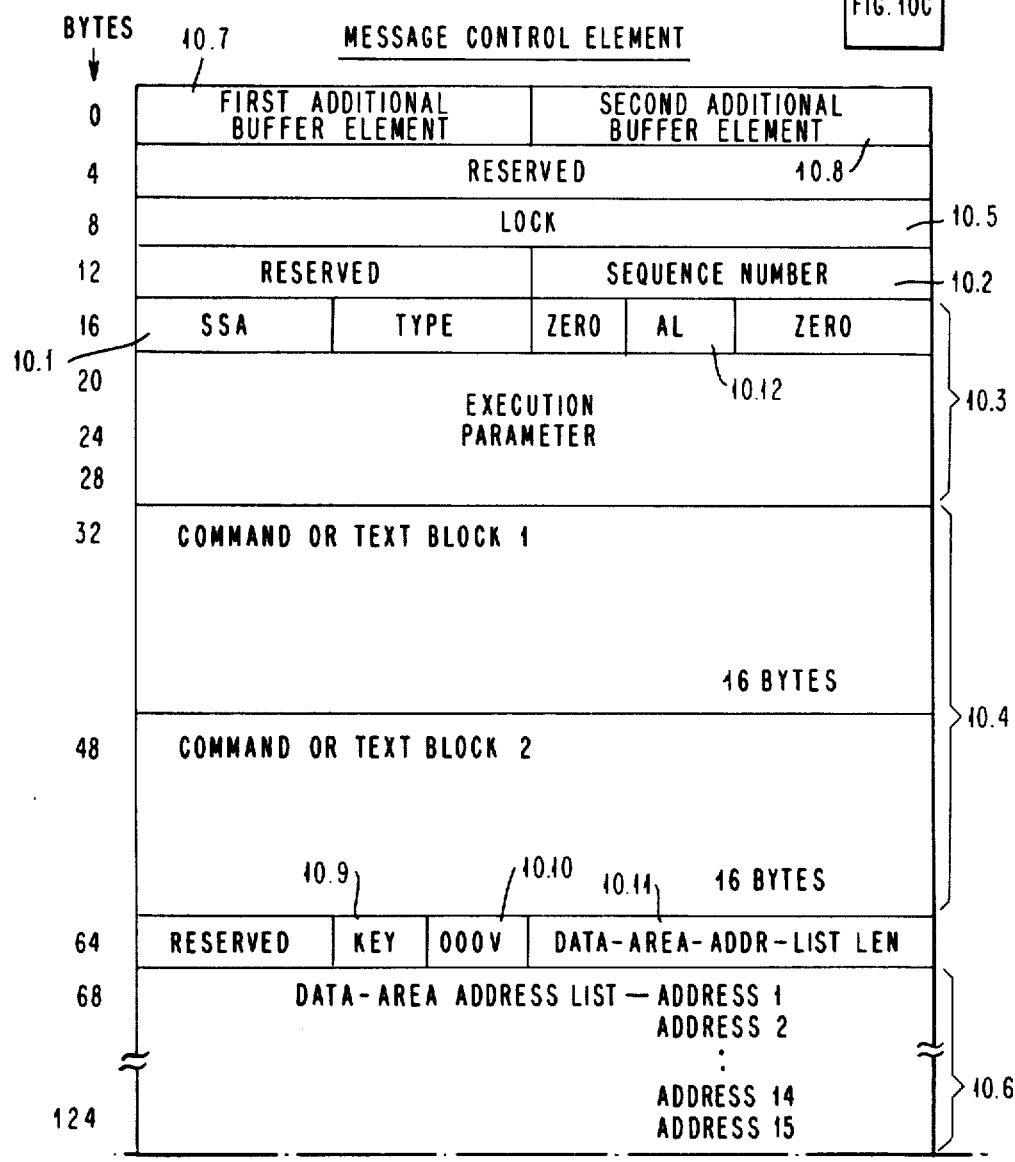

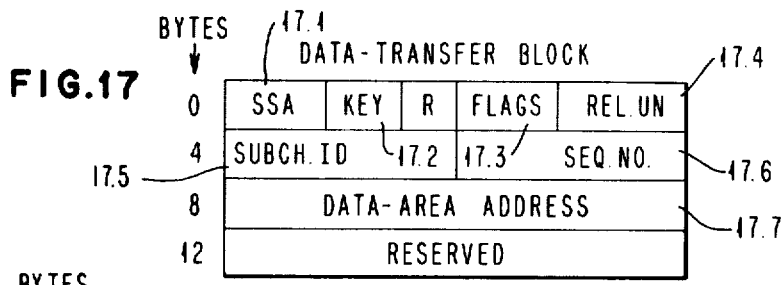
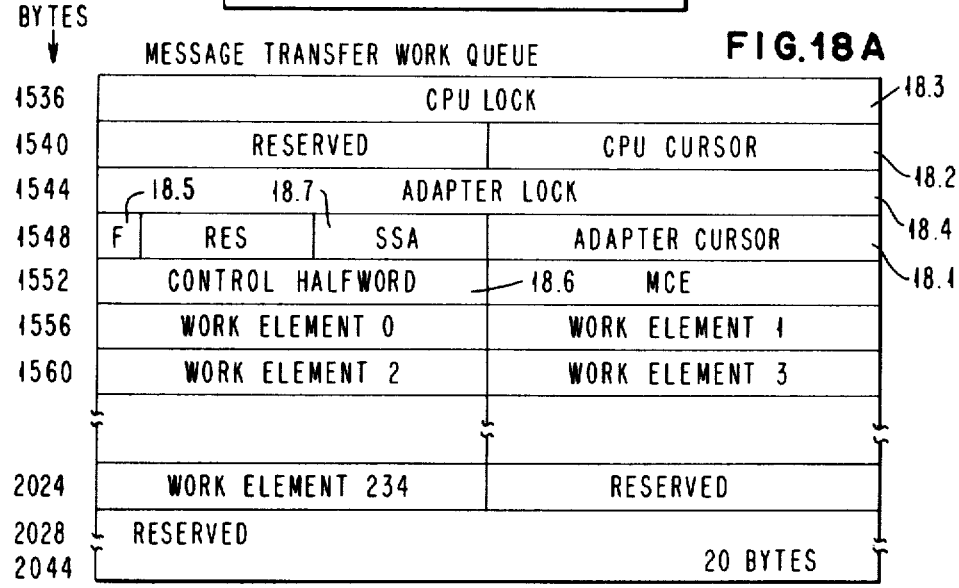
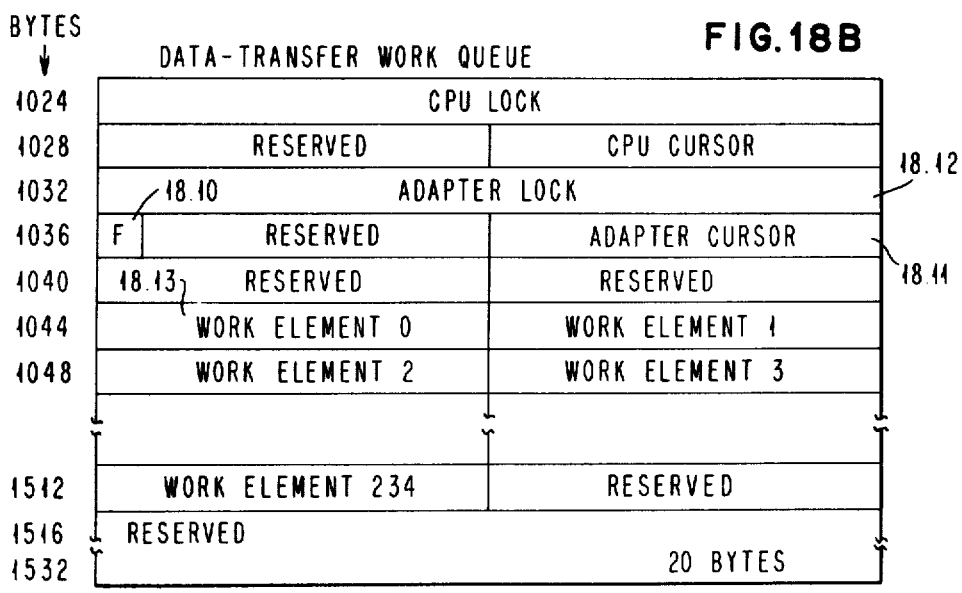

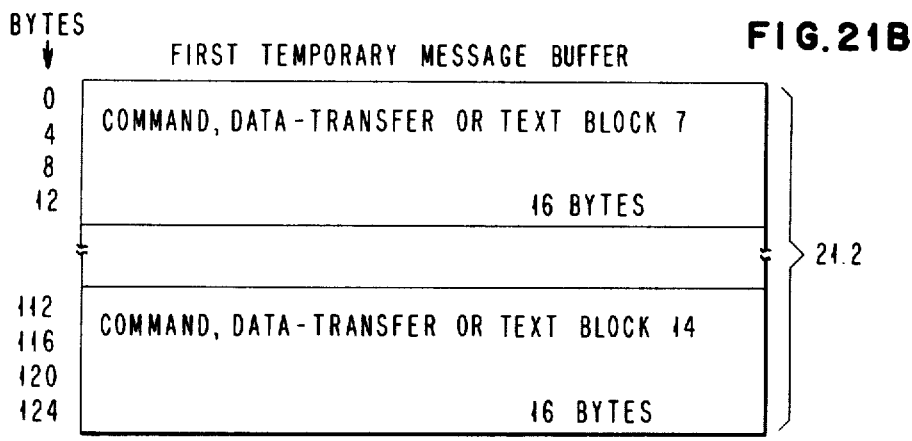
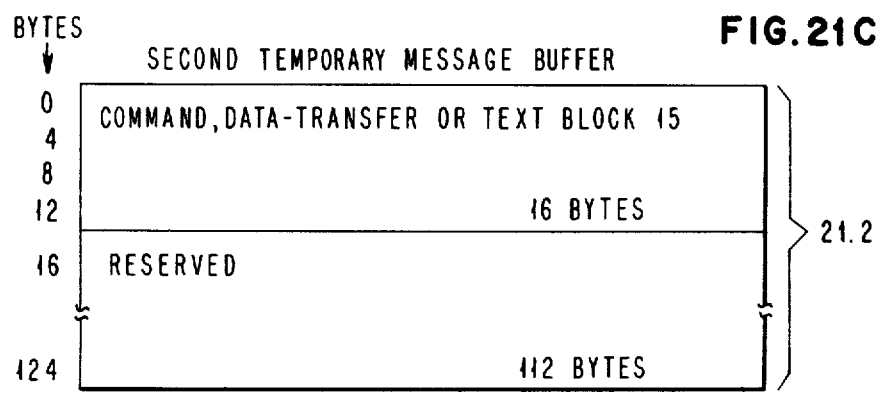
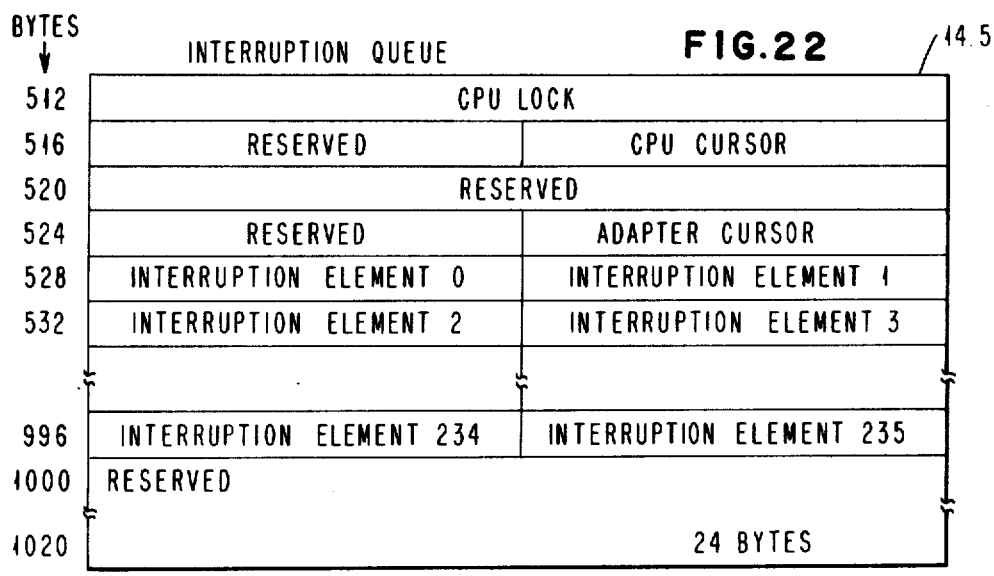

FIG. 23

DATA-TRANSFER CONTROL REGISTER — 14.7

| BYTES | | | | | |
|---|---|---|---|---|---|
| 2176 | COMP CT. | A | RES | AL | MCE |
| 2180 | 23.5 | | 23.3 | RESERVED | 23.1 |
| 2184 | DATA-TRANSFER LOCK 1 | | | | |
| 2188 | CONTROL HALF-WORD 1 | | STATUS 1 | | RESERVED |
| | 23.3 | | 23.4 | | 23.2 |
| 2296 | DATA-TRANSFER LOCK 15 | | | | |
| 2300 | CONTROL HALF-WORD 15 | | STATUS 15 | | RESERVED |
| | | | 23.4 | | |

FIG. 24

CONFIGURATION ELEMENT — 14.4

| BYTES | | | |
|---|---|---|---|
| 2048 | STATE LOCK | | 24.2 |
| 2052 | RESERVED | DEFER COUNT | STATE |
| 2056 | PRIMARY LENGTH | PRIMARY CURSOR | 24.3 |
| 2060 | PRIMARY RESPONSE-LIST ADDRESS | | |
| 2064 | ALTERNATE LENGTH | RESERVED | |
| 2068 | ALTERNATE RESPONSE-LIST ADDRESS | | |
| 2072 | LINK LOCK 0 | | |
| 2076 | LINK LOCK 1 | | |
| | | | 24.1 |
| 2100 | LINK LOCK 7 | | |
| 2104 | RESERVED | | |
| 2172 | | 72 BYTES | |

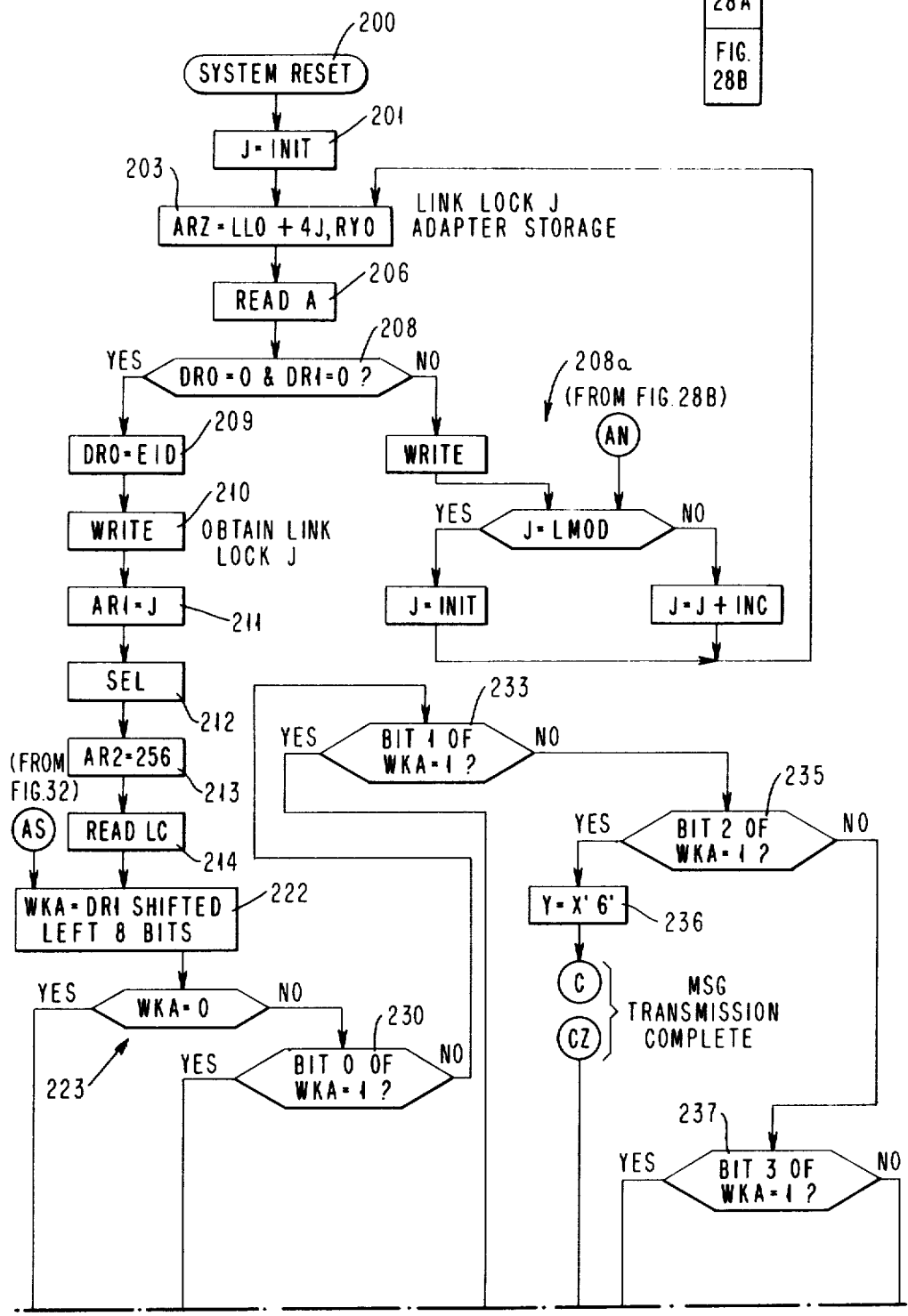

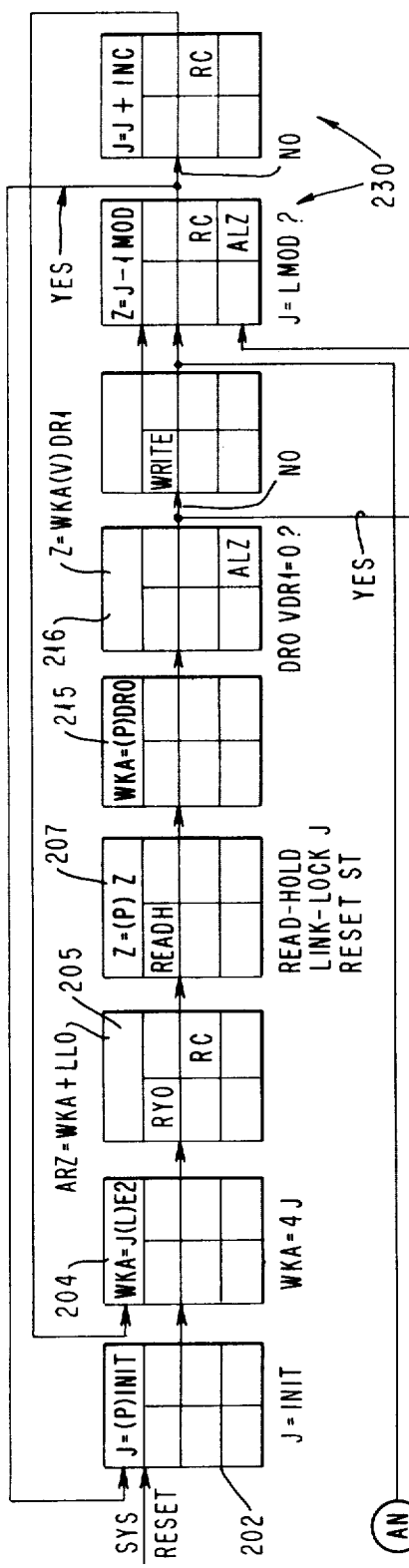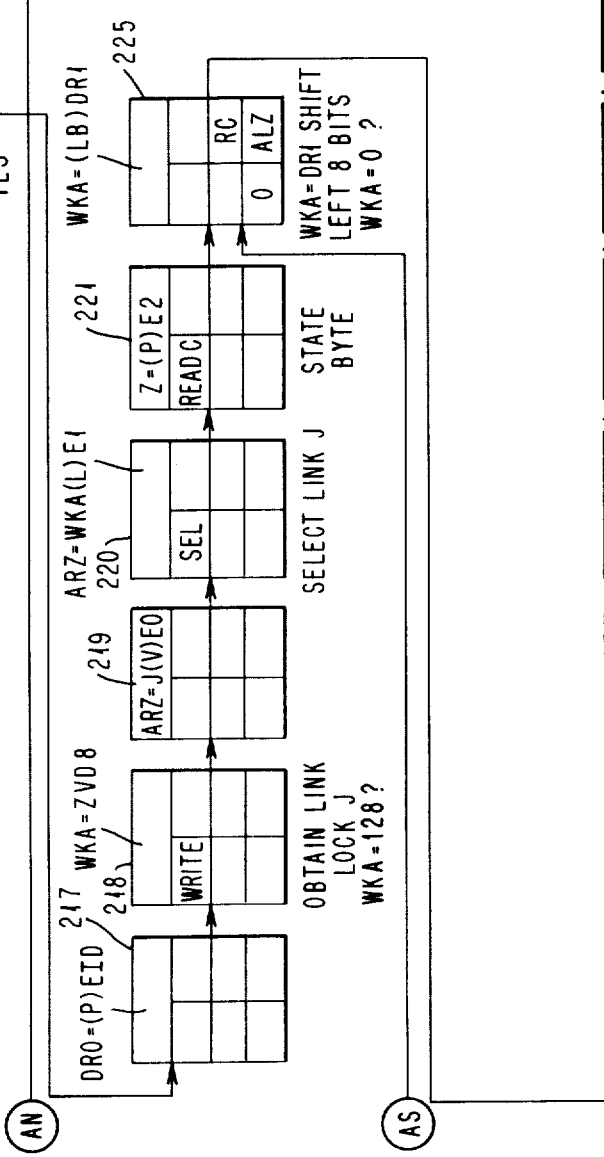
FIG. 29

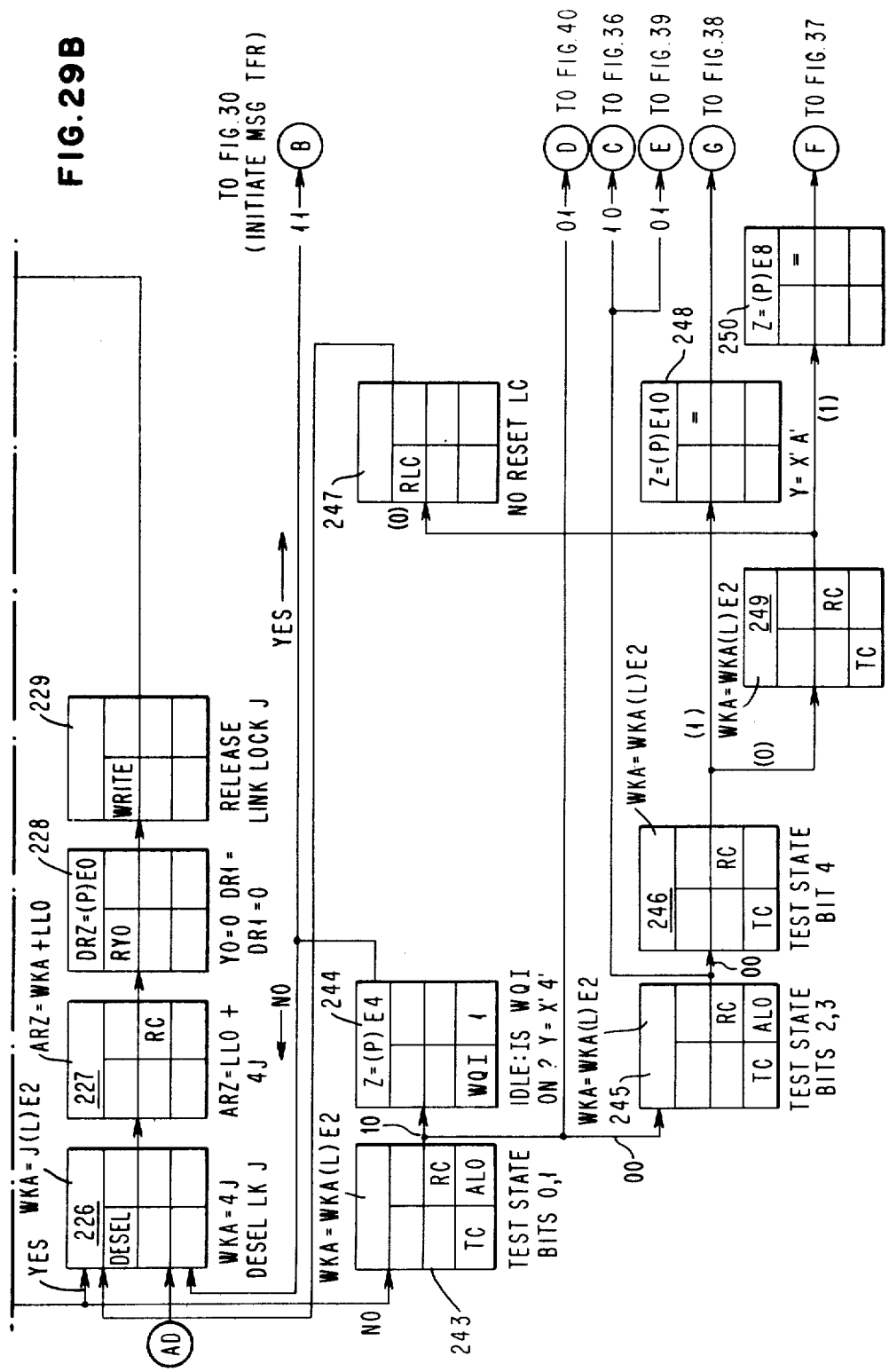

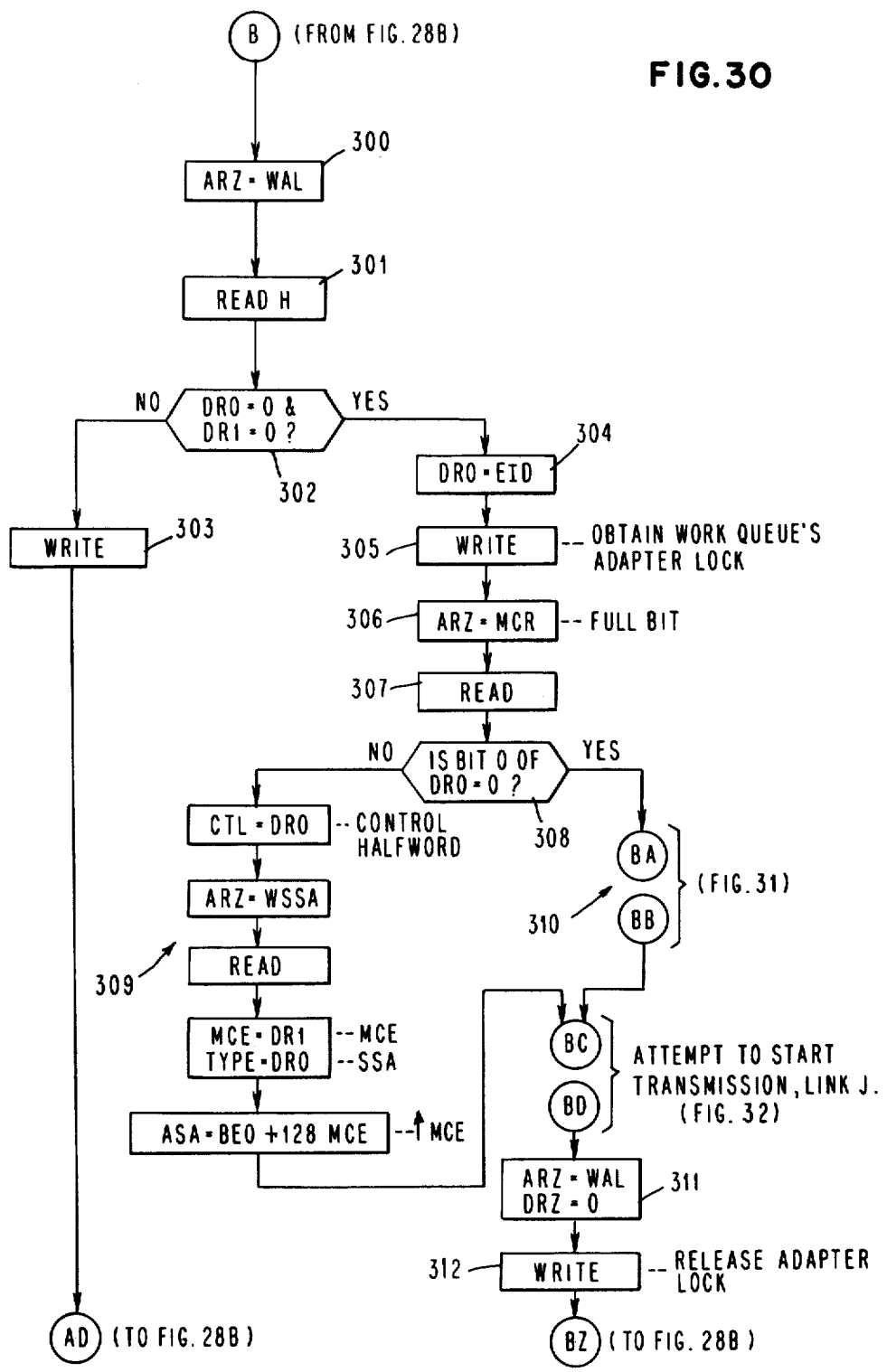

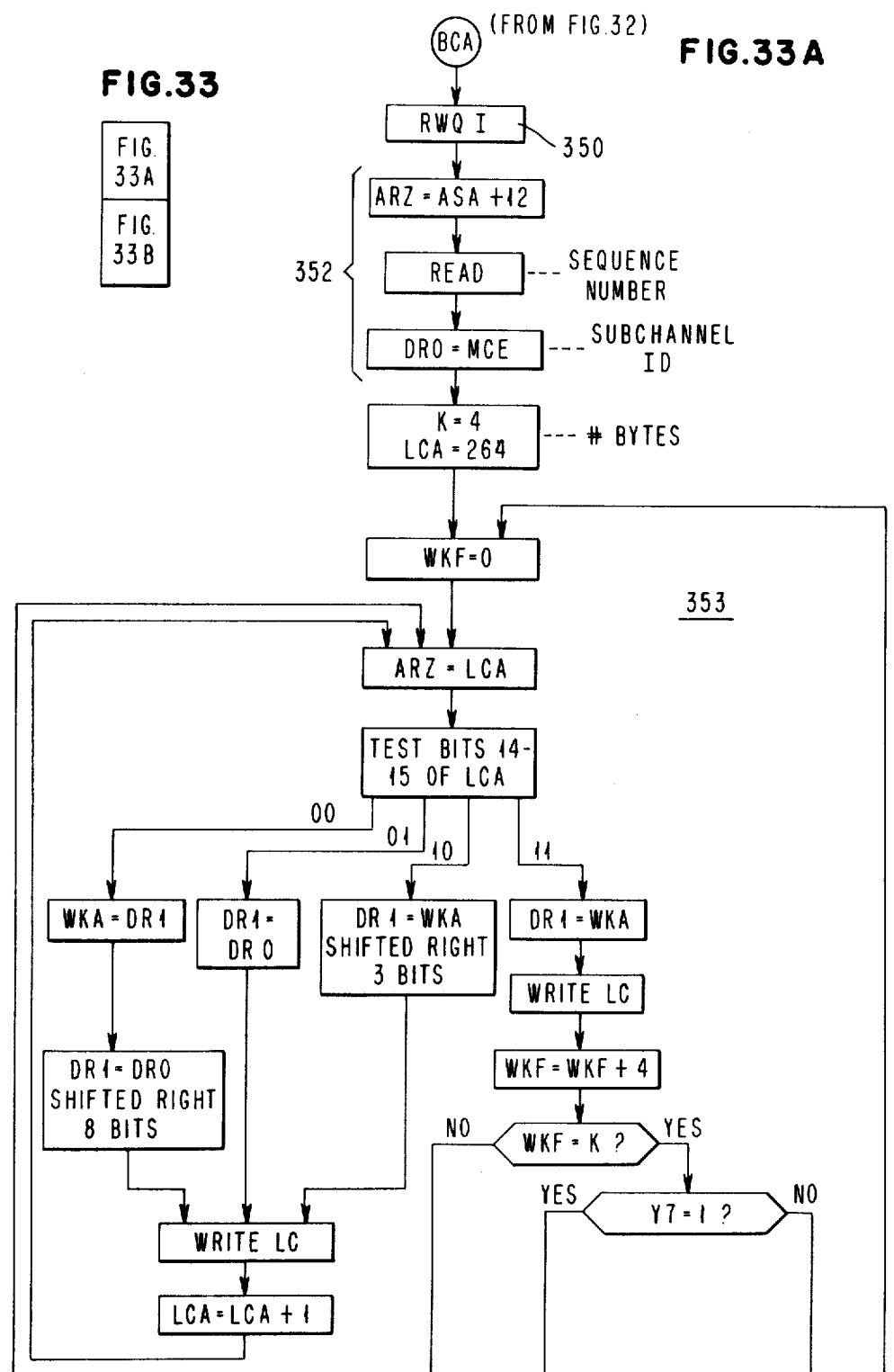

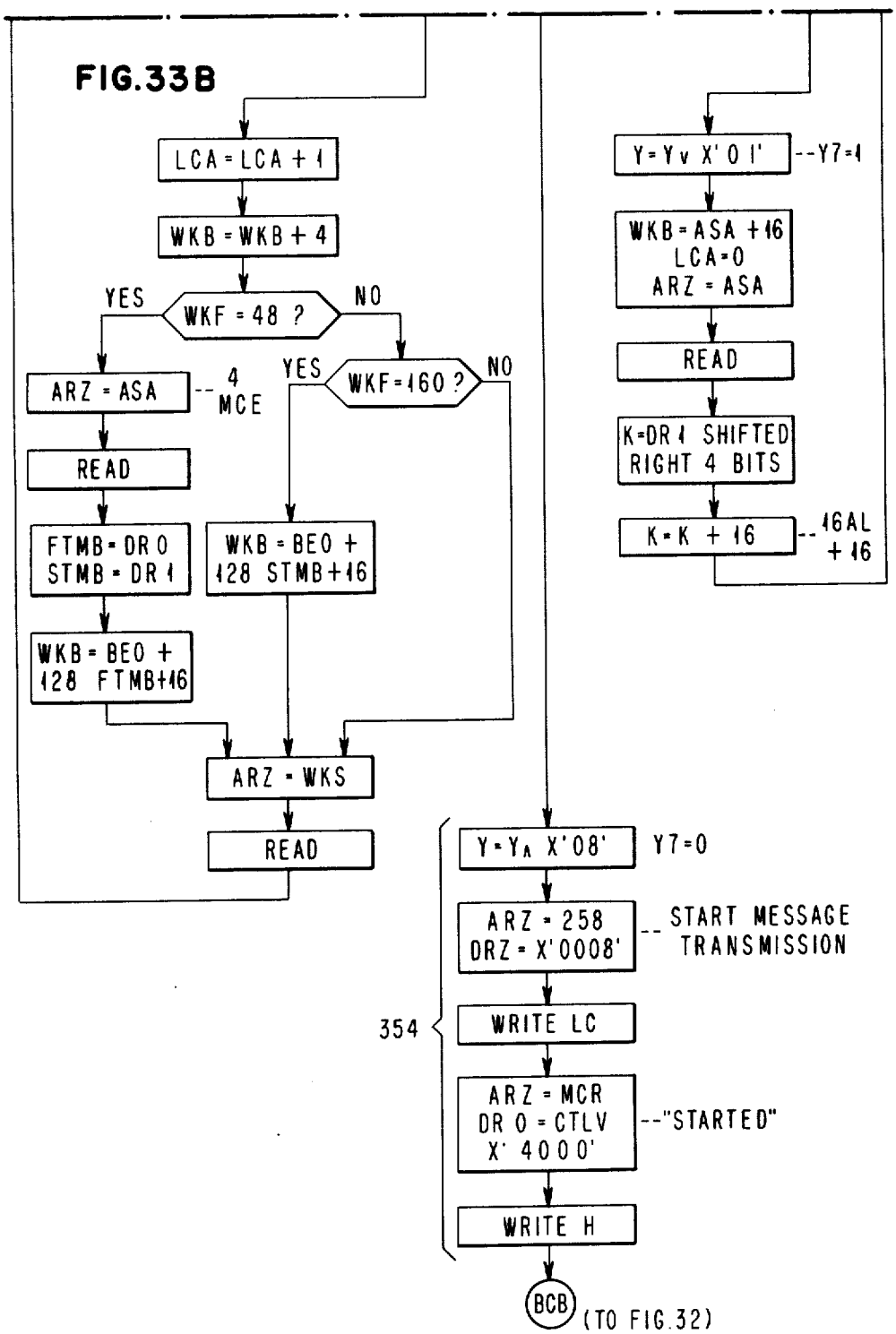

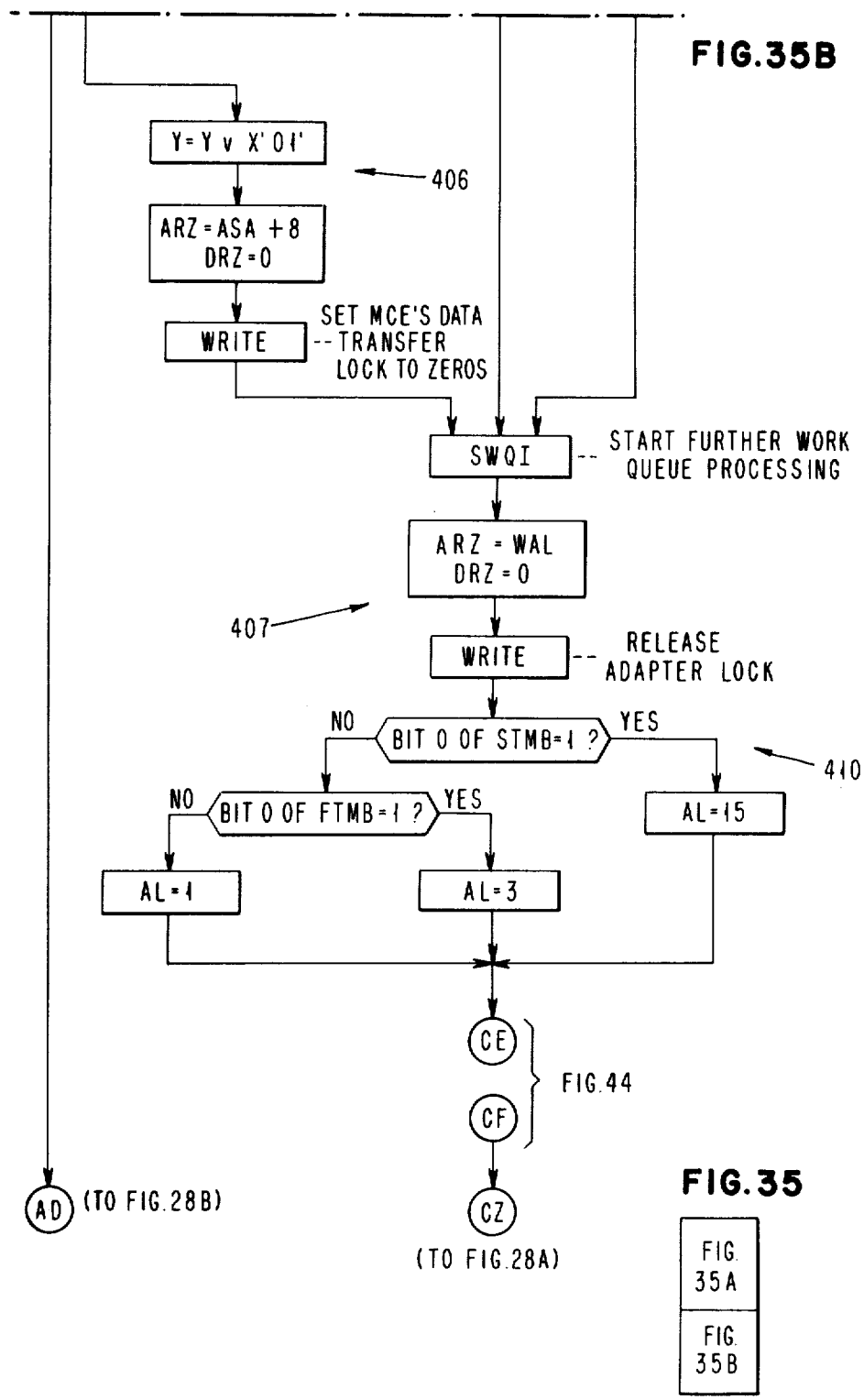

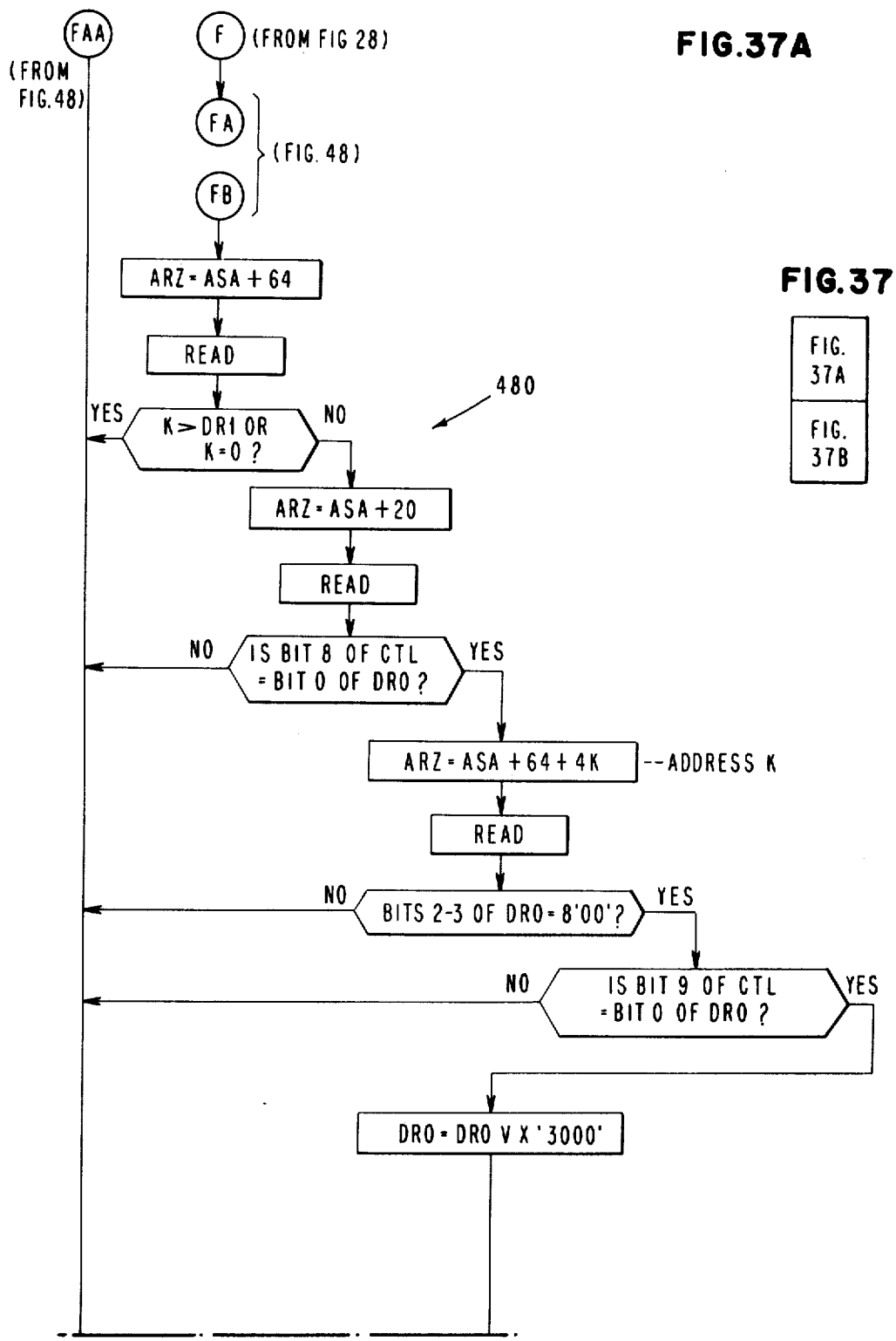

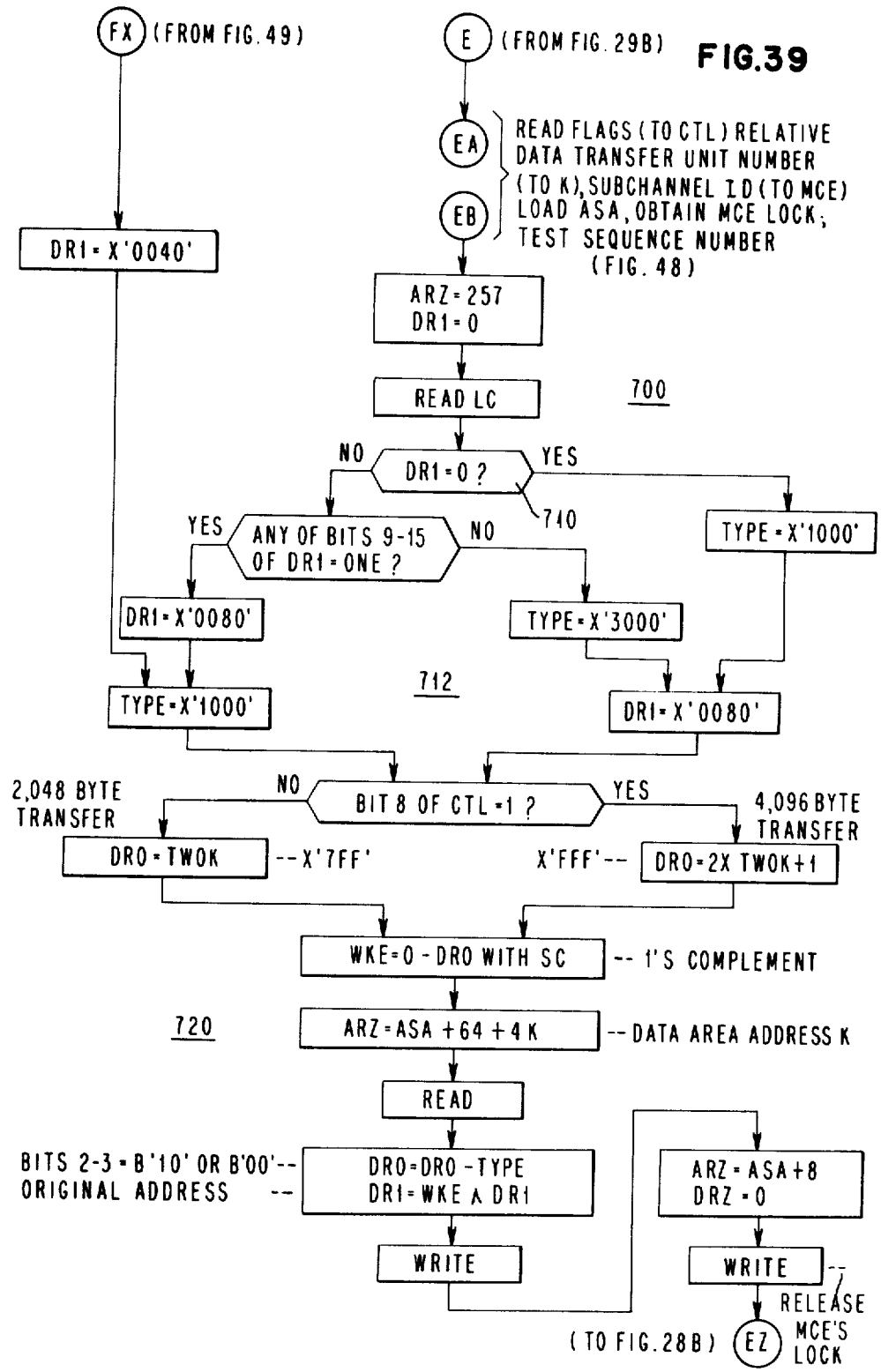

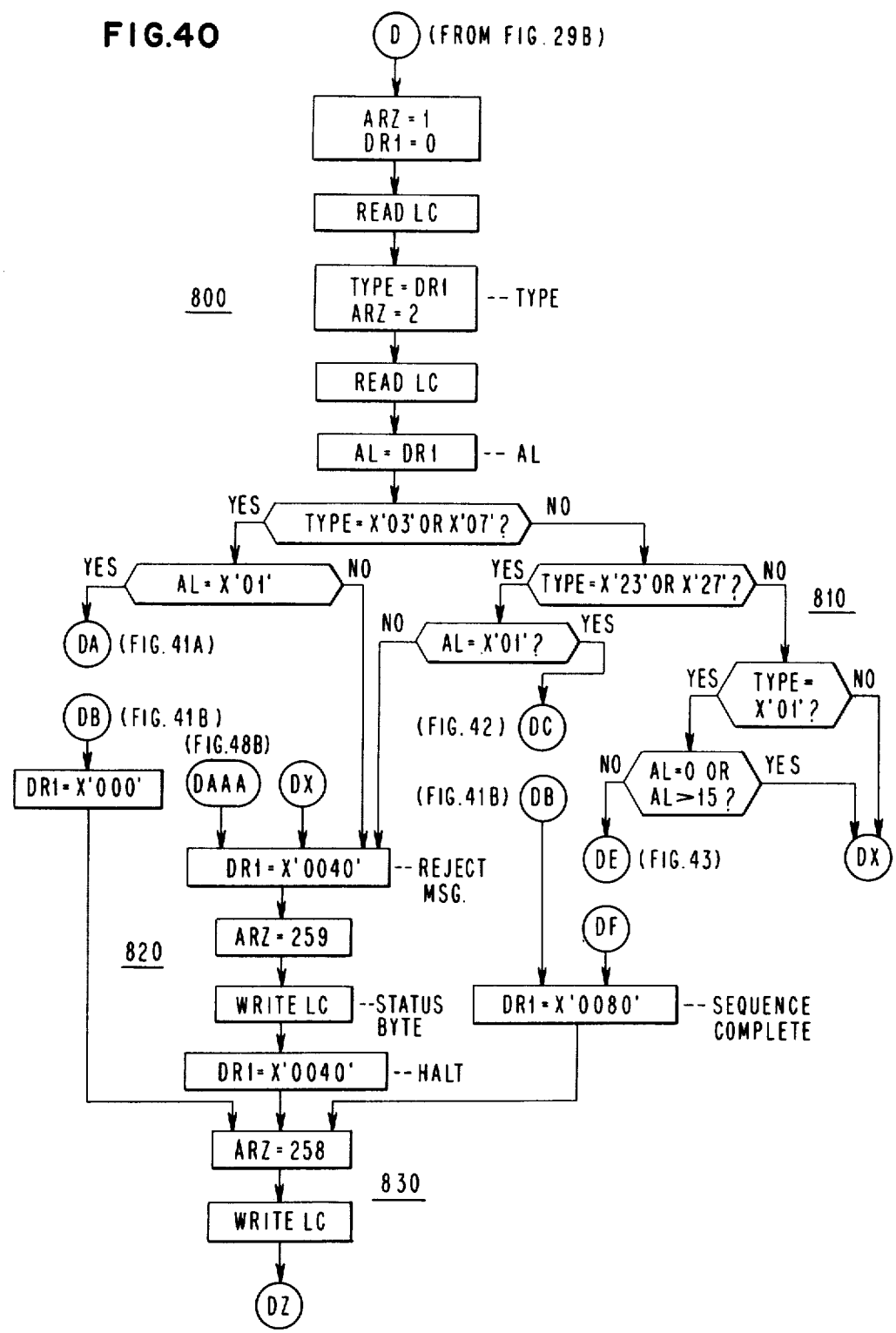

FIG. 41

| FIG. 41A |
|---|
| FIG. 41B |

FIG. 41A

DA (FIG.40)
↓
DAA (FIG.48A)
↓
DAB (FIG.48B)
↓
DR1 = 0 — SET SEQ.NO.=0
WRITE H
1000

ARZ = ASA + 8
DRZ = 0
↓
WRITE — RELEASE MCE LOCK

↓
ARZ = ASA + 64
↓
READ
↓
1010 IS BIT 15 OF DR0=1?
— NO → (left branch)
— YES →

WKE = DR1
WKE = ASA + 68  — LIST BYTES
K = 0  — ADDRESS 1
↓
ARZ = ASA + 20 — FLAGS
↓
READ
1020
↓
CTL = DR0
↓
K = WKE ?
— YES → (left)
— NO →
ARZ = WKF
↓
READ — ADDRESS K
↓
AR0 = DR0
AR1 = DR1
↓
RPB 1030
ARZ = STL
↓
READ H
↓
DR0=0 & DR1=0 ?
— NO → WRITE → DELAY 10 CYCLES
— YES → DR0 = EID → WRITE
OBTAIN STATE LOCK

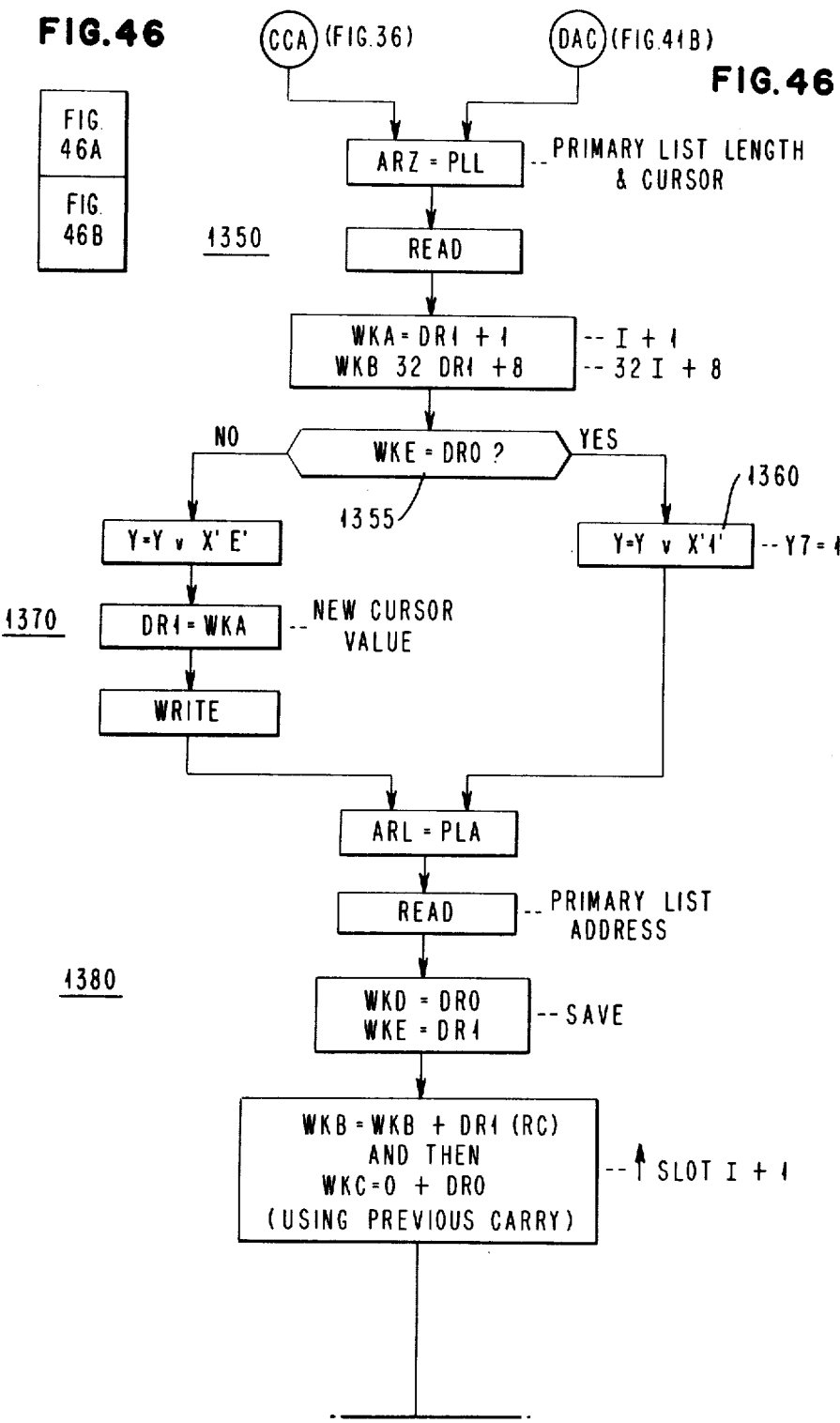

FIG. 53
| FIG.53A |
|---------|
| FIG.53B |
FIG. 53A
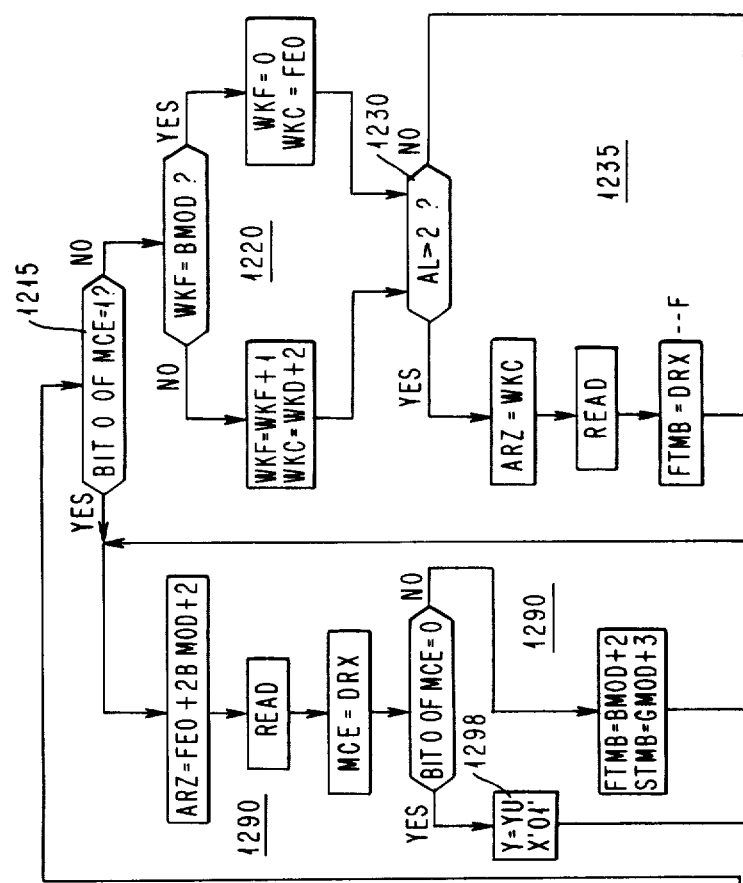
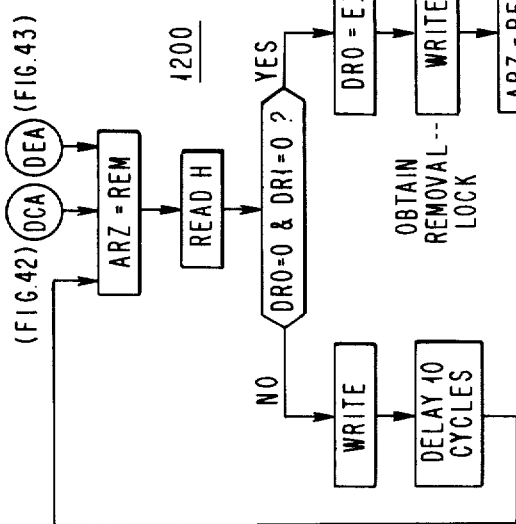

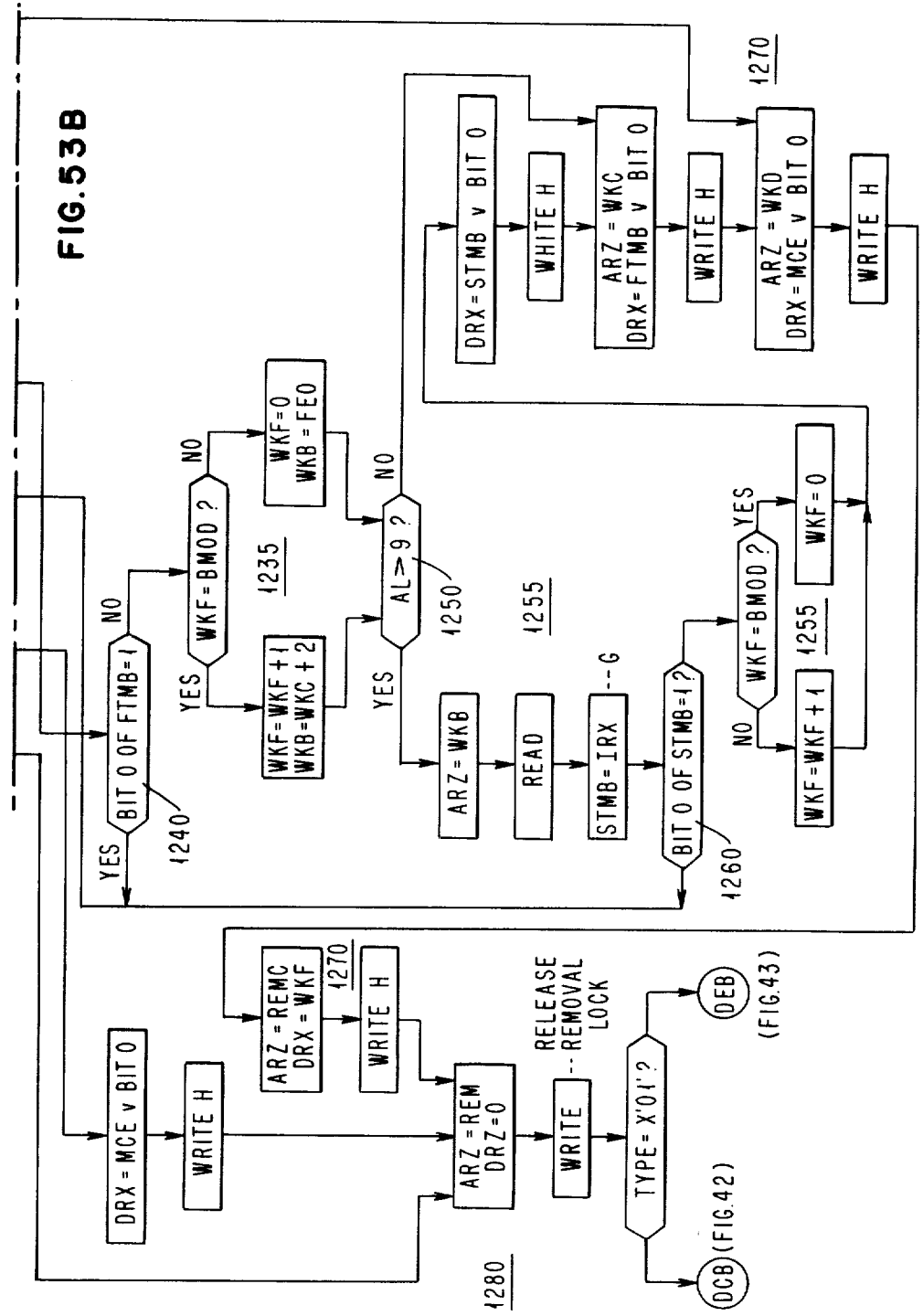

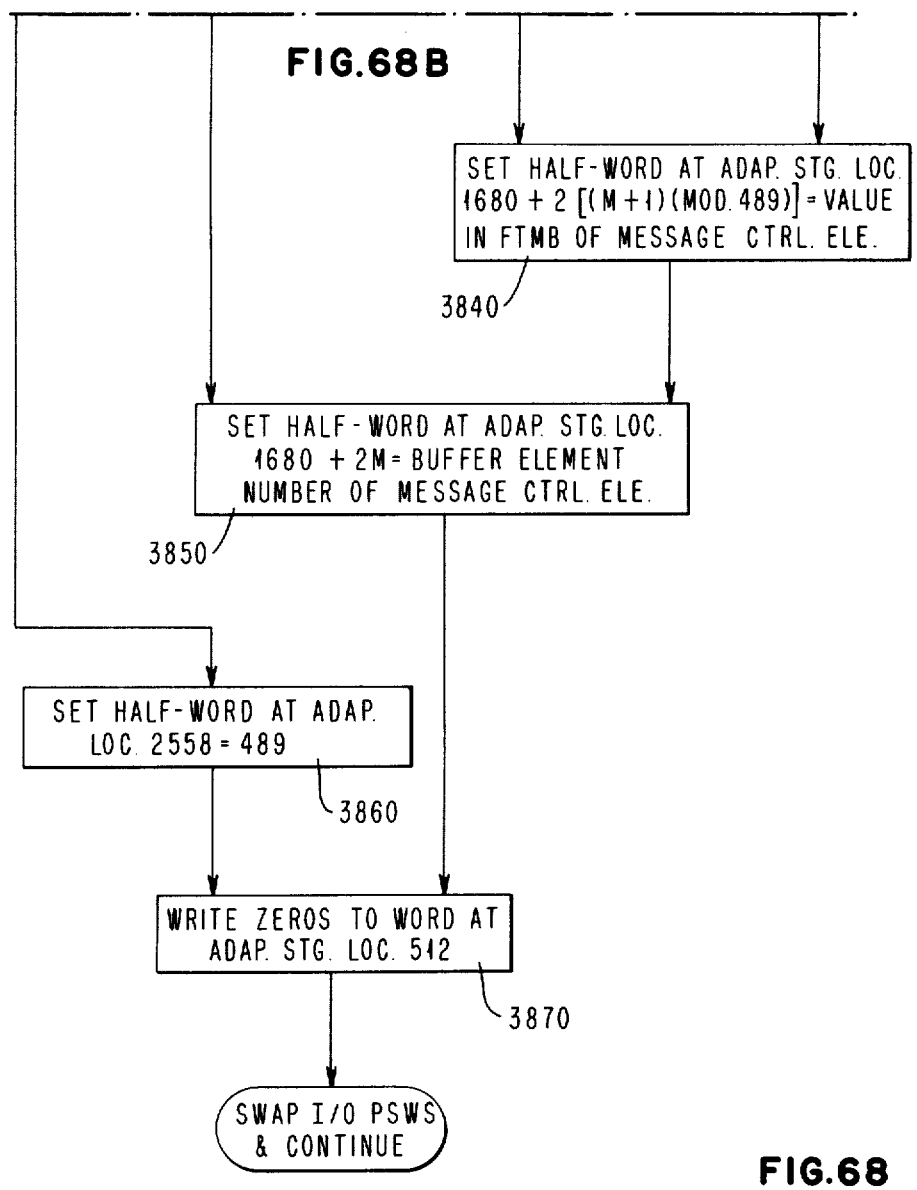
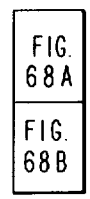
FIG. 68

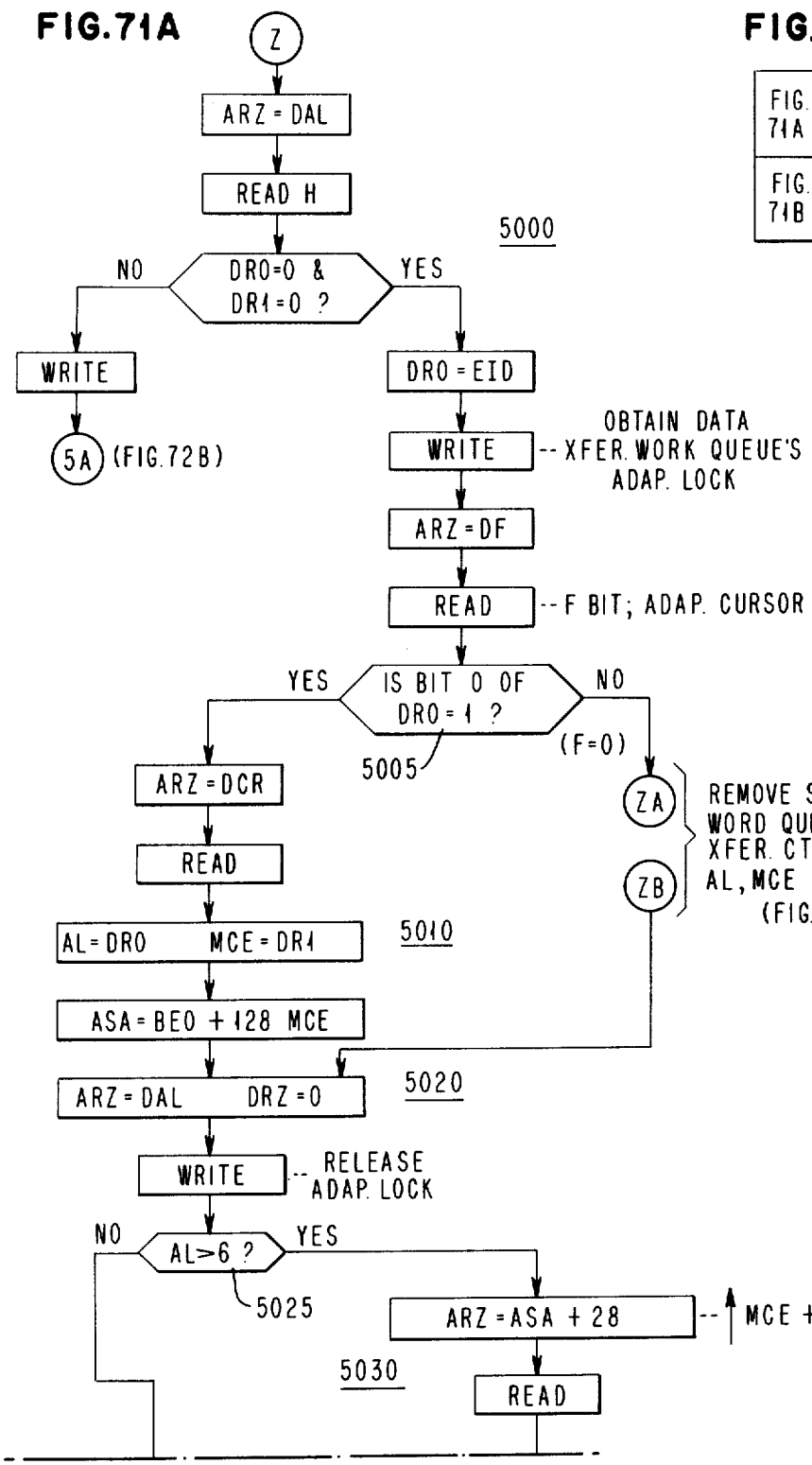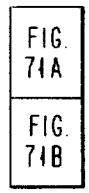

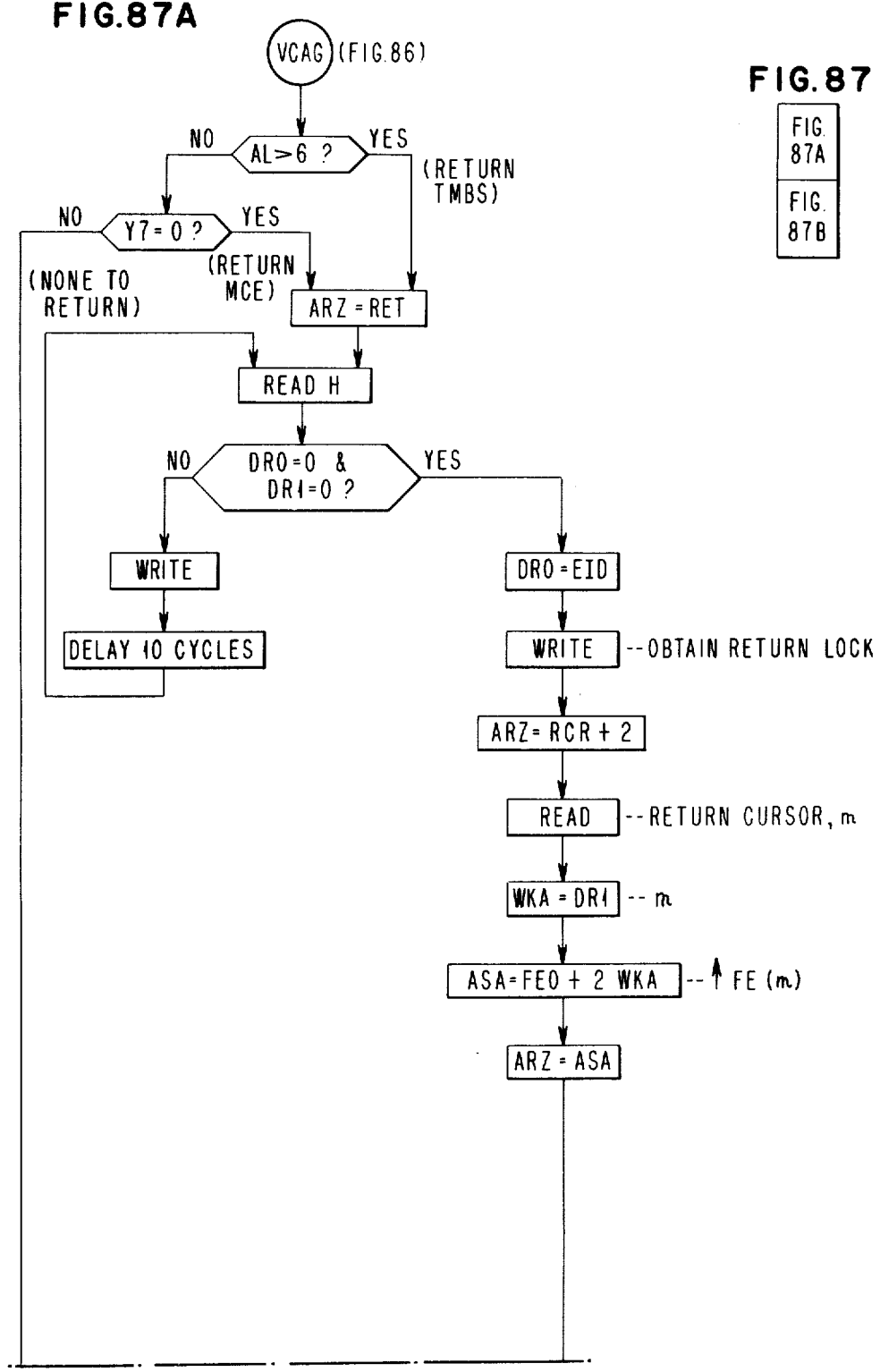

BLOCK TRANSFERS OF INFORMATION IN DATA PROCESSING NETWORKS

BACKGROUND

Field Of The Invention

This invention concerns a method and apparatus for transferring information between host data processing systems and secondary (mass) storage subsystems.

Problems Solved And Principal Objects

In contemporary data processing systems information is usually transferred between host systems and secondary (backing) storage subsystems through input-output channels associated with the host systems and control units associated with the subsystems. The channels and control units perform data transfer conversions (bit-to-byte, byte-to-word, etc.) and ancillary housekeeping functions (storage address updating, bit/byte counting, etc.). The channels, control units and devices operate in response to programmed commands which are passed one at a time from host main storage to a channel, from the channel to a control unit and from the control unit to a device. Consequently each command transaction requires several signalling processes between the channel and control unit; one for selecting the device, another for transferring the command information, another for transferring data if the command specifies a data transfer, and another for communicating concluding status to the host system via the channel. The signalling processes for transferring commands and status represent a not insignificant burden on input-output resources of a system. And since variable amounts of data are transferred in response to data transfer commands it is not unusual for command and status signalling operations to consume more time and facilities than an associated transfer of a short string of data.

Accordingly, a principal object of this invention is to provide for more efficient communication of commands, status information and data between host systems and secondary storage subsystems.

Another characteristic of contemporary systems is that transfers of information directly between loosely coupled host systems are usually conducted through special channel-to-channel adapter devices which interconnect a single channel in one host to a single channel in another host. This increases network costs and provides very limited connection path options. Furthermore, the channel-to-channel adapters require synchronous interaction between supervisory programs in the communicating host systems, thereby increasing the program loads on the host systems. The present invention seeks to alleviate these connection path limitations and program loading burdens.

Accordingly, another principal object of this invention is to provide a basis for obtaining more efficient communications between host systems in a network of loosely coupled host systems.

Inasmuch as commands and associated operations are usually processed one at a time by contemporary channels and control units the signalling transactions between a channel and control unit for each command represent an added burden on the channels, the control units and the links (e.g. interface cabling) between channels and control units.

Accordingly, another object of this invention is to provide a basis for permitting plural commands to be transferred simultaneously from a host system to a subsystem in a single communication transaction, and for enabling a subsystem control unit to transfer concluding status, relative to operations performed in response to plural command functions, in a single communication transaction.

Another problem characteristic of contemporary systems is that a fixed amount of host storage space is usually allocated to each host system channel for control of "subchannel" operations in respect to associated command programs. This may be inefficient inasmuch as traffic through individual channels may fluctuate considerably in time, whereby subchannel storage capacity allocated to one channel may remain unused while another channel may be effectively blocked because of insufficient storage capacity.

Accordingly another object of this invention is to provide a more efficient basis for allocating buffer storage capacity to I/0 subchannels.

Another characteristic of contemporary systems is that the process performed in the host system for initiating an input or output operation (e.g. the process associated with the execution of a Start I/0 instruction in IBM System/370 systems) usually requires the initiating host system to attempt to link to a device, and to refrain from performing other operations until it receives an indication of the status of the attempted link-up operation. If a device or linkage path is busy it may be necessary for the host system to terminate the operation unsuccessfully and subsequently repeat the initiation process. This increases the supervisory program burden on host processing and potentially can degrade overall system performance.

Accordingly, another object of this invention is to provide a method for more efficiently initiating input-output operations in data processing systems.

SUMMARY OF THE INVENTION

In accordance with the foregoing objects a method and apparatus are provided for transferring information between host systems and secondary storage subsystems. The information may be transferrable over various linkage paths on a selective basis. The subject method and apparatus are also conveniently adaptable to be used for transferring information between pairs of host systems over various paths assignable on a selective basis. In such "inter-host" transfers the information may be channeled either directly between hosts or indirectly through a subsystem.

In accordance with the subject method all information transferred between a host system and a subsystem consists of message block units and data block units having predetermined block formats. Data block units are either 2048 bytes or 4096 bytes in length. Messages have variable block lengths and contain information in four basic type formats; Types I, II, III and IV. Type III messages are transferrable between host systems, either through direct links between host systems or indirectly through switched linkages supplied by subsystems in a "store-and-forward" mode.

Each message consists of a 16-byte header followed by an array of one or more 16-byte blocks of information. Type I and II messages (requests) are transmitted only by host systems to subsystems. Type III (attention) messages may be sent from host systems to subsystems, from host systems to other host systems, and from subsystems to host systems. Type IV (completion) messages are sent only from subsystems to host systems.

Each completion message indicates the status of handling of operations specified by commands in an associated request message.

The message header contains information denoting the message type, the "destination" subsystem or host to which it is immediately being sent and the number of 16-byte blocks of information which follow the header. When a type III message is sent from a host to a subsystem for switched transfer to another host, the "immediate" destination is the subsystem. The message is stored in the subsystem and a subsequent type I or II request instructs the subsystem to route the stored type III message to another specified host.

Each request message (type I or II) contains one or more commands which specify operations for the subsystem to perform. Type I requests invariably contain at least one command defining a data transfer operation. Type II requests do not contain any data transfer commands. Type III (attention) messages contain free form text blocks following the header. The text information in these blocks represents information directed to a subsystem or host system on an unsolicited basis. Type IV (completion) messages contain status information blocks following the header. Each status information block in each type IV message defines the status of completion or abnormal termination of the operations designated by a corresponding command in an associated type I or type II request.

A string of several data transfer command blocks in a type I request may represent a single data transfer command specifying a transfer of several data blocks between contiguous block locations in subsystem secondary storage and scattered block locations in host (main) storage. Such commands are transmitted to the subsystem in a compact single-block form with a string length indication. When initiating the transfer of any data block unit defined by such a command the subsystem sends a relative-data-transfer number to the host system; said number indicating the position of said units in the associated string.

The subsystem comprises a processing facility capable of storing plural requests at one time and of performing operations defined by individual commands in one request in a sequence arbitrarily suited to the availability of subsystem resources and system communication links.

An adapter processor associated with each host system (also termed the "host adapter") operates on an asynchronous basis, relative to central processors (CPU's) and supervisory programs in the associated host system, to sustain transfers of messages and data between the associated host system and one or more subsystems, and to sustain transfers of attention (type III) messages between the associated host system and other host systems. A host adapter may have several links to other hosts and several links to each of several subsystems. It thereby may transfer messages on a path-selective basis, via links assigned to subchannels only when required. Basically, the host adapter may be viewed as an input-output channel processor having extended functional capabilities. A host adapter may comprise plural processing "engines" capable of simultaneously handling different message and data block unit transfers.

Each subsystem contains one or more CPU's, and an associated "subsystem adapter" for sustaining transfers of messages and data relative to associated host systems. The subsystem adapters have logical organizations similar to the host adapters and perform generally similar operations.

Each host adapter has an associated "host adapter store" facility used only for controlling message and data transfers relative to the associated host system. Each subsystem adapter also has an associated "subsystem adapter store" facility for controlling transfers of messages and data relative to the respective subsystem. Each host and subsystem has an associated "main store" facility for storing programs and data. The host and subsystem adapter stores may be located in reserved and dedicated portions of the associated main stores.

A portion of each adapter store, termed a "subchannel buffer pool", contains multiple storage spaces allocatable to support multiple message transfer transactions relative to the associated host or subsystem. When a space in this pool is allocated to a particular message that space is referred to as the "subchannel control space" associated with that message. Each subchannel control space consists of one or more buffer storage element sub-spaces selected from the associated buffer pool. Each buffer storage element sub-space consists of 128 contiguous byte storage locations. Buffer storage elements not allocated to subchannel control spaces have "free" status. The buffer storage elements forming a particular subchannel control space are restored to free status as soon as they are no longer needed in respect to the associated message transaction, and are thereby immediately available to be used in forming other subchannel control spaces. Different elements of a subchannel control space may be restored to free status at different times. For instance, elements of a subchannel control space in the host adapter store, when associated with a message which has been transferred to a subsystem and which does not require any data transfer action by the subsystem or any status response from the subsystem, may be restored to free status immediately after the message has been transferred. Other elements associated with a message requiring a data transfer or completion message follow-up remain associated with the message until the associated follow-up communication is completed.

The CPU's in the subject host systems and subsystem are controlled by supervisory instruction programs. Outgoing message transfers, from a host system to a subsystem or other host, are scheduled as tasks by such supervisory programs. A newly defined instruction, Start Subsystem Transfer (SST) is used by CPU's in the host systems and subsystems to initiate message transfers. A newly defined instruction, Start Data Transfer (SDT) is used by subsystem CPU's to initiate data block transfers specified by commands in type I request messages.

A host system CPU executing an SST instruction refers to a message control block array in host main storage (prepared previously by a host system supervisory program), which contains the message header and information for locating the rest of the message. While executing said instruction said CPU constructs a subchannel control space from free buffer elements in the subchannel buffer pool section of the associated host adapter store, copies the message information from the message control block array and associated other areas of main storage into said subchannel control space, and makes an entry in a work queue list section of said host adapter store which effectively makes the transfer processing of the associated message a pending item of work in the work queue list. Said CPU then signals the associated host adapter and concludes its execution of said SST instruction while said work item remains pending in said queue.

The associated host adapter initiates the handling of operations associated with work items in the work queue list in the sequence of their entry into said list. When a link is available to a destination specified in the message associated with the oldest pending work item the adapter selects such a link and transfers (or attempts to transfer) the message. If the transferred message is a request message it is accompanied in transit by subchannel identifier information which identifies the associated subchannel control space in the subchannel buffer pool, and by sequence number information which indicates the time-positional sequence of the message relative to other request messages transferred from the same host system. The subsystem retains this identifier and sequence information and returns representations of said information to the host adapter in association with each transaction between the subsystem and the host system pertaining to that message (i.e. each associated transfer of data, completion message, etc.).

When a message is inbound to a host system (i.e. an attention or a completion message for an associated Type II request message) the associated host adapter constructs a subchannel control space in the associated host adapter store, stores the message information in that space, and subsequently forwards the message to the attention of supervisory programs in the associated host system. The last-mentioned forwarding operation is conducted either by an interruption method or a response list method. In the interruption method the host adapter posts an entry in an interruption queue section of the associated host adapter store, and signals an interruption request to host CPU's. When a host CPU accepts this interruption request it refers to the interruption queue, locates the subchannel control space containing the inbound message information, transfers the message information to a predetermined area of host main storage (from which it can be removed and processed under guidance of host supervisory programs), and restores the elements of the subchannel control space to free status. When using the response list method the host adapter transfers the message from the subchannel control space to a pre-designated response list area of host main storage and restores the elements of the subchannel control space to free status. Host CPU's, under control of host supervisory programs, periodically examine the response list and attend to messages entered therein by host adapters. The choice of the interruption or response list method by the adapter is governed by control information prestored in a "configuration element" section of host adapter storage (by a host CPU operating under direction of a host supervisory program).

Data block transfers are initiated by subsystems in association with data transfer commands contained in request messages received from host systems. Before each transfer of a data block unit the subsystem sends a copy of the subchannel identifier information received with the associated request message. The host uses this information to locate the associated subchannel control space, and thereby to determine the location in host main storage which is to be used as the source or destination of the data block unit which is to be transferred.

A somewhat similar process is performed in the subsystem for exchanging messages and data with host systems. Outbound messages (completion and attention) are prepared in subsystem main storage, by subsystem CPU's operating under control of subsystem supervisory programs. For each outbound message a Start Subsystem Transfer instruction (SST) is executed by a subsystem CPU to locate a message in subsystem main storage, and to construct a subchannel control space for that message in the subsystem adapter store. The CPU stores the message information in the associated subchannel control space, and prepares an associated work item entry in a work queue section of the adapter store. When that entry is reached for processing by the subsystem adapter, and when a link to the proper host system is available, the adapter selects that link and forwards the message to said host's adapter for processing in the host system as an inbound message.

Messages inbound to the subsystem (from a host system) are received from the link by the subsystem adapter. The adapter constructs a subchannel control space in the subsystem adapter store for each incoming message and stores the message in the associated space. Such messages are subsequently conveyed to the attention of the subsystem CPU and supervisory programs by the interruption method referred to above.

Data block unit transfers are initiated by the subsystem in response to data transfer commands communicated in host request (Type I) messages. Each block unit transfer is scheduled and prepared by subsystem CPU's, operating under guidance of subsystem supervisory programs, and initiated by subsystem CPU execution of a Start Data Transfer (SDT) instruction. In executing this instruction the subsystem CPU refers the associated subsystem adapter to a message control block array and a data-transfer array in subsystem main storage. Said arrays contain control information prepared by said subsystem supervisory programs which describe: the number of data blocks to be transferred, the source or destination host or hosts, the direction of the transfer (to or from the host), and the source or destination location of the data in subsystem main storage. If the data is outbound to a host it is prepared in subsystem main storage by an earlier transfer from subsystem secondary storage to subsystem main storage. If the data is inbound to the subsystem it is transferred to subsystem secondary storage after being received in subsystem main storage. The subsystem CPU signals the subsystem adapter and said adapter operates on an asynchronous basis to carry out the transfer (e.g., to establish a link with a destination or source host, and conduct the required data block unit transfer in cooperation with the host adapter). The host adapter is responsible for determining the destination or source location in host main storage of each transferred data block unit (which it does by referring to the subchannel control space of the associated request message).

A subsystem CPU executing an SDT instruction constructs a subchannel control space from free elements in the subchannel buffer pool section of the associated subsystem adapter store, copies information from the message control block and associated data-transfer array in subsystem main storage into said subchannel space, and makes an entry in a work queue list section of said subsystem adapter store which effectively makes the data transfer processing a pending item of work in the work queue list. Said CPU then signals the associated subsystem adapter and concludes its execution of said SDT instruction while said work item remains pending in said queue.

The associated subsystem adapter initiates the handling of operations associated with work items in the work queue list in the sequence of their entry into said list. As each data block unit transfer is concluded (or abnormally terminated) the subsystem adapter composes response status, stores said status in the subchannel control space and transfers the resulting response message to the attention of subsystem supervisory programs by the interruption method referred to previously. After all commands in a request message have been processed, subsystem programs use these response messages to compose a completion message which is then transmitted to the host system.

A host adapter may comprise plural processing engines and connect via external links to plural subsystems and other hosts. It also may have plural linkage paths to an individual subsystem or host. These links may be used for sustaining a high volume of concurrent message processing and data transfer activity. They also may be used on a redundant basis for ensuring availability of link resources in the event of link failures. A subsystem adapter may connect with a similar configuration of redundant links for communicating with host systems on a path-selective basis.

Host supervisory programs initiate request message transfers to subsystems by directing host CPU executions of initiating instructions SST mentioned above. Host programs may also pass other controlling information to the associated host adapter by executing a "Signal Adapter" (SIGA) instruction described herein. Such other control information may include information directing the adapter to use the interruption method or response list method when forwarding specified types of inbound messages to the attention of host programs. Such information may be stored in the configuration element section of host adapter storage in association with the execution of one or more SIGA instructions.

The foregoing and other objects, features and advantages of the invention may be more fully understood and appreciated by considering the following detailed description and claims in reference to the accompanying drawings.

DESCRIPTION OF THE DRAWINGS

FIG. 1 shows a network of host systems and subsystems configured in accordance with the subject invention.

FIG. 2 shows message formats for carrying out the message communication aspect of the subject invention.

FIG. 3 shows the formats of commands constituting component elements of subject request messages.

FIG. 4 shows the format of host system program instructions Start Subsystem Transfer (SST) and Signal Adapter (SIGA); for respectively initiating message transfer from a host system to a subsystem or another host system and transferring control information to a host adapter.

FIG. 9 shows the organization of the "work queue" section of host adapter storage.

FIG. 10 also shows the formats of the "first and second temporary message buffers", representing the contents of the second and third buffer elements in a subchannel control space in the subchannel buffer pool of FIG. 7; said control space being used to control the transfer of a message from the associated host to a subsystem or other host.

FIG. 11 shows the "interruption queue" section of host adapter storage.

FIG. 17 shows the form of a data transfer block associated with execution of an SDT instruction.

FIG. 18 shows the form of the work queue portion of subsystem adapter storage.

FIG. 22 shows the form of a Start Subsystem Transfer instruction (SST) used by subsystem CPU's to initiate transfers of completion and attention messages from respective subsystems to host systems.

FIG. 23 shows the form of an "SST Text Array" associated with the execution of an SST instruction.

FIG. 24 shows the form of the configuration element portion of subsystem adapter storage.

FIGS. 28A and 28B arranged as shown in FIG. 28 represent a flow diagram illustrating the link scanning procedure of a host adapter engine.

FIGS. 29A and 29B arranged as in FIG. 29 illustrate the microinstructions for sustaining the procedure of FIG. 28.

FIGS. 30–36 are schematic flow diagrams illustrating operations of host adapter engines at the microinstruction level for processing the transfer of messages from the associated host to a subsystem and other hosts.

FIGS. 37–39 and 48–51 are schematic flow diagrams illustrating operations of host adapter engines at the microinstruction level for processing transfers of data between the associated host and a subsystem.

FIGS. 40–43 and 52 are schematic flow diagrams illustrating host adapter engine operations for processing incoming messages sent by the subsystem and other host systems.

FIGS. 44 and 53 are schematic flow diagrams illustrating operations of host adapter engines and CPU's at the microinstruction level for respectively dissolving and creating subchannel control spaces.

INDEX

Figure 5:
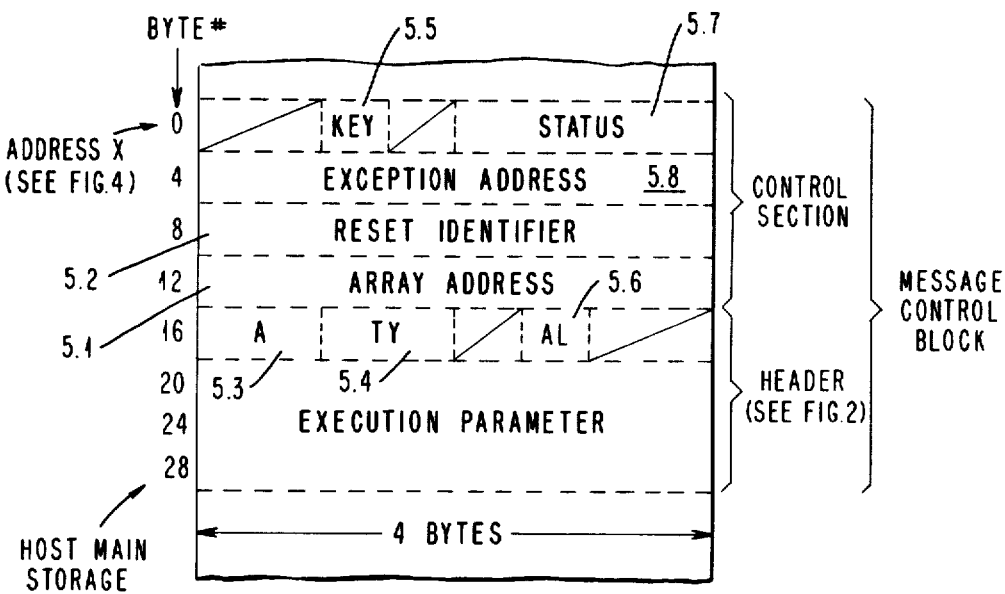
FIG. 5 shows the form of a message control block array in host main storage.

1. Introduction
2. Information Formats And Communication Protocols
   a. Messages
   b. Commands
3. Host Initiation Of Message Transfer Operations
4. Adapter Handling Of Host-originated Message
5. Adapter Operation For Receiving Message From Subsystem Or Other Host
6. Adapter Communication With Associated Host Upon Receipt Of Message From A Subsystem Or Other Host
7. Host Handling Of Received Messages
   a. Messages In Interruption Queue
   b. Messages In Response List
   c. Host Initiation Of Response List Activity
8. Subchannel Control Space Elements
9. Transmission of Message to Subsystem
10. Subsystem Handling Of Messages From Host Systems
11. Data Transfer
12. Message Transfer From Subsystem to Host System
13. Adapter Logical Organization
    a. Overview
    b. Adapter Engine Data Flow
    c. Adapter Engine Microprogram Controls
    d. Adapter Engine Microinstructions
    e. Microprogram Example
    f. Adapter Engine Operations For Outgoing Message Transfers
    g. Adapter Engine Operations For Data Transfers
    h. Adapter Engine Operations For Incoming Message Reception
    i. Adapter Engine Operations For Subchannel Control Space Creation And Dissolution
    j. Adapter Engine Operations For Interruption And Response List Communication
14. Link Control Interface
15. Host System Organization
16. Subsystem Adapter Organization
    a. Overview
    b. Subsystem Adapter Microinstructions
    c. Subsystem Adapter Engine Operations For Data Transfers
17. Summary
18. Claims

DETAILED DESCRIPTION

1. Introduction

With contemporary advances in LSI technology it has become increasingly cost effective to organize data processing system networks on a distributed basis, and to provide sophisticated processing capabilities in peripheral device controllers and peripheral devices. Device controllers and devices are thereby adaptable to perform functions which traditionally have been reserved for host "central" systems (e.g. resource management functions, store-and-forward message switching functions, etc.).

Since data bases stored in secondary storage subsystems may be extensively shared among host systems it is important to provide superior reliability, versatility and efficiency in such subsystems, and similar properties in the connection facilities linking such subsystems with host systems. For these and other reasons it has become desirable to adapt secondary storage subsystems to perform more sophisticated command handling and data handling services. It has also become desirable to adapt host systems and secondary subsystems to communicate through channels and communication links which are essentially transparent to central processing functions in the respective systems and subsystems. Such adaptation can also be used to pass information between host systems, via a subsystem, thereby enabling host systems to keep each other apprised, on a loosely coupled basis, of the current status of use of shared data stored in a subsystem.

A system configured in accordance with these objectives is shown in FIG. 1. One or more host systems 1a, 1b,..., connect with secondary storage subsystem 3. Subsystem 3 comprises subsystem processing facility 5 and a secondary storage facility 7. Facility 7 is represented at 7a, 7,..., 7n by disk pack symbols, but it should be understood that facility 7 may include various storage media and various hierarchial organizations of storage. As exemplified at 1a, each host system comprises a host main store 9a, one or more host central processing units (CPU's) 10a, a host adapter 12a, and a host adapter store 13a.

The host system CPU's may be IBM System/370 processors adapted to execute the newly defined instruction Start Subsystem Transfer (SST) described below, and to perform related operations described below. IBM System/370 processing architecture is described in "IBM System/370 Principles of Operation", GA22-7000, available through IBM sales representatives and branch sales offices. This publication is incorporated herein by this reference.

The subsystem processing facility 5 comprises one or more subsystem CPU's 14, a subsystem main store 15, a subsystem adapter 16, and a subsystem adapter store 17. A storage subsystem and subsystem processing facility which could be conveniently adapted to provide the presently described functions of these elements is described in "IBM 3850 Mass Storage System (MSS) Principles of Operation: Theory", GA32-0035 available through IBM sales representatives.

Each host adapter such as 12a coordinates transfers of messages and data, via links 18, between the associated host system 1a and one or more subsystems such as 3. It also may coordinate transfers of messages between the associated host system and other host systems (via host adapters associated with the other hosts). Each subsystem adapter such as 16 coordinates transfers of messages and data between the associated subsystem such as 3 and one or more hosts such as 1a, 1b, etc., via links 18. Each host adapter and subsystem adapter comprises one or more microprogrammed processors termed adapter engines. These engines operate to pass message and data signals between links 18 and respective adapter stores such as 13a and 17. Each engine is capable of establishing selective connections to any link which is attached to the respective system or subsystem, and any system or subsystem may have plural attached links as suggested at 18. Some of the links 18 may directly connect host systems as suggested at 19.

Each host adapter such as 12a interfaces with the links 18 through associated host link controllers 20. Each subsystem adapter such as 16 interfaces with the links 18 through associated subsystem link controllers 21.

Information is forwarded over the links 18 in predetermined message block unit formats and data block unit formats. Message block units (hereafter "messages") may be transferred from a host system to a subsystem or another host, or from a subsystem to a host system. The subsystem may operate as a store-and-forward message switch, accepting a message from one host, storing it, and forwarding it to another host. Data is transferred between a host system and subsystem in fixed length data block units of 2,048 (8-bit) bytes or 4,096 bytes.

As indicated hereafter Type I and Type II messages, termed requests, are directed only from a host system such as 1a to a subsystem such as 3. Each request comprises an array of one or more commands, each block defining a discrete operation to be performed by the subsystem. The subsystem may be adapted to store plural requests concurrently (permissively from different hosts), and to perform functions designated by individual command blocks in these requests in a sequence and at a pace arbitrarily suited to the availability of subsystem and link resources. Accordingly, the sequence of execution of the operations specified by the commands in a request may differ arbitrarily from the original order of the commands in the request.

Each type I request contains at least one command block specifying a data block transfer. In such commands the data blocks to be stored in subsystem storage or retrieved from subsystem storage may be identified in symbolic terms. Such terms are translated by the subsystem processor 5 into appropriate real physical addresses relative to the associated secondary storage 7.

2. Information Formats & Communication Protocols a. Messages

Message formats are shown in FIG. 2. The subject system provides for transfers of four different types of messages (Types I, II, III, and IV). Type I and II messages, termed requests, are originated only by host systems and sent only to subsystem processors. Type III messages, termed attention messages, are originated either by host processors or subsystem processors, and may be sent either to subsystem processors or host processors. An attention message originated by one host may be transferred to another host either directly (through a direct link 18 between the adapters associated with the hosts) or indirectly (through a link to a subsystem and store-and-forward switching in the subsystem). Type IV messages, termed completion messages, are directed only from subsystems to host systems. Each completion message indicates the status of completion or abnormal termination of operations specified by the commands in an associated host-originated request message.

Each message comprises a 16-byte header followed by one or more 16-byte blocks of information. The format of the header is indicated at 30 in FIG. 2. It includes a 1-byte address portion (A) defining the destination of the message, a 1-byte type portion (TY) indicating the message type, a ½-byte portion (AL) indicating the message block length (i.e. the number of 16-byte blocks of information trailing the respective header), and a 12-byte execution parameter. The last-mentioned parameter represents control information which is used by the destination subsystem or host in a manner described later.

Type I messages are accompanied in transmission by "subchannel identifier" and "sequence number" information signals which are sent in advance of the message header signals. The subchannel identifier is a 2-byte expression which defines the location of an associated subchannel control space in the adapter store of the originating host system. The sequence number is a 2-byte count expression which defines the position of the respective message in the sequence of all messages transferred relative to the associated host system. The subchannel identifier and sequence number are retained by the subsystem, and corresponding signals are returned to the host system in each transaction pertaining to the associated message (data transfer, completion message, etc). The subchannel identifier is used by the host adapter to locate the subchannel control space of the associated message. The sequence number is used to verify that the associated message is being processed in a required sequence.

Request messages contain command information in command blocks 32 (FIG. 2) following the header. The command information in each block 32 defines an operation to be performed at the initiative of a destination subsystem designated in the header. Type I requests include one or more data transfer commands. Type II requests do not contain any data transfer commands. In response to information in a data transfer command the subsystem is required to initiate and control a transfer of one or more block units of data between its secondary storage 7 (FIG. 1) and main storage 9 (a, b, c, . . .) in the originating host system. In each such transfer the host adapter and subsystem adapter must interface via a link 18 selected by one of the adapters. Each data block transfer is initiated by a subsystem CPU which prepares the data in subsystem main storage. The adapters then operate on an asynchronous basis to transfer the data between subsystem main storage and host main storage.

Type IV completion messages are associated with request messages. Such messages are sent from subsystems to host systems. Information in blocks 36 trailing the header of each completion message represents the concluding status of operations designated in corresponding commands of the associated request message. Completion messages indicating successful completion of all operations are distinguished as Type IVa (normal completion) message. Completion messages indicating abnormal termination of any operation are distinguished as Type IVb (abnormal completion) messages.

Blocks 38 in attention messages contain information text in free form directed to the attention of the addressed subsystem or host supervisory program.

b. Commands

Command formats are shown in FIG. 3. Each command designates either a data transfer operation or a control operation. Commands which specify data transfers are shown at 42. Data transfers from a subsystem to a host system are termed Read operations. Data transfers to a subsystem from a host system are termed Write operations. The operation is specified by the operation parameter OP. Each block 42 specifies a transfer of a block unit of data, consisting either of 2,048 bytes of data or 4,096 bytes of data. The block unit size (2,048 or 4,096 bytes) for all data transfer commands in a request is specified by a flag bit in the execution parameter in the associated request message header.

The length parameter m in an initial command block defines a "string" association between that block and the m−1 following blocks. If m is greater than 1 the m−1 following blocks are associated with the initial block in defining a transfer of a string of m block units of data between contiguous block locations in subsystem secondary storage and randomly positioned block locations in host main storage. Although the command blocks in each such string association occupy m blocks in the stored representation of the associated request message, that is the representation which is stored in host main storage, they will occupy only a single command block in the representation of the associated request message which is transmitted over the link to the subsystem (thereby conserving link bandwidth). In such a "compactable" command block string, exemplified at 42 in FIG. 3, the string length parameter m may be equal to or less than the aggregate length parameter AL specified in the associated header 30 (FIG. 2). Commands which specify transfers of single block units of data represent special cases of the above configuration in which m (the string count length) is 1 and the stored representation of the command consists of a single block.

The fields H and B in the first block of a string 42 (or the only block if m=1) designate the source or destination address of the initial data block unit in subsystem secondary storage. H represents the location of a segment space in subsystem secondary storage (which is capable of storing multiple blocks) and B represents an offset position within that space for supplying or receiving the first block unit of data to be transferred. H is designated in logical (symbolic) terms and the subsystem processing controls must translate H into an appropriate representation of a real physical location (by a table lookup procedure).

The address term (ADDR), in each block of a command block string such as 42, defines a location in host main storage at which an associated block unit of data is to be stored (for a Read operation) or from which it is to be read out (for a Write operation). These addresses may be either real addresses (SSTA variant—see Section 3) or virtual (SSTV variant—see Section 3).

As noted previously, when the parameter m in a data transfer command is greater than 1 the associated command is transmitted to the subsystem in a compact form consisting only of the first block of the stored representation of the command string. When the subsystem initiates a transfer of any data block unit defined by such a string the subsystem adapter sends a "relative data-transfer" number to the host adapter. This number indicates the relative position of the data block unit currently being transferred in the string of all data block units defined by the associated command string. The host adapter uses this number to refer to the subchannel control space (in host adapter storage), and thereby to determine the address location (ADDR) in host main storage to which or from which the associated data block unit is to be transferred.

Assume, for example, a request message sent from a host to a subsystem contains an execution parameter having a 0 flag bit. This indicates that the lengths of individual data block unit transfers are to be 2,048 bytes. Assume further that such a request contains a Read command having a string block count (m) of 5. In the transmittal of this request only the first command block in the associated stored string of 5 command blocks would actually be sent to the subsystem (thereby conserving link bandwidth). However, the subsystem would thereafter initiate transfers of 5 block units of data (each block containing 2,048 data bytes) from 5 contiguous block unit spaces in subsystem secondary storage (starting at a location defined by the H and B parameters of the command) to 5 scattered block unit locations in host main storage (defined by ADDR terms retained in a "subchannel control space" in host adapter storage). The 5 data block units may be transferred in an arbitrary sequence. Before each transfer over the host link the data would be transferred from subsystem secondary storage to subsystem main storage. Then the data would be transferred from subsystem main storage to host main storage. As each data block transfer is initiated the subsystem adapter would signal a relative-data-transfer number and a subchannel identifier number to the host adapter. The relative-data-transfer number indicates the position of the associated data block unit in the string of all such units to be transferred (1st, 2nd, 3rd, etc.). The host adapter uses this number to locate the information ADDR defining the address in host main storage at which said data is to be stored. The information ADDR is found in the associated command block in an associated subchannel control space in host adapter storage. The host adapter locates said subchannel control space by means of the subchannel identifier number mentioned above.

Had the flag bit in the above example been a 1 the block units transferred would each have been 4,096 bytes long instead of 2,048 bytes long.

The data block units designated by such a command string normally could be transferred in any sequence convenient to the subsystem. However, the host can require that such block units be transferred in the sequence of the associated command blocks in the request message (e.g. to permit orderly storage and verification of the transferred data). A string implication bit in the execution parameter of message header 30 indicates whether block unit transfers in any string are to be processed in arbitrary or fixed sequence.

A series of control commands may also occupy a string of several blocks in a request. However, all command blocks in such a "string" are explicitly transmitted to the subsystem. The format for a control command occupying a string of plural blocks is shown at 44 in FIG. 3. Here the "OP" term in the first block denotes a specific control operation required for each command block in the string (e.g. "search") the term "m" in the first block denotes the number of command blocks in the string, and the "parameter" terms in the individual blocks represent information to be interpreted by the subsystem processing facility in respect to the specified control operation (e.g. search arguments).

As indicated earlier, Type II requests contain only control commands and Type I requests contain at least one data transfer command. An example of a Type I request containing a "mixed" format of control and data transfer commands is suggested at 46 in FIG. 3. Here, the first "m" blocks represent a string of control information and the next "n" blocks represent a compactable data transfer command. In this case, the length term (L) in the header 30 (FIG. 2) would contain a number equal to at least m+n.

3. Host Initiation Of Message Transfer Operations

To initiate the transfer of an outgoing message a host supervisory program, running on one or more host CPU's, prepares a "message control block" array (FIG. 5) in host main storage. Area A in this array (5.3 of FIG. 5) contains address information denoting the address of the subsystem or host system to which the message is to be sent. When this array has been prepared a host CPU executes an initiating instruction Start Subsystem Transfer (SST), having the form shown in FIG. 4, and the associated operation initiates a process by which a message is transferred. The operation code portion of the SST instruction (Hex B238 for mnemonic SSTA or B239 for mnomonic SSTV) distinguishes its initiating purpose. The CPU adds the displacement term D2 to the contents of a register specified by B2. The result defines an address location in host main storage at which the first byte of the aforementioned message control block (byte 0) is stored.

Continuing its execution of the SST instruction the host CPU accesses host adapter storage (e.g. 13a FIG. 1) and constructs a subchannel control space uniquely associated with the message. Host adapter storage may be either in a special reserved area of host main storage or in a separate storage array accessible to host CPU's and the host adapter. The host CPU copies the message control block information into a predetermined portion of this subchannel control space, and then enters "work queueing" information into certain other parts of adapter storage which effectively prepares the host adapter to carry out the required message transfer operation on an asynchronous basis (i.e. after the host CPU has concluded its execution of the SST instruction).

Host adapter storage is generally accessible to the host adapter on an unrestricted basis and to host CPU's during particular CPU operations; the latter include operations associated with execution of SST instructions, operations in response to interruption requests signalled by the host adapter to host CPU's, and operations associated with host CPU execution of the SIGA instruction discussed later. It is not accessible to host CPU's otherwise. Host adapter storage includes a "subchannel buffer pool" section in which subchannel control spaces are formed as described below. The host adapter uses subchannel control spaces to control transfers of messages to or from the subsystem, and also to control the handling of data transfers associated with type I requests.

Figure 6:
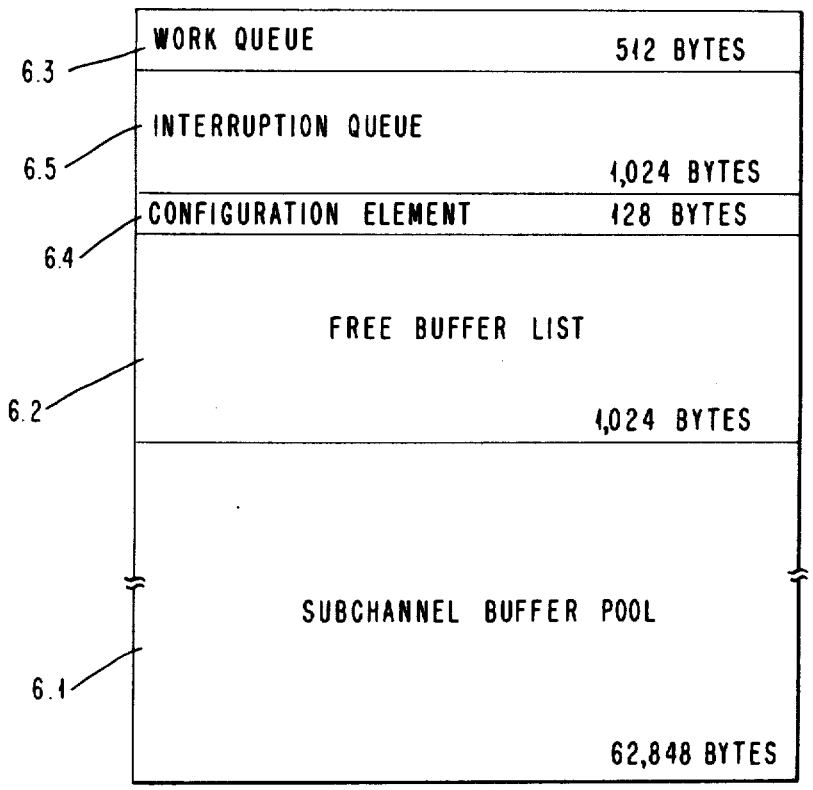
FIG. 6 shows the organization of host adapter storage.

Host adapter storage, as indicated in FIG. 6, contains five sections, 6.1 through 6.5. Section 6.1 is termed the "Subchannel Buffer Pool", section 6.2 is the "Free Buffer List", section 6.3 is the "Work Queue", section 6.4 is the "Configuration Element", and section 6.5 is the "Interruption Queue".

Figure 7:
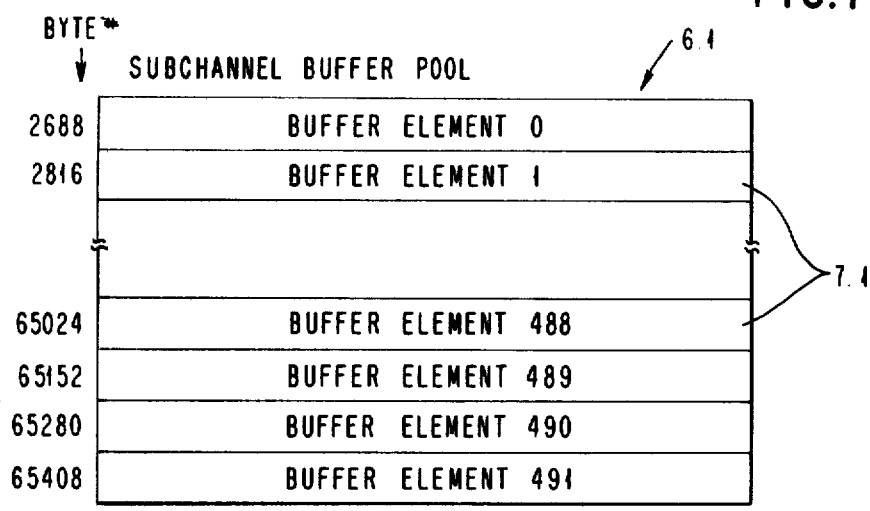
FIG. 7 shows the organization of the "subchannel buffer pool" section of host adapter storage.

As shown in FIG. 7 subchannel buffer pool 6.1 comprises 492 "buffer element" spaces 7.1 numbered from 0 to 491. Each element 7.1 contains 128 bytes of storage space (a byte is 8 bits). Each buffer element can have "free" or "occupied" status. One, two or three free elements are assigned as needed to construct each of the subchannel control spaces referred to above.

Figure 8:
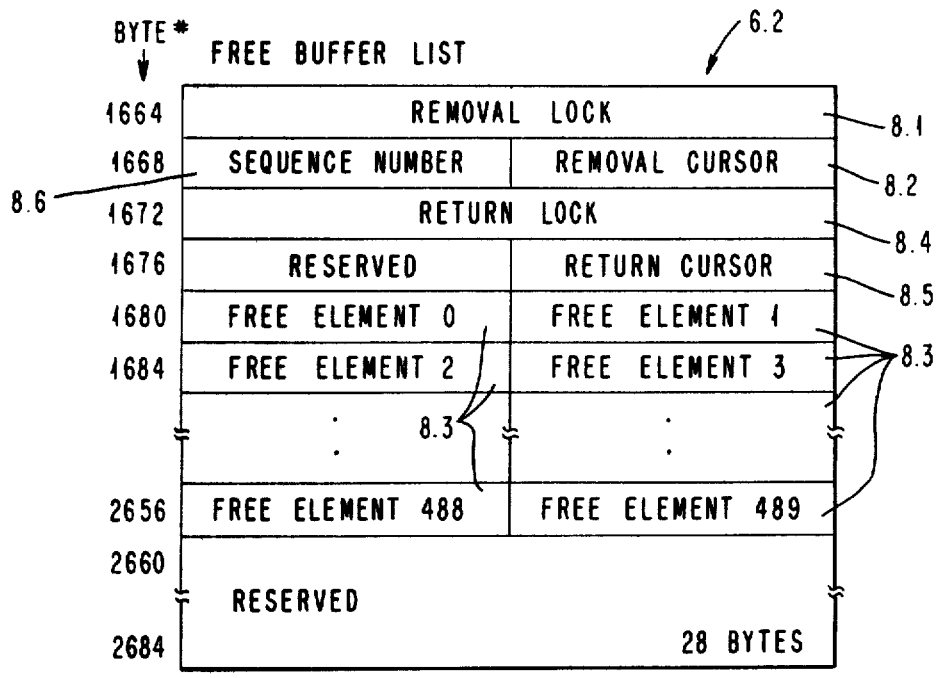
FIG. 8 shows the organization of the "free buffer list" section of host adapter storage.

As shown in FIG. 8 "free buffer list" 6.2 contains 490 "free element" spaces, numbered from 0 to 489, which are used by the adapter for designating buffer elements in subchannel buffer pool 6.1 having free status. During execution of the above-mentioned SST instruction the host CPU refers to list 6.2 to locate free buffer elements in pool 6.1 for constructing the required subchannel control space. When seeking to access the free buffer list said CPU may be in competition with other host CPU's and host adapter engines having access to this list. Accordingly, a lock procedure is used to prevent conflicting accesses. The module seeking access (CPU or adapter engine) first tests a "removal lock" word 8.1. If this word is zero, meaning that the free buffer list is accessible, the module seeking access enters its identity (non-zero) into the lock word position. If the removal lock 8.1 is not zero when tested, meaning that the list is currently being accessed by another module, its value is not changed. In the latter circumstance, the module examining the lock word is effectively excluded from access to said list and must repeat the lock examination process at a later point in time.

When a host CPU executing an SST instruction is successful in altering the lock word in the free buffer list said CPU uses the number in "removal cursor" space 8.2—say M—to locate "free element" number M at one of the free element sites 8.3. Free element number M will contain a number—say A—representing the number of one of the buffer elements 7.1 in subchannel buffer pool 6.1. Buffer element number A represents the next element in pool 6.1 which is assignable to a subchannel control space. If a CPU requires, for example, three buffer elements to construct a subchannel control space (in association with its execution of the SST instruction), it will use free element number M designated by removal cursor 8.2, and successive free elements M, M+1 (modulo 490) and M+2 (modulo 490) in the free buffer list to locate buffer elements A, B, and C in pool 6.1. If the initial bits in free elements M, M+1, M+2 are 0 the designated buffer elements in the subchannel buffer pool (A, B and C) have free status and the subchannel control space can be constructed as described below. If the initial bit in any one of the free elements M, M+1 or M+2 is 1 the associated buffer element is not free. In the latter circumstance it is recognized that the elements required to construct the subchannel control space are not available, and the CPU must then release the removal lock 8.1 (reset it to 0) without altering free elements M, M+1, and M+2 and terminate its execution of the SST instruction on an unsuccessful basis.

If the requisite free elements are available for constructing a subchannel control space the host CPU executing the SST instruction proceeds to construct said control space. For this purpose it resets the initial bits of free elements M, M+1 and M+2 to 1 (to indicate occupancy), alters removal cursor 8.2 to point to a "new" next free element (e.g. M+3, (modulo 490)), increments a sequence number count in sequence number slot 8.6, transfers the previous (unincremented value) count number into a sequence number slot in the subchannel control space, and resets removal lock 8.1.

When successful in constructing a subchannel control space during execution of an SST instruction the host CPU executing the instruction copies message information from the message control block designated by the instruction into said subchannel control space. The message header information is taken from bytes 16–31 of the message control block (see FIG. 5) and stored in bytes 16–31 of the first buffer element in the subchannel control space. This first buffer element, termed the "message control element", has the information format shown in FIG. 10A. The SSA slot 10.1 contains the identity of the destination subsystem. The sequence number slot 10.2 is used to store a sequence count number corresponding to the number previously stored in slot 8.6 of the free buffer list.

Figure 10C:
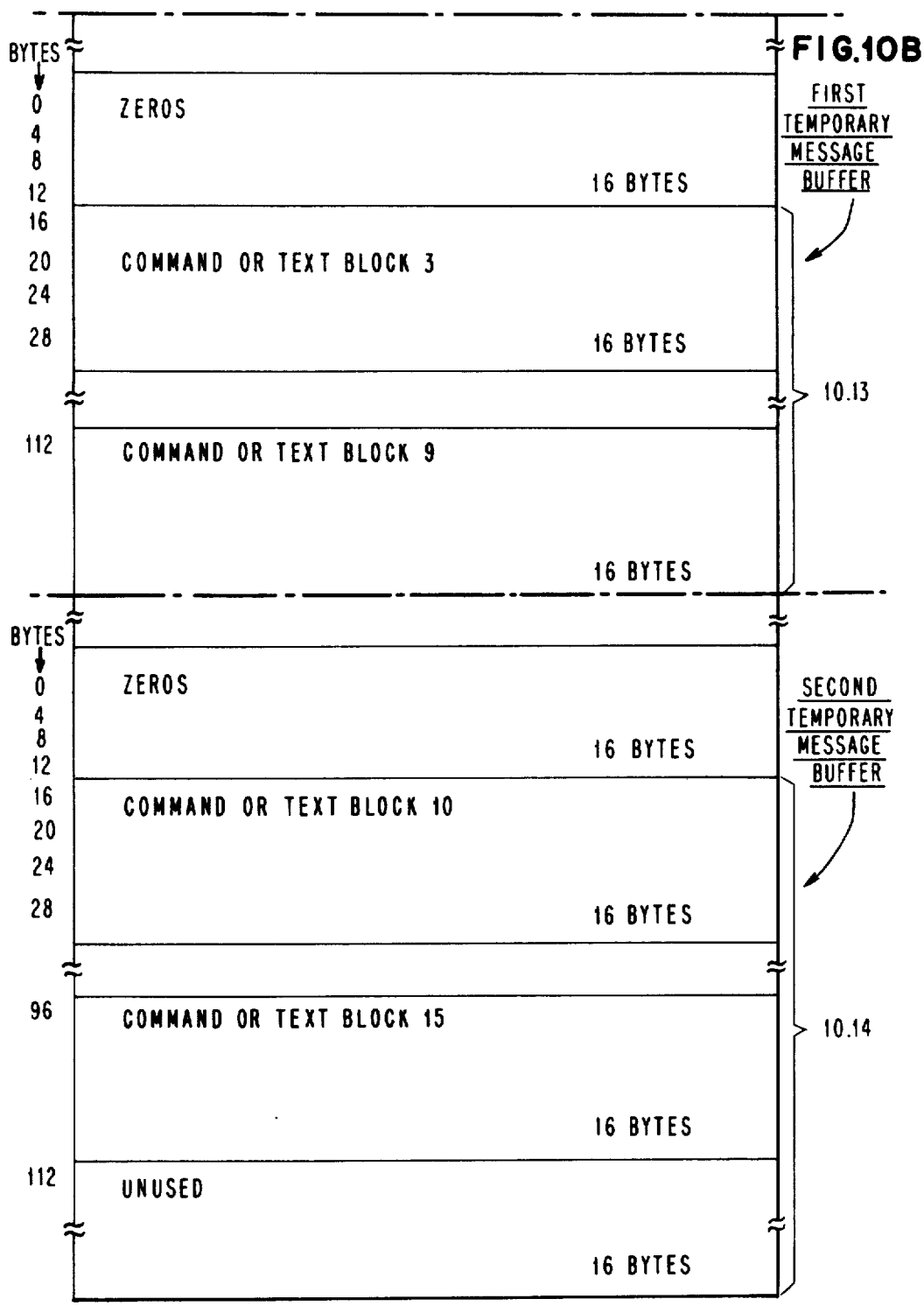
FIG. 10 shows the format of a "message control element", representing the contents of the first buffer element in a subchannel control space in the subchannel buffer pool of FIG. 7.

The command or text blocks which constitute the remainder of the message information are copied from host main storage into predetermined parts of the subchannel control space. In main storage these blocks are located in a series of address locations beginning at a byte location defined by the information in array address slot 5.1 of the message control block (see FIG. 5), and extending over an area defined by length information AL in the same message control block. The first two command or text blocks are stored in the message control element (FIG. 10A) contiguous to the message header information. If there are more than two command blocks the other blocks are stored in first and second temporary message buffer elements of the same subchannel control space. (FIGS. 10B and 10C.)

The length information AL is stored in the AL ("array length") slot (10.12 of FIG. 10) of the message control element, and thereby effectively defines the number of additional buffer elements in the respective subchannel control space.

If the message is a request the operation code of the (SST) instruction indicates whether the address information ADDR in the command blocks (see FIG. 3) represent real or virtual addresses in host main storage. Operation code Hex B238 (instruction mnemonic SSTA) denotes absolute and operation code Hex B239 (mnemonic SSTV) denotes virtual. If the addresses are virtual the CPU executing the SST instruction translates said addresses into absolute terms in the process of storing the addresses (and associated command blocks) in the subchannel control space. The CPU also sets "pin bits" associated with said absolute addresses. Pin bits are used for "page fixing" purposes which are irrelevant to the present invention. Pin bits will not be described further herein.

After copying the message information into the subchannel control space a CPU executing an SST instruction must post a work entry in work queue 6.3 (FIG. 6) identifying the location of the just prepared subchannel control space, and effectively designating the transfer of the message information in that space as a pending item of work for the host adapter. The work queue contains a lock word 9.1 (FIG. 9) which is used in the same manner as removal lock 8.1 in the free buffer list 6.2. If unsuccessful in modifying the value of lock 9.1 (i.e. if the lock value is not 0 when examined) the CPU seeking access to queue 6.3 must idle and repeat the attempt later. When successful, the CPU uses "CPU Cursor" 9.2 to locate a next available one of the "work element" slots 9.3. Into this slot the CPU copies the number of the first buffer element in the subchannel control space (i.e. the space in which the message control element array is located). The CPU then increments the value of the number in CPU cursor 9.2 by 1 and signals the host adapter (e.g. 12a, FIG. 1) to set work initiative latches described below indicating that an item of message transfer work is now available in queue 6.3.

Contemporaneously the CPU enters the number of the first buffer element of the subchannel control space into a reset identifier space 5.2 in the message control block (FIG. 5), and transfers the unincremented sequence number count information from the free buffer list into said first element for indicating the position of the associated message in the sequence of all messages originated by the respective host system.

At this point, assuming all of the foregoing operations have been carried out successfully, the CPU releases CPU lock 9.1 and concludes its execution of the SST instruction on a "successful" basis. Thereafter, the host adapter is responsible for attending to work items in the work queue at its own initiative and on an asynchronous basis.

4. Adapter Handling Of Host-originated Message

The host adapter (e.g. 12a, FIG. 1) comprises one or more processing engines analogous to host CPU's. When work queue 6.3 (FIG. 9) contains an unfinished work item entry an adapter engine seeking to attend to unfinished work will attempt to access the work queue via "adapter lock" 9.4. The manner in which the engines are sequenced to seek work will be explained in paragraphs 9 and 13 infra. If the engine cannot access the work queue (lock word 9.4 not 0) it sequences itself to other operations described later in paragraph 9. If it can access the work queue the engine enters its identity (non-zero) into adapter lock 9.4 and examines adapter cursor 9.5. Using the information in said cursor the engine locates a work element 9.3 containing the oldest unprocessed entry. Referring to that entry the engine locates the first buffer element (i.e. message control element) of the associated subchannel control space. The information in said entry is transferred to a separate "message transfer control register" portion of the queue and the value of cursor 9.5 is incremented by 1 to set up a next entry for processing. If a link is available currently for transferring the associated message to its specified destination (subsystem or other host) the message is transferred. If the message is a Type I request it is accompanied by subchannel identifier information, denoting the location of the associated subchannel control space, and sequence number count information indicating the position of the message in the sequence of all messages processed by this host. Said information will be stored by the destination subsystem and passed back to the origin host's adapter in association with each signaling transaction pertaining to that request (data transfer, completion statement, etc.) for enabling the host adapter to participate in the transaction.

As noted above when an adapter engine successfully obtains access to the work queue (via adapter lock 9.4) and the queue is not empty, it transfers a work entry to a message transfer control register and increments cursor 9.5. A part of this register is located in control half-word space 9.6. When an entry is transferred into this register the adapter engine sets a bit in space 9.6 to indicate occupancy of the associated register, and then attempts to continue the transfer processing of the associated work entry. If this process is not completed it will be continued by the same or another engine since each engine examines the occupancy bit in space 9.6 before attempting to access any work elements in the work queue via cursor 9.5. If said occupancy bit is "on" the engine attempts to continue the unfinished process before starting a new process.

The register associated with space 9.6 consists of that space and spaces 9.7 and 9.8 in the work queue. When said register is occupied "SSA" space 9.7 stores the address of the message destination (subsystem or other host) and "MCE" space 9.8 stores the number of the buffer element in pool 6.1 containing the message control element part of the associated subchannel control space. When a work item is transferred into register 9.6–9.8 the initial bit in the associated work element is set to 0, to indicate vacancy in said element, and cursor 9.5 is incremented to point to the next work element.

If register 9.6–9.8 is occupied, and if a link to the destination subsystem specified in the associated message is currently available, an engine having access to said register proceeds to forward the associated message, in accordance with the procedure outlined in paragraph 9 infra, from the associated subchannel control space to said link. If a link is not currently available, the engine resets adapter lock 9.5 to 0, and transfers to another sequence of operations.

After a message has been forwarded to a link or a final determination is made that the transfer can not be completed, the occupancy bit in register section 9.6 is reset to indicate vacant status in register 9.6–9.8, and any buffer element in the associated subchannel control space which is no longer needed is returned to free status. The adapter engine which transfers the message restores such buffer elements to free status by accessing and modifying the free buffer list 6.2 (FIG. 8). On obtaining access to return lock 8.4 the engine uses return cursor 8.5 to locate a next available free element (or elements) 8.3. The engine sets the initial bit(s) of this element (or these elements) to 0 (to indicate free status), and stores in this free element (or elements) the number (or numbers) of the buffer element(s) in the subchannel control space, which elements are thereby also restored to free status. The engine then increments the value of return cursor 8.5 and releases return lock 8.4 (resets its value to 0). Subchannel control space elements may also be returned to free status by host CPU's (e.g. elements not restored by host adapter operations (refer to paragraph 6 infra)). A similar process is performed by the host CPU for each such return operation.

5. Adapter Operation For Receiving Message From Subsystem Or Other Host

Host adapter engines also construct subchannel control spaces for receiving "inbound" attention messages from subsystems or other host systems, and "inbound" completion messages for Type II requests from subsystems. For this purpose the engine assuming responsibility for the message transfer (refer to paragraph 9 infra) attempts to access removal lock word 8.1 in the free buffer list 6.2 (FIG. 8). If the value of said lock word is 0 the engine enters its identity (non-zero) into the lock word space and uses removal cursor 8.2 to locate elements in pool 6.1 which are assignable for subchannel control space construction. If enough free elements in list 6.2 are available (initial bits 0), the engine resets their initial bits to 1, thereby "creating" said subchannel control space. The engine then increases the value of removal cursor 8.2 (modulo 490), releases removal lock 8.1 (resets its value to 0), and copies the inbound message into said subchannel control space.

Buffer elements 489–491 in subchannel buffer pool 6.1 (FIG. 7) represent reserve elements which are used only when an adapter engine seeking to process an inbound message transfer finds that enough other buffer elements are not available in pool 6.1 for subchannel control space construction, i.e. that elements in free list 6.2 located by removal cursor 8.2 have initial bits previously set to 1. To use these reserve buffer elements the adapter engine sets the initial bit to 0 in free element 489 to indicate use, leaves the removal cursor 8.2 in free buffer list 6.2 unchanged, and resets removal lock 8.1 to 0. If buffer elements 489–491 are already in use when required by an adapter engine (initial bit in 1 free element 489) the engine resets removal lock 8.1 without constructing a subchannel control space. In this case the process of subchannel creation will be repeated at a later time.

When a subchannel control space for message reception is successfully constructed the host adapter engine sends a signal to the host link controller associated with the link carrying that message (e.g. one of the link controllers 20, FIG. 1). That controller then forwards the message to said engine, and said engine stores the message in the just-constructed subchannel control space. The engine then operates in a manner described in paragraph 6 infra to bring the message to the attention of supervisory programs in the associated host system.

6. Adapter Communication With Associated Host Upon Receipt Of Message From A Subsystem Or Other Host When a host adapter engine receives a message from an attached subsystem or another host system (e.g. after having constructed a subchannel control space and having stored an incoming message in that space), said engine uses information in configuration element 6.4 (FIG. 12) to forward the message to the attention of host system software. The configuration element indicates whether the message is to be forwarded via an interruption queue (i.e. in association with an entry in the interruption queue and an interruption of a host CPU) or via a response list (i.e. without a CPU interruption). The form of the interruption queue is shown in FIG. 11.

Configuration element 6.4 (FIG. 12) contains state information, subject to initialization and alteration by host software defining the method to be used by the adapter engines at any given time to communicate received messages to the host system. Upon obtaining access to state lock 12.1 the adapter engine places its identifier (non-zero) in the lock space and examines information in state space 12.2 indicating whether the communication to the host system should be carried out by the interruption method or response list method.

When the interruption method is specified the adapter places a work entry in interruption queue 6.5 (FIG. 11) identifying the subchannel control space containing the message to be forwarded. Referring to "adapter cursor 11.1", the adapter engine performing this process locates a "next" interruption element 11.2 for message queuing. The engine enters into this element the number of the first buffer element in the subchannel control space which presently contains the message and sets a 1 in the initial bit in the selected interruption element to indicate occupancy. The engine then increments the value of adapter cursor 11.1, signals an interruption request to host CPU's for effectively indicating the presence of an active entry in interruption queue 6.5, and resets state lock 12.1 in the configuration element thereby effectively making the configuration element and interruption queue accessible to other adapter engines and host CPU's.

The interruption queue is also used by the adapter to communicate unsuccessful completion of an outbound message transfer. In such usage, the adapter engine encountering an uncompletable message transfer operation creates an abnormal completion message, enters the abnormal completion message in the subchannel control space previously constructed to hold the outbound message, posts an entry in the interruption queue identifying said space and signals an interruption request to the host CPU's.

When the configuration element specifies response list handling for a given "completion" message an adapter engine processing that message locates a primary or alternate response list area in host main storage, via section 12.3 or 12.4 in the configuration element, and transfers the message from the subchannel control space into said area. The adapter engine then modifies the selected response list area to indicate occupancy, and the free buffer list 6.2 to restore the elements of the associated subchannel control space to free status.

7. Host Handling Of Received Messages a. Messages In Interruption Queue

When an interruption request associated with interruption queue 6.5 is signalled to host CPU's a first available one of said CPU's will accept interruption and attempt to process the "oldest" unprocessed work entry in the interruption queue. Said CPU first attempts to access said queue via CPU lock word 11.3. If successful, the CPU uses CPU cursor 11.4 to locate the oldest active entry in interruption elements 11.2. Using the information in this entry said CPU locates a subchannel control space containing an incoming message, transfers a copy of the message information to an area of main storage accessible to a host supervisory program (e.g. accessible to an interruption handler program), and resets the respective element 11.2 to idle status (sets 0 into its initial bit). The CPU then advances cursor 11.4 (modulo 490), resets CPU lock 11.3 and modifies free buffer list 6.2 to restore the buffer elements in the associated subchannel control space to free status.

b. Messages In Response List

Figure 12:
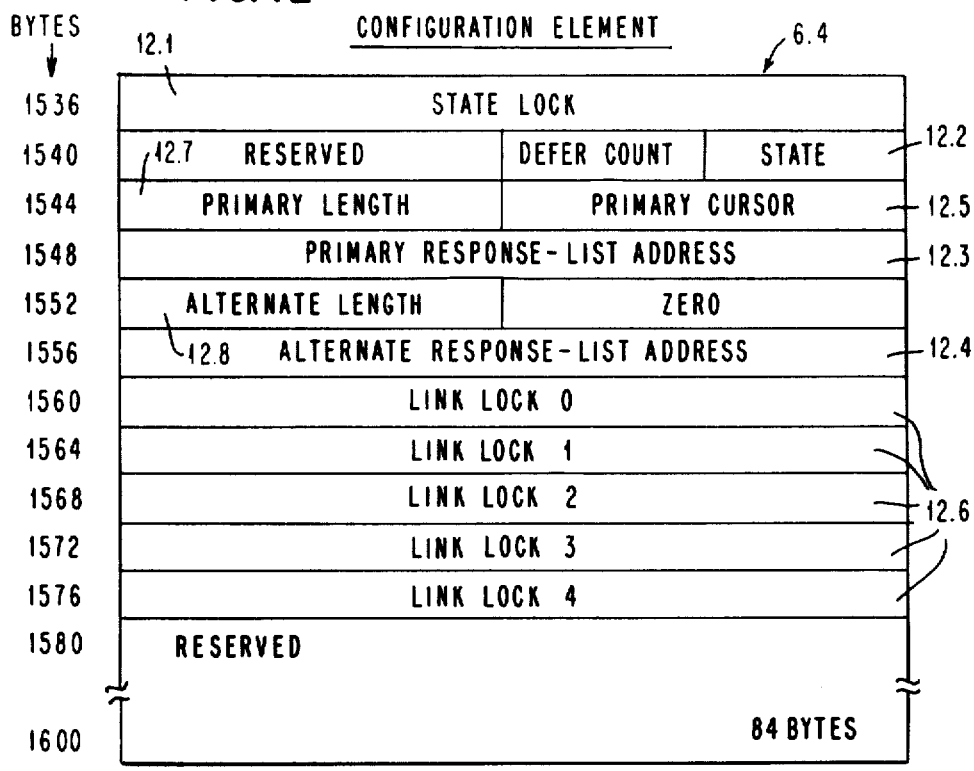
FIG. 12 shows the "configuration element" section of host adapter storage.
Figure 13:
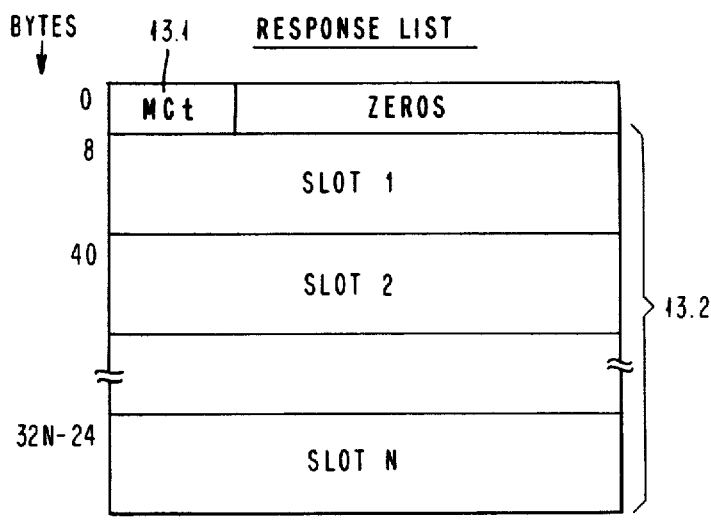
FIG. 13 shows the form of a "response list" in host main storage.

As noted previously the response list may be located in a generally accessible area of host main storage (as distinct from the interruption queue which is located in "limited access" adapter storage). The format of the response list is shown in FIG. 13. This list consists of N 32-byte areas 1, 2,. . . N. The M count value (MCt) indicates the number of messages currently resident in said areas (i.e. placed therein by adapter engines) which require CPU processing. To enter a message into an area in the response list an adapter engine is referred to configuration element 6.4 (FIG. 12) to a "primary" response list address defined by information in address space 12.3. The engine then locates a free space in that list via primary cursor 12.5, transfers a message from a subchannel control space into the free space in said response list, increments the MCt value in said space, increments the value of primary cursor 12.5, and restores the elements of the associated subchannel control space to free status. If the primary response list is full the engine refers to an alternate response list address defined in the configuration element.

The information in space 12.3 defines the main storage address of the initial byte of said response list. This information is pre-stored in space 12.3 by an earlier programmed operation of a host CPU. In such operation the CPU executes a "signal adapter" instruction SIGA (FIG. 4) by which it stores a copy of the response list address in said space 12.3.

Messages in the response list are processed as follows. Host CPU's examine the response list at predetermined time intervals (e.g. in response to time-out interruptions). If the MCt value is not equal to the value it took at the previous examination by a host CPU, there are unprocessed messages on the list. In this case, control is transferred to a program for processing the first unprocessed message contained in said space. When the message has been processed, (by said program), further unprocessed messages on the list are processed in sequence until all messages indicated by the present MCt value have been processed.

c. Host Initiation Of Response List Activity

To initiate response list activity by the host adapter, a host supervisory program, running on one or more host CPU's, prepares a response list area (FIG. 13) in host main storage. This area contains a message count (13.1 in FIG. 13) which is initialized to zero and a number, say n, of available completion message slots (13.2 in FIG. 13). When this area has been prepared, a host CPU executes a controlling instruction Signal Adapter (SIGA), having the form shown in FIG. 4, and the associated operation initiates a process by which response list parameters are placed in the configuration element (FIG. 12) in adapter storage. The operation code for the SIGA instruction is B32A. The address B2+D2 of the instruction has value X'02' to distinguish its response-list initiating purpose. General register 1 defines the absolute address of the response list and bits 21–31 of general register 2 contain the length count value n.

8. Subchannel Control Space Elements

FIG. 10A illustrates the form of the first buffer element of a subchannel control space used for transferring a host-originated message to a subsystem or other host. This part of the subchannel control space, termed the "message control element" (abbreviated MCE), contains the destination of the message in slot 10.1, the sequence number of the message in slot 10.2, the header of the message in space 10.3, the first two command or text blocks of the message information in space 10.4, a data-transfer lock word (10.5), a data-area address list (10.6), first and second temporary message buffer element numbers (10.7 and 10.8), a storage protection key value (10.9), a virtual address indicator bit (10.10), and a data-area address length count (10.11). This information is stored in the MCE during CPU execution of the initiating instruction SST as described previously. If the message contains more than two command or text blocks the other blocks are stored in first and second temporary message buffer element sections of the subchannel control space (FIGS. 10A and 10B). The number of such other blocks is effectively indicated by the information in the array length slot AL (10.12).

The subchannel control space is used in conjunction with a "message transfer control register" section of the work queue (FIG. 9) to control the process by which the message is eventually forwarded to the destination subsystem or host. The message transfer control register is located in byte positions 12, 13, 16, 18 and 19 in the work queue (FIG. 9). Bytes 12 and 13 indicated at 9.6 jointly comprise the "control halfword section" of said register. Byte 16 indicated at 9.7 represents the "destination address section" of said register. Bytes 18 and 19 indicated at 9.8 jointly comprise the "subchannel identifier section" of said register.

When a host adapter engine first starts to process a work entry in work queue 6.3 it transfers a subchannel identifier number—which represents the number of the buffer element containing the message control element array of an associated message waiting to be transmitted—from a work element 9.3 into subchannel identifier section 9.8 of the message transfer control register. It also accesses the message control element array, copies the destination address information SSA from slot 10.1 in said array into the destination address section 9.7 of the message transfer control register, and sets an "occupancy" bit in the control halfword section 9.6, to indicate that said register currently is occupied. It then modifies cursor 9.5 to point to another work element 9.3. The foregoing use of the message transfer control register permits the adapter to interrupt and later continue its handling of the message associated with the subchannel control space now identified in section 9.8, without having to refer to cursor 9.5 and an associated work element 9.3 to re-locate the message information. It also enables the adapter to test the availability of links to the associated destination without having to refer to the message control element array to determine the destination address.

The control halfword section 9.6 of the message transfer control register also contains bit slots which are used by the adapter to indicate the status of transmission handling of the associated message (started or not started/suspended), to register a count of the number of attempted transmissions which have failed due to link errors, and to indicate the identities of links (up to a maximum of 3) on which such errors have occurred.

9. Transmission Of Message To Subsystem

As indicated previously a host adapter contains one or more processing engines. These cooperate with host link controllers 20 (FIG. 1), associated with links 18 (FIG. 1), to transfer messages and data between the associated host system and subsystems or other host systems. The links are numbered in sequence, 0, 1, 2, .. . When not performing other operations each adapter engine scans the links in the order of their numbering, in a "round robin" sequence, until it finds a link which is available for transferring an outgoing message or which requires other service as described below. If a link currently being scanned is available to transmit an outgoing message the link is selected and the engine attempts to access the work queue. If said queue is accessible (i.e. if adapter lock 9.4 is 0), and if the next item of work is an outbound message having a destination accessible through the currently selected link, that message is forwarded to a link controller associated with that link. Said controller temporarily stores the message and later forwards it over said link to the proper destination. If the message destination is not accessible through the currently selected link, or if the work queue is inaccessible or empty, the engine releases the adapter lock 9.4, deselects the currently selected link, and returns to scanning the links at the link position following that of the currently selected link.

The foregoing procedure will now be described more specifically. The configuration element (FIG. 12) contains a link lock space 12.6 for each link 18 (FIG. 1). The link lock spaces are numbered in correspondence with associated links (0, 1,2,3,4, . . . ). When not performing other operations each adapter engine scans these lock spaces in a predetermined "round robin" sequence (0, 1,2,3,4, . . . 0,1,2,3,4, . . . , etc.) until it finds an accessible lock space (i.e. one containing a 0 lock word). Assume that this space is link lock space J associated with particular link J. When the engine finds link lock word J to be 0 it sets its identity (non-zero) into link lock J and attempts to select link J via the controller responsible for that link (the "link J controller"). Said controller responds with state information describing the status of link J. The engine analyzes this status and conditions its subsequent operations on the result of its analysis.

The status of link J may be: (a) idle (i.e. available to transfer an outgoing message); (b) waiting for a message previously transferred from link J to the link J controller to be forwarded from said controller to the host adapter store; (c) requesting the host adapter to perform concluding operations described infra, after having transferred an outgoing message; (d) requesting the host adapter to perform concluding operations described infra, after having transferred a data block unit to or from said adapter at subsystem initiative (in accordance with a command in a request message); (e) requesting the host adapter to transfer a data between host main storage and link J (i.e. in accordance with an data transfer command in a request message currently being interpreted in a subsystem attached to link J); (f) unavailable (e.g., inoperative).

If link J has the idle status described at (a) above the adapter engine performing said analysis will attempt to process an item of work in work queue 6.3 (i.e. an outbound message) if said queue is accessible and contains an active work item. After processing said item as described below, or after failing to obtain access to the work queue, the engine will resume its link scan at position J+1.

If link J has the status described at (b) above the engine will attempt to attend to the forwarding of an incoming message, from a buffer in the link J controller to either a subchannel control space in host adapter storage or a response list slot in host main storage. The engine will signal the link J controller when this operation is completed, wait for an idle status return indication from said controller, and then proceed with the work queue servicing operation associated with status (a) above.

If link J has the status described at (c) above the engine will attempt to perform concluding operations described below, signal the link J controller if successful, wait for idle status to be returned, and proceed with the work queue operation associated with status (a) above.

If link J has the status described at (d) above the engine will attempt to perform concluding operations described infra in the paragraph entitled "Data Transfer", signal the controller if successful, wait for idle status to be indicated, and proceed with the operation for status (a) above.

If link J has the status described at (e) above the engine will attempt to transfer the requested data transfer operation, signal the link J controller if successful and proceed as for status (a) above.

If link J has the status described at (f) above the engine will resume its link scan at position J+1.

The operation associated with status (a) above will now be considered more specifically. If link J has the idle status described at (a) above the engine analyzing said status will first determine if the work queue contains any unfinished work.

Each engine has an associated work queue initiative latch described in paragraph 13 infra, under "Adapter Logical Organization". Said latches are set and reset by signals "broadcast" to all adapter engines over a "SIGA" bus described infra in paragraph 13. When set, said latches represent that the work queue may contain a pending item of work associated with an outgoing message. When reset said latches represent that the work queue is empty. If the engine analyzing said link J status detects that its work queue initiative latch is reset (i.e. that the work queue is empty) it deselects link J, releases link lock J, and resumes its scanning of link locks at position J+1. On the other hand, if said engine detects that its work queue initiative latch is set it attempts to access the work queue via adapter lock 9.4. If the lock value is not 0 (i.e. if the work queue is not currently accessible) the engine proceeds as if its initiative latch had been reset above. On the other hand, if the lock value is 0 (i.e. if the work queue is accessible) the engine sets its identity in the lock space and assumes control of said queue.

Upon assuming control of the work queue the engine first examines the occupancy bit in control halfword section 9.6. If said bit is 1 (i.e. if the message transfer control register is currently occupied) the engine refers to the information in register section 9.7 to determine if the destination of the associated message is accessible via the currently selected link, link J. If said destination is not accessible via link J the engine releases the work queue adapter lock, deselects link J, releases link lock J, and proceeds with its link lock scan at position J+1. If said destination is accessible via link J the engine proceeds to transfer the message to the link J controller together with subchannel identifier information from MCE field 9.8 and sequence number information from sequence number field 10.2.

In order to transfer the message and associated information the engine first signals a "request to send" to the link J controller, waits for a "ready to receive" signal from said controller, and then transfers up to 256 bytes of the message. The controller temporarily stores the message bytes (in a buffer store in said controller) and later passes them via link J to a controller (21, FIG. 1) interfacing between link J and the destination subsystem or host. When a message or 256 bytes of a message have been transferred to the link J controller the engine releases adapter lock 9.4, deselects link J, releases link lock J and resumes its link lock scan at position J+1.

If the occupancy bit in control halfword section 9.6 had been 0 when examined above (meaning that the message transfer control register was not then occupied by an "initiated" work item) the engine would have used the number contained in adapter cursor 9.5—say M—to locate associated work element number M in the work queue. If the initial bit in this work element M had been 0 (indicating, in effect, that element M and all other elements in the work queue were then vacant) the engine would have broadcast a signal on the above-mentioned SIGA bus to reset the work queue initiative latches of all adapter engines, and then it would have reset the work queue adapter lock to 0, deselected link J, released link lock J, and resumed its link lock scan at position J+1. On the other hand, if the initial bit of work element M had been 1, the engine would have used the number—say N—stored in work element M to locate an associated buffer element N in subchannel buffer pool 6.1 (FIG. 7). This buffer element would contain the message control element array of a subchannel control space containing an associated outgoing message waiting to be serviced. The engine would then have copied the number N into subchannel identifier section 9.8 of the message transfer control register, and transferred the destination address information (SSA) from the message control element (buffer element N) into the destination address section 9.7 of the message transfer control register. The engine would then have set the occupancy bit in control halfword section 9.6 to 1, to indicate occupancy of the message transfer control register, and thereafter the engine would have proceeded as in the case above where the message transfer control register had been initially occupied (i.e. if the destination defined in section 9.7 had been accessible via link J the engine would have proceeded with the transfer of the message indicated by register section 9.8, released the work queue and link lock J, deselected link J and resumed its link lock scan at position J+1; if said destination had been one not accessible via link J the engine would merely have released the work queue and link lock J, deselected link J and resumed its link lock scan at position J+1).

If the link J currently selected by an adapter engine has the status described at (c) above—i.e. requesting concluding operations by the adapter after having transferred an outgoing message—the adapter engine performs one of the following concluding operations:

A. If the status information associated with link J indicates that a message was transferred without error the engine attempts to access the work queue and delete the associated work item entry from the message transfer control register 9.6–9.8. If unable to access the work queue (adapter lock 9.4 not 0) the engine deselects link J, releases link lock J and resumes its link lock scan at position J+1. If the work queue is accessible the engine resets the occupancy bit in control halfword section 9.6 to 0 (thereby vacating the message transfer control register) and signals to set the work queue initiative latches of all engines. If the transferred message was a request containing a data transfer command the engine also sets a 0 into the lock space 10.5 of the associated message control element (FIG. 10), thereby enabling data transfers to proceed. The engine then releases the work queue, signals completion of concluding operations to the link J controller, waits for an idle status indication from said controller, deselects link J, releases link lock J and resumes its link lock scan at position J+1.

B. If the status information associated with link J indicates that a message was transferred incorrectly, possibly due to an error encountered on link J the engine determines the message can be retransmitted over another link; i.e. if another link (other than link J) connects to the same message destination and has not been used previously in an unsuccessful transfer of the same message. The destination connections of the links are ascertainable from a table in host adapter storage, and the previous usage of any link in an unsuccessful transfer of the same message is ascertainable from the link identity information in control halfword section 9.6. The engine also determines if the maximum number of unsuccessful transfers of this message have been attempted (i.e. once over each distinct link to the destination subsystem or host) by referring to the transfer count information in the control halfword section. If a link other than link J connects to the same destination, and the number of prior unsuccessful transfers of this message permits, the engine prepares the system for a retransmission of the same message over the other link. For this purpose the engine sets the state bit in control halfword section 9.6 to indicate "not started/suspended" status, increases the transfer count in halfword section 9.6 by 1, stores the identity of link J in a vacant one of the "link identity" slots in halfword section 9.6, broadcasts a signal to set all work queue initiative latches, releases the work queue adapter lock, signals the controller of link J to indicate completion of the requested concluding operations, waits for an idle status signal response from said controller, deselects link J, releases link lock J and resumes link lock scanning at position J+1. Thereafter, the message will be retransferred over the other link in response to a link selection initiative of the same or another adapter engine.

C. If the status information associated with link J indicates erroneous transfer of the message, as in B above, and the adapter engine ascertains either that no other untried link connects to the required destination, the adapter engine notifies the host system that the message can not be transferred. To accomplish this the engine generates an "abnormal completion" message and communicates it to the host system in the same manner as an abnormal completion message received from a subsystem or other host (refer to paragraph 12 infra). For this purpose the engine uses bytes 16 and 19-31 from the message control element array of the original message as the byte positions of the abnormal completion message. The engine also incorporates the link J status information into byte position 4 of the (single) text block portion of this message. Then the engine refers to configuration element 6.4 (FIG. 12) to determine if it should communicate the abnormal completion message to the associated host system by the interruption method or the response list method. If the interruption method is specified the abnormal completion message is entered into the buffer element containing the original message control element array (i.e. written over the original message control element array), an associated entry is posted in the interruption queue (FIG. 11) pointing to said message and an interruption request is signalled to host CPU's. On the other hand if the response list method is specified the engine stores the abnormal completion message in the response list by the method previously described. After completing its entry into the interruption queue or response list the engine resets control halfword 9.6 to unoccupied status, releases the work queue adapter lock 9.4, signals to set all work queue initiative latches, signals completion of concluding operations to the link J controller, refer to the associated subchannel control space in host adapter storage. The adapter uses the sequence number information to verify that the original request message is being processed by the subsystem in an appropriate sequence relative to other messages sent from the same host to that subsystem.

10. Subsystem Handling Of Messages From Host Systems

As indicated previously messages transferred from a host system to a subsystem are passed from a host CPU to a host adapter, then by said adapter to a host link controller associated with the host system, from that controller to an associated link, from that link to a subsystem link controller associated with the subsystem (e.g. 21, FIG. 1), from the latter controller to a subsystem adapter associated with the subsystem (e.g. 16, FIG. 1), and from the subsystem adapter to a subsystem program (via a subsystem CPU). Each subsystem adapter comprises one or more engines having logical organizations similar to host adapter engines and performing operations generally similar to those performed by host adapter engines. Each subsystem also has an associated subsystem adapter store for staging incoming and outgoing messages (e.g. 17, FIG. 1) and one or more subsystem CPU's. Under control of supervisory programs said CPU's interpret incoming messages, interpret commands in request messages, control secondary storage resources of the subsystem, initiate data block transfers specified in type I request message commands, compose outgoing completion and attention messages, and initiate transfers of said outgoing messages by the associated subsystem adapter. Subsystem programs contain SST instructions, for operating subsystem outgoing messages by the associated subsystem adapter. Subsystem programs contain SST instructions, for operating subsystem CPU's (e.g. 14, FIG. 1) to initiate outgoing message transfers (i.e. transfers of completion and attention messages), and Start Data Transfer (SDT) instructions described in paragraph 11 for initiating data block transfers.

Operations of the subsystem adapter and CPU's in attending to incoming messages are entirely asynchronous to the message forwarding operations of the originating host systems. With certain exceptions incoming request messages are attended to by the subsystem at a pace determined by the supervisory programs of the subsystem CPU's and in a sequence determined by said programs. One exception is that a request message from a host system specifying cancellation of a request message previously sent by the same host is given precedence for execution over the previous request.

Operations specified by commands within a host request need not be executed in the sequence of respective commands within the message, but instead they may be executed in an order suited to the logical organization of the subsystem and to the availability of subsystem storage resources and communication links to designated hosts. However, if a flag bit in the request message header specifies sequential execution the commands in that request will be processed in the sequence of their appearance in said request. This type of specification should be used only when essential to the correct execution of said operations inasmuch as it tends to negatively affect system performance (through put).

When all commands in a request have been processed by the subsystem, a supervisory program in the subsystem operates a subsystem CPU to compose either a completion message or abnormal completion message which then must be transferred to the origin host system. This transfer is initiated by a subsystem CPU and carried out by a subsystem adapter engine, a subsystem link controller, a link, a host link controller and a host adapter engine. If execution of any command in a request has been terminated abnormally, because of a hardware malfunction or an incorrect specification of command parameters, the associated completion message is indicated in the "type" portion of its header to be an "abnormal completion message". If all command functions in a request have been successfully concluded the associated completion message is indicated to be a "normal completion message" (hereafter, simply a "completion message"). Abnormal completion messages and completion messages have different formats and information context.

Subsystem supervisory programs may also compose attention (type III) messages for communicating "text" information to a host system on an unsolicited basis. Attention messages are forwarded in the same manner as completion messages. Completion and abnormal completion messages are associated with request messages received from host systems, whereas attention messages pertain to events in the subsystem that must be called to the attention of the host system; for instance a delay time-out or receipt of a message switching request from a first host specifying the transfer to a second host of an attention message previously received from the first host.

Incoming request and attention messages received by the subsystem adapter are stored in subchannel control spaces selected by the subsystem adapter in the subsystem adapter store. Such stored messages are communicated to subsystem supervisory programs via the interruption method described above. When a subsystem CPU accepts interruption associated with an incoming message identified in the subsystem interruption queue (FIG. 18), the message is transferred from the subchannel control space to subsystem main storage. The SSA field of the message is modified to identify the address of the originating host system and an interruption code is stored in subsystem main storage for use by subsystem software. If the message is a Type I request, the accompanying subchannel identifier number and sequence number parameters are contained in the interruption code, and are thereby communicated to subsystem software.

Figure 14:
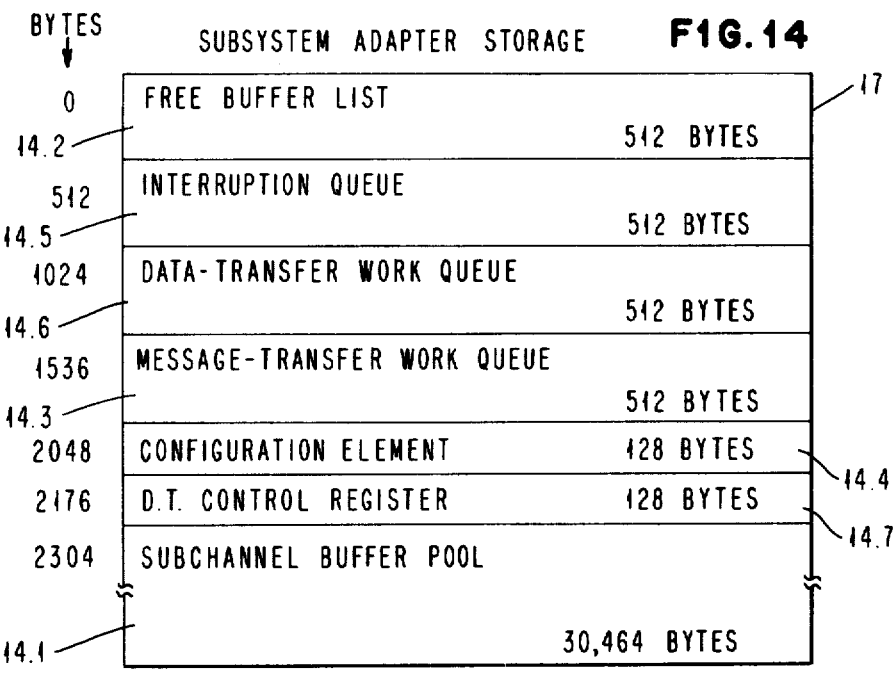
FIG. 14 shows the organization of subsystem adapter storage.

Subsystem adapter storage (17, FIGS. 1, 14) is accessible to the subsystem adapter (16, FIG. 1) and subsystem CPU's (14, FIG. 1). Specific areas in subsystem adapter storage are reserved as functional counterparts of the areas in host adapter storage shown in FIG. 6. Subsystem adapter storage includes a subchannel buffer pool 14.1, a free buffer list 14.2, a message-transfer work queue 14.3, a configuration element 14.4, an interruption queue 14.5, a data-transfer work queue 14.6, and a data-transfer control register 14.7.

Subchannel buffer pool 14.1 contains buffer elements which are used to construct subchannel control spaces for exchanging messages and data with host systems, and for presenting "response" messages from the subsystem adapter to subsystem software by a procedure described infra under "Data Transfers". Free buffer list 14.2 contains elements which are used to identify buffer elements in the subchannel buffer pool which are free to be used for subchannel control space construction. Subsystem message-transfer work queue 14.3 contains work element spaces which are used to define locations of messages in pool 14.1 awaiting transfer communication to host systems. Subsystem data-transfer work queue 14.6 contains work element spaces which are used to define locations of data transfer control arrays in pool 14.1 associated with pending data transfers. The subsystem adapter processes such entries in the sequence of their insertion into the work queues, and conducts associated message transfer and data transfer communications via subsystem link controllers such as 21 (FIG. 1). Subsystem interruption queue 14.5 is used to identify buffer elements in the subchannel buffer pool containing response messages and incoming request and attention messages which are to be communicated to subsystem software in association with the signalling of interruption requests to subsystem CPU's. When a message is processed by a subsystem CPU in response to an interruption request the associated work item entry is deleted from the interruption queue. Subsystem configuration element 14.4 is used to maintain state information for controlling subsystem adapter usage of interruption and response list techniques for communicating messages to subsystem software and link information controlling communications relative to host systems. Subsystem data transfer control register 14.7 is used during data-transfer operations.

When a message is received from a host system the subsystem adapter constructs an associated subchannel control space in free elements of its subchannel buffer pool 14.1, and stores the message in that space. If the state information in the configuration element specifies interruption the adapter creates an entry in its interruption queue denoting the location of the subchannel control space, and presents an interruption request signal to subsystem CPU's. When a subsystem CPU accepts an interruption request it copies a message from a subchannel control space specified by an entry in the interruption queue into address locations 512-767 in subsystem main storage, and stores an associated interruption code in locations 184-191 in subsystem main storage. If the message is a request the host subchannel identifier and sequence number parameters accompanying that message are stored in said locations 184-191 as part of the interruption code. The associated elements of the interruption queue and the subchannel control space are restored to free status after the interruption request has been accepted and processed in this manner.

A subsystem adapter may concurrently be receiving a host message, transferring an outgoing message to a host, and sustaining several data block transfers with associated hosts.

After processing an interruption request in respect to an incoming message the subsystem CPU transfers control to subsystem software which transfers the message from locations 512-767 to another space in subsystem main storage, and schedules a task for processing the message. In respect to request messages, the software schedules execution of operations specified by the commands. If the message is a request the accompanying subchannel identifier and sequence number parameters are removed from subsystem main store locations 184-191 and processed in association with the request.

If the message is a request it is scanned for logical misspecifications. If there are any an abnormal completion message is generated describing the exceptions, and an SST instruction is issued for initiating the transfer of said abnormal completion message to the associated host. If there are no logical misspecifications, the software schedules the initiation of operations specified by the individual commands. A flag bit in the execution parameter of the request header (see FIG. 2) is inspected to determine if the commands must be executed sequentially. If sequential execution is specified the specified command operations are performed in the order of their specification in the request. Otherwise the command operations are initiated in an arbitrary sequence based upon the availability of subsystem storage and communication resources.

11. Data Transfer

Figure 15:
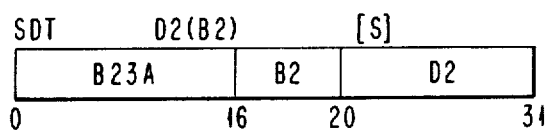
FIG. 15 shows the form of a Start Data Transfer (SDT) instruction used by subsystem CPU's to initiate data block transfers.

Transfers of unit size data blocks are initiated by subsystems in response to data transfer commands communicated from host systems in request messages. Each data block transfer operation is initiated by subsystem CPU (14, FIG. 1) execution of a Start Data Transfer (SDT) instruction (FIG. 15). In response to this instruction the subsystem CPU "primes" the subsystem adapter (16, FIG. 1) to transfer one or more block units of data—each block unit consisting of either 2,048 bytes of data or 4,096 bytes of data—between subsystem main storage (15, FIG. 1) and one or more host main storages (e.g. 9a, FIG. 1). Data involved in a transfer to a host system is transferred from subsystem secondary storage (7, FIG. 1) to subsystem main storage before the associated SDT instruction is executed (by subsystem software). Data transferred from a host to a subsystem after initiation by an SDT operation is subsequently transferred from subsystem main storage to subsystem secondary storage by subsystem software.

During SDT execution the subsystem CPU creates a subchannel control space in subchannel buffer pool 14.1 (FIG. 14), and transfers information into "message control element" and "first and second temporary message buffer" parts of said space from subsystem main storage. Said information describes the data to be transferred, the direction of the transfer, and the identity of the destination or source host. The CPU then posts an associated work entry in data-transfer work queue 14.6 to initiate further action by the subsystem adapter on an asynchronous basis. The adapter subsequently tries to carry out the required data block transfers. After the transfers, or abnormal termination, the adapter engine handling the transfer process creates a response message or abnormal response message. It stores this message in the subchannel control space created during SDT execution, and posts an associated entry in interruption queue 14.5 to forward said message to the attention of subsystem software.

The information initially transferred into a subchannel control space during SDT execution is obtained by the subsystem CPU from two arrays in subsystem main storage; an "SDT message control block array" (FIG. 16) and an "SDT data transfer array" consisting of one or more data-transfer blocks (FIG. 17). The address location of the first byte in the message control block array (byte 0) is defined by the sum of the D2 term of the SDT instruction and the information content of a register designated by the B2 term of said instruction. The array address section 16.1 in the message control block array contains information defining the address location of the first byte in the associated data transfer array. The data transfer array consists of from one to fifteen SDT data transfer blocks having the form shown in FIG. 17. The number of such blocks is indicated by the array length information AL in the message header section 16.2 of the message control block array. The arrays are stored in subsystem main storage in advance of the execution of the associated SDT instruction under control of subsystem software.

In creating a subchannel control space during SDT execution the CPU uses free buffer list 14.2 (FIGS. 14 and 19) to locate from one to three buffer elements in buffer pool 14.1 for assignment to said subchannel control space. Referring to removal cursor 19.1 the CPU locates the required number of free elements 19.2. The number of elements required (one, two or three) depends on the number of SDT data transfer blocks contained in the associated SDT data transfer array (one element if said array contains six or fewer blocks, two elements if said array contains 14 or fewer blocks, three elements if said array contains 15 blocks). The value of removal cursor 19.1 is increased by the number of elements assigned to said subchannel control space.

The information stored in the selected elements 19.2 identifies associated buffer elements 20.1 (FIG. 20) in the subchannel buffer pool which can be used to form the respective subchannel control space. The first buffer element in said subchannel control space, called the "SDT message control element", is shown in FIG. 21. The CPU executing the SDT instruction enters "control" information from the associated SDT message control block (FIG. 16), and data transfer information from the associated SDT data transfer array, into this SDT message control element. The CPU then increases a count value stored in "sequence number" field 19.3 of the free list and stores the increased value both in field 19.3 and in the "subsystem adapter sequence number" section 21.1 of the message control element (FIG. 21). This sequence number thus becomes uniquely associated with the respective data transfer transaction. After posting the associated work queue entry the CPU terminates its execution of the SDT instruction and the subsystem adapter has the responsibility for the data transfer operation.

The subsystem adapter attends to its tasks, including data transfer operations, as follows. When not engaged in a specific task each adapter engine operates in a predetermined sequence to locate tasks to perform. Each engine first determines if an outgoing message transfer task requires continuation service or start-up service. If such service is required the engine attempts to continue or start up the transfer processing of a message. Next, the engine determines if a subsystem link controller has received an incoming message. If it has the engine attempts to create a subchannel control space for that message. If successful, the engine stores the message in said space and posts an entry in the interruption list to secure further processing of said message by subsystem software. Finally, the engine attempts to determine if a data transfer operation requires continuation or start-up service. If it does, the engine attempts to provide the required service. Then the engine recycles to attempt to service an outgoing message and all of the above steps are repeated.

Adapter storage contains a data transfer control register (14.7 of FIGS. 14, 23) and a message transfer control register (18.5, 18.6 and 18.7 of FIG. 18) respectively associated with data transfers and outgoing message transfers. The message transfer control register is set to occupied status (and thereby associated with the transfer processing of an outgoing message) from the time the adapter initially inspects an associated message work item entry in the message transfer work queue to the time that the associated message transfer is either concluded or abnormally terminated.

When the message transfer control register is set to occupied status an associated work item indication is transferred into said register and an associated work element in the work queue (FIG. 18) is returned to free status. In this operation the identity of the first buffer element in the associated subchannel control space (i.e. the number of the buffer element containing the "SST message control element"; see paragraph 12, infra) is transferred into the message transfer control register as the work item indication.

The data transfer control register is associated with the processing of a data transfer operation from the time an associated work item entry in the work queue is first inspected by the subsystem adapter to the conclusion or abnormal termination of the associated data transfer. When the data transfer control register is set to occupied status the work queue element containing the associated work item entry is returned to free status. Contemporaneously, the identity of the first buffer element in the associated subchannel control space (i.e. the buffer element containing the "SDT message control element") is stored in the data transfer control register (23.1 of FIG. 23).

The message transfer control register and data transfer control register both have an occupancy bit (18.5 and 18.10 respectively in FIG. 18). This bit is set to indicate that the associated register is occupied when an associated work item identifier is initially transferred to said register from the work queue, and reset to indicate that the respective register is vacant when the transfer process associated with said work item has been concluded or abnormally terminated.

In performing the above "work locating" sequence a subsystem adapter engine performs the following specific operations. The engine first determines if an outgoing message requires service by examining the occupancy bit in the message transfer control register. If that register is occupied the engine attempts to find a previously unused link in non-busy status for connecting to the specified destination host system. If a suitable link is found the engine attempts to transmit the associated message to said host. If the message is transmitted, or if the message transfer control register is empty when its occupancy bit is examined, the engine next examines the message-transfer work queue. If the work queue is not empty, the engine attempts successively to: the engine attempts successively to: access the work queue, transfer the next entry to the associated message transfer control register, set the occupancy bit of said register, and then proceed with the transfer processing of the entry now contained in said register as described above.

If no outgoing message requires service, or if the processing of one outgoing message has been concluded or abnormally terminated and properly reported to subsystem software via a response message, the engine scans the subsystem link controllers for incoming message reception activity. If such activity is found the engine attempts to process one such message (the first one it finds). It does this by creating an associated subchannel control space, storing the message in said space, and posting an associated entry in the interruption queue. If no incoming message activity is found, or if the engine has just completed an attempt to service an incoming message, the engine next attempts to find and service a data transfer operation.

For this purpose it first examines the occupancy bit of the data transfer control register. If said register is occupied the engine attempts to establish a link connection to the host system designated in the associated subchannel control space, and to initiate the required data transfer operation over said link. If the data transfer control register is empty when its occupancy bit is examined the engine proceeds to examine the data-transfer work queue. If the work queue is not empty at that time the engine attempts to initiate processing of the next item (i.e. the item designated by adapter cursor 18.11). In the latter circumstance, the engine attempts to access the work queue and transfer the work element associated with said next item into said engine's data transfer control register. If this action is successful the engine sets the occupancy bit of its data transfer control register and deletes said item from said work queue (by modifying the occupancy bit of the associated work element and incrementing adapter cursor 18.11). The engine then proceeds to attempt to carry out the data transfers in accordance with the procedure described above. If the engine finds that no data transfer subchannel requires service, or if the engine has concluded an attempt to service one data transfer, the engine recycles its activity sequence to attempt location and servicing of an outgoing message. The above procedure is thereby cyclically repeated by each engine.

12. Message Transfer From Subsystem To Host System

Outgoing subsystem messages (i.e. completion and attention messages) are composed under control of subsystem software and transmitted to host systems via the subsystem adapter, subsystem link controllers, links, host link controllers and host adapters. The message transfer process is initiated by a subsystem CPU and carried out under control of the subsystem adapter. The subsystem CPU initiates the transfer by executing a Start Subsystem Transfer instruction (SST) having the form shown in FIG. 4. This instruction refers the CPU to a 16-byte text block containing the message information and related control parameters. The text block is located in subsystem main storage (prepared earlier by subsystem programs).

When executing an SST instruction the subsystem CPU creates a subchannel control space in subchannel buffer pool 14.1 (if sufficient elements in said pool are available for this purpose), stores the message information and related control parameters in said space, creates an entry in message-transfer work queue 14.3 designating the leading element of said space (i.e. the element containing the message control element array; see FIG. 21), sets the message-transfer work queue initiative latch, and signals the subsystem adapter that said queue contains a pending item of work. The CPU then concludes its execution of said instruction and the transfer operation becomes the responsibility of the subsystem adapter.

As explained in paragraph 11 supra the subsystem adapter engines cyclically search for work tasks, alternating between searching for message processing work and data transfer work. In this search each engine examines a respective message transfer control register to see if a message-related work activity has been initiated in the adapter but not processed to conclusion. If such an activity is indicated in said register the engine attempts to advance the transfer processing of the associated message, and then proceeds to scan for incoming message activity and data transfer activity (inbound or outbound) as described previously. If the message transfer control register is vacant when examined the engine proceeds to inspect the message-transfer work queue, thereby determining if said queue is occupied. If the queue is occupied the engine attempts to transfer said work item to its message transfer control register, and to advance the transfer processing of the associated message.

Figure 16:
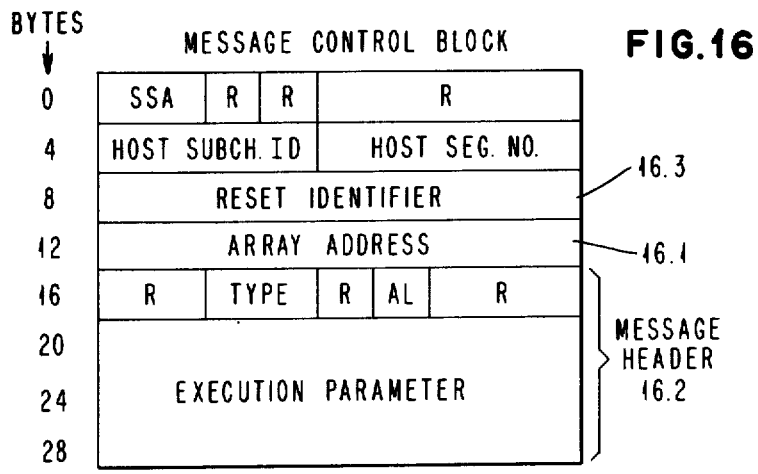
FIG. 16 shows the form of a message control block array in subsystem main storage which can be used in association with subsystem CPU execution of an SDT or SST instruction.
Figure 19:
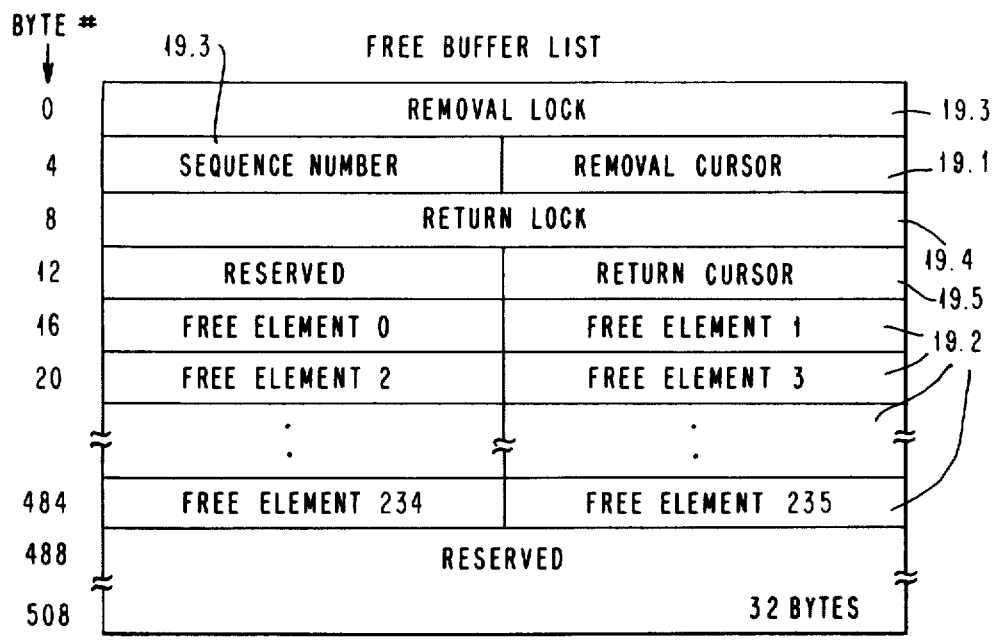
FIG. 19 shows the form of the free buffer list portion of subsystem adapter storage.
Figure 20:
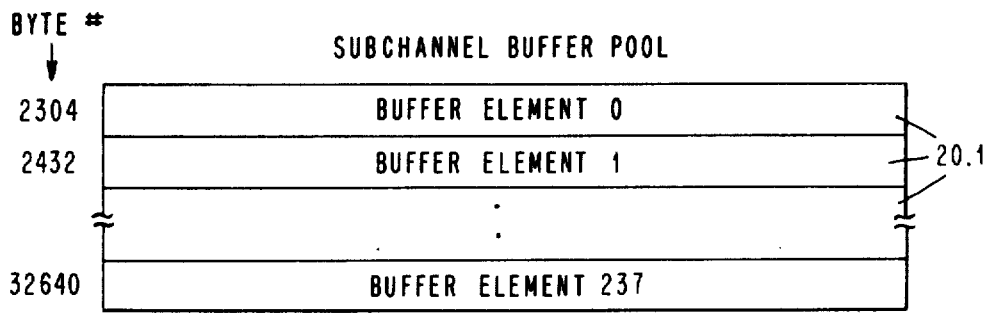
FIG. 20 shows the form of the subchannel buffer pool portion of subsystem adapter storage.

In the above-mentioned process of SST instruction execution the subsystem CPU executing said instruction uses the D2 and B2 terms of said instruction (see FIG. 22) to locate an SST message control block in subsystem main storage having the form shown in FIG. 16. This block in turn refers said CPU to an SST Text Array in subsystem main storage. Said control block contains the message header and control parameters, and said text array contains the message information proper. The CPU adds the D2 term of the instruction to a base address number located by the B2 term of the instruction to form the address of the initial byte of the SST message control block. The CPU then uses the array address term 16.1 in the SST message control block to locate the associated SST text array. Next, the CPU creates the associated subchannel control space using removal cursor 19.1 in the free buffer list (FIG. 19) to locate the required buffer elements in the subchannel buffer pool (FIG. 20). Then the CPU stores the message header, control parameters and message information proper in said subchannel control space. If successful in constructing said space the CPU increments the removal cursor value by the number of elements effectively removed from free status in the subchannel buffer pool. Then the CPU increments the sequence number value in sequence number slot 19.3, by one, and stores the updated value both in slot 19.3 and in the "reset identifier" slot 16.3 of the message control block (FIG. 16). Finally, after completing the foregoing operations the CPU concludes SST execution, by posting a corresponding work item entry in the message-transfer work queue and signalling the subsystem adapter that said queue is not empty. In this posting the CPU uses CPU cursor 18.2 to locate the work element in which it posts the entry and then increments the value of said cursor by one (modulo 235).

In accessing adapter storage spaces such as the free buffer list and work queue the CPU must operate in potential competition with other CPU's. Accordingly to eliminate conflicts the CPU can access the free buffer list only after examining the removal lock space 19.3, finding its value to be 0, and storing its identity (non-0) in said lock space until it is through using said list, and thereafter resetting the lock value to 0. Similarly before accessing the work queue the CPU must test "CPU lock" space 18.2, find its value to be 0, and set its identity value into said lock space.

After the message has been "encapsulated" in an associated subchannel control space and the associated work entry has been posted in the work queue, by the foregoing action associated with SST instruction execution, the subsystem adapter has the responsibility for controlling the actual transfer of the message (to the host specified in the SSA field of the message header). When the associated message-transfer work queue entry is the next entry to be serviced (i.e. the next entry indicated by adapter cursor 18.1) and the message transfer control register is currently vacant, and obtaining access to the message-transfer work queue in connection with its "work-seeking" process, a subsystem adapter engine will transfer said next work queue entry to the message transfer control register. Said engine will then update the free buffer list to effectively restore the associated work element in the work queue to free status, and thereafter it will attempt to advance the processing of the message, relative to the associated entry now posted in the message transfer control register, by means of the procedure described next.

Assuming that the status information in the message transfer control register indicates that processing of said message has not started, the adapter engine will attempt to reserve a link to the destination host system whose address is indicated in the SSA field of the message control element array (FIG. 21) associated with said message. For this purpose the engine will attempt to obtain access to a link lock 24.1 (FIG. 24) for a link to the host in configuration element 14.4 until it is successful (i.e. until it finds the value in said path lock space to be 0). Then the engine initiates a message transfer operation.

The engine initiates a message transfer by placing the message in a buffer in the link controller (21, FIG. 1) associated with the reserved link. If the message is a completion message it is accompanied by a host subchannel identifier number and sequence number corresponding to the numbers received with the request message. Thereafter, the engine sets the state of its message transfer control register to "started", stores the identity of the reserved link in a "current link" section of said register, and branches its operating sequence to search for incoming message processing activity and data transfer processing activity. Contemporaneously the message is forwarded over the link by the associated link controller.

Subsequently, when the engine controls return to the sequence for processing outgoing message activity the engine will find the state to be "started", and thereby proceed to evaluate a "completion indicator" associated with the link identified in the current link field of its message transfer control register. If said indicator should indicate that the transfer has been completed the engine will test other status indicators associated with said link for abnormal condition indications. If no abnormal conditions are indicated the engine will generate a normal response message, store it in the message control element currently assigned to the outgoing message, alter the type field of said element to indicate a normal response message, and then operate through the configuration element to select the interruption queue or response list for communicating this response message to subsystem software. For the latter purpose the engine will obtain access to the configuration element by testing lock space 24.2 (if necessary repeatedly) until its value is 0 and then entering its identity into that space. Then the engine will refer to the state space 24.3 and determine thereby whether to use the interruption queue or response list technique for communicating said response message to the software. Thereafter, the engine will release lock 24.2. If the response list method is chosen the engine will return the buffer elements of the subchannel control space to free status. If the interruption method is chosen the subsystem CPU will return the subchannel control space to free status when it services the associated interruption request.

If the link status indicators above indicate an abnormal transfer condition not due to link error the engine uses the exception indicators in the link buffers to compose an abnormal response message which it stores in the message control element of the associated subchannel control space. This response message is communicated either by interruption or via a response list as above, after which the configuration element lock 24.3 is released and the subchannel control space is freed conditionally, as above.

If the link status indicators above indicate an abnormal transfer condition due to link error the adapter adds 1 to a count representing the number of unsuccessful transfers. If the result is less than four the engine stores the current link identity in its message transfer control register, attempts to reserve another link to the same host and repeats the transfer. If the incremented transfer count is four the engine generates an abnormal response message and transfers it to subsystem software via either the interruption queue or a response list as above.

After any of the foregoing actions the engine sets the occupancy latch of the message transfer control register to indicate empty status and resumes its work seeking sequence.

13. Adapter Logical Organization

(a) Overview

Figure 25:
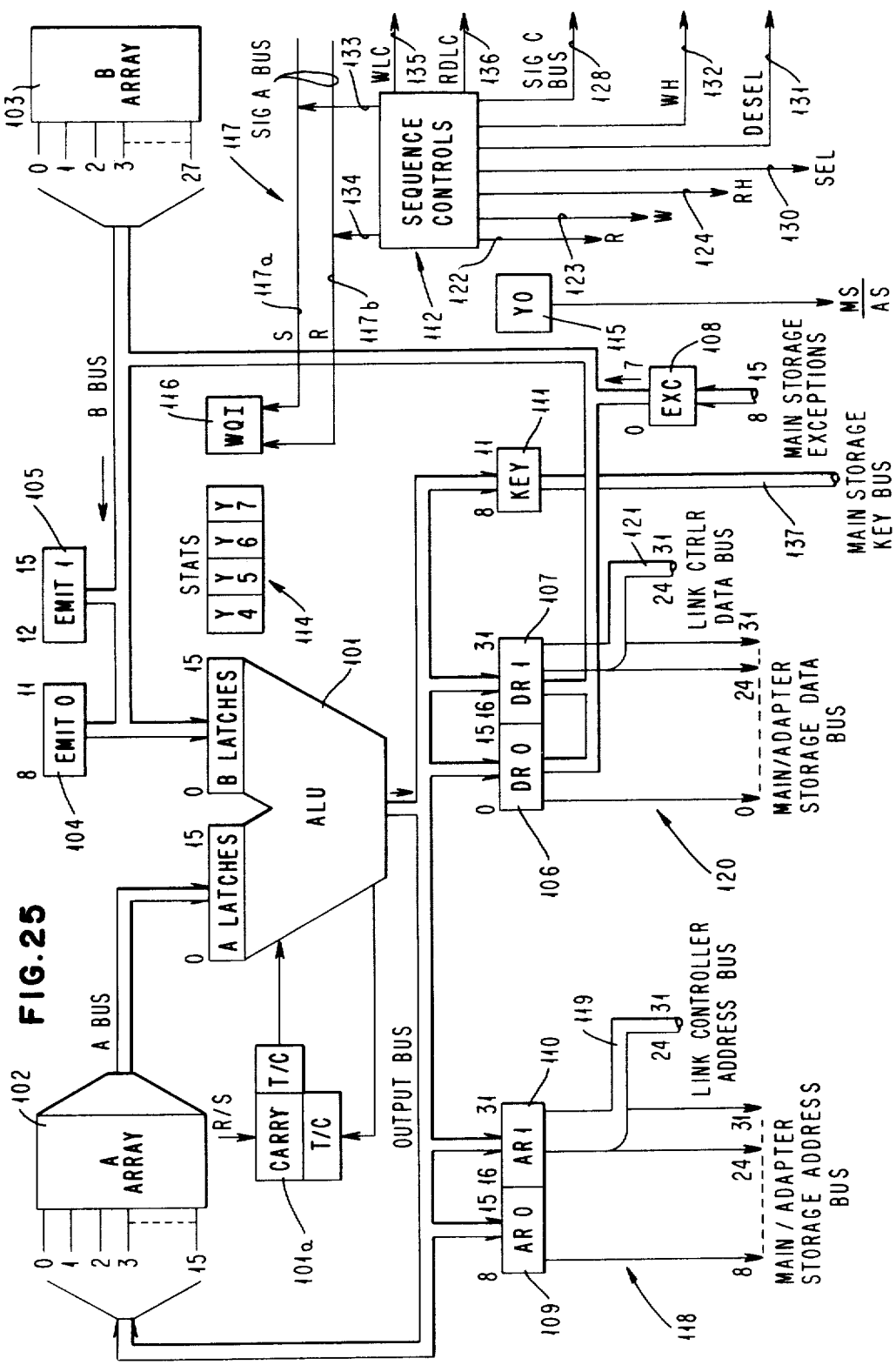
FIG. 25 is a schematic of the data flow organization of a Host Adapter Engine.

The elements of a host adapter engine are shown in FIG. 25. Subsystem adapter engines have similar organizations with specific adaptational features discussed in paragraph 16 infra. This paragraph 13 concerns the logical organization of the host adapter engine and details of its control logic.

Each host adapter engine is a minicomputer device adapted for performing the engine functions previously described. Each engine cyclically processes information internally in bit-parallel units containing up to 16 bits. An engine can transfer up to 32 bits at a time to or from main storage or adapter storage, and 8 bits at a time to or from any link controller.

(b) Host Adapter Engine Data Flow

A host adapter engine, shown schematically in FIG. 25, is a cyclically operating data processing unit. It contains an arithmetic logic unit (ALU) 101 having a left side (A) input fed by an associated "A bus", and a right side (B) input fed by an associated "B bus". Inputs are supplied to the A bus from a writable buffer store array 102 containing 16 addressable halfword storage locations. In any basic machine cycle of engine operation a location in array 102 can be addressed via not shown addressing circuits and a halfword of information can be read out of said location to the A bus. In the same cycle a halfword of information can be written into the same location from the ALU output bus. The input to the B bus in any cycle is supplied from a selected one of the following 33 sources: one of 28 "constant" storage locations in a read only storage array 103, emit register 104, emit register 105, data register 106 (DR0), data register 107 (DR1), or exception register 108. In any cycle in which array 103 is chosen as the source of input to the B bus, address signals are supplied to said array via not shown lines, and decoded by a not shown decoding circuit, to select one of the 16 locations in said array as the source of said input. In any cycle of engine operation, arithmetic unit 101 can be controlled to perform an addition, subtraction, shifting or logical combining operation (AND or OR) on one or both of its inputs. When a shifting operation is performed the A input can be shifted left or right a number of bit positions specified by 4 bits of the B input, or the B input can be shifted left 8 bit places.

The output of arithmetic unit 101 in any engine cycle is applied, via the bus labeled "output bus" and not shown selection gates, to one of the following 21 "destination" registers: data register 106, data register 107, address register 109 (AR0), address register 110 (AR1), key register 111, or a currently addressed one of the 16 register storage locations in A array 102. Arithmetic unit 101 includes a standard carry latch circuit 101a for providing initial carry inputs to unit 101.

Each adapter engine also comprises: not shown timing controls for defining engine operating cycles, sequence controls 112 for controlling the operations performed in each engine cycle, status indicating latches (stats) 114 (Y4-Y7), storage access control latch 115 (Y0), and work queue initiative latch 116. Latches Y4-Y7 and latch 115 are selectively set and reset under the control of controls 112. Work queue initiative latch 116 is set and reset by signals conveyed through SIGA bus 117. Bus 117 consists of two lines 117a and 117b coupled to controls such as 112 and work queue initiative latches such as 116 in all engines associated with a given host. Lines 117a and 117b are selectively energized for respectively applying set and reset stimulation to all of said latches. Signals can also be applied to bus 117 from CPU's associated with the same host system.

Controls 112 control the signal flow within the engine and "external" transfers of signals between the engine and other parts of the host system; i.e. main storage 9a, adapter storage 13a, and link controllers 20 (FIG. 1). When controls 112 issue a read or write access request to external storage the state of latch 115 is used to specify if the request is to main storage or adapter storage. When latch 115 is set main storage is selected. When latch 115 is reset adapter storage is selected.

Address registers 109 and 110 supply 24-bit addresses via bus 118 for use in association with storage access requests. An 8-bit portion of register 110 also supplies 8-bit addresses for link controller selection via bus 119. When used for storage addressing the outputs of registers 109 and 110 are transferred in parallel over 24-line bus 118 to the store designated by the state of latch 115. When used for link controller selection the 8 high order bits in register 109 are transferred via the 8-line bus 119 to circuits for selecting one of the link controllers 20.

Data registers 106 and 107 can be bidirectionally coupled to the store designated by latch 115 (main or adapter), via 32-line bus 120, for transferring information to or from a storage location designated by the contents of address registers 109 and 110. The high order 8 bits of register 107 also can be bidirectionally coupled, via 8-line bus 121, to a link controller 20 specified by selection signals on bus 119. Accordingly register 107 can exchange message information and data in byte units with the link controllers, and registers 109 and 110 in combination can exchange information in word (4-byte) units with main and adapter storage.

Explicitly shown outputs of controls 112 direct specific functions as follows. Lines 122-124 control storage access requests. Line 122 is pulsed to request a read operation, line 123 is pulsed to request a write operation, and line 124 is pulsed to trigger off a "read hold" sequence. In a read hold operation the selected store is pulsed to request a read operation and conditioned to prevent accesses to the word location until after the requesting host adapter has written either its identity (non-0) or all zeros back into the word location. Output bus line 128 (SIGC) connects to set inputs of not shown interrupt request latches in all host CPU's. Bus 128 is pulsed in association with the posting of entries in interruption queue 6.5 (FIG. 6). Lines 130 and 131 are respectively pulsed to select and deselect a link 18 in association with signals on bus 119 specifying the particular link to be selected or deselected. Line 132 is used in association with line 123 and latch 115 to signal that only a predetermined halfword part of the output of registers 109 and 110 is to be written into the selected store (main or adapter). Lines 133 and 134 connect respectively to lines 117a and 117b in bus 117, and are respectively pulsed to transmit set and reset stimulation to all work queue initiative latches. Line 135 or 136 is pulsed in association with link controller access requests to specify the direction of data or message information transfer. Line 135 specifies a "write" transfer from the engine to the link controller and line 136 specifies a "read" transfer from the link controller to the engine.

Register 111 supplies storage protection key signals in association with storage access operations. Key signals are passed from register 111 to storage via bus 137, enabling storage controls to discriminate between authorized and unauthorized accesses. Exception register 108, connected to the storage controls, receives an exception indication when an unauthorized access to main storage is attempted.

(c) Host Adapter Engine Microprogram Controls

The functions of controls 112 are conveniently implementable by microprogramming. An appropriate configuration of microprogram controls and microprogram instruction parameters is described below. Those skilled in the art will appreciate that such functions may also be easily implemented by sequence counting circuits, albeit in less orderly fashion.

Figure 26:
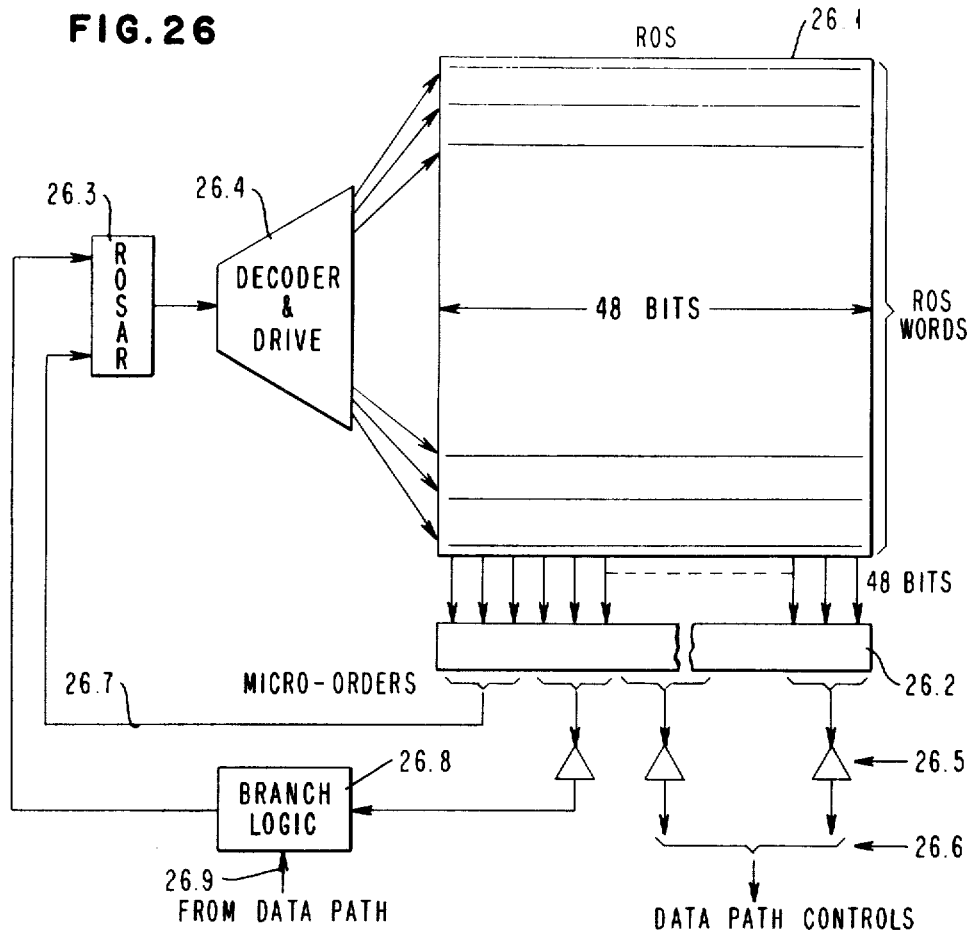
FIG. 26 is a schematic of a host adapter engine Microprogram control store.

FIG. 26 shows a suitable configuration of microprogram controls for implementing controls 112. This configuration generally resembles control systems described by S. Tucker in "Microprogram Control For System/360" (IBM Systems Journal, Vol. 6, No. 4, 1967, pages 222-241), and by S. Husson in "Microprogramming Principles And Practice", Chapter 8 (Prentice-Hall, 1970). Said controls include a read-only store (ROS) array 26.1 containing microinstruction control words, an output register 26.2 for storing control words cyclically extracted from array 26.1 which define operations of the subject engine in respective cycles, an address register 26.3 for specifying locations to be accessed in array 26.1 in successive cycles, decode and driver circuits 26.4 for cyclically decoding addresses in register 26.3 and for providing cyclic drive energization to associated locations in array 26.1, field decoders 26.5 for cyclically decoding micro-order fields in control words stored in output register 26.2, data path control lines 26.6 extending from decoders 26.5 to not-shown gating elements in the data flow paths of FIG. 25, "next address" output lines 26.7 for specifying a part of the address to be set into register 26.3 for next cycle control, and branch logic 26.8 for determining the remainder of the next address entry to register 26.3 in accordance with signals received on lines 26.9 from elements of the engine data flow path (including the stats 114).

Array 26.1 contains approximately 11,000 control word storage spaces each space including 48 bit storage locations. In each cycle of engine operation a control word is transferred from a selected location in array 26.1 into output register 26.2 and acts through decoders 26.5 to control the actions taking place in the engine data flow paths of FIG. 25. Concurrently, a new address is formed and inserted into register 26.3 for determining the next cycle control function. The bits of each control word are grouped into micro-order fields having functions described below.

(d) Host Adapter Engine Microinstructions

The micro-order fields in the control words of array 26.1 specify or determine: sources of "A" and "B" inputs to ALU 101 (FIG. 25), functions to be performed in ALU 101 (add A and B, subtract B from A, AND A and B, OR A and B, shift A left or right by a bit distance specified by B, shift B left 8 bits or pass B), register destinations of ALU outputs, inputs to emit registers 104 and 105, external access requests (EXT) to storage and link controllers, storage functions (read, write, read hold, write halfword), link control function (select read, select write, deselect) the conditioning of stats 114, the conditioning of work queue initiative latches (i.e. signals to bus 117), the conditioning of CPU interruption request latches (i.e. signals to bus 128), and the generation of next microinstruction addresses. Functions which can not occur in the same engine cycle (e.g. storage selection and link controller selection) can be controlled by corresponding micro-order fields in different microinstructions.

The source of the A input to ALU 101 (i.e. the address in array 102) is specified by a 4-bit micro-order field. The locations in array 102, numbered 0-15, have functionally associated mnemonic symbols. For example, location 15 is identified as the "J" register and is used to contain the number of the link lock currently being scanned by the engine (see paragraph 9 supra). Similarly, location 3, termed the MCE register, is used to store the address of a message control element during processing of operations associated with a message transfer or data transfer. Table 1 below lists the A array locations and their associated identification symbols.

TABLE 1

| Address In A Array | Inputs to ALU A Side | |
|---|---|---|
| | Identification Symbol | Represents |
| 0 | J | a buffer for temporary storage of the number of a link lock currently being scanned |
| 1 | K | a buffer for temporary storage of the data area address information of a message control element; see FIG. 10 |
| 2 | CTL | a buffer for temporary storage of a control halfword; see FIG. 9 |
| 3 | AL | a buffer for temporary storage of array length information (see FIGS. 5 and 10) |
| 4 | MCE | a buffer for temporary storage of the number of a buffer element (in the subchannel buffer pool section of adapter storage) containing a message control element array |
| 5 | FTMB | a buffer for storing the adapter storage address of a second buffer element of a subchannel control space ("first temporary message buffer") |
| 6 | STMB | a buffer for storing the adapter storage address of a third buffer element of a subchannel control |

TABLE 1-continued

| | Inputs to ALU A Side | |
|---|---|---|
| Address In A Array | Identification Symbol | Represents |
| | | space ("second temporary message buffer") |
| 7 | ASA | a buffer for storing an adapter storage address |
| 8 | LCA | a buffer for storing a link controller address |
| 9 | TY | a buffer for storing the type indication of a message |
| 10 | WKA | Work (scratchpad) register A |
| 11 | WKB | Work (scratchpad) register B |
| 12 | WKC | Work (scratchpad) register C |
| 13 | WKD | Work (scratchpad) register D |
| 14 | WKE | Work (scratchpad) register E |
| 15 | WKF | Work (scratchpad) register F |

The micro-orders for controlling inputs to the B side of ALU 101 are 6-bit binary coded digital expressions capable of expressing 64 different code value combination. Each order specifies either a source of input information or the information itself. These micro-orders are indicated in Table 2 infra. The first 28 code positions (order code values 0-27) specify address locations 0-27 in B array 103 as input sources. These locations contain specified constants. The next 4 code positions (order code values 28-31) specify various different registers in the engine data flow path (FIG. 25) as B input sources. Code positions 32-47 and 49-63 represent direct input sources (emit inputs). When one of the code values 32-47 is specified the low order 4 bits of the same micro-order (representing a number from 0 to 15) are applied respectively to the 12th to 15th bit denominational positions of the B input. When one of the values 49-63 is specified the low order 4 bits are respectively applied to the 8th through 11th bit denominational positions of the B input. Code position 48 is unused.

Locations 0-19 in B array 103 contain constants associated with their mnemonic identification symbols. Locations 4-16 contain constants defining address locations in adapter storage of parameters represented by the associated symbols. For example, location 4 associated with symbol LL0 contains the address of link lock 0 in the configuration element (FIG. 12). This address is 1560 plus the address of work queue byte 0. Locations 0-3 contain constants used in the engine's link scanning process. Location 0 contains the engine's identity, for use when setting its identity into the previously described lock words. Locations 25 and 26 in the B array contain constants defining specific byte positions in the link controller buffers (for particular information exchange functions defined below). Location 27 is not used (available for added function).

Code positions 28-31, in the B-input micro-order, specify particular registers in the engine data flow which are associated with their respective idenfication symbols (for instance the symbol for code value 28 is DR0 representing data register 106; see FIG. 25).

TABLE 2

| | Inputs to ALU B Side | |
|---|---|---|
| Micro-Order Code Value | Symbol | Represents |
| 0 | EID | Location 0 in array 103 containing this engine's identity (constant) |
| 1 | INIT | Location 1 in array 103 containing the identity of the initial link (0 or 4) in this engine's link scanning sequence |
| 2 | LMOD | Location 2 in array 103 containing this engine's link modulus (4 or 0) |
| 3 | INC | Location 3 in array 103 containing this engine's link scanning increment (+1 or −) |
| 4 | LL0 | Location 4 in array 103 containing the address of link lock 0 |
| 5 | STL | Location 5 in array 103 containing the address of state lock 12.1 (FIG. 12) |
| 6 | STB | Location 6 in array 103 containing the address of state byte 12.2 (FIG. 12) |
| 7 | PLL | Location 7 in array 103 containing the address of the primary length slot (FIG. 12) |
| 8 | WE0 | Location 8 in array 103 containing the address of work element 0 (FIG. 9) |
| 9 | IAC | Location 9 in array 103 containing the address of the interrupt queue adapter cursor (FIG. 11) |
| 10 | IE0 | Location 10 in array 103 containing the address of queue element 0 (FIG. 11) |
| 11 | REM | Location 11 in array 103 containing the address of removal lock 8.1 (FIG. 8) |
| 12 | REMC | Location 12 in array 103 containing the address of removal cursor 8.2 |
| 13 | RET | Location 13 in array 103 containing the address of return lock 8.4 |
| 14 | RETC | Location 14 in array 103 containing the address of return cursor 8.5 |
| 15 | FE0 | Location 15 in array 103 containing the address of free element 0 (FIG. 8) |
| 16 | BE0 | Location 16 in array 103 containing the address of buffer element 0 (FIG. 7) |
| 17 | WMOD | Location 17 in array 103 containing the work queue modulus (244) |
| 18 | IMOD | Location 18 in array 103 containing the interruption queue modulus (490) |
| 19 | BMOD | Location 19 in array 103 containing the subchannel buffer pool modulus (489) |
| 20 | BIT0 | Location 20 in array 103 containing the constant value X'8000' |
| 21 | B0M | Location 21 in array 103 containing the constant mask value X'FF00' |
| 22 | B1M | Location 22 in array 103 containing the constant mask value X'00FF' |
| 23 | TW0K | Location 23 in array 103 containing the constant mask value X'7FF' |
| 24 | PLA | Location 24 in array 103 |

TABLE 2-continued

Inputs to ALU B Side

| Micro-Order Code Value | Symbol | Represents |
|---|---|---|
| | | containing the address of the primary response list address slot 12.3 (FIG. 12) |
| 25 | LCSB | Location 25 in array 103 containing the address of the link controller buffer in which the link controller state byte is stored (address 256) |
| 26 | LCCB | Location 26 in array 103 containing the address of the link controller buffer in which the link controller command byte is stored (address 258) |
| 27 | — | (Not used but available for added function) |
| 28 | DR0 | Specifies data register 106 as the B input source |
| 29 | DR1 | Specifies data register 107 as the B input source |
| 30 | DRx | Specifies data register 106 as the B input source if bit 31 of address register 110 is 0; and data register 107 otherwise |
| 31 | EXC | Specifies exception register 108 as the B input source |
| *32–47 | E | Specify emission of 4 low order bits of respective micro-order to B input bit Denominations 12–15 |
| 48 | — | Not used |
| 49–63 | D | Specify emisson of 4 low order bits of respective micro-order to B input bit denominations 8–11 |

*NOTE:
Code values 32, 40, 44, 46 in the B-input micro-order have significance as follows:
32 - (Symbol Z) the emitted bits (value 0) define the constant value 0
40 - (Symbol WAL) the emitted bits (value 8) define the offset of the work queue adapter lock (byte 8) from the base address of work queue byte 0
44 - (Symbol MCR) the emitted bits (value 12) define the offset of the message transfer control register (byte 12) from the base address of work queue byte 0
46 - (Symbol WAC) the emitted bits (value 14) define the offset of the work queue adapter cursor (byte 14) from the base address of work queue byte 0
48 - (Symbol WSSA) the emitted bits (value 16) define the offset of the work queue SSA field (byte 16) from the base address of work queue byte 0

The ALU performs one of eight functions in respect to its A and B inputs, as specified by a 3-bit micro-order field, in accordance with Table 3.

TABLE 3

(ALU Function)

| Micro-Order Value | Symbol | Represents |
|---|---|---|
| 0 | V | OR [Form the bit-by-bit "OR" of A and B] |
| 1 | · | AND [Form the bit-by-bit "AND" of A and B] |
| 2 | + | ADD [Form A + B] |
| 3 | − | Subtract [Form A − B] |
| 4 | L | Shift A left by no. of bits specified by B bits 12–15 |
| 5 | R | Shift A right by no. of bits specified by B bits 12–15 |
| 6 | LB | Shift B left 8 bits; block A |
| 7 | P | Pass B input to ALU output; block A |

The ALU output is gated to one of 25 destination registers specifed in a 5-bit micro-order field in accordance with Table 4.

TABLE 4

ALU Output Destination

| Micro-Order Code Value | Symbol | Represents |
|---|---|---|
| 0–15 | Same as values 0–15, Table 1 | Same as A inputs 0–15 (Table 1) |
| 16–22 | — | Not used |
| 23 | Z | No destination |
| 24 | AR0 | Address register 109 |
| 25 | AR1 | Address register 110 |
| 26 | ARZ | Address register 110 and reset address register 109 |
| 27 | DRZ | Data register 107 and reset data register 106 |
| 28 | DR0 | Data register 106 |
| 29 | DR1 | Data register 107 |
| 30 | DRX | Data register 106 if bit 31 of address register 110 is 0; otherwise data register 107 |
| 31 | KEY | Key register 111 |

A 2-bit micro-order field determines the settings of stats 114 in accordance with Table 5.

TABLE 5

| Order Code Value | Symbol | Represents |
|---|---|---|
| 0 | NOP | No-operation (stats unchanged) |
| 1 | = | Set Y4–Y7 to states of respective bits 12–15 on B bus |
| 2 | OR | "OR" Y4–Y7 with respective bits 12–15 on B bus and set respective results into Y4–Y7 |
| 3 | AND | "AND" Y4–Y7 with respective bits 12–15 on B bus and set respective results into Y4–Y7 |

The carry function input to ALU 101 is determined by the state of carry latch 101a. A 2-bit micro-order field determines this state to be: the current state (symbol ()), a set state established at the beginning of the current cycle (symbol SC), or a reset state established at the beginning of the cycle (symbol RC).

Signals to "external" media—main/adapted storage, link controllers and interrupt request latches—are specified by a 4-bit micro-order field in accordance with Table 6. The last two functions apply to reset bus lines not shown in FIG. 25 which have no particular relevance to the present invention.

TABLE 6

External (EXT) Micro-Orders

| Order Code Value | Symbol | Represents |
|---|---|---|
| 0 | NOP | No-operation |
| 1* | READH | Specifies pulsing of read hold line 124 |
| 2* | READ | Specifies pulsing of storage read line 122 |
| 3* | WRITE | Specifies pulsing of storage write line 123 |
| 4 | READLC | Specifies pulsing of link controller read select line 136 |
| 5 | WRITELC | Specifies pulsing of link controller write select line 135 |
| 6 | RWQI | Specifies reset signalling to all work queue initiative latches 116 |
| 7 | SWQI | Specifies set signalling to |

TABLE 6-continued

External (EXT) Micro-Orders

| Order Code Value | Symbol | Represents |
| --- | --- | --- |
|  |  | all work queue initiative latches 116 |
| 8 | SIGC | Specifies pulsing of line 128 (set interrupt request latches) |
| 9 | SEL | Specifies pulsing of line 130 (to select link specified on bus 119) |
| 10 | DESEL | Specifies pulsing of line 131 (to deselect link specified on bus 119) |
| 11* | WRITEH | Specifies pulsing of "write halfword" bus 132 |
| 12 | SY0 | Specifies set input to latch 115 |
| 13 | RY0 | Specifies reset input to latch 115 |
| 14 | RLC | Specifies reset signalling to link controller specified on bus 119 |
| 15 | RPB | Specifies signal to main storage for resetting a "pin" bit |

*NOTE:
The signals generated in response to these orders are directed to the store (main or adapter) specified by the state setting of latch 115 (Y0). The source of the halfword to be written when order code 11 is specified is determined by the state of bit 30 in address register 110 (source is: register 106 if bit 30 = 0, register 107 if bit 30 = 1).

The address for selecting the next microinstruction is a 14-bit expression. Twelve of the 14 bits of each next address are directly specified by the currently effective microinstruction control word. The sources of the other two bits are specified by a 3-bit A test field and a 2-bit B test field in the current microinstruction word. The A test and B test micro-orders are shown in Tables 7 and 8.

TABLE 7

| Order Code Value | Symbol | Represents |
| --- | --- | --- |
| 0 | 0 | First address bit is 0 |
| 1 | 1 | First address bit is 1 |
| 2 | WQI | First address bit is 1 or 0 if work queue initiative latch 116 is respectively set or reset |
| 3 | TC | First address bit is 1 or 0 if carry latch is respectively set or reset |
| 4 | Y4 | First address bit is 1 or 0 if Y4 latch is respectively set or reset |
| 5 | Y5 | First address bit is 1 or 0 if Y5 latch is respectively set or reset |
| 6 | Y6 | First address bit is 1 or 0 if Y6 latch is respectively set or reset |
| 7 | Y7 | First address bit is 1 or 0 if Y7 latch is respectively set or reset |

TABLE 8

| Order Code Value | Symbol | Represents |
| --- | --- | --- |
| 0 | 0 | Second address bit is 0 |
| 1 | 1 | Second address bit is 1 |
| 2 | ALZ | Second address bit is 1 if ALU result = 0 |
| 3 | AL0 | Second address bit is 1 if |

TABLE 8-continued

| Order Code Value | Symbol | Represents |
| --- | --- | --- |
|  |  | bit 0 of ALU result is 1 |

Figure 27:
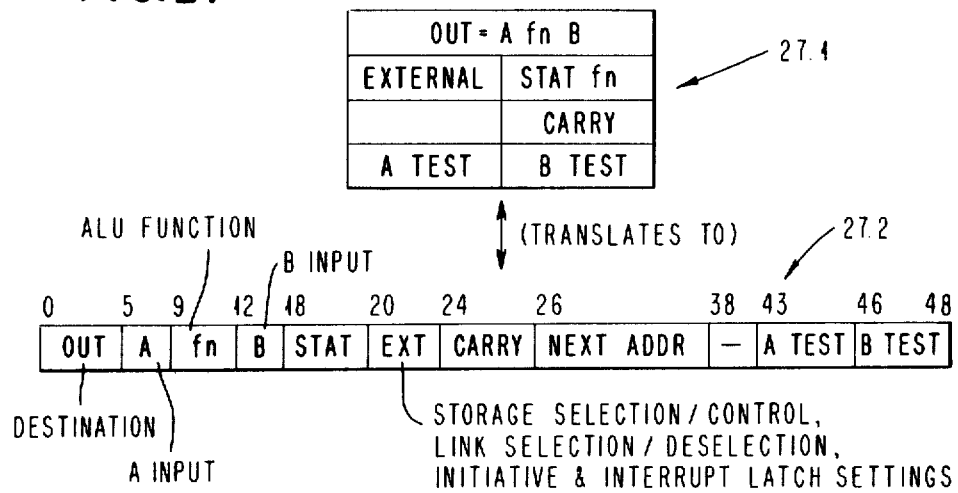
FIG. 27 schematically illustrates the coding representation for host adapter engine microinstruction control words.

A schematic form for writing microinstruction control words is shown in FIG. 27. Each 7-box symbol 27.1 translates to a corresponding 48-bit microinstruction control word expression 27.2. The schematic form 27.1 is used to illustrate the microprogramming of the subject engines in the discussion which follows.

e. Microprogram Example

The following description of host adapter engine microprogramming applies particularly to engines in host system 1 (FIG. 1). The SSA address of subsystem 3 assumed to be is "1" and the SSA address of host 2 is assumed to be "2". Furthermore, there are assumed to be 4 links between host 1 and subsystem 3, numbered 0, 1, 2 and 3; and a single link between hosts 1 and 2 designated as link number 4.

FIGS. 28A and B show the engine procedure for link scanning and FIGS. 29A and B show the form of the microinstructions employed to implement this procedure. As shown in FIG. 28A after the initial engine reset 200 (e.g. by a manually actuated system reset signal) operation 201 is performed to set the J register (location 0 in A array 102; see Table 1 and FIG. 25) to an initial "J" value determined by the "INIT" constant stored at location 1 in array 103 (see Table 2). Operation 201 is specified by a microinstruction having the form shown at 202 in FIG. 29.

Next, at 203 (FIG. 28A), the contents of location 4 in B array 103 (denoting the adapter storage address of link lock 0 in configuration element 6.4; see Table 2 and FIG. 6) is augmented by four times the value in the J register of array 102. The result (representing the adapter storage address of link lock J) is placed in address register 110 and address register 109 is reset (see micro-order ARZ Table 4). Also stat Y0 is reset (see micro-order RY0 Table 6).

The operations 203 are performed in two microinstruction steps shown at 204 and 205 in FIG. 29A. Microinstruction 204 sets work register A (WKA), in A array 102 (see Table 1 and FIG. 25), to four times the initial J value, by shifting said J value left two bit places. This shift is specified by micro-order L (Table 3) and the number 2 accompanying "emit" micro-order E (Table 2). Microinstruction 205 adds the content of work register A to the address of link lock 0 (extracted by micro-order LL0 from location 4 in B array 103). The result (representing the address of link lock J) is placed in address register 110 and address register 109 is reset (both by operation of micro-order ARZ). At the same time latch Y0 is reset by operation of micro-order RY0, and the ALU carry latch is reset by micro-order RC.

Next, at 206 (FIG. 28A) a read hold signal is issued to adapter storage to invoke the readout of link lock J (FIG. 12) at the adapter storage address location now specified in address registers 109 and 110. The high order bits of this address (in address register 109) are all 0's. The microinstruction for this is shown at 207 (FIG. 29A). During this operation the ALU is effectively idled, by the pass operation P (Table 3) and the micro-order Z (no destination; see Table 4), and latches Y4-Y7 are set to 0 by micro-order "=" (bits 12-15 on the B bus, corresponding to the low order bits of the address of link lock 0, are all 0's).

Next, at 208 (FIG. 28A) a sequence branch is taken conditioned on whether or not data registers 106 and 107 both contain 0 values (i.e. on whether the link lock J value is currently 0). If the "yes" branch is taken this engine's identity is entered into data register 106 by operation 209 (FIG. 28A) and at step 210 this engine's identity is transferred from register 106 into the link lock J storage space (FIG. 12). If the "no" branch is taken at 208 (link lock J not 0) the value of J is incremented by 1 (modulo 5) at 208a and execution continues at step 203 (FIG. 28A). Assuming that link lock J is accessible the value J is transferred from the J register to address register 110 (AR1) at step 211 (FIG. 28A), a selection signal is issued to the link J controller defined by that value at step 212, the number 256 is set into address register 110 at step 213, and that number is used at step 214 to read the link J controller status byte from location 256 of that controller's buffer store into DR1 (data register 107).

The microinstruction sequence for generating the actions of steps 208-214 is indicated in FIG. 29A at 215-221. Microinstruction 215 passes the contents of DR0 (data register 106) to work register A. Microinstruction 216 "OR's" the values in WKA and DR1. If the result is 0 (i.e. if both data registers have 0 values) the "yes" branch is taken to microinstruction 217. Microinstruction 217 transfers the engine's identity from location 0 in B array 103 to DR0. Next, microinstruction 218 enters the engine's identity into link lock J space and sets WKA to value 128. Then microinstruction 219 sets AR1 to the current J value. Microinstruction 220 then evokes the selection of the link J controller and microinstruction 221 reads a primary status byte from byte location 256 in the link J controller buffer.

In respect to the last operation it is noted that each link controller has a 268-byte buffer for sustaining message and data transfers, and for status indication. Bytes 0-255 in this buffer are used to store message and information and data, and bytes 256 and 257 respectively contain "primary" and "secondary" status bytes. The contents of bytes 258-267 will be discussed later.

After step 214 (FIG. 28A) the "primary" status byte of the link J controller is shifted from DR1 into work register A at step 222 (FIG. 28A) and the engine sequence branches at 223 on the contents of work register A. The bits in the link J primary status byte have the following significance (when set to 1):

| Bit | Significance |
|---|---|
| 0 | Link J is idle |
| 1 | Message has been received in link J controller buffers (from subsystem or host 2) |
| 2 | Message has been sent out from link J controller buffers to link J |
| 3 | Data transfer on link J complete |
| 4 | Data for link J controller buffer request pending |
| 5 | Link J unavailable |
| 6 | Not used |
| 7 | Link J ready to send |

When all bits of the primary status byte are 0 the link J controller is either in a transition between states or not operational. Accordingly when the yes branch is taken at step 23 (FIG. 28A) the engine must continue its scan sequence for another value of J. Accordingly, in this circumstance the engine microprogram controls branch to step 224 (FIG. 28B)—to deselect link J, reset Y0, and release link lock J (reset it to 0)—and then to step 208a via circled connection point AN. At step 208a the value of J is altered (incremented by 1 modulo the link modulus) and the scan sequence is iterated for the altered value beginning at step 203. The microinstructions for evoking the actions of steps 222-224 are shown at 225 in FIG. 29A and 226-229 in FIG. 29B. The microinstructions corresponding to step 208a are indicated at 230 in FIG. 29A.

If at least one bit of the link J primary status byte is not 0 at step 223 the "no" branch is taken to a further branch 230 which is conditioned on the value of bit 0 of the primary status byte. If bit 0=1 (link J idle) the sequence advances to a further branch 231 (FIG. 28B) conditioned on the state of the engine's work queue initiative latch (116, FIG. 25). If said latch is not on (not set) the "no" branch is taken to step 224, and the scan sequence for link J is thereby terminated via the operations 224 and 208a as explained above. If the work queue initiative latch is on at branch point 231, operation 232 (FIG. 28B) sets stats Y4-Y7 to a state associated with initiation of the message transfer processing sequence described later.

If bit 0=0 at branch decision point 230 the "no" branch is taken to a further branch decision 233 conditioned on the state of bit 1 in the primary status byte. If bit 1=1 at this decision point the "yes" branch is taken to step 234 which conditions latches Y4-Y7 to initiate the message reception sequence described later. If bit 1=0 at decision point 233 the "no" branch is taken to branch decision 235 which is conditioned on the state of bit 2 in the primary status byte. If bit 2=1 at decision point 235 the "yes" branch is taken to step 236 which conditions latches Y4-Y7 to initiate the message transmission concluding sequence described later.

If status bit 2=0 at decision point 235 the "no" branch is taken to branch decision 237 conditioned on the state of bit 3 in the primary status byte. If bit 3=1 latches Y4-Y7 are set by operation 238 to initiate the data transfer concluding sequence described later. If bit 3=0 bit 4 of the primary status byte is tested at decision point 239.

If bit 4=1 at this point latches Y4-Y7 are set by operation 240 to initiate the sequence for an inbound data transfer from the link J controller buffer to host main storage. If bit 4=0 at decision 239 latches Y4-Y7 are set by operation 241 to initiate the sequence for an outbound transfer from host main storage to the link J controller buffer as described later.

The microinstructions associated with operating steps 230-241 are shown at 243-249 in FIG. 29B. Microinstruction 243 effectively tests bits 0 and 1 of the primary status byte (decisions 230 and 233) by branching on the state of ALU output bit 0(AL0) and conditionally sets latches Y4-Y7 (operation 234). Microinstruction 243 is followed by a branch to microinstruction 244, or microinstruction 245, or to a microprogram for message reception processing (FIG. 40). Microinstruction 244 branches on (tests) the state of the work queue initiative latch (decision 231 FIG. 28), conditionally sets latches Y4-Y7 to the state for initiating message transfer (operation 232 FIG. 28), and links either to microinstruction 226 (corresponding to operation 224 FIG. 28) or to a microprogram for initiating the message transfer processing sequence (FIG. 30) depending respectively on whether the initiative latch is in the off or on state. Microinstruction 245 tests the states of bits 2 and 3 in the primary status byte and branches either to microinstruction 246 or to a microprogram for attending to the concluding phase of a message transfer sequence (FIG. 36) or to a microprogram for attending to the concluding phase of a data transfer process (FIG. 39). Microinstruction 245 effectively provides decisions 235 and 237, and operations 236 and 238 of FIG. 28. Microinstruction 246 tests the state of bit 4 in the primary status byte and branches either to microinstruction 248 or microinstruction 249 (refer to decision 239, FIG. 28). Microinstruction 248 sets latches Y4-Y7 for evoking a branch to a microprogram for continuing a data transfer process (refer to operation 240 FIG. 28). Microinstruction 249 retests the state of status bit 4 and branches either to microinstruction 247 or microinstruction 250. Microinstruction 247 transfers a reset signal to the link J controller and re-enters the link scanning sequence at microinstruction 226. Microinstruction 250 sets Y4-Y7 to evoke a microprogram sequence for initiating data transfer processes.

| Y4 | Y5 | Y6 | Y7 | Operations Initiated |
|----|----|----|----|----------------------|
| 0  | 1  | 0  | 0  | Message transfer |
| 0  | 1  | 1  | 0  | Message transfer completion |
| 0  | 0  | 1  | 0  | Message reception |
| 1  | 1  | 1  | 0  | Data transfer completion |
| 1  | 1  | 0  | 0  | Initiate data transfer |
| 1  | 0  | 1  | 0  | Continue data transfer |

Accordingly, at step 232 (FIG. 28) stats Y4-Y7 are set to configuration 0100 to initiate the message transfer sequence described later in reference to FIGS. 30-35, at step 234 Y4-Y7 are set to configuration 0010 to branch the controls to a microprogram for attending to message reception, and so forth (for operations 234, 236, 238, 240 and 241).

Figure 28B:
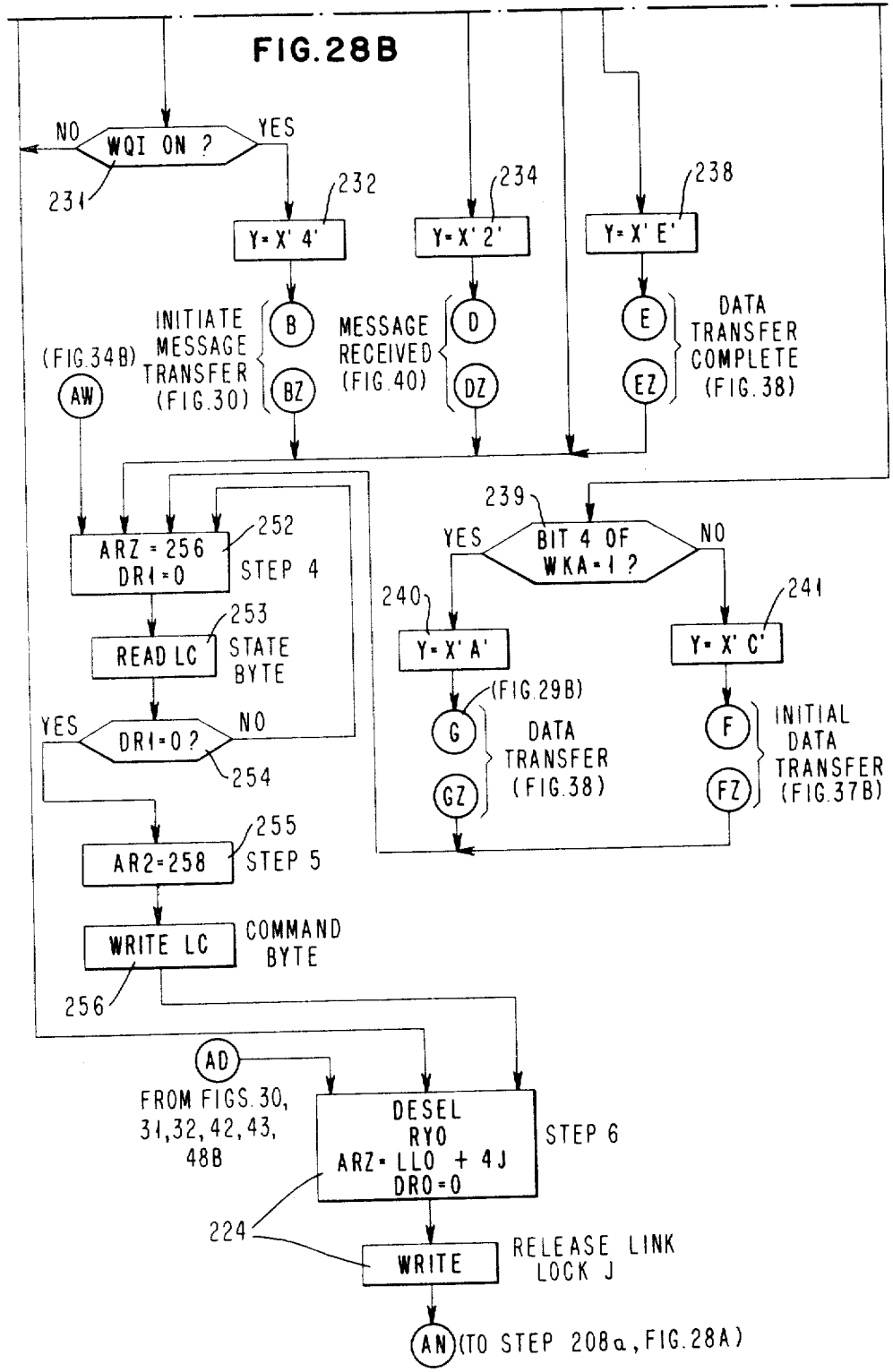

Upon conclusion of any of the sequences initiated at any of the operating steps 232, 234, 236, 240 or 241 (FIG. 28B) the engine sequence returns to the basic link scanning sequence at operation step 252 (FIG. 28B). At this point address register 110 is set to 256 and data register 107 is cleared. Then at operation step 233 the link controller primary status byte is again read from location 256 in the link J controller buffer into data register 107. This byte is tested for 0 value at decision point 254. If it is not 0 the sequence repeats—through operation 252, decision 253, and operation 254—until a 0 value is detected. When the value of the status byte is 0 at decision point 254 the sequence advances via operation steps 255 and 256 to the sequence 224 for advancing the scan sequence to another link. Operation 255 loads number "258" into address register 110 and operation 256 writes information into location 258 in link J controller.

Location 258 is used to store an adapter "command" byte in which individual bits are used by the adapter engine to signal control information to the link controller as follows:

bit 0—represents that a current message transfer sequence is complete
bit 1—represents a halt signal
bit 2—not used
bit 3—indicates completion of a data transfer sequence
bit 4—indicates a request to start a message transfer sequence
bit 5—indicates a request to send information
bit 6—indicates a request to start a data transfer
bit 7—not used When the halt bit in the command byte (bit 1) is 1 the controller is in effect instructed to inspect byte location 259 in which the adapter has previously written control information having the following significance:

bits 0, 2, 3, 5, 6, 7 - not used
bit 1—instructs the controller to terminate a current transfer (due to a specification exception)
bit 4—indicates to the controller that a received message has been rejected (due to a type exception)

It is believed that the foregoing example of engine operations for link scanning, with associated microinstruction specifications, sufficiently illustrates the technique for translating engine operation specifications into associated microinstructions and microprograms. Accordingly, one skilled in this art should be able to determine quite simply the microinstructions and microprograms for implementing the other engine operations given a functional specification of the other operations on a level comparable to FIG. 28. Accordingly, in the following paragraphs other engine operations are described in reference to FIGS. 30-53, on a level of detail equivalent to that in FIG. 28, and for the sake of brevity the associated microinstructions are omitted.

f. Adapter Engine Operations For Outgoing Message Transfers

Referring to FIGS. 25, 28 and 30-36 the adapter engine initiates operations associated with preparation for message transmission, and with actual message transmission, at the entry position denoted by the circled "B" (see FIG. 30) and returns to the link scanning sequence of FIG. 28 at the circled exit points "BZ" and "AD". Upon entering the base preparational sequence (FIG. 30) the engine performs operation 300. This operation loads the address of the work queue adapter lock space (9.4, FIG. 9) from location 40 in array 103 (WAL) into address register 110 (ARZ). Next, the engine performs operation 301 to apply a read hold signal to adapter storage. The engine sequence then branches at decision point 302 on the presence or absence of 0's in data registers 106 and 107.

If the "no" branch is taken at decision point 302 operation 303 re-writes the lock value (non-zero) into the work queue adapter lock space from data register 106, and the engine resumes link scanning at operation step 224 (FIG. 28) via circled connection symbol "AD".

If the "yes" branch is taken at decision point 302 the engine writes its identity into register 106 via operation 304, and that identity is tranferred into the work queue adapter lock space via operation 305 giving this engine control of the work queue. This is followed by operation 306 which loads the address of the first byte of the message transfer control register (byte 12, FIG. 9) from location 44 in array 103 into address register 110, and then by operation 307 which reads said first byte into data register 106. Then a branch is taken at decision point 308 conditioned on the value of bit 0 of said first byte (the occupancy indicating bit).

If no branch is taken at decision point 308 (message transfer control register is occupied) operations 309 are performed to prepare for an attempted transmission of a message in the subchannel control space identified in the MCE section of said register (space 9.8, FIG. 9), and the sequence for attempted transmittal (FIG. 32) is entered via the circled flow connection "BC". In operations 309 the control halfword information is stored temporarily in location 2 in array 102 and the contents of the SSA and MCE fields in the work queue (FIG. 8) are read out of adapter storage into data registers 106 and 107. The address of the first byte of the message control element is computed and that element (FIG. 10) is read out of the subchannel buffer pool section of adapter storage.

Figure 31:
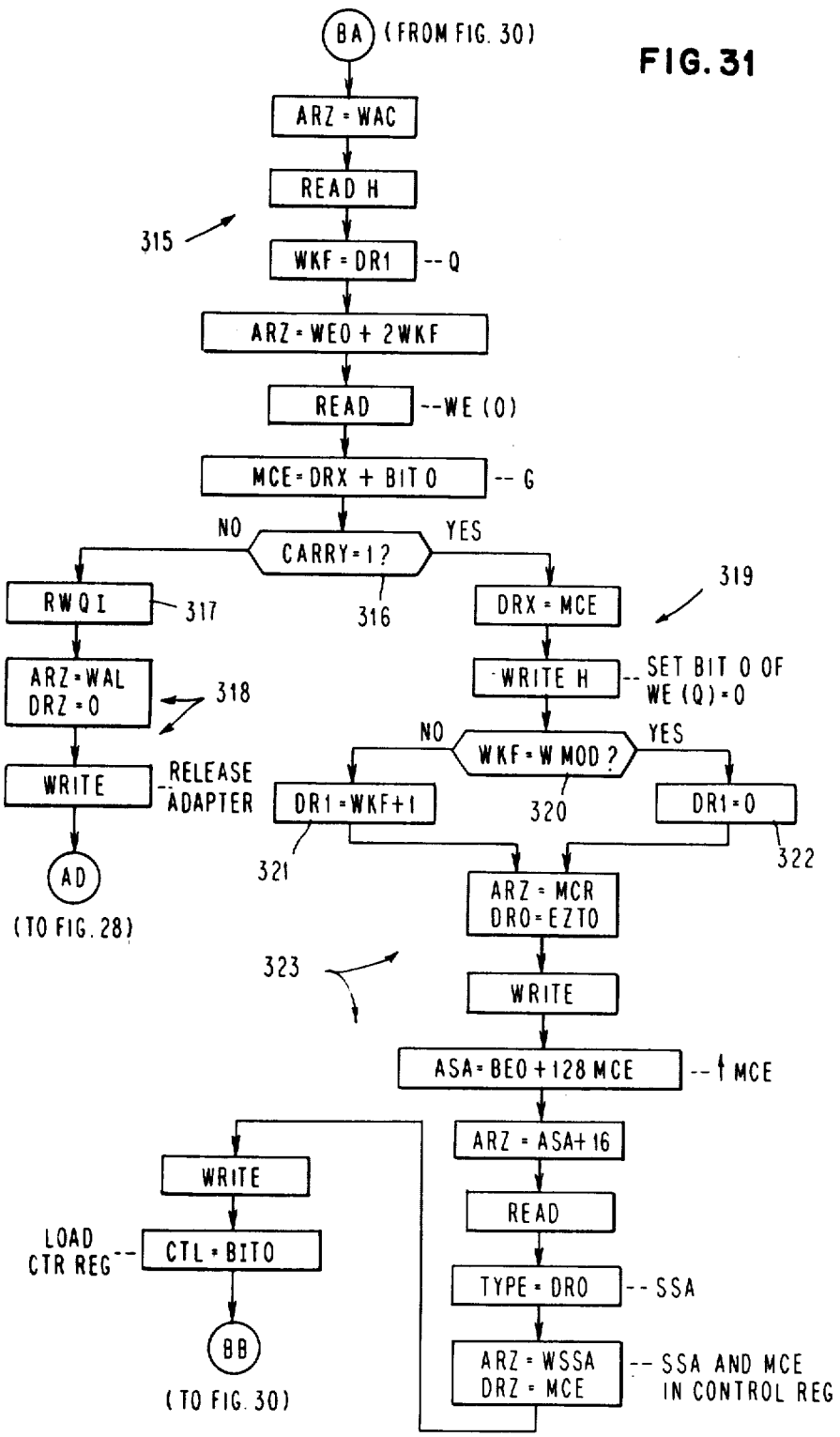
Figure 32:
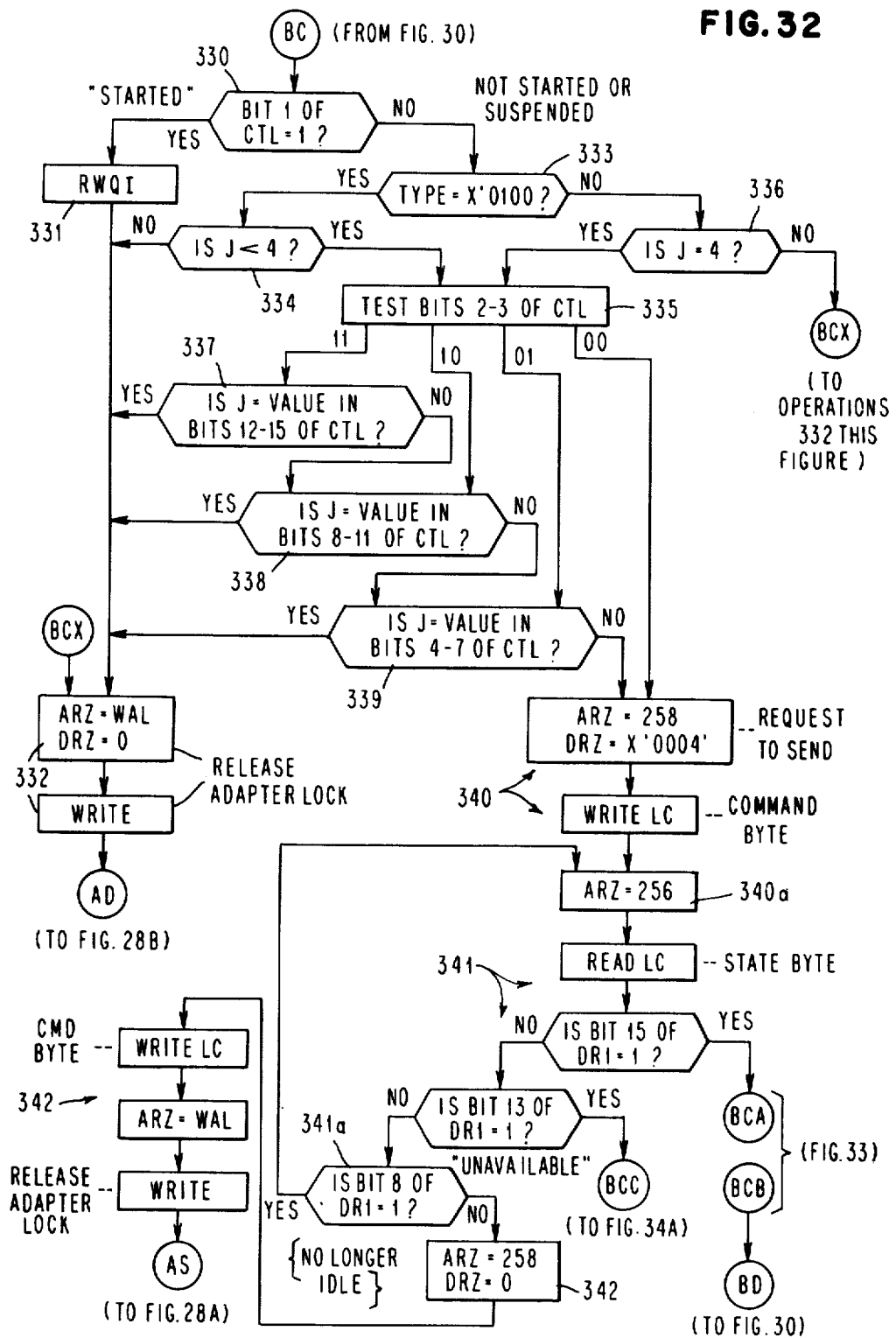

On the other hand if the "yes" branch is taken at decision point 308 (message transfer control register unoccupied) the engine controls enter the sequence for loading the message transfer control register (FIG. 31), via circled "BA", and successful (i.e. if the work queue is not empty) link to the sequence for message transmittal FIG. 32 via circled connections "BB" and "BC" (FIG. 30). If the work queue is empty, when the sequence of FIG. 31 is traced the engine resets its work queue initiative latch and re-enters the link scanning sequence of FIG. 28 via "AD".

If the attempt to start message transfer (FIG. 32) is successful, the base sequence of FIG. 30 is re-entered via circled "BD", concluding operations 311 and 312 are executed, and the link scanning sequence of FIG. 28 is re-entered via "BZ". Operations 311 and 312 reset the value in the work queue adapter lock space to 0, making that space accessible to other adapter engines.

In the sequence of FIG. 31, for attempting to load the message transfer control register, operations 315 evaluate the occupancy status of the work element space (9.3, FIG. 9) defined by adapter cursor 9.5; i.e. the contents of a 37 Q"th work element (WE(Q)) are read out from adapter storage and entered into data registers 106 and 107, and the initial (occupancy) bit is examined. At decision point 316 a branch is taken conditioned on the value of said initial bit. If WE(Q) is empty (37 no" branch taken at 316) the work queue initiative latches of all engines are reset at 317, the work queue adapter lock is released by operations 318, and the link scan sequence (FIG. 28) is re-entered via "AD". If the "yes" branch is taken at 316 the occupancy bit of WE(Q) is reset to 0 by operations 319 and a branch is taken at 320 on the value Q. If that value is not equal to the work queue modulus (i.e. 244) it is increased by 1 in operation 321. If said value of Q is equal to the work queue modulus it is reset to 0 in operation 322. After operation 321 or 322, operations 323 are performed to load the message transfer control register (916–918) with the work entry information extracted from WE(Q) and the sequence for attempted transmission (FIG. 32) is entered via connection BB to FIG. 30 and connection BC from FIG. 30 to FIG. 32.

In the sequence of FIG. 32 decision branch 330 is conditioned on the value of status bit 1 in the control halfword (9.6, FIG. 9). If said bit is 1 (i.e. if the associated message transfer process is in "started" state) the work queue initiative latches are reset at 331, the work queue adapter lock is released at 332, and the base link scan sequence of FIG. 28 is re-entered via "AD". If the state bit indicates "not started" or "suspended" status at decision point 330 another branch 333 is taken conditioned on the message type. If the message is a request (type x'0100') another branch 334 determines if the link number J is less than 4 (i.e. if the currently selected link connects to the subsystem). If J is not less than 4 the sequence is terminated via operations 332. If J is less than 4 the sequence advances to operation 335 described below. If the message is not a request, at decision point 333, another branch 336 is taken to determine if the value of J is exactly 4. If this value is not 4 the sequence terminates via the circled "BCX" connection to operations 332. If it is 4 the sequence advances to operation 335.

In operation 335 the combination of values represented by bits 2 and 3 of the control halfword 9.6 is examined, and a 4-way branch is conditioned on said value. The combined states of bits 2 and 3 in the control halfword represent a "transfer count" representative of the number of prior unsuccessful transmissions of the message currently defined in MCE space 9.8 (refer to paragraph 8, supra). If the transfer count is not 0 (i.e. if the "00" branch is not taken at 335) the current value of J is compared to groups of bits in the control halfword representing identities of links on which prior unsuccessful transfers have been conducted or attempted. If the "11" branch is taken at 335 the current value of J is compared at decision point 337 to the link identity indications in control halfword bits 12–15. If a match is obtained the sequence terminates via operations 332. If the "10" branch is taken at 335 or if a match is not obtained at 337, J is compared at 338 to control halfword bits 8–11. If a match is obtained in this comparison the sequence terminates via operations 332. If the "01" branch is taken at 335, or if a match is not obtained at 338, J is compared at 339 to the value of control halfword bits 4–7. If a match is obtained at 339 the sequence terminates via operations 332. If a match is not obtained at 339 or if the "00" branch is taken at 335 the sequence advances to signalling operations 340.

In operations 340 a "request to send" signal is presented by the adapter engine and a command byte is written into location 258 of the link J controller's buffer. Then a state byte is transferred from location 256 in the link J controller's buffer to the engine's data register 107. The link J controller's state byte is then examined via operations 341. If link J is "ready to send" the sequence connects via circled "BCA" to the message transfer operations illustrated in FIG. 33 which eventually connect back to the basic preparational sequence of FIG. 30 via circled connections "BCB" and "BD" (FIG. 32).

In operations 341 if the link J controller does not have "ready to send" status an "availability" bit in the status byte is evaluated to determine if link J is available (i.e. potentially accessible). If link J is not available the engine sequence connects via "BCC" to an analysis sequence illustrated in FIG. 34 which eventually connects either to a base concluding sequence illustrated in FIGS. 35 and 36 or to the base link scanning sequence of FIG. 28. If link J is apparently available the link J status bit distinguishing between idle and busy status is re-examined at 341a. If link J is idle at 341a the sequence loops to operation 340a to retransfer the state byte from location 256 of the link J controller's buffer for re-examination. If link J is not idle at decision point 341a the engine performs operations 342 by which a revised command byte is written into location 258 in the link J controller's buffer and the work queue adapter lock is released. Then the engine returns to the base link scanning procedure (FIG. 28) via "AS".

In the basic transmission sequence of FIG. 33 the engine controls issue a signal at operation step 350 to reset all work queue initiative latches. In the following operations 352 the sequence number and subchannel identifier number information are fetched to engine registers from the message transfer control register section of the work queue. In operations 353 these numbers are written into locations 264-267 in the link J controller's buffer in preparation for forwarding the same numbers over link J in association with the message information. In operations 354 (FIG. 33B) the link J controller's buffers are filled with the first 256 (or less) bytes of message information and the base sequence of FIG. 30 is re-entered at operation 311 via "BCB" and "BD".

Figure 34A:
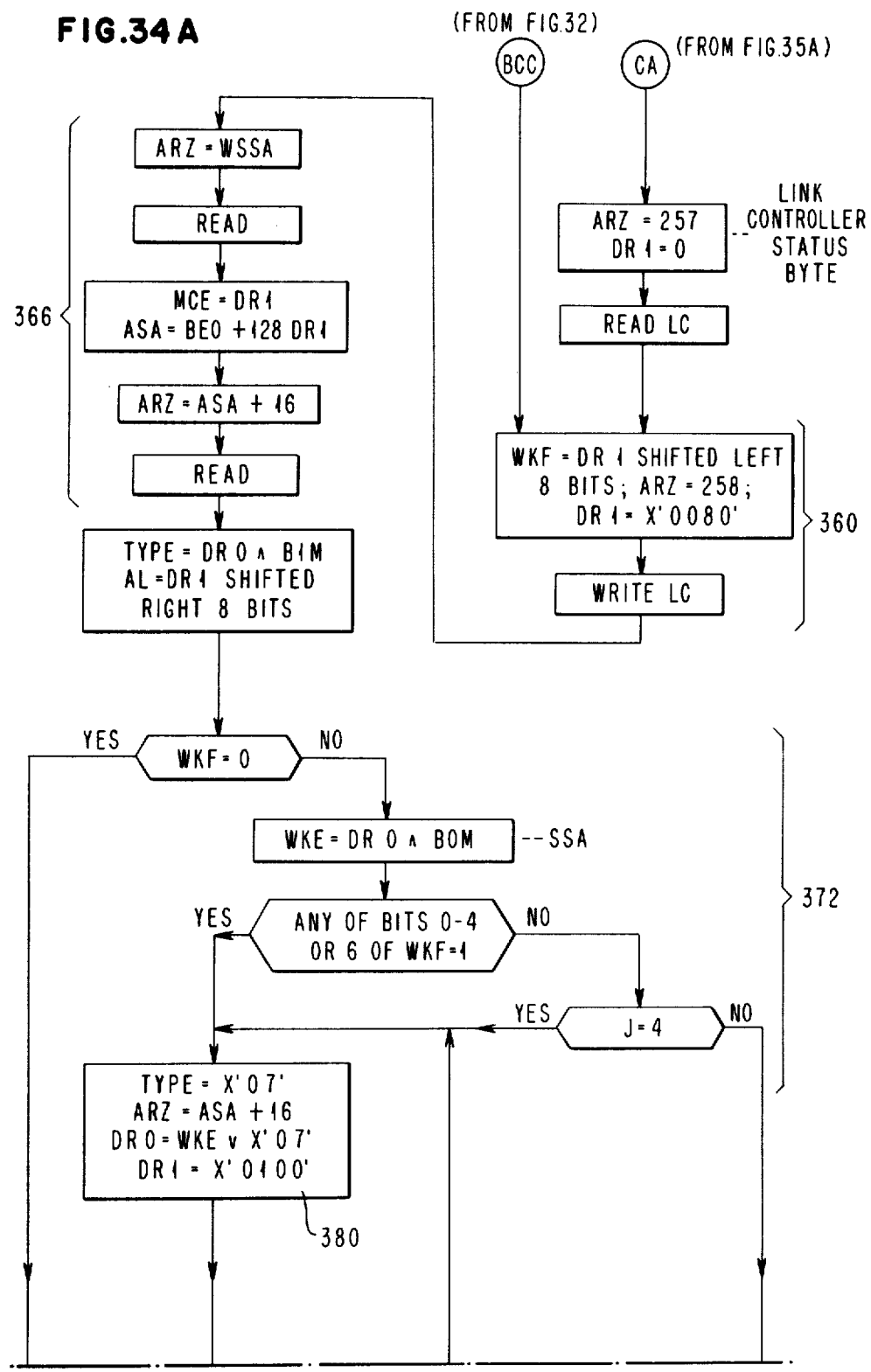
Figure 34:
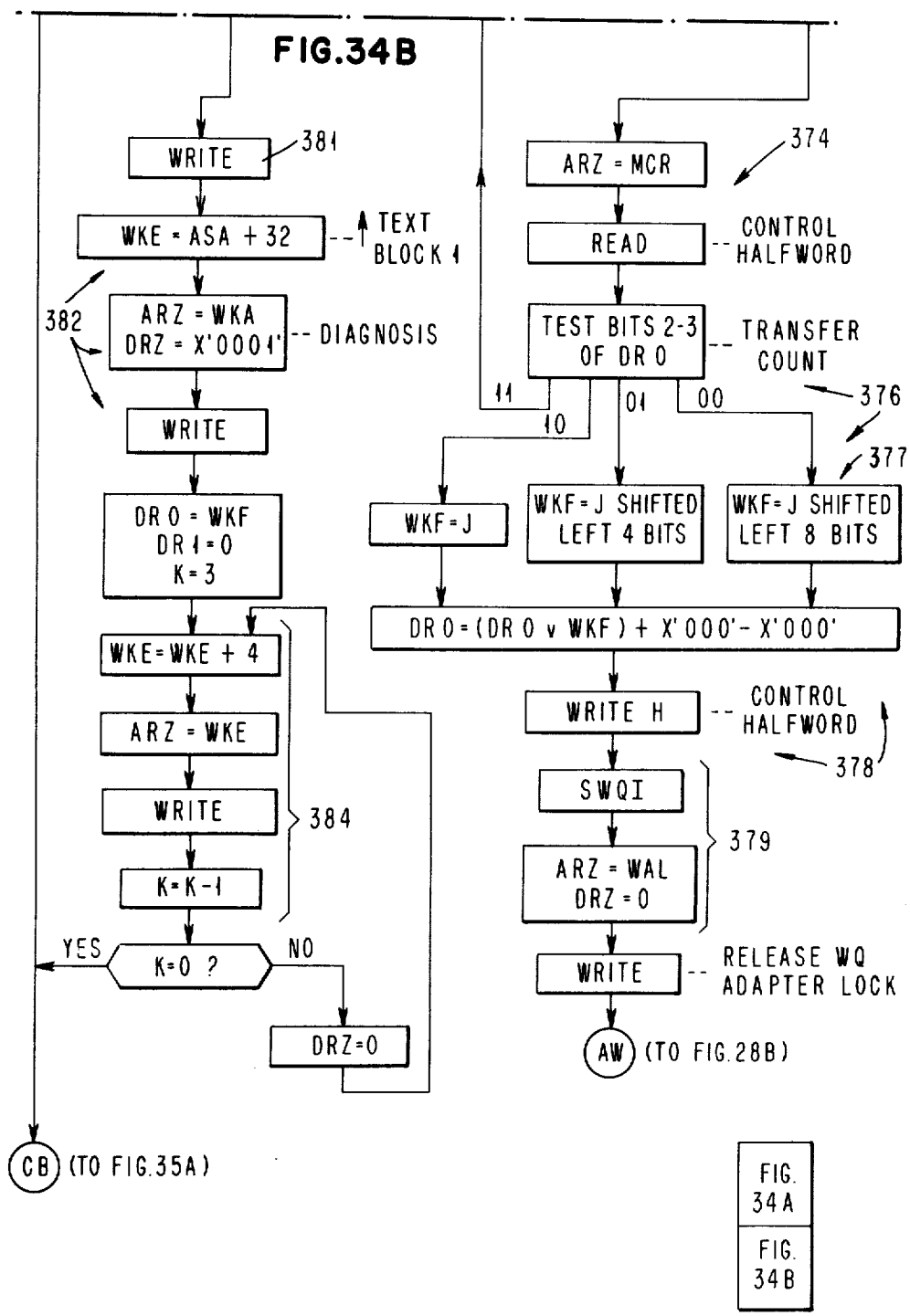

In the analysis sequence of FIG. 34 operations 360 are used to write a command byte into location 258 in the link J controller buffer, for effectively indicating abnormal termination of a message transmittal sequence. Then operations 366 are performed to retrieve information in the 16th to 19th byte positions of the message control element (FIG. 10) for the subject message. Then operations 372 evaluate the link J controller status byte in association with the value of J. If J has a value less than 4 the engine sequence branches to operations 374 (FIG. 34B) for retrieval of the control halfword information (FIG. 9), followed by operations 376 to test the transfer count portion of said halfword (refer to paragraph 8 supra), followed by operations 377 and 378 to record the value of J in a selected position within said halfword as an indication that an unsuccessful attempt has been made to transfer the message over link J. Operations 378 are followed by operations 379, for applying "set" stimulation to the work queue initiative latches and releasing the work queue adapter lock, after which the base sequence of FIG. 28 is re-entered via "AW".

If the current value of J is 4, or if the latest value of the transfer count is 3, operations 380 and 381 are performed to write revised "type" information into the header portion of the message control element for effectively designating said element as containing an abnormal completion message. Associated operations 382 and 384 are then used to write diagnostic information and link status information into the first text block portion of the message control element (for analysis by host system software). Thereafter, the sequence connects via "CB" to operations shown in FIGS. 35 and 36 associated with the concluding stages of (outgoing) message transfer processing.

Figure 35A:
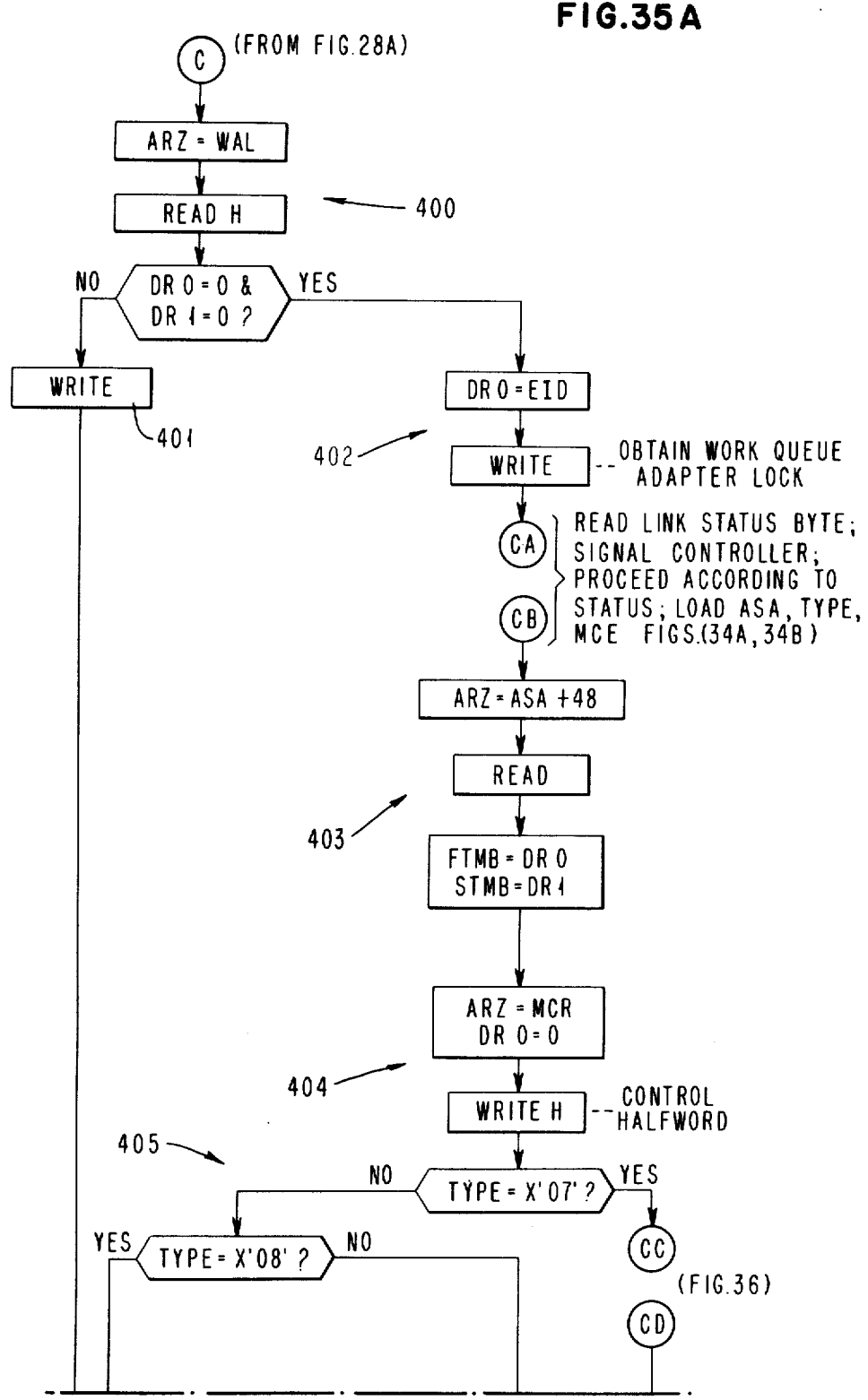

The concluding sub-sequence of FIGS. 35A, B and 36 is entered from the base link scanning sequence of FIG. 28 at "C" (FIG. 35A) and connects back to the link scanning sequence via "CZ" (FIG. 35B). In this sub-sequence the work queue adapter lock is examined via operations 400 (FIG. 35A). If the work queue is inaccessible the current adapter lock value is rewritten via operation 401 and the base sequence of FIG. 28 is re-entered via "AD" (FIG. 35B). If the work queue is accessible (current value of adapter lock=0) this engine's identity number is written into the adapter lock storage space via operations 402 (FIG. 35A) and the analysis sequence of FIG. 34 is entered via "CA". In said analysis sequence link J status byte is examined, a concluding signal is given to the link J controller, a selective sequence of operations is performed depending on the link status, register ASA (location 7 in array 102; see table 1, infra) is loaded with the address of the message control element for the message currently under consideration (refer to operations 366 FIG. 34A), register TY (location 9 in array 102) is loaded with the message "type" identification (refer to operations 366 FIG. 34A) and register MCE (location 4 in array 102) is loaded with the number of the buffer element (in the subchannel buffer pool section of adapter storage) which contains the message control element (refer to operations 366).

Thereafter the sequence of FIG. 35A may be re-entered via "CB". In such re-entrance operations 403 load registers FTMB and STMB (locations 5 and 6 in array 102) with information defining the locations of additional buffer elements in the subchannel control space associated with the message control element. Then the work queue message transfer control register is reset to "empty" status via operations 404.

Figure 36:
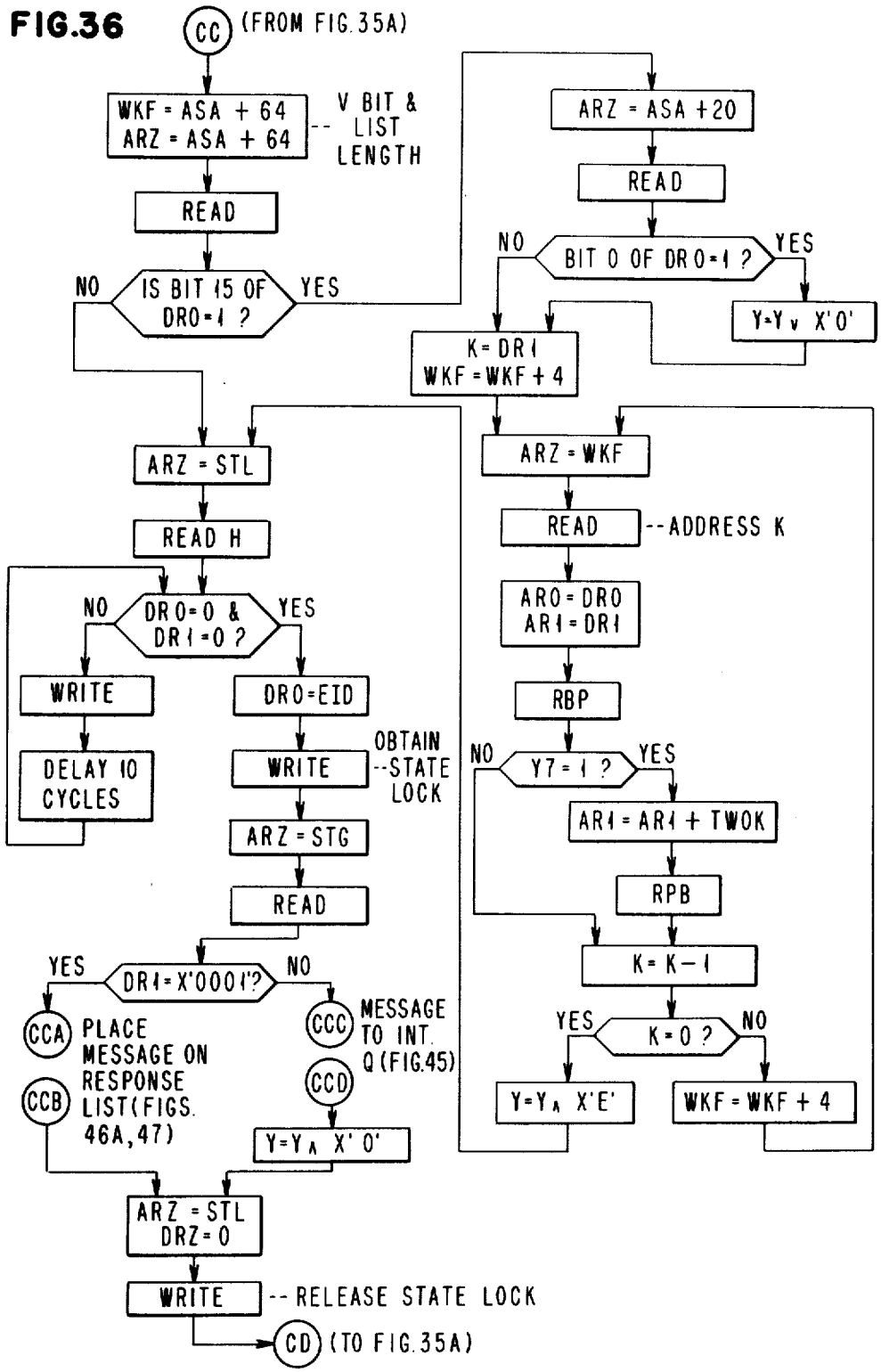

Next, the message type is evaluated via operations 405. If the message is a request (X '08') the engine merely returns to the deselection phase of the link scan sequence of FIG. 28 via "AD". For a control type message (X '07') the sequence of FIG. 36 is entered, via "CC", for creating an abnormal completion message and communicating it via an entry in either the interruption queue or in a response list. If the message type is neither control nor request—i.e. if the message type is attention (X '01') the engine performs operations 406 (FIG. 35B) for resetting the data transfer lock in the message control element to conclude this phase of the sequence.

Figure 44:
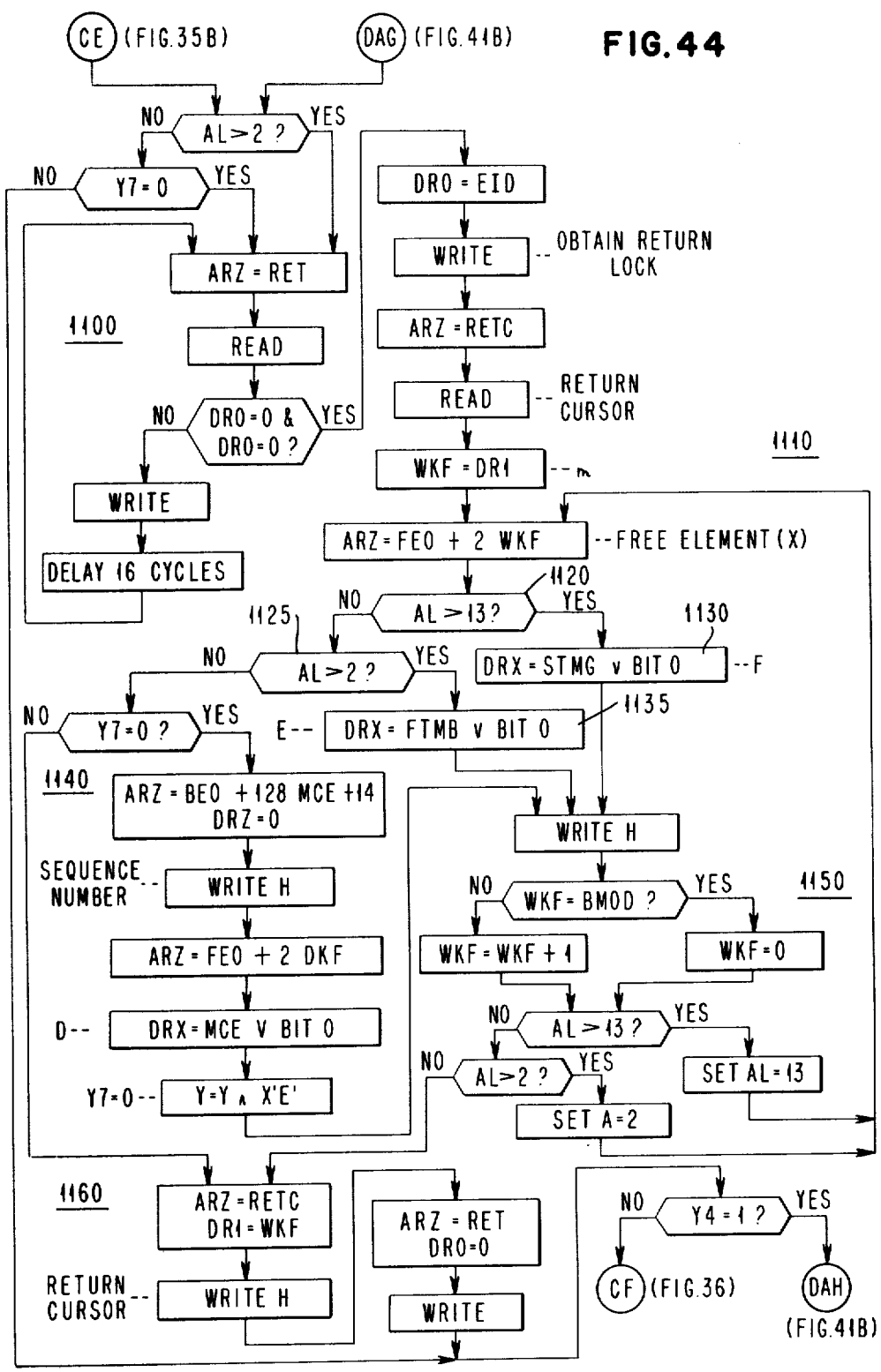

For each of the above type decisions the sequence eventually proceeds to operations 407 (FIG. 35B) which provide set stimulation to the engine work queue initiative latches and release (write 0's in) the work queue adapter lock. Then the message array length (the number of blocks following the header is evaluated by operations 410 (FIG. 35B) and the sequence concludes via "CE" with operations to return elements of the subchannel control space to free status (FIG. 44).

g. Adapter Engine Operations For Data Transfer

Adapter engine operations for data transfer are illustrated in FIGS. 37-39, and 48-51. The data transfer sequence is entered from the link scanning sequence of FIG. 28 via connectors "F", "G" and "E". Connector "F" connects via "FA" in FIG. 37A to a transfer preparation sequence illustrated in FIGS. 48A and B. Connector "G" connects via "GA" in FIG. 38 to the sequence of FIGS. 48A, B. Connector "E" connects via "EA" in FIG. 39 to the sequence of FIG. 48A, B.

Figures 48, 48A:
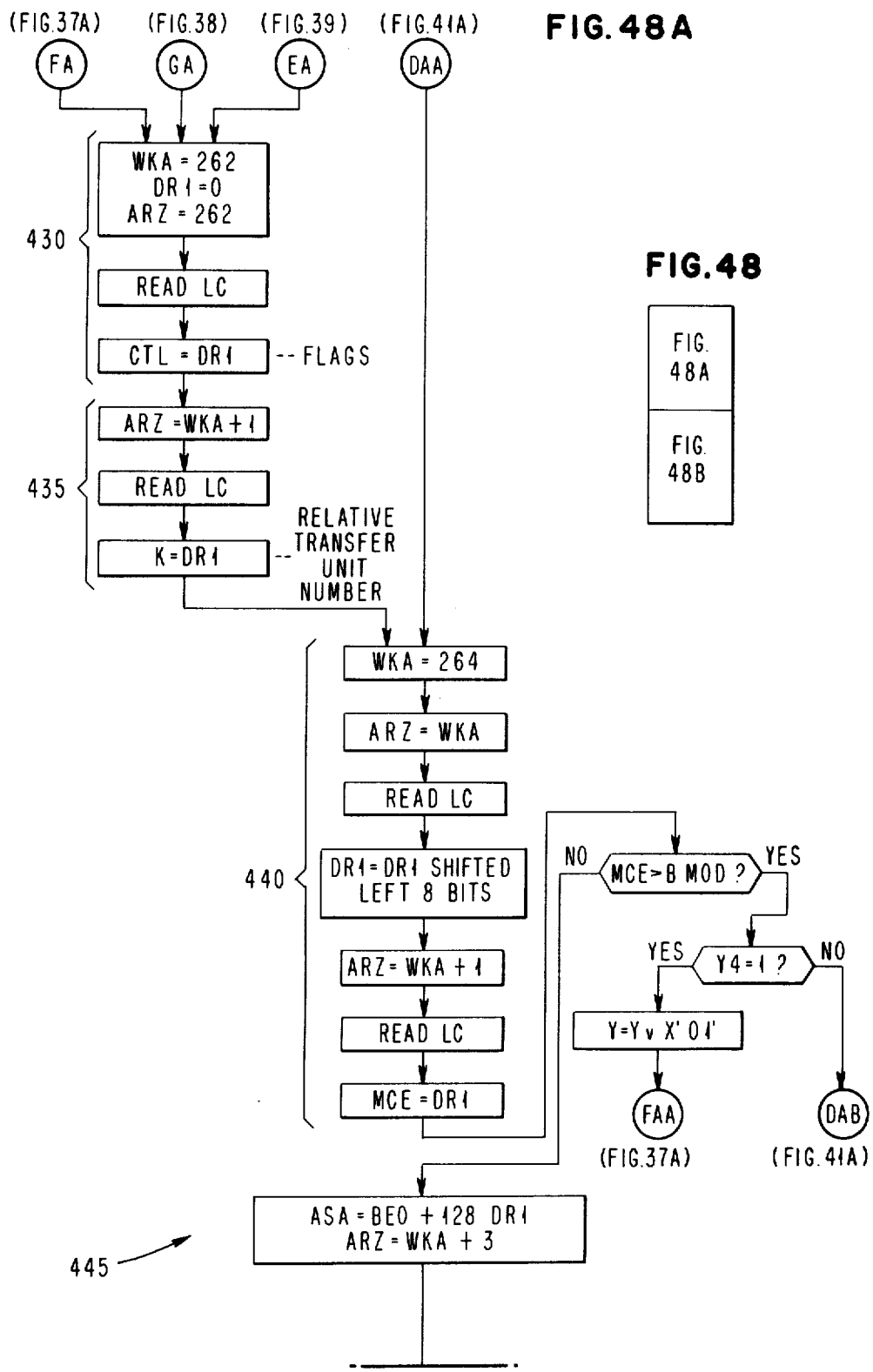
Figure 48B:
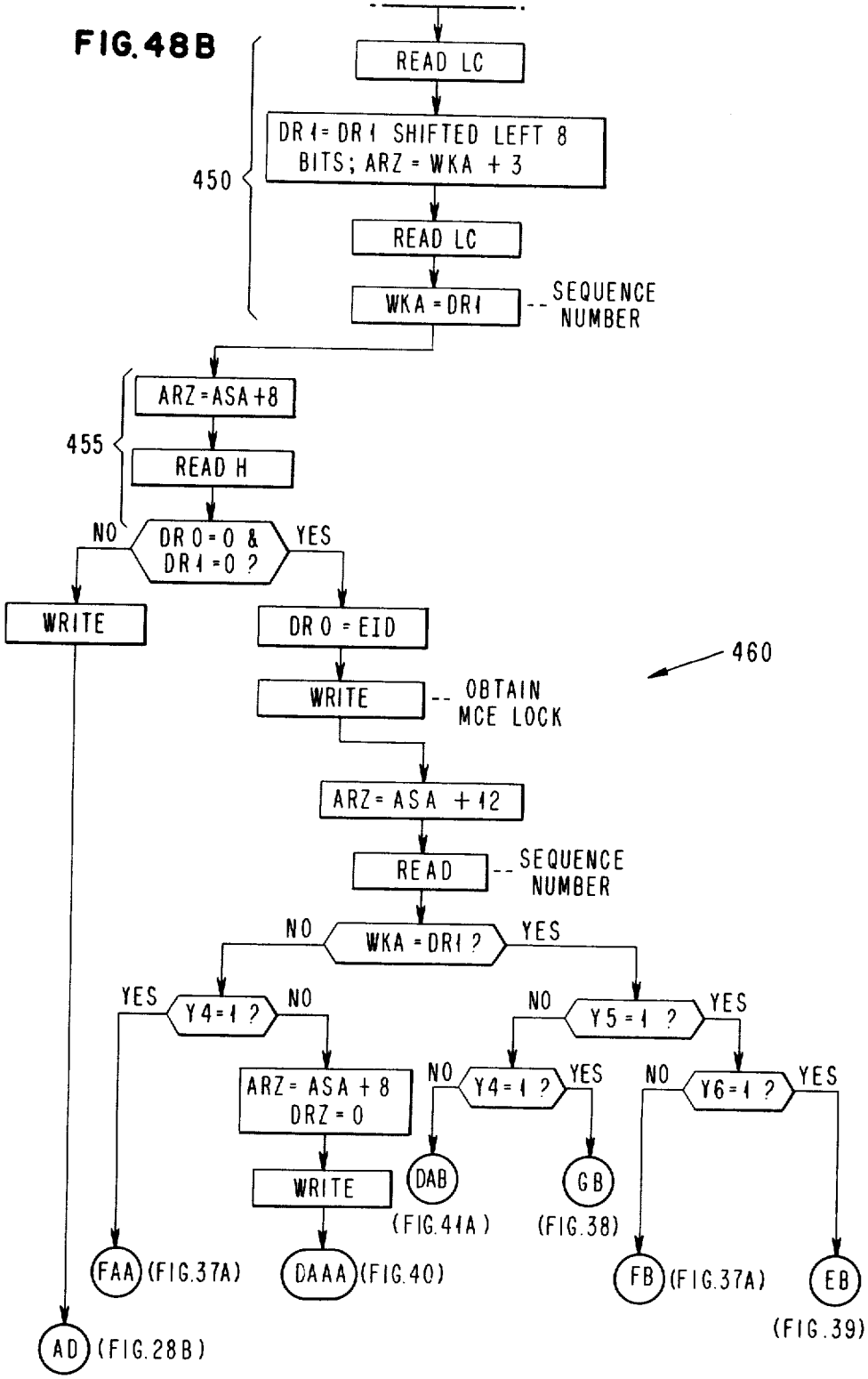

In the preparation sequence of FIGS. 48 (A, B) operations 430 read flag information from link buffers to register CTL (location 2 in A array 102), operations 435 transfer a relative data transfer unit number from link (J controller) buffers to register K (location 1 in array 102), operations 440 transfer subchannel identity information (for location of the associated request message) from link buffers to register MCE (location 4 in array 102), operations 445 load the address of the buffer element containing the associated message control element into register ASA (location 7 in array 102) by computing said address from information in location 16 in B array 102 and register 107 (FIG. 25), operations 450 (FIG. 48B) transfer sequence number information from link buffers to WKA (location 10 array 102), operations 455 (FIG. 48B) evaluate the accessibility of the message control element lock (10.5 FIG. 10), and if said element is accessible operations 460 (FIG. 48B) compare the sequence number information in the message control element (10.2, FIG. 10) to the sequence number information received from the link. If the compared sequence numbers do not match the sequence connects either to a terminating operation diagrammed in FIG.

37 (via "FAA") or to rejecting and terminating operations in FIG. 40 (via "DAAA").

Figure 37B:
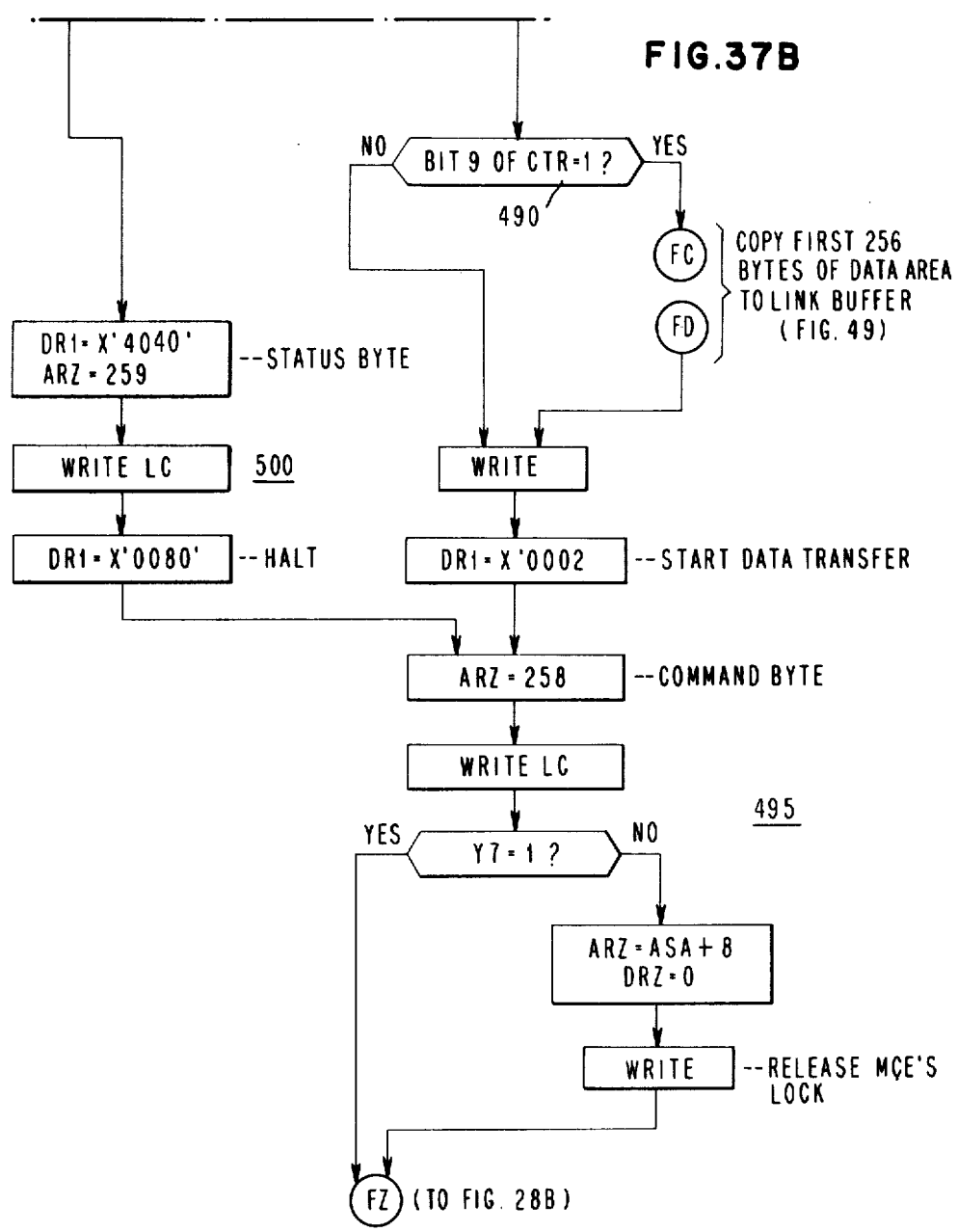
Figure 38:
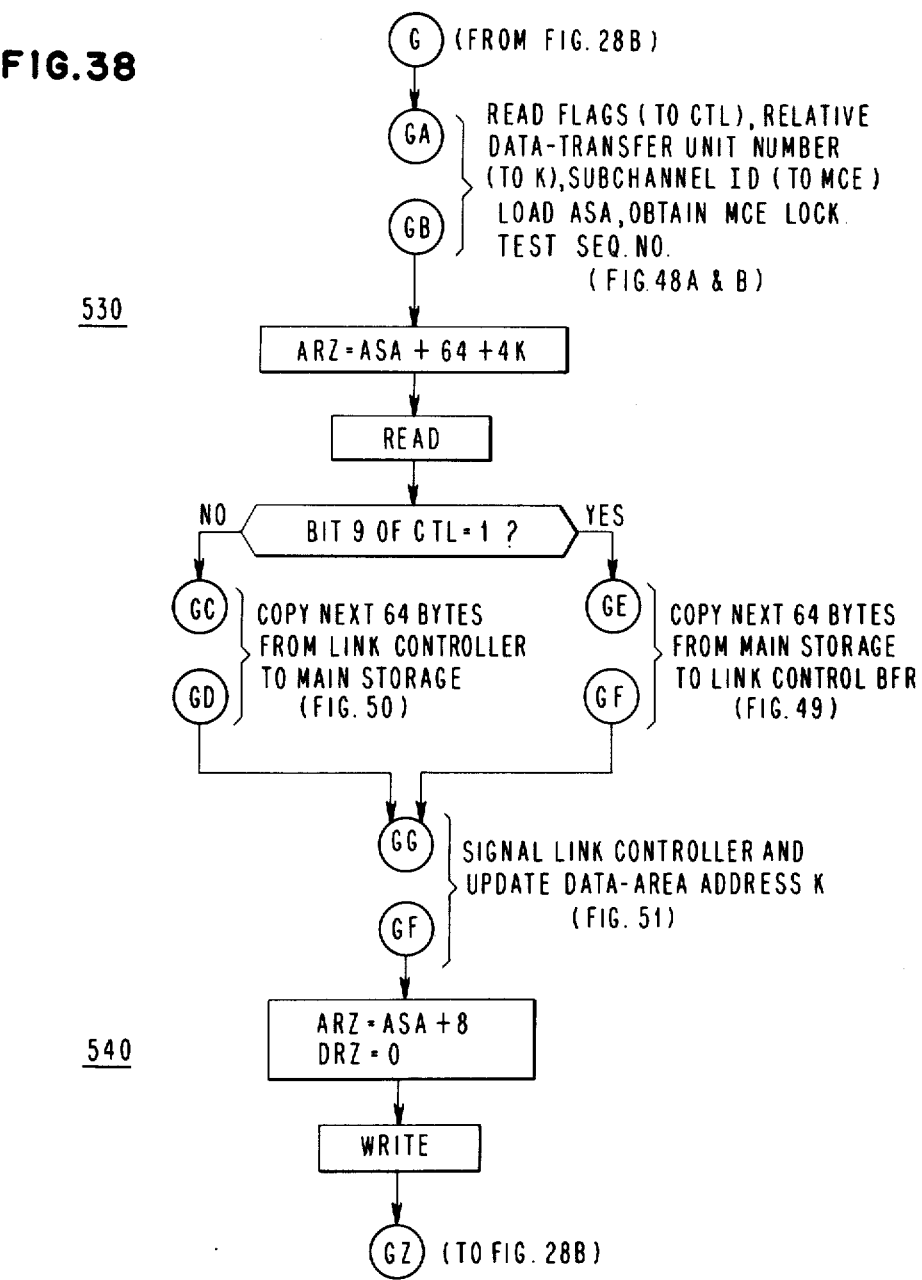

If the compared sequence numbers match the engine continues either with a data transfer operation diagrammed in FIG. 37 or 38, or with a data transfer concluding operation diagrammed in FIG. 39, or with a completion message reception operation diagrammed in FIG. 41.

If the status latches are respectively set to 1, 1, 0 and 0 the sequence branch of FIG. 28 connects to the sequence of FIG. 37 via "FB". In the data-transfer initiation sequence of FIG. 37 (A, B) the operations 480 verify that K does not exceed the data area address length value, that the flag bit communicated through the link buffers corresponds to the flag bit in the execution parameter, and that the read-write indicator bit communicated through the link buffers corresponds to the read-write indicator in data-area-address K (10.6 in FIG. 10). If any of these tests fail, the sequence connects to terminating operations 500. If all of the tests are successful, the sequence connects to operations 490.

Figure 49:
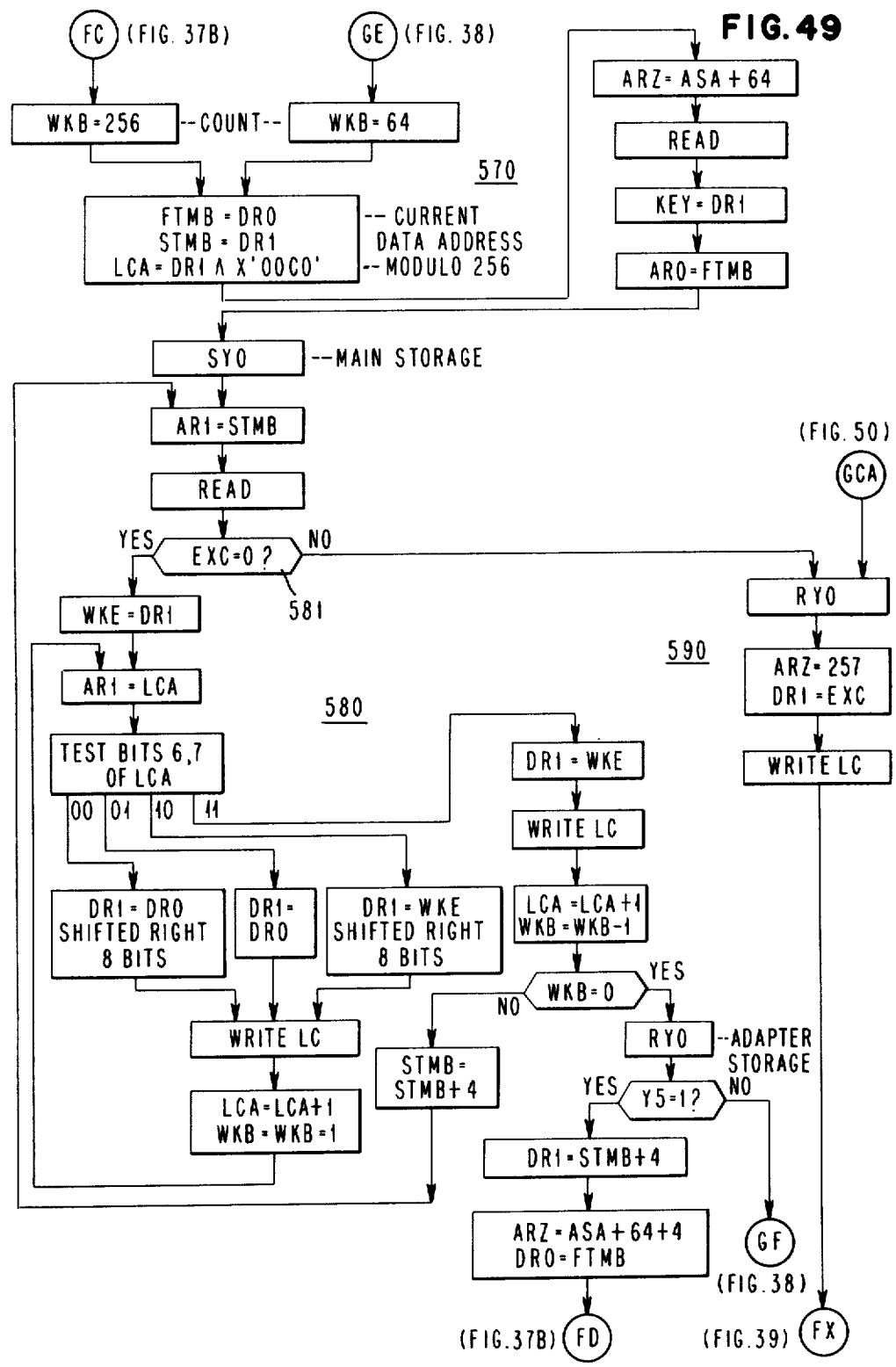

In the sequence of FIG. 37B, operations 490 connect to the sequence of FIG. 49 if the read-write indicator communicated through the link buffer indicates a write operation. The sequence of FIG. 49 transfers the first 256 bytes of data-area K to the link controller's link buffer, as described subsequently in this section. Continuing the sequence of FIG. 37B, operations 495 transfer a link status byte to the link controller, transfer a link command byte to the link controller, and reset the message control element lock (10.5 FIG. 10) to conclude this phase of the sequence. The sequence connects back to the link scanning sequence of FIG. 28 via connector "FZ".

Terminating operations 500 of FIG. 37B transfer a terminating status byte and halt command byte to the link controller and connect to operations 495 in order to conclude the data-transfer initiating sequence.

If the status latches are respectively set to 1, 0, 1, and 0 the sequence branch of FIG. 28 connects to the intermediate data-transfer sequence of FIG. 38 via connector "GB". The host adapter engine transfers 64 bytes of data between link controller buffers and host main storage in the sequence of FIG. 38. Operations 530 test the read-write indicator communicated via the link buffer and connect either to the input copy sequence of FIG. 50 (read) via connector "GC" or to the output copy sequence of FIG. 49 (write) via connector "GE". Operations 540 connect to the signal and update sequence of FIG. 51 via connector "GG" and reset the message control element lock (10.5 FIG. 10) to conclude this phase of the sequence. The sequence connects back to the link scanning sequences of FIG. 28 via connector "GZ".

The output copy sequence of FIG. 49 is used by the data-transfer initiation sequence of FIG. 37 to transfer 256 bytes of data from main storage to the link control buffers and by the intermediate data-transfer sequence of FIG. 38 to transfer 64 more bytes of data. Connection is via connector "FC" from FIG. 37 or connector "GE" from FIG. 38. In the sequence of FIG. 49, operations 570 set the transfer count value to 256 or 64, initialize adapter controls relating to main-storage addressing and protection keys, and operations 580 sequentially transfer the required bytes of data from main storage to link controller buffer locations via busses 118 and 119 in FIG. 25 and registers 109 and 110 in FIG. 25. Within the sequence of operations 580, operation 581 links to operations 590 if storage protection exceptions are detected. Operations 590 transfer a data-transfer terminating command to the link controller and connect to the completion sequences of FIG. 39 via connector "FX". If no storage protection exceptions are detected at 581, the required bytes are transferred and this phase of the sequence is completed with a connection back to connector "FD" of FIG. 37 or connector "GF" of FIG. 38.

Figure 50:
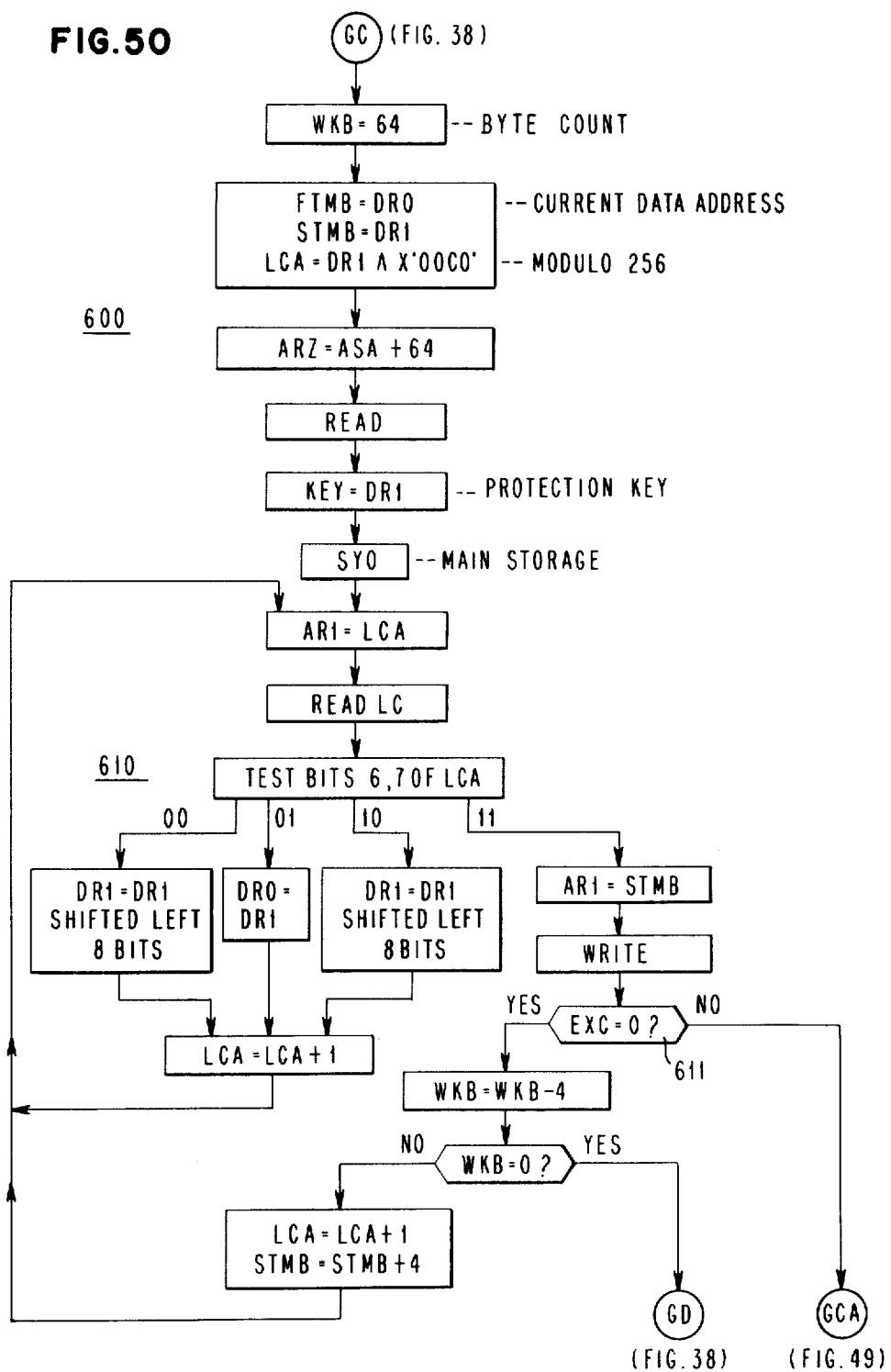

The input copy sequence of FIG. 50 is used by the intermediate data-transfer sequence of FIG. 38 to transfer 64 bytes of data from both control buffers to main-storage. Connection is via connector "GC" in FIG. 38. In the sequence of FIG. 50, operations 600 are similar to previously-described operations 570 of FIG. 49 except that the transfer count value is always initialized to 64. Operations 610 are similar to operations 580 of FIG. 49 except that the direction of transfer is reversed. Operation 611 links to terminating operations 590 of FIG. 49 when storage protection exceptions are encountered but connection is made back to FIG. 38 via connector "GD" if no such exceptions are encountered.

Figure 51:
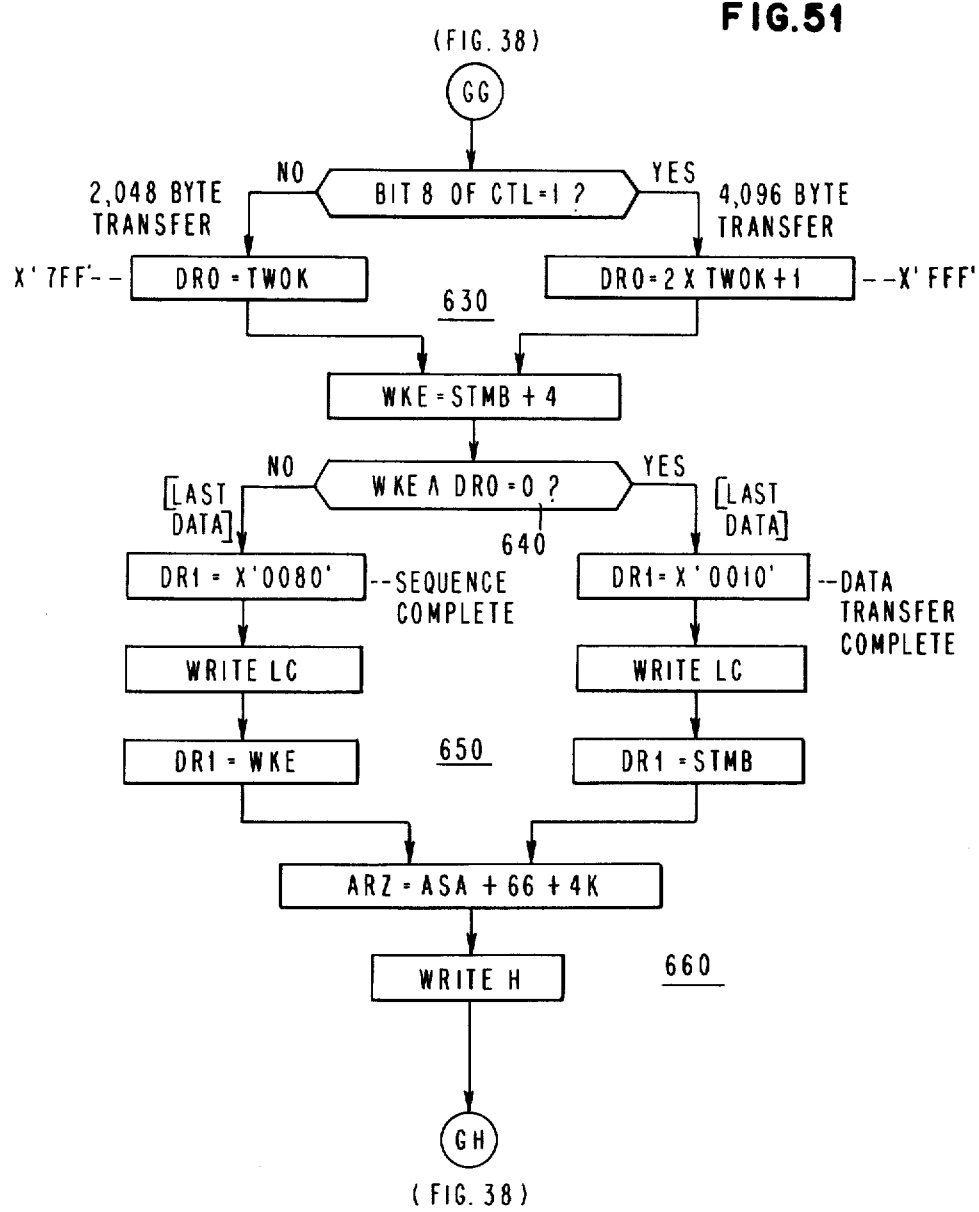

In the signal and update sequence of FIG. 51, operations 630 set up a "test mask" value appropriate to testing for the completion of a 2,048 byte transfer or a 4,096 byte transfer, operation 640 makes the test for completion, operations 650 transfer a command to the link controller indicating whether or not the last data in the current block has been transferred, and operations 660 place the updated data-area address in data-area address list address K (10.6 in FIG. 10) of the message control element.

If the status latches are respectively set to 1,1,1, and 0 the sequence branch of FIG. 28 connects to the data-transfer completion sequence of FIG. 39 via connector "EB". In the sequence of FIG. 39, operations 700 transfer a secondary-status byte from the link controller, operation 710 analyzes status bits in the status byte in order to determine the termination conditions, operations 712 set up bits indicative of whether the operation is to be retried via a different link because transmission errors occurred, and operations 720 restore data-area address K (10.6 in FIG. 10) to its original value, reset the message control element lock (10.5 in FIG. 10) and conclude this phase of the sequence via connector "EZ" of FIG. 28.

h. Adapter Engine Operations For Incoming Message Reception

Adapter engine operations for incoming message reception are illustrated in FIGS. 40-43 and 52. The incoming message reception sequence is entered from the link scanning sequence of FIG. 28 via connector "D".

In the message reception sequence of FIG. 40, operations 800 transfer the TY and L indicators (30 in FIG. 2) from link controller buffers to the subsystem adapter, operations 810 determine the nature of the message and connect to the proper continuation sequence, operations 820 transfer a status byte to the link controller rejecting the message if it is not of a nature that is recognized by operations 810, and operations 830 transfer a command byte to the link controller to signal that the sequence is complete.

Figure 41B:
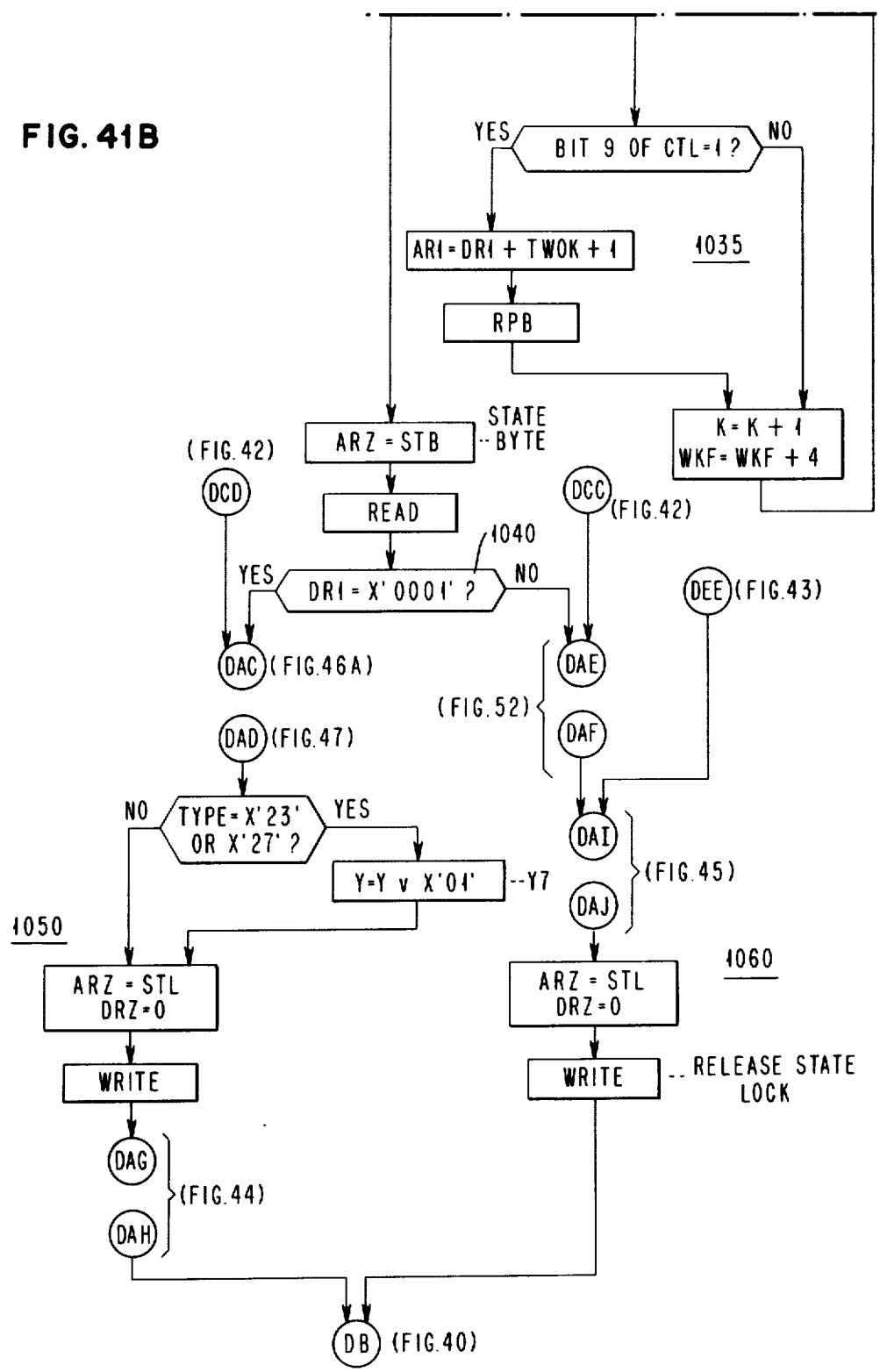
Figure 42:
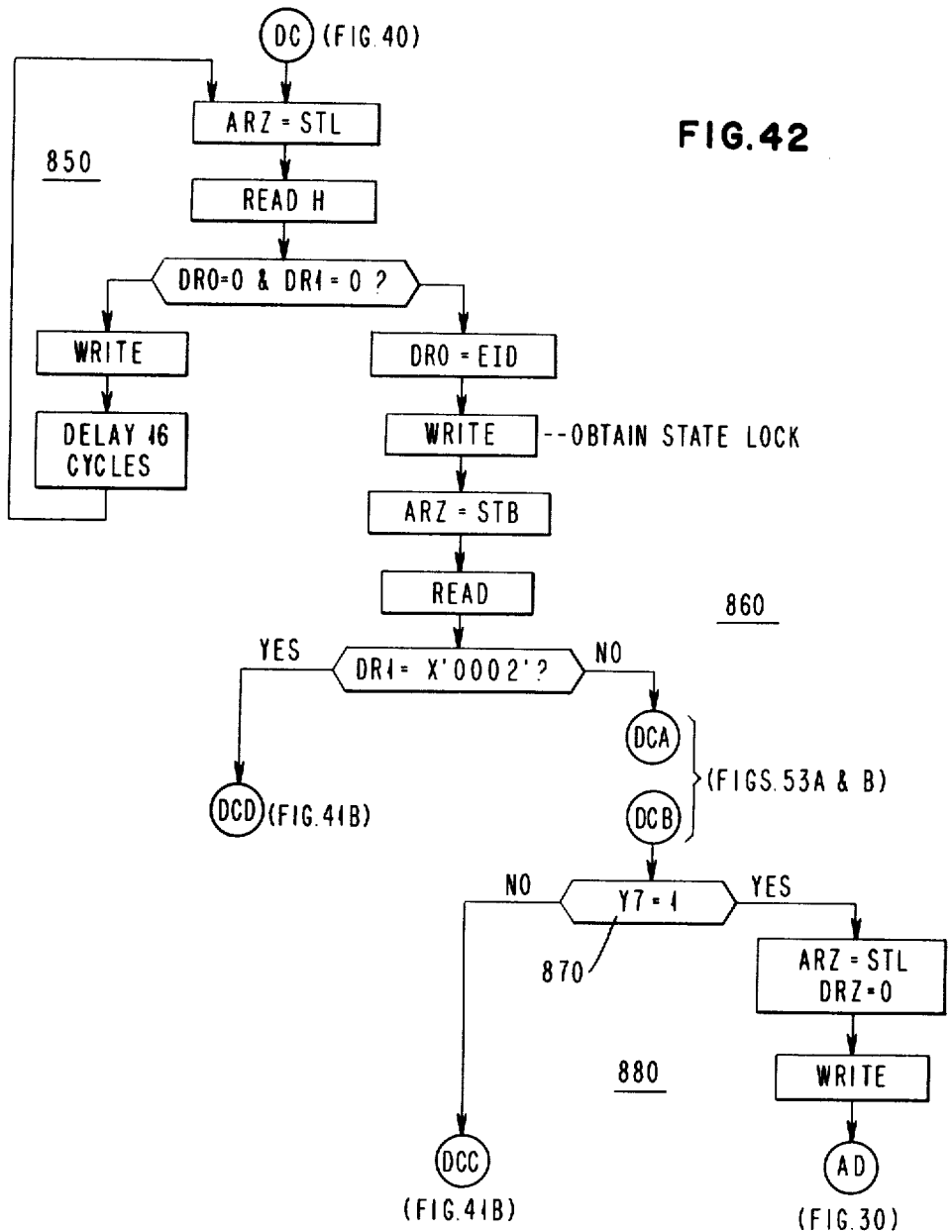

In the sequence of operations 810, if the message is a completion message (Type IV from Section 2), then the sequence connects to one of the completion message sequences of FIGS. 41 or 42 via one of the connectors "DA" or "DC". The sequence of FIG. 42 is entered if no subchannel control space is presently assigned to receive the message.

Figure 43:
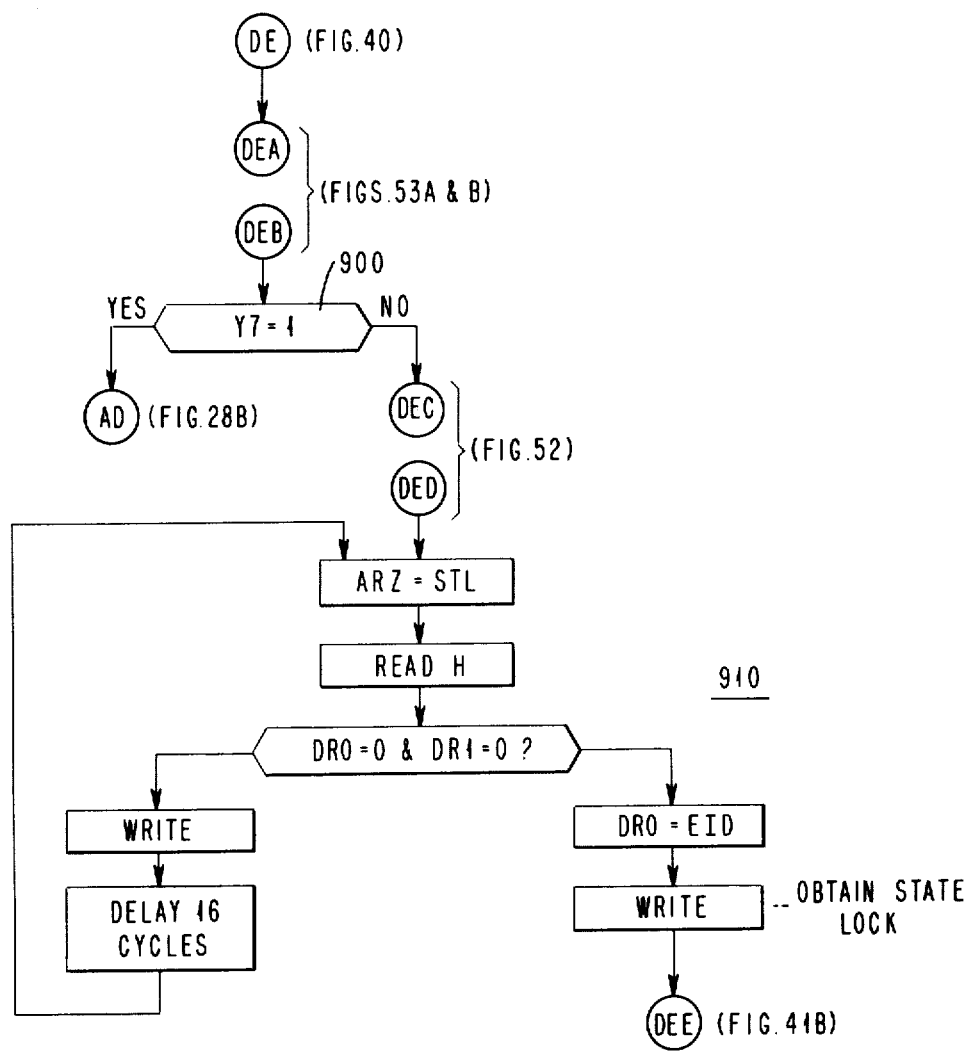

In the sequence of operations 810, if the message is an attention message (Type III from Section 2), then the sequence connects to the attention message sequence of FIG. 43 via connector "DE".

In the sequence of FIG. 42, a destination for the incoming completion message is determined. This destination is either a predesignated response-list area of host main storage or a subchannel control space constructed by the subsystem adapter. Operations 850 write this engine's identity number into the state lock (12.1 of FIG. 12) when the present value in the lock becomes 0. Operations 860 perform a sequence branch depending on the value in the configuration element's state byte (12.2 in FIG. 12). Operations 870 connect to the operations of FIG. 41 if a subchannel control space for the incoming message has been obtained by the operations of FIG. 50, and operations 880 reset the state lock and connect to the operations of FIG. 28 if all subchannel control spaces are presently unavailable.

In the sequence of operations 860, connection is made to the sequence of FIG. 41 via connector "DCD" if the completion message is to be presented to the host supervisory programs by the response list method of presentation; otherwise the message is to be presented via the interruption method and connection is made to the sequence of FIG. 53 via connector "DCA".

In the attention-message sequence of FIG. 43, connection is first made to the sequence of FIG. 53 in order to obtain a subchannel control space for the incoming attention message. If such a space is available, operation 900 connects to the copy sequence of FIG. 52 via connector "DEC", and operations 910 write this engine's identity number into the state lock (12.1 of FIG. 12) when its value is zero and connect to the sequence of FIG. 41 via connector "DEE". If, on the other hand, all subchannel control spaces are unavailable, operation 900 connects to the operations of FIG. 28 via connector "AD".

Figure 52:
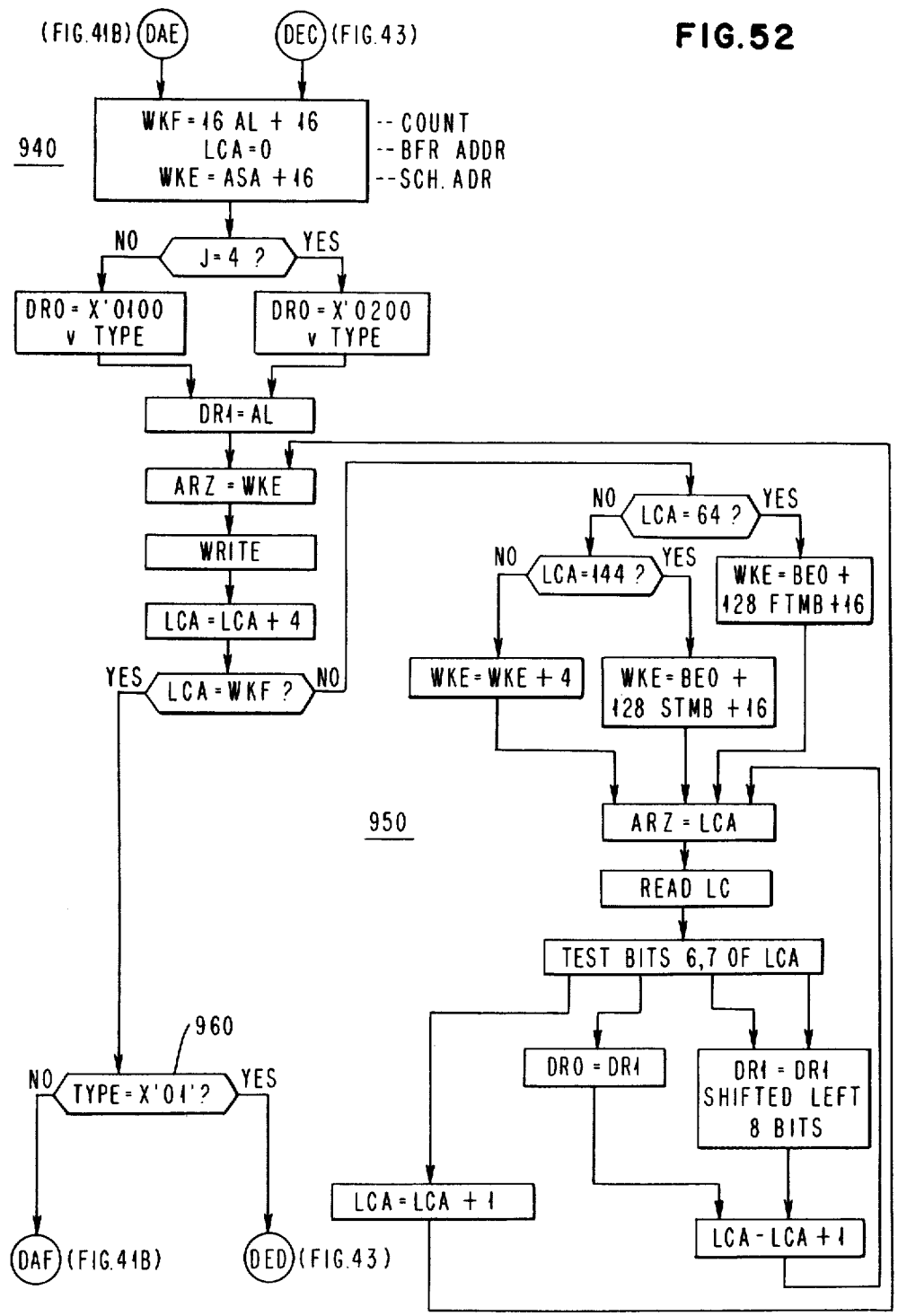

The copy sequence of FIG. 52 is used as part of the incoming-message sequences of FIG. 41 and FIG. 43 in order to transfer a completion or attention message from link controller buffers to a subchannel control space. Operations 940 set up the initial byte-count value, buffer address and subchannel control space address, operations 960 transfer the message from the buffer to the subchannel control space, and operations 960 connect back to the proper sequence (FIG. 41 or FIG. 43).

If a subchannel control space is presently assigned to receive the incoming completion message, the sequence branch of operations 810 in FIG. 40 connects to the completion message sequence of FIG. 41 via connector "DA". Connector "DA" connects via "DAA" to a transfer preparation sequence illustrated in FIGS. 48A and 48B and described in Section 13g. Connection back to the sequence of FIG. 41 is via connector "DAB". Thereafter, in the sequence of FIG. 41, operations 1000 set the sequence number in the message control element (10.2 in FIG. 10) to zeros and reset the message control element lock (10.5 in FIG. 10). Operation 1010 performs a test to determine if virtual page "unpinning" operations are to be performed. These operations, which are not relevant to the present invention, are performed by operations 1035. Operations 1030 then write the engine's identity number into the state lock (12.1 of FIG. 12) when the present value of the state lock becomes 0. Sequence branch 1040 determines whether the incoming message is to be presented to host supervisory programs via the response-list or interruption method; operations 1050 transfer the message to a predetermined response-list area of host main storage, reset the state lock (12.1 of FIG. 12), and connect to the sequence of FIG. 44 which returns the subchannel control space to the free buffer list (6.2 in FIG. 6); operations 1060 connect to the sequence of FIG. 52 in order to copy the incoming message to a subchannel control space, connect to the sequence of FIG. 45 in order to place the subchannel control space on the interruption queue (FIG. 11), and reset the state lock (12.1 of FIG. 12) to indicate the completion of this phase of the sequence. Operations 1050 and 1060 both connect back to the sequence of FIG. 40 via connector "DB".

i. Adapter Engine Operations For Subchannel Control Space Creation And Dissolution Adapter engine operations for subchannel control space creation and dissolution are illustrated in FIGS. 44 and 53. The operations for subchannel control space dissolution in FIG. 44 are entered from the outgoing message transfer sequence of FIG. 35B via connector "CE" and, also from the incoming message reception sequence of FIG. 41B via connector "DAG". The operations for subchannel control space creation in FIG. 53 are entered from the incoming message reception sequence of FIG. 42 via connector "DCA" and also from the incoming message reception sequence of FIG. 43 via connector "DEA".

In the dissolution sequence of FIG. 44, operations 1100 write the engine's identity number into the return lock of the free buffer list (8.4 of FIG. 8) when the present value of the lock becomes 0. Then operations 1110 locate the next element on the list via the value (say "m") in the return cursor of the free buffer list (8.5 of FIG. 8), operation 1130 returns the third buffer element (say element number "F"), of the subchannel control space to the free list when sequence branch 1120 determines that there are three elements in the subchannel space, operation 1135 returns the second buffer element (say element number "E") of the subchannel control space to the free list when sequence branch 1125 determines that there are two or more elements in the subchannel control space, operation 1140 returns the first element of the subchannel control space to the free list, operations 1150 increment the value of the return cursor modulo 490, and operations 1160 transfer the updated cursor value to the free buffer list (8.5 of FIG. 8), reset the value of the return lock (8.4 of FIG. 8) to zeros, and connect to the sequence of FIG. 35B via connector "CF" or FIG. 41B via connector "DAH".

In the subchannel control space creation sequence of FIG. 53, operations 1200 write the engine's identity number into the removal lock of the free buffer list (8.1 of FIG. 8) when the present value of the lock is 0. Then operations 1210 locate the next free element on the list via the value (say "N") in the removal cursor of the free buffer list (8.2 in FIG. 8), operations 1220 establish the buffer element (7.1 in FIG. 7) whose number (say "E") is in free element "N" (8.3 of FIG. 8) as the message control element (FIG. 10) of the subchannel control space and increment the removal cursor to the value "(N+1) modulo 489" if sequence branch 1215 determines that buffer element "E" is free for use. Operations 1235 establish the buffer element (7.1 in FIG. 7) whose number (say "F") is in free element "(N+1) modulo 489" as the first temporary message buffer (i.e. the second element part of the subchannel control space) and increment the return cursor to "(N+2) modulo 490" if sequence branch 1230 determines that two elements are required for the subchannel control space and sequence branch 1240 determines that buffer element "F" is free for use. Operations 1255 establish the buffer element (7.1 in FIG. 7) whose number (say "G") is in free element "(N+2) modulo 489" as the second temporary message buffer (i.e. the third element part of the subchannel control space) and increment the return cursor value to "(N+2) modulo 489" if sequence branch 1250 determines that three elements are required for the subchannel control space and sequence branch 1260 determines that buffer element "G" is free for use. Operations 1270 mark the buffer elements used for the subchannel control space as no longer free, and operations 1280 reset the removal lock (8.1 of FIG. 8) to zeros and connect to the sequence of FIG. 42 via connector "DCB" or FIG. 43 via connector "DEB".

Figure 45:
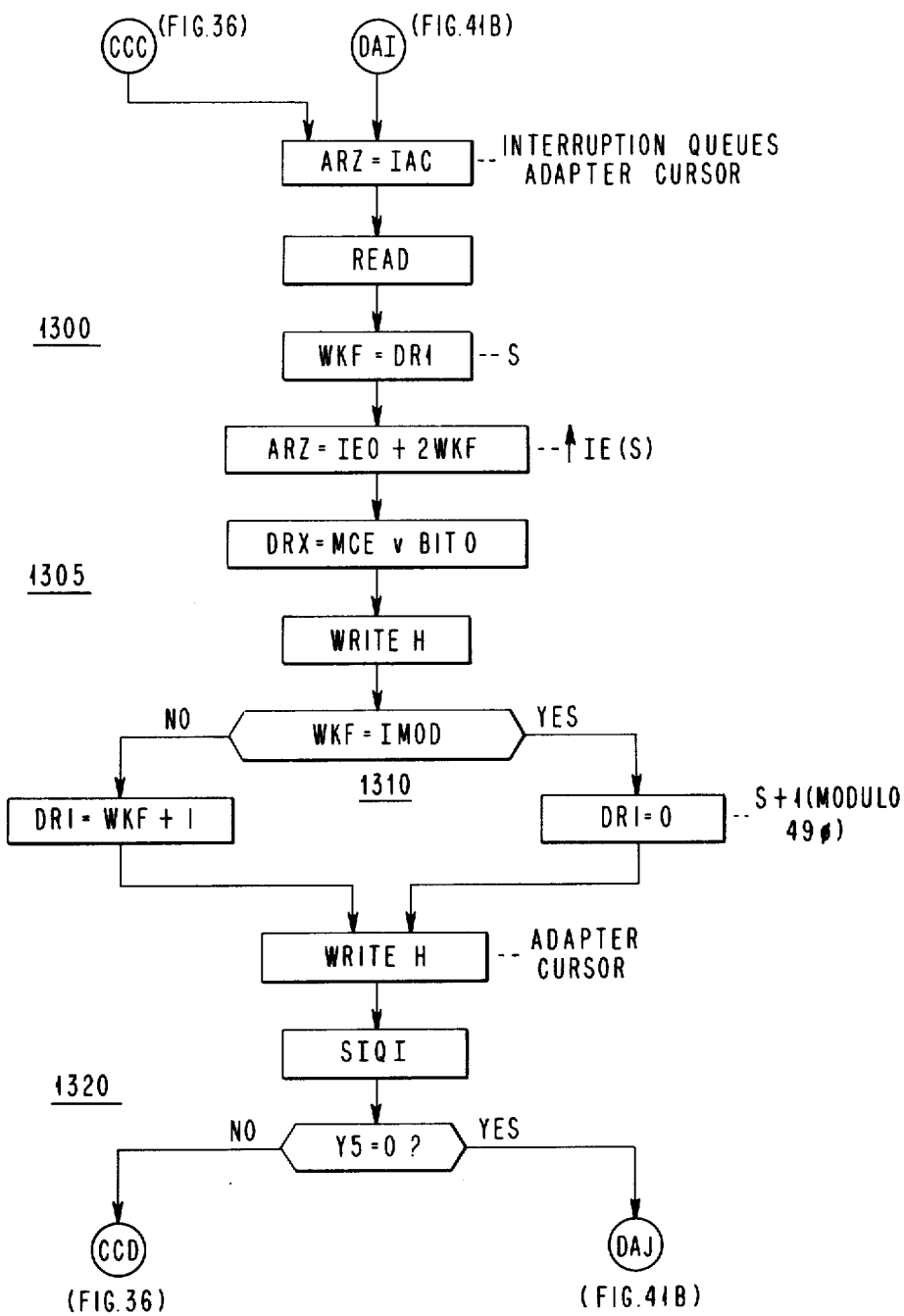
FIGS. 45–47 are flow diagrams illustrating host adapter engine operations at the microinstruction level for carrying out interruption and response list communications of message activity relative to host system software.
Figure 46B:
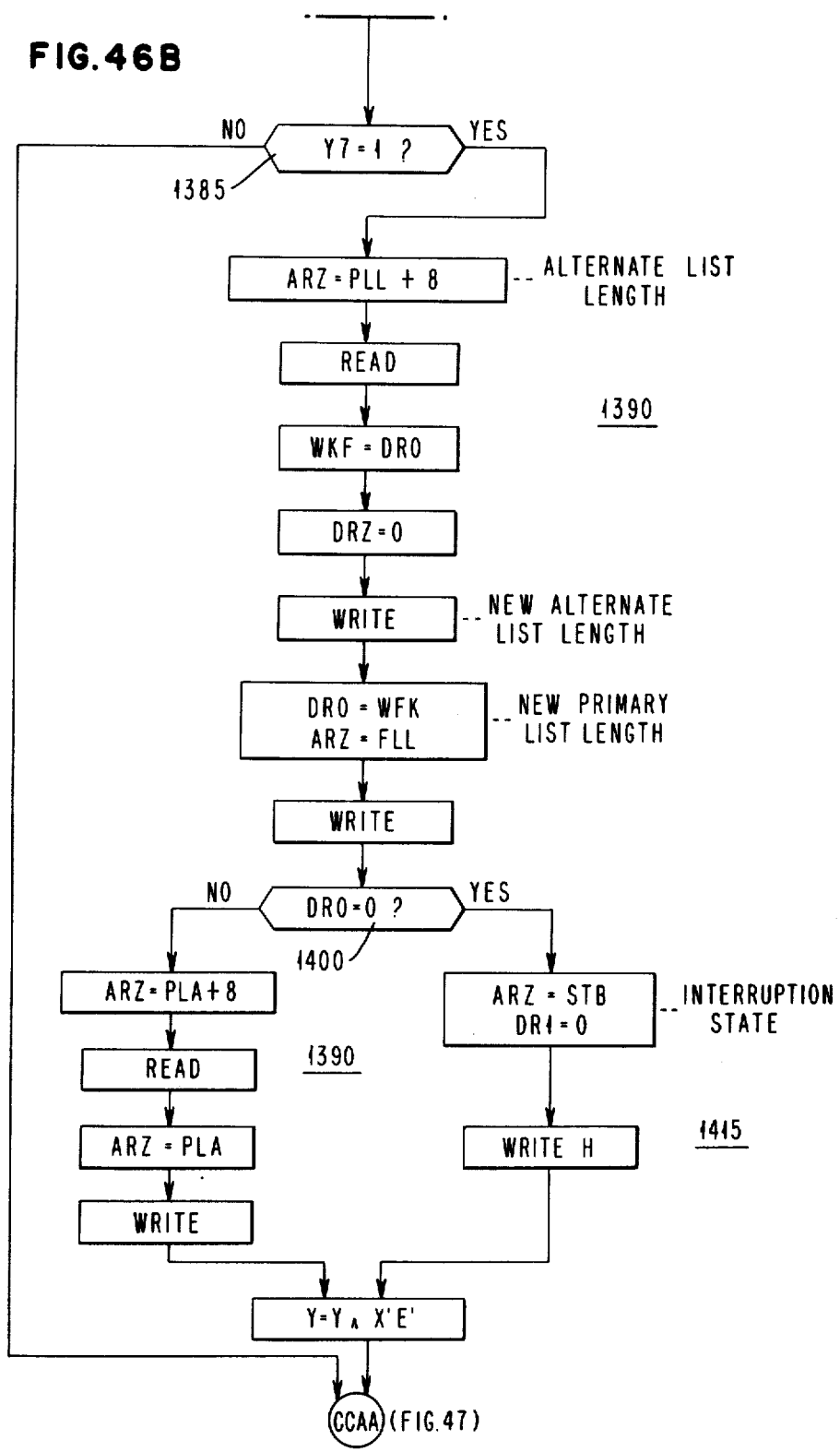
Figure 47:
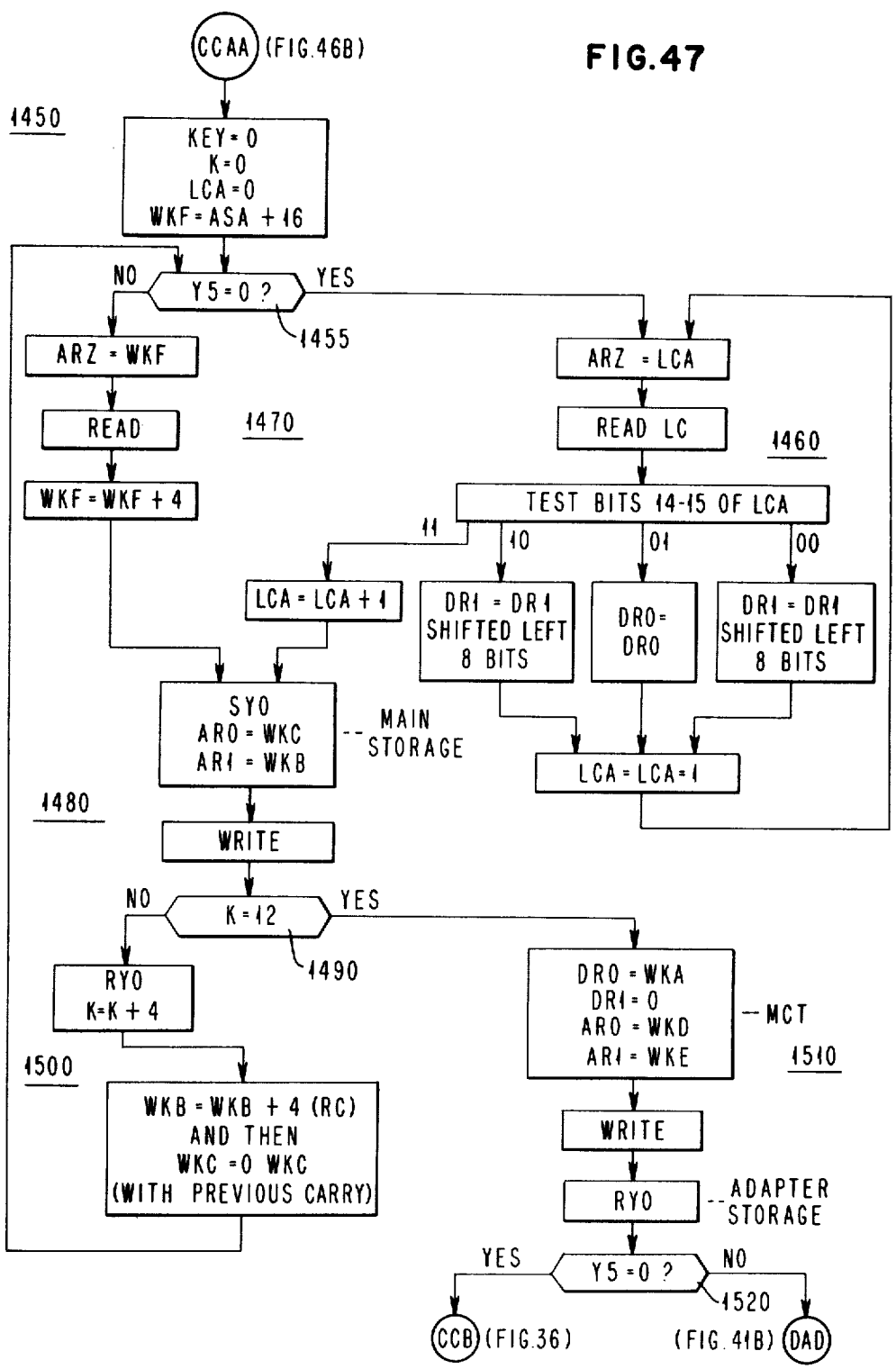

An exception case occurs in the sequence of FIG. 53 when the removal cursor value indicates a buffer element (7.1 in FIG. 7) that is not presently free for use. Then operations 1290 use reserved buffer elements 489–491 for the subchannel control space if sequence branch 1292 determines that they are available for use and operation 1298 sets status indicator 47 (114 in FIG. 25) if they are not.

j. Adapter Engine Operations For Interruption And Response List Communication Adapter engine operations for interruption and response list communication are illustrated in FIGS. 45–47. The operations required to place a work entry in interruption queue 6.5 (FIG. 11) which identifies the subchannel control space containing the message to be forwarded are shown in FIG. 45. The operations of FIG. 45 are used in the request message transmission sequence of FIG. 36 via connector "CCC" and in the message reception sequence of FIG. 41 via connector "DAJ". The operations required to transfer a message to a response-list area in host main storage are in FIGS. 46–47. The operations of FIG. 46 are used in the request message transmission sequence of FIG. 36 via connector "CCA" and the message reception sequence of FIG. 41 via connector "DAC".

In the interruption sequence of FIG. 45, operations 1300 locate the next interruption element on the interruption queue (11.2 of FIG. 11) via the value (say "S") in the adapter cursor byte (11.1 of FIG. 11), operations 1305 place the identifier for the subchannel control space containing the message to be presented to host supervisory programs in interruption element "S" (11.2 of FIG. 11), operations 1310 calculate the value "(S+1) modulo 490" and place it back in the adapter cursor byte (11.1 of FIG. 11), and operations 1320 pulse the interruption request latches of host CPU's (128 in FIG. 25) and connect to the sequence of FIG. 36 via connector "CCD" or FIG. 41 via connector "DAJ".

In the response-list sequence of FIG. 46, operations 1350 locate the next free slot (say "I+1") on the primary response list via the primary cursor (12.5 in FIG. 12), operations 1360 set status indicator Y7 (112 of FIG. 25) if the slot is the last in the primary response list when sequence branch 1355 determines that the value in the primary length register (12.7 in FIG. 12) is equal to "I+1", operations 1370 transfer the value "I+1" back to the primary cursor (12.5 in FIG. 12) in the configuration element, operations 1380 determine the address in host main storage of the first byte in the free slot of the response list via the primary response list address register (12.3 of FIG. 12), operations 1390 transfer the alternate response-list address (12.4 in FIG. 12) and alternate length (12.8 in FIG. 12) into the corresponding primary registers (12.3 of FIG. 12 and 12.7 of FIG. 12 respectively) if sequence branch 1385 determines that all slots on the primary response list are now in use, and operations 1415 set the state byte value (12.2 in FIG. 12) so that further messages will be presented to host supervisory programs via the interruption method if sequence branch 1400 determines that the alternate length value (12.8 in FIG. 12) is zero. Then connection is made to the sequence of FIG. 47 via connector "CCAA".

In the response-list copy sequence of FIG. 47, operations 1450 set protection value 0 into the key register (111 of FIG. 25), operations 1470 transfer four bytes of the message to the adapter data registers (106 and 107 of FIG. 25) from a subchannel control space if sequence branch 1455 determines that the source is a subchannel control space, operations 1460 transfer four bytes of the message to the adapter data registers (106 and 107 of FIG. 25) from link controller buffers if sequence branch 1455 determines that the source is to be the link controller, operations 1480 transfer four bytes of the message from the adapter data registers to host main storage, operations 1500 prepare to transfer four more bytes if sequence branch 1490 determines that all sixteen bytes of the message have not been transferred yet, operations 1510 place the new message count value (MCT—13.1 of FIG. 13) in host main storage, and sequence branch 1520 connects back to the sequence of FIG. 36 via connector "CCB" or the sequence of FIG. 41B via connector "DAD".

14. Link Control Interface

The elements of a host adapter engine are shown in FIG. 25 and described in paragraph 13. Each host adapter engine has a link control data bus, a link control address bus, and several control lines for communicating with link controllers in the host system. Such link controllers are comprised of control circuitry and buffer circuitry; link control circuitry transfers data bytes between link control buffers and external links to subsystems and also processes signals from host adapter engines as described in this section. Link controls per se are not subjects of the present invention.

The interface between host adapter engines and link controls is provided by link control buffers and the previously described busses and control lines in FIG. 25: link control data bus (121 in FIG. 25), link control address bus (119), link control read select line (136), link control write select line (135), link control select line (130), and link control deselect line (131). Both control information and data are transferred between host adapter engines and link controls by setting and examining the contents of various link control buffer locations as described subsequently in this section. Micro orders that effect such setting and examination are given in Table B of paragraph 13d; operations used by a host adapter engine to select link controls for communication are described in Section 13.

The locations in the link control buffer are used for communicating between the adapter engines and the link controls. Specific uses of the locations in the link control buffer are shown in Table 9 below.

TABLE 9

Link Control Buffer Locations

| Link Control Buffer Address | Description |
|---|---|
| 0–255 | Data bytes |
| 256 | Link control primary status byte |
| 257 | Link Control secondary status byte |
| 258 | Adapter command byte |
| 259 | Adapter status byte |
| 260 | K byte |
| 262 | Flag byte |
| 263 | Relative transfer unit (TU) number |
| 264–265 | Subchannel identifier |
| 266–267 | Sequence number |

Link controls place bytes received via links sequentially into link control buffer "data byte" locations 0–255; host adapter engines then transfer them sequentially out of data byte locations 0–255, as described in Section 13. Similarly, when the direction of flow is reversed, adapter engines transfer bytes sequentially into link control data buffer byte locations 0–255 (as described in Section 13) and link controls then transfer them sequentially from these locations to the links.

The bits in the "link control primary status byte" (buffer location 256) have already been described in conjunction with the microprogram example of Paragraph 13e. When the "data transfer complete" bit in the link control primary status byte (bit 4 of buffer location 256) is one, the individual bits in the link control secondary status byte (buffer location 257) have been set by link controls as follows:

Bit 0: Request transmission retry via this link because link level errors have occurred Bits 1–4: Status bits transmitted via the link by the subsystem Bit 5: Link J is not operational Bit 6: Status bit transmitted via the link by the subsystem Bit 7: Request transmission retry via a different link because link level errors have occurred The bits in the "adapter primary status byte" and "adapter secondary status byte" (buffer locations 258 and 259) have been described in conjunction with the microprogram example of Section 13e.

The "K byte" of the link control buffer (location 260) is set and examined only by the adapter engines. It provides a buffer for the temporary storage of data area address information of a message control element (10.6 of FIG. 10).

The "flag byte" of the link control buffer (location 262) is used to indicate the size and direction of data-unit transfers as follows:

Bit 0: 4,096 byte transfer request
Bit 1: Write operation request

The "relative transfer unit" byte (location 263) is set by the link controls to the relative transfer unit value received from a subsystem via the link when the subsystem requests the initiation of a data-transfer sequence (see Paragraph 2b). The "subchannel identifier" and "sequence number" (locations 264–265 and 266–267) are also received from the subsystem via the link when the subsystem requests the initiation of a data-transfer or completion message sequence. Adapter engine use of these locations is described in Section 13.

15. Host System Operation And Interruption

The host system organization, including its CPU's, is described in Section 1. Host CPU initiation of message transfer operations via an initiating instruction Start Subsystem Transfer (SST) is described in Paragraph 3. Host CPU handling of received messages is described in Paragraph 7a. Host CPU's also use a control instruction Signal Adapter (SIGA) to modify the operation of host adapter engines in connection with response-list presentations of messages.

The host system CPU's may be IBM System/370 processors adapted to execute the newly defined SST and SIGA instructions and to process interruptions from the host adapter interruption queue (FIG. 11) as described in this section. Processors of the type contemplated have microprogram controls as described in U.S. Pat. No. 3,400,371 and in the previously cited Tucker and Husson references (see Section 13c). Multiprocessors of the type presently contemplated are described in "System/370 Model 158 Maintenance/Diagram Manual", Form Number SY22-6912-4 (copyright International Business Machines Corporation, 1975). Firmware changes to such multiprocessors for providing the presently contemplated functions are illustrated in FIGS. 54–74.

Figure 66:
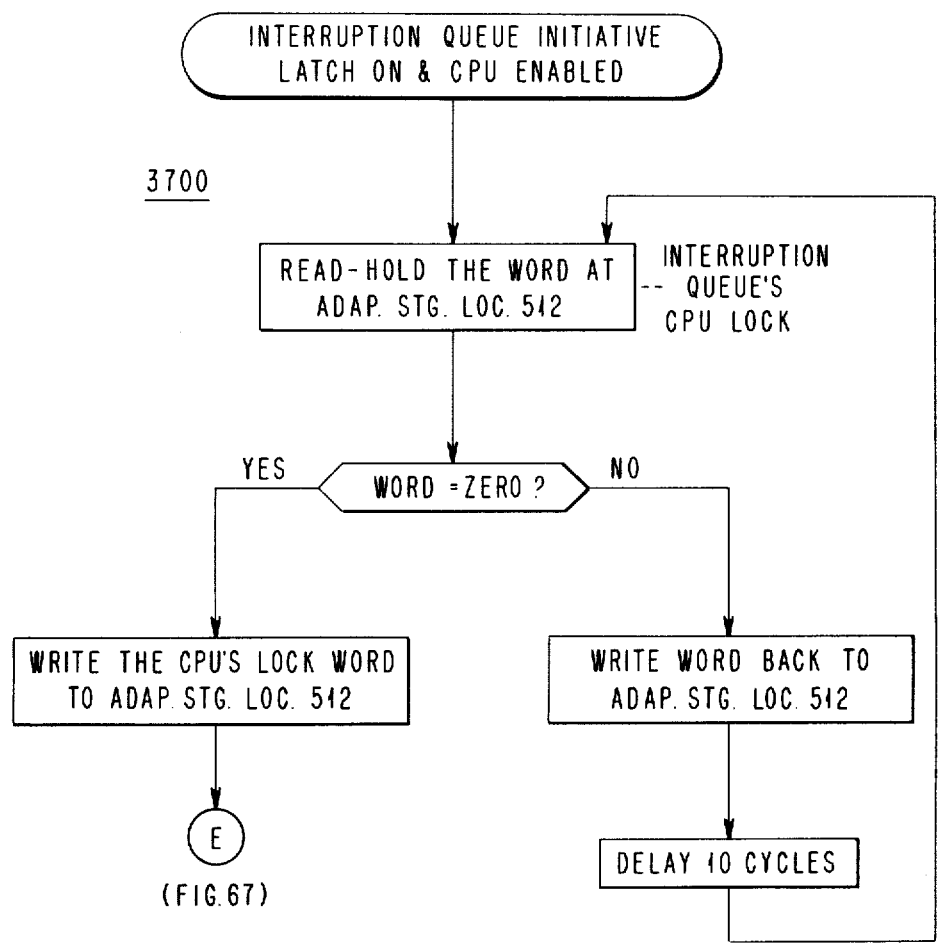
FIGS. 66–68 are schematic flow diagrams illustrating host CPU operations at the microprogram level for processing interruption requests from the host adapter.
Figure 67:
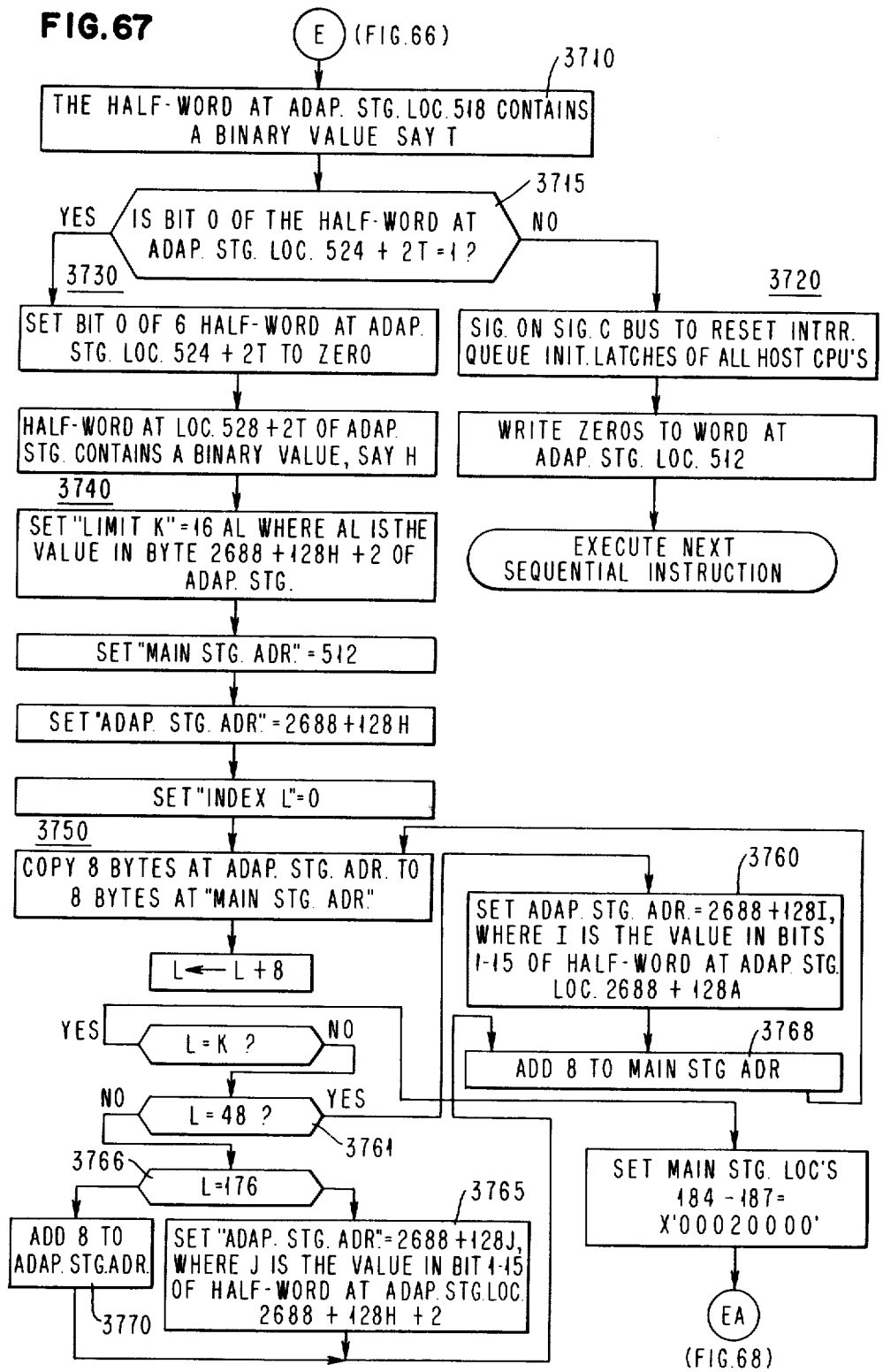
Figure 68A:
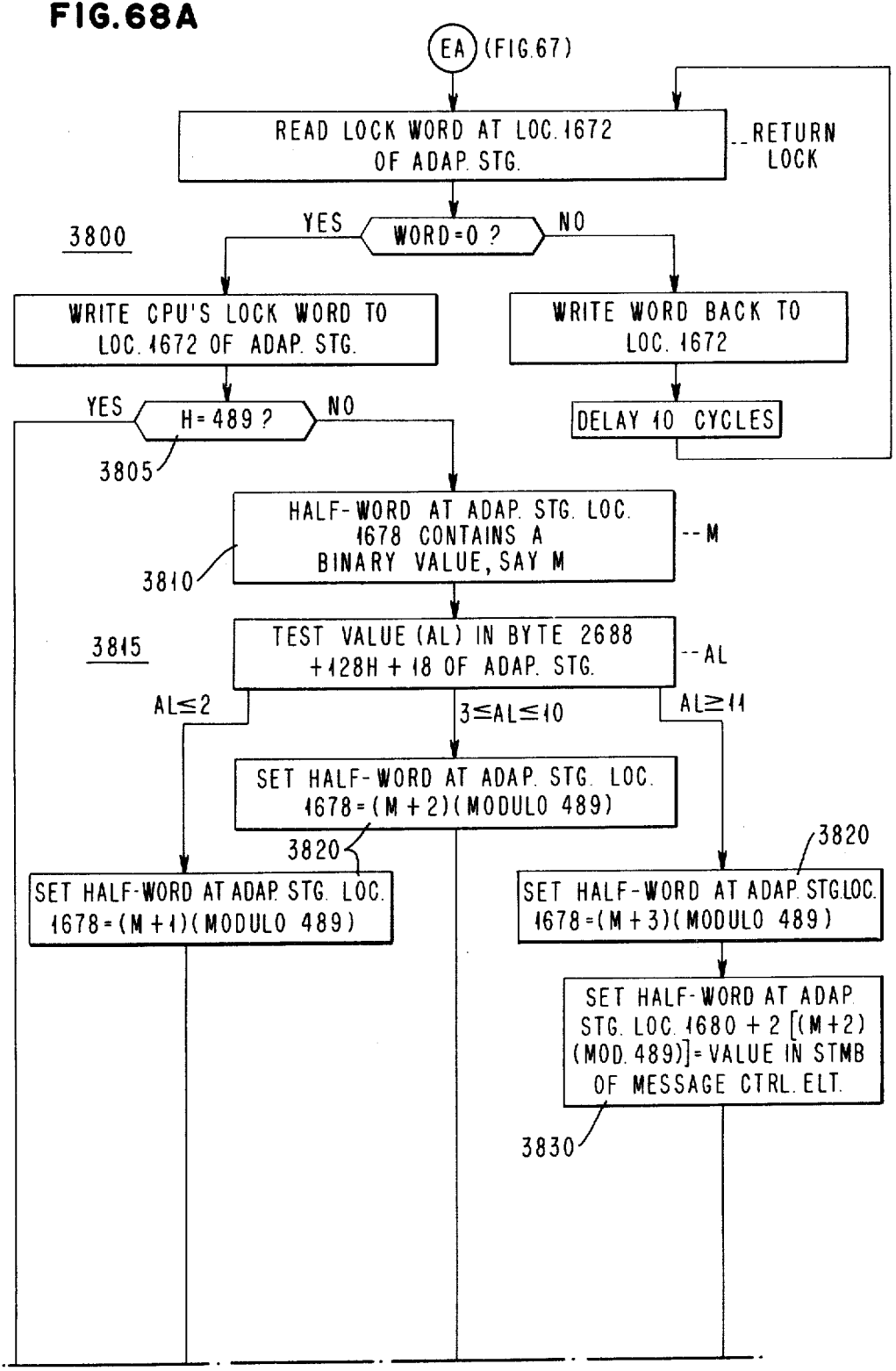
Figure 69:
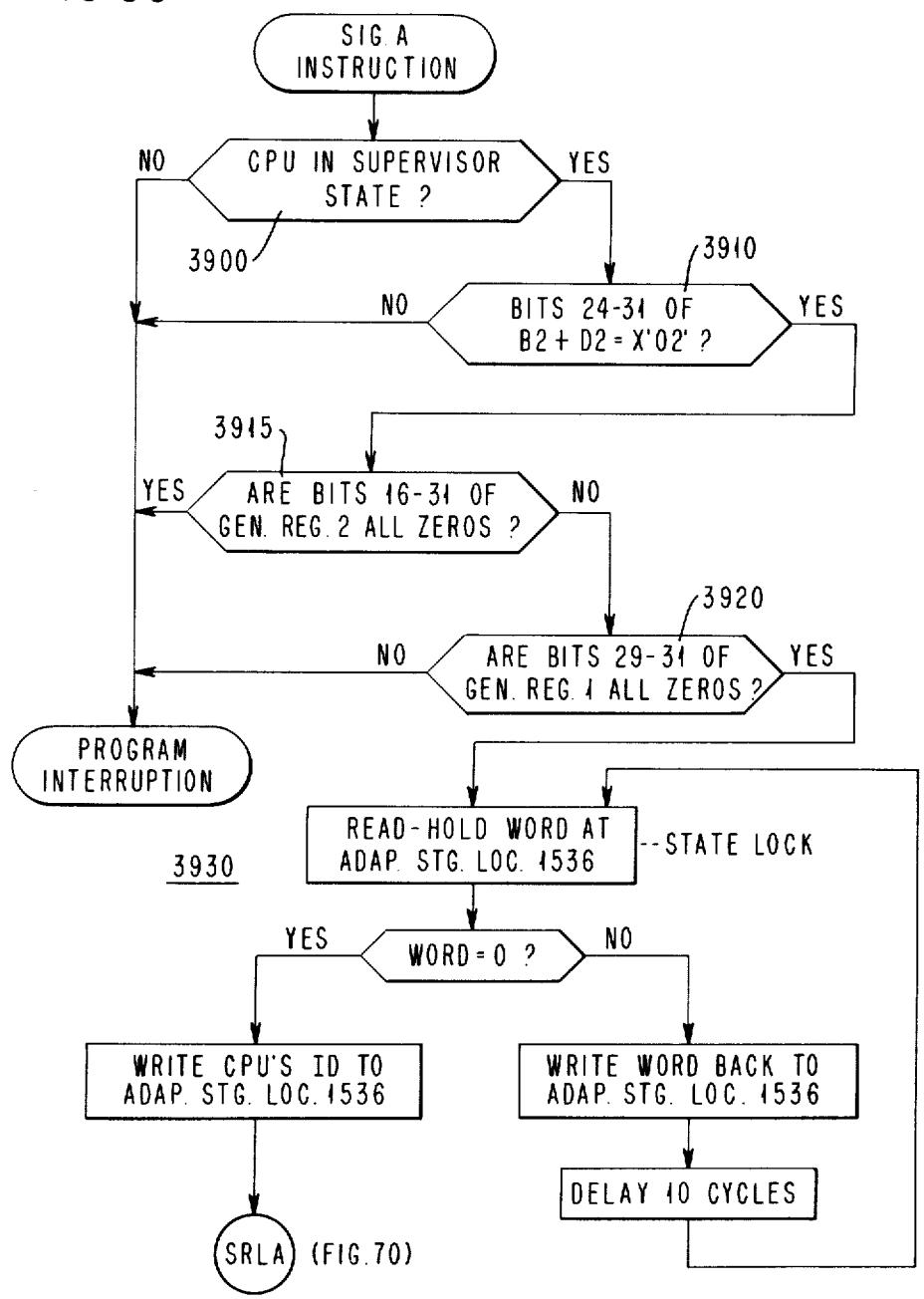
FIGS. 69–70 are schematic flow diagrams illustrating host CPU operations for executing the operations associated with execution of SIGA instructions.
Figure 70:
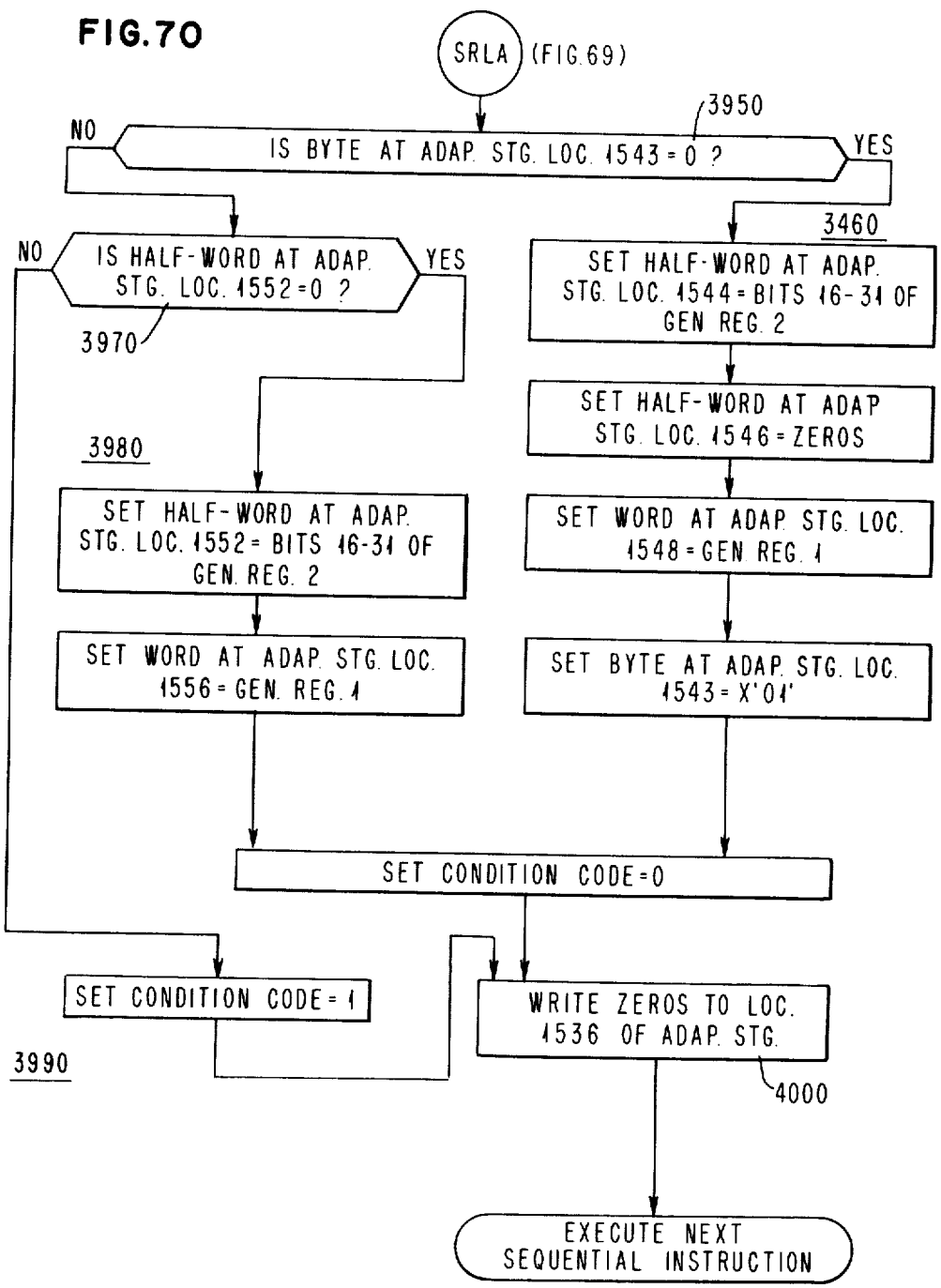

Host CPU operations for SST execution are illustrated in FIGS. 54–65. Host operations for interruption presentation are illustrated in FIGS. 66–68. CPU operations for SIGA are illustrated in FIGS. 69–70.

FIGS. 54–65 illustrate, at the CPU firmware level, the preparational process for the message-transfer initiating instruction SST. The following phases must be executed.

Figure 54:
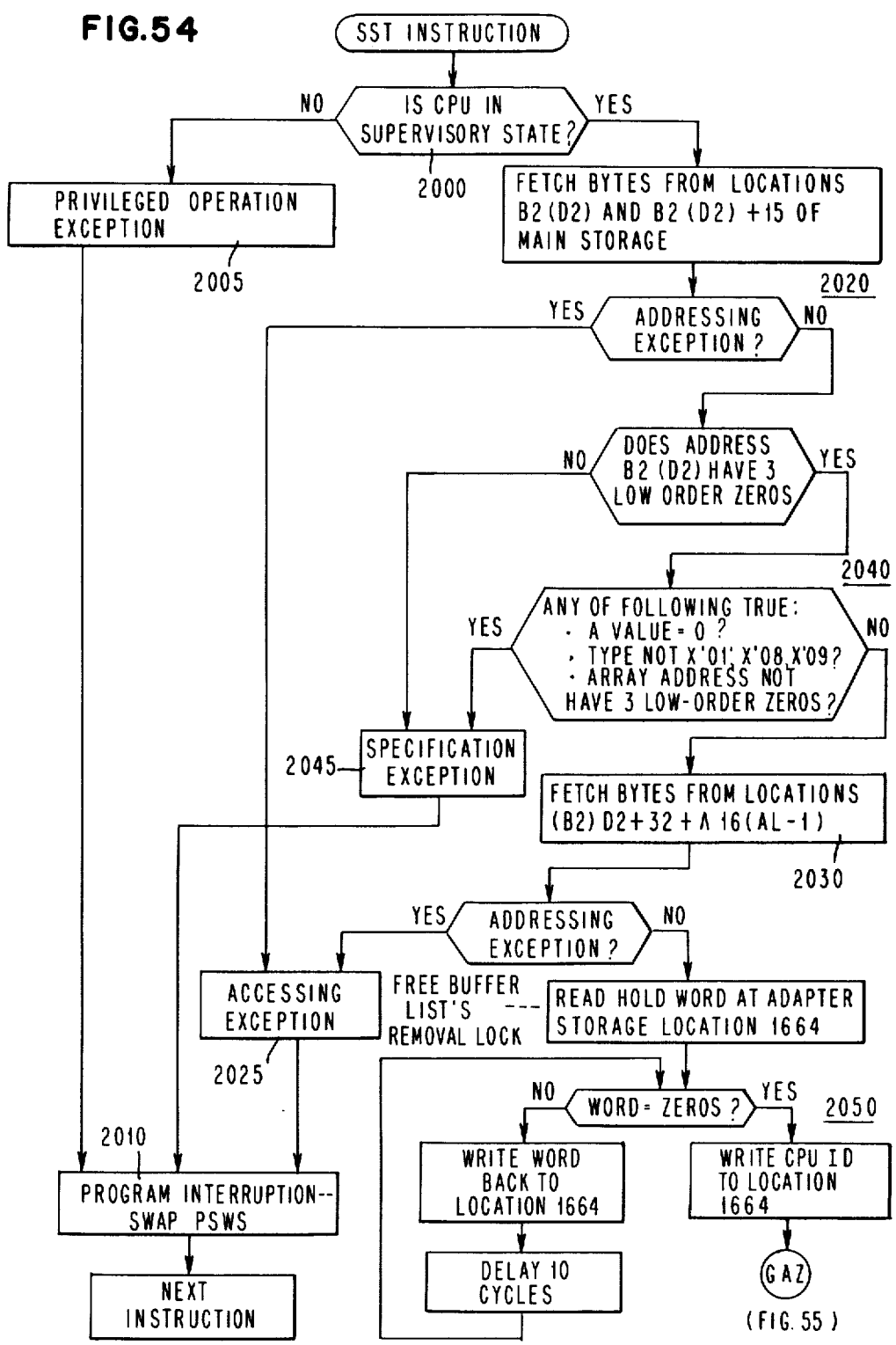
FIGS. 54–65 are schematic flow diagrams illustrating host CPU operations at the microprogram level for carrying out the operations associated with execution of SST instructions.

In the sequence of FIG. 54, operations 2005 and 2010 generate a program interruption of the CPU if sequence branch 2000 determines that the CPU is not in the supervisor state; operations 2025 and 2010 generate a program interruption if operations 2020 and 2030 determine that the control section and header of the message control block (see FIG. 5) specified by address B2(D2) of the SST instruction are not in accessible main storage locations; operations 2045 and 2010 generate a program interruption if operations 2040 determine that address B2(D2) does not indicate an 8-byte boundary, or the A value in the header (5.3 of FIG. 5) is zero, or the TY value in the header (5.4 of FIG. 5) is not X'01', X'08', or X'09', or the array address of the control section (5.1 of FIG. 5) does not indicate an 8-byte boundary; and operations 2050 write the CPU's identifier number into the free buffer list's removal lock (8.1 of FIG. 8) when the previous value is or becomes zero. Connection is then made to the sequence of FIG. 55 via connector "GAZ".

Figure 55:
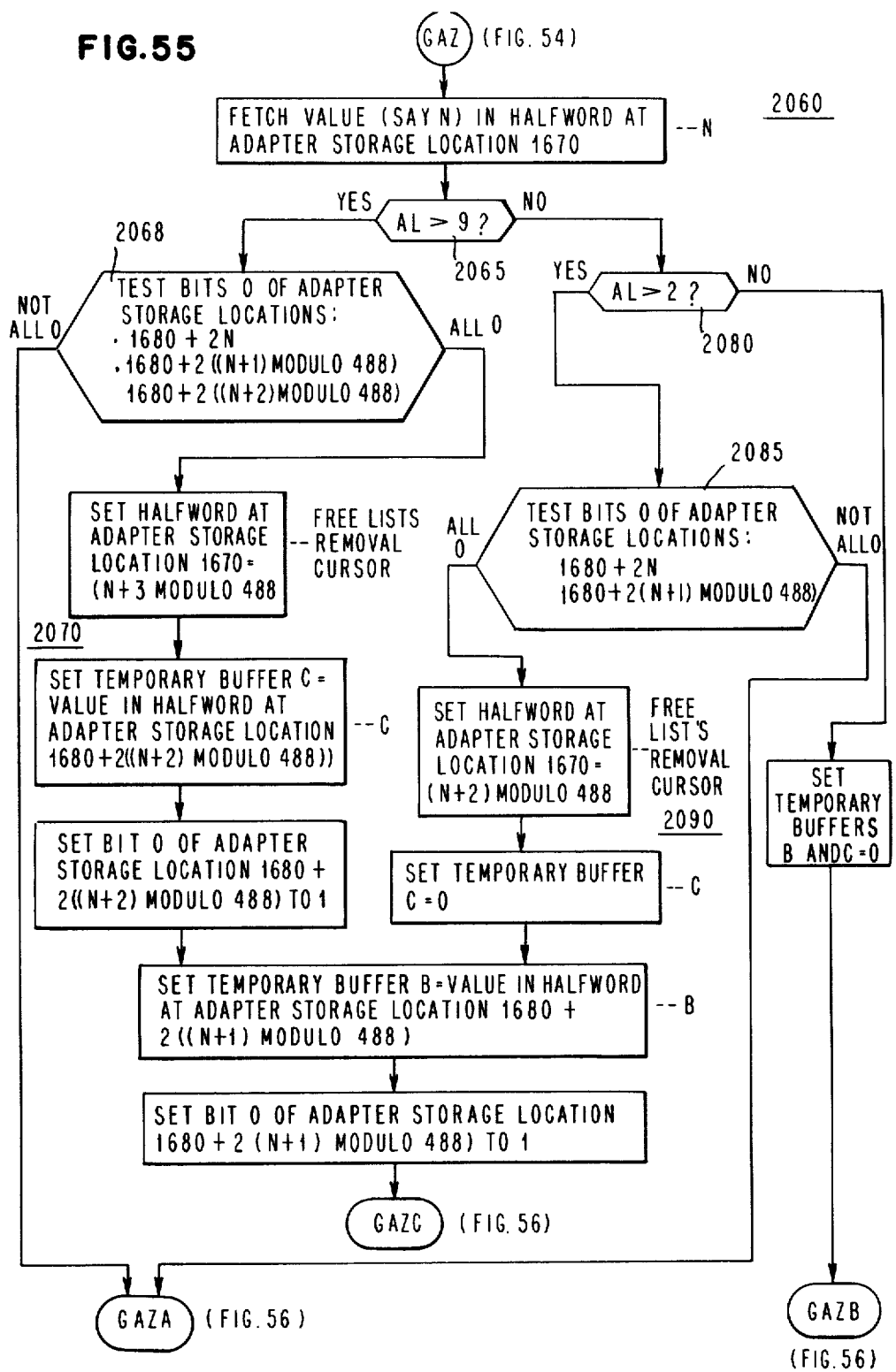
Figure 56:
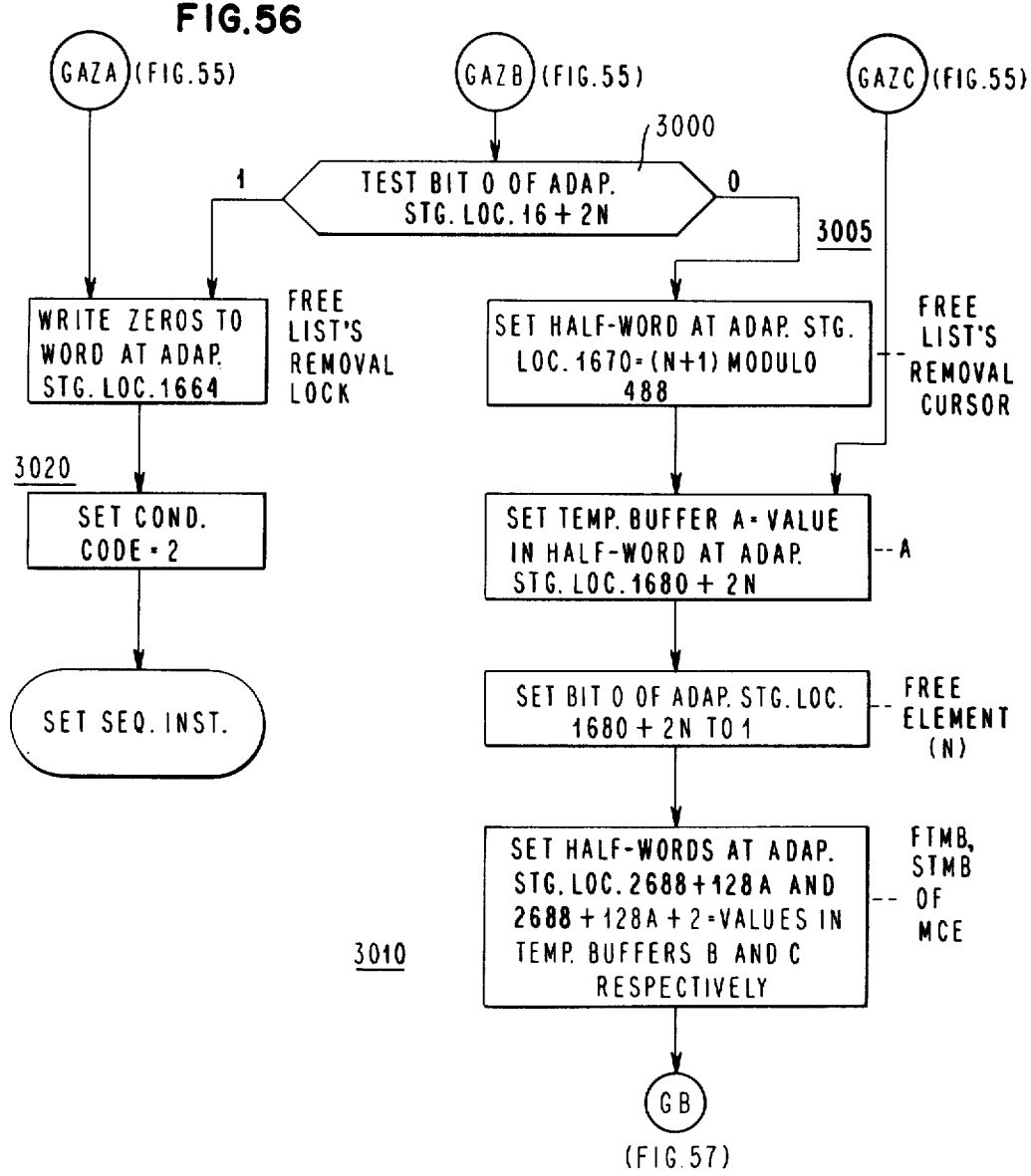

In the sequence of FIGS. 55–56, the CPU removes free elements from the subchannel buffer pool (7.1 of FIG. 7) in order to construct a subchannel control space. In the sequence of FIG. 55, operations 2060 locate the next free element (8.3 of FIG. 8) in the free buffer list via the value (say "N") in the removal cursor of the free buffer list (8.2 of FIG. 8); operations 2070 remove three buffer elements (7.1 of FIG. 7) from the free buffer list (FIG. 8) when sequence branches 2065 and 2068 determine that the A value (5.3 of FIG. 5) in the message header is greater than 9 (i.e., that there are at least 10 blocks in the message array) and that three such free elements are available; operations 2090 remove two buffer elements (7.1 of FIG. 7) from the free buffer list (FIG. 8) when sequence branches 2080 and 2085 determine that the A value (5.3 of FIG. 5) in the message header is between three and nine and that there are two such free elements available.

In the sequence of FIG. 56, operations 3005 remove one buffer element (7.1 of FIG. 7) from the free buffer list (FIG. 8) when sequence branches 2080 and 3000 determine that the S value (5.3 of FIG. 5) is less than three and that one such buffer element is available; operations 3010 place the host-adapter storage addresses of the second and third free elements just selected (if any) in the first temporary message buffer (FTMB) and secondary temporary message buffer (STMB) halfwords (10.7 and 10.8 of FIG. 10) of the first free element just selected (thus making this first element the message control element of the subchannel control space—see FIG. 10); and operations 3030 reset the free list's removal lock, set CPU condition code 2 for the SST instruction and proceed to the next sequential instruction when any of sequence branches 2068, 2085, or 3000 determines that insufficient free elements are available. The sequence of FIG. 56 links to the sequence of FIG. 57 via connector "GB".

Figure 57:
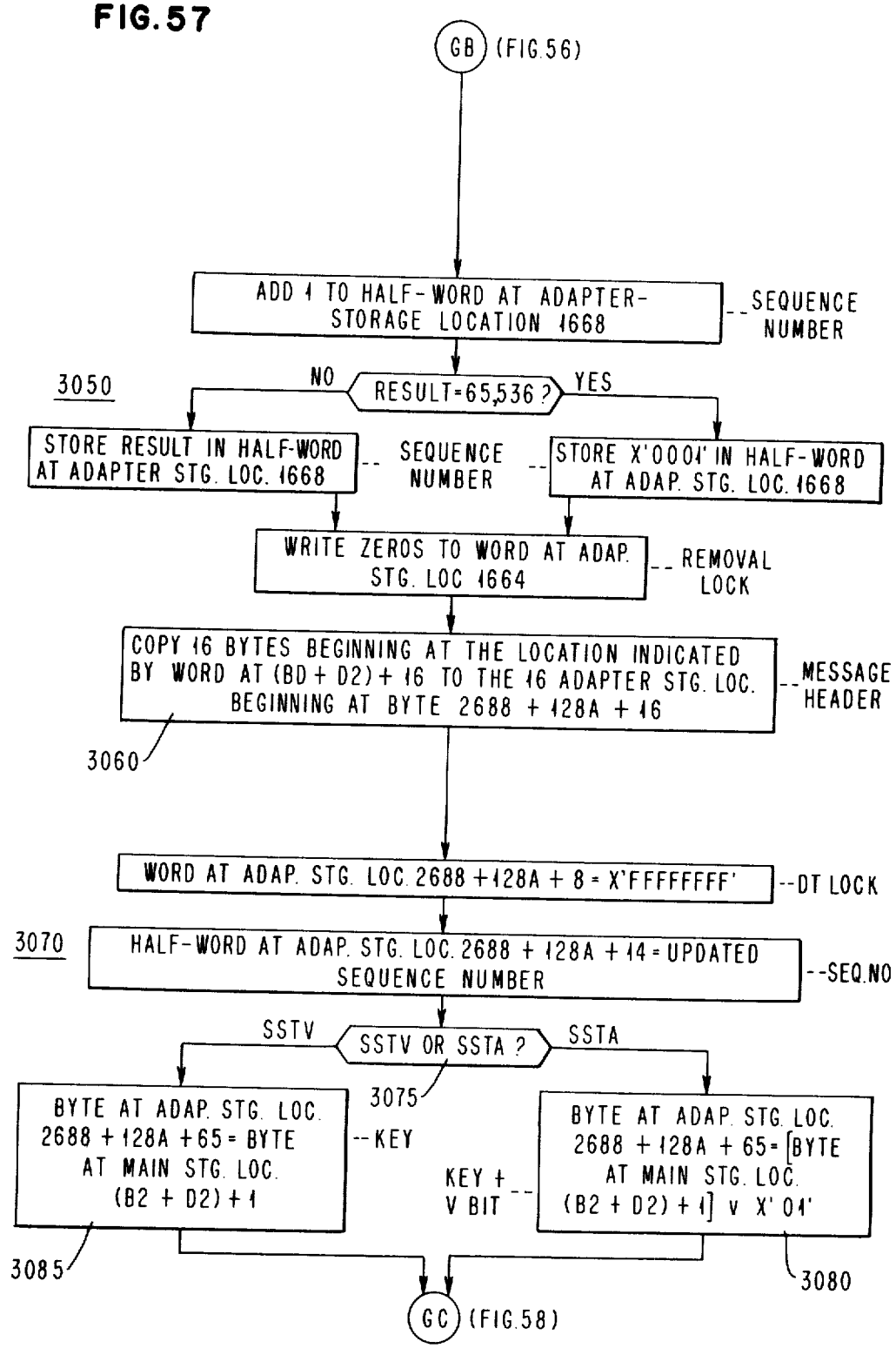

In the sequence of FIG. 57, the CPU performs further initializing actions with respect to the subchannel control space constructed in the operation of FIGS. 55–56. Operations 3050 form an incremented sequence number starting with the value in the sequence number register (8.6 in FIG. 8) of the free buffer list and reset the free list's removal lock (8.1 of FIG. 8), operations 3060 transfer the message header (FIG. 5) of the message control block from host main storage to the message control element (10.3 of FIG. 10) of the subchannel control space, operations 3070 place ones in the bits of the lock word (10.5 of FIG. 10) of the message control element and set the incremented sequence number in the sequence number register (10.2 of FIG. 10) of the message control element, operations 3080 and 3085 transfer the protection key (5.5 in FIG. 5) from the message control block in host main storage to the key location (10.9 in FIG. 10) of the message control element, operations 3080 also set the V bit (10.10 in FIG. 10) to one if sequence branch 3075 determines that the instruction is in the virtual addressing form SSTV (instruction operation code B238) as opposed to the real addressing form SSTA (operation code B239), and connection is made to the sequence of FIG. 58 via connector "GC".

Figure 58:
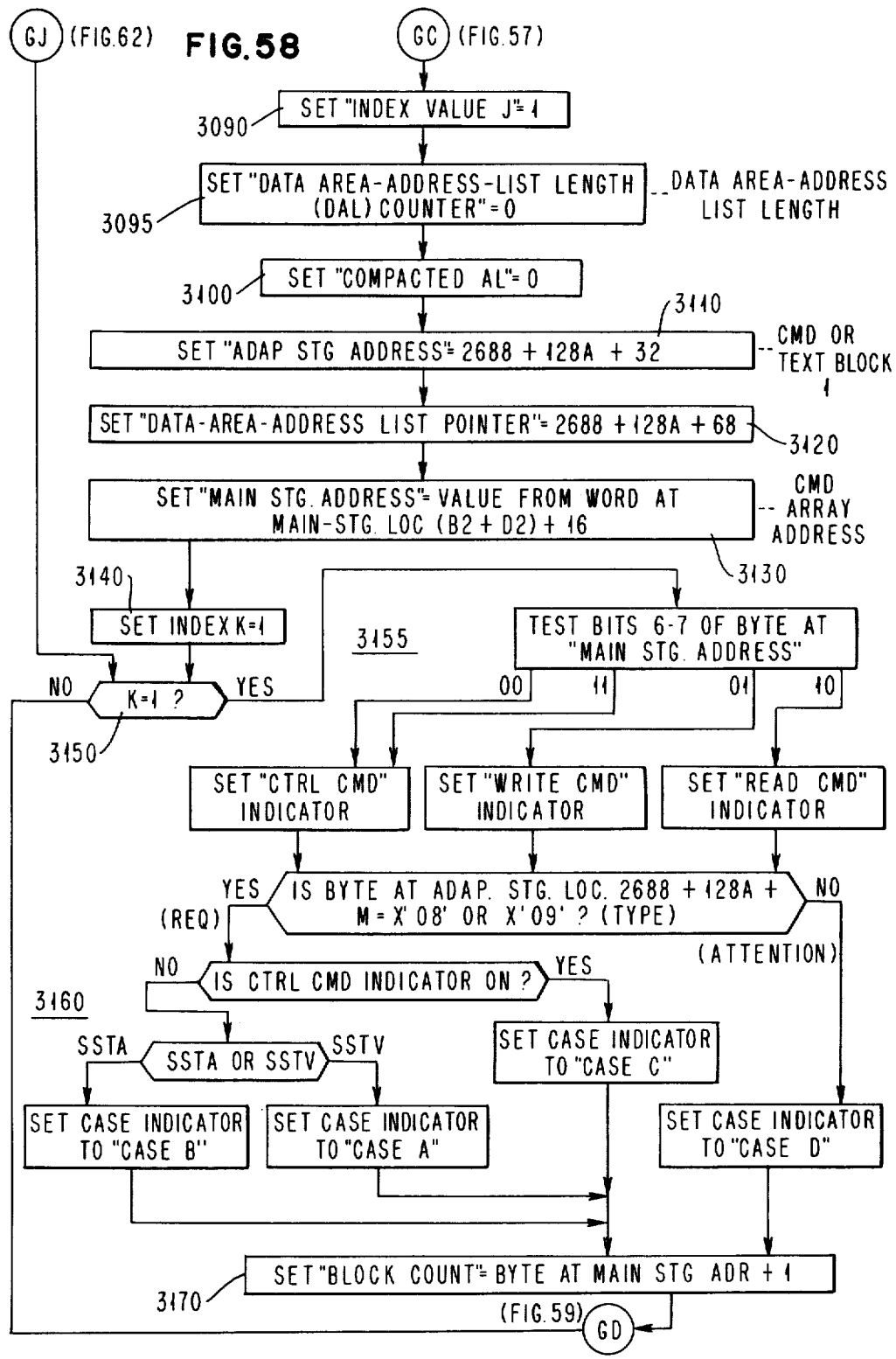
Figure 59:
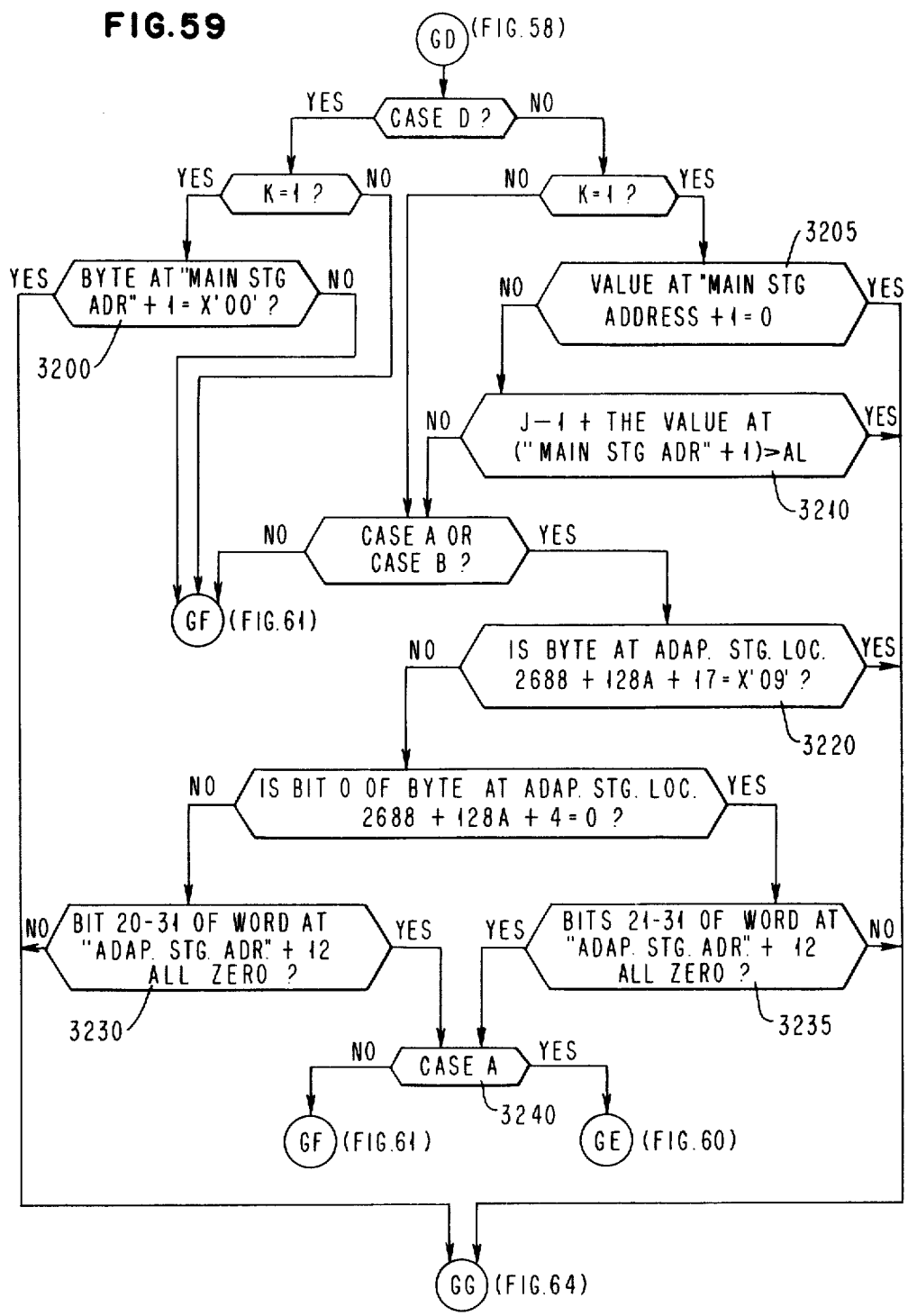

In the sequence of FIG. 59, the CPU microprogram tests the command whose first byte is addressed by the "main-storage address" register for proper specification according to the "case indicator" set up in the sequence of FIG. 58. In the sequence of FIG. 59, sequence branches 3200 and 3205 connect to the exception sequence of FIG. 64 via connector "GG" when the "index K" counter has value 1 and the "m value" (FIG. 3) of the command is 0, sequence branch 3210 ensures that the sum of the "m values" (FIG. 3) in the commands in the array has not exceeded the "AL value" (5.6 in FIG. 5) in the message control block, sequence branch 3220 ensures that the message is a "Type 1" request and sequence branches 3230 and 3235 ensure that the byte boundaries indicated by the data-area addresses (ADDR) in the command (FIG. 3) agree with the block unit size (2,048 or 4,096 bytes—see Section 2b) for all data transfer commands in the request. If no specification exceptions are encountered in the sequence of FIG. 59, connection is made to the sequence of FIG. 60 via connector "GE" or the sequence of FIG. 61 via connector "GF".

FIGS. 58–62 illustrate the sequential transfer of the commands (FIG. 1) in the command array from host main storage to the subchannel control space constructed in the operations of FIGS. 55–56 and initialized in the operations of FIG. 57.

In the sequence of FIG. 58 various internal CPU registers and counters (not shown) are initialized. Operations 3090 initialized the "index value J" counter to 1, operations 3095 initialize the "DAL counter" to 1, operations 3100 initialize the "compacted AL" counter to 0, operations 3110 set the "adapter storage address" register to the address of command or text block 1 (10.4 in FIG. 10) in the message control element, operations 3120 set the "data-area address list pointer" register to the address of the beginning of the data-area address list (10.6 in FIG. 10) of the message control element, operations 3130 set the "main storage address" register to the value in the array address (5.1 in FIG. 5) of the message control block (i.e., to the address of the first command in the array), and operation 3140 sets the "index K" counter to 1. Within the sequences of FIGS. 58–62, the "index K" counter is used to count the command blocks (FIG. 3) in the individual commands of the array as these command blocks and commands are processed sequentially by CPU firmware.

In the sequence of FIG. 58, and when the sequence branch 3150 determines that the "index K" counter value for the present command is 1, operations 3155 set a "command indicator" register (not shown) to reflect the command code value (FIG. 3) in the command, operations 3160 set a "case indicator" (not shown) to control subsequent operations according to the specific case identified, and operations 3170 set a "block count" counter to the value in the "m" byte (FIG. 3) of the command.

Figure 60:
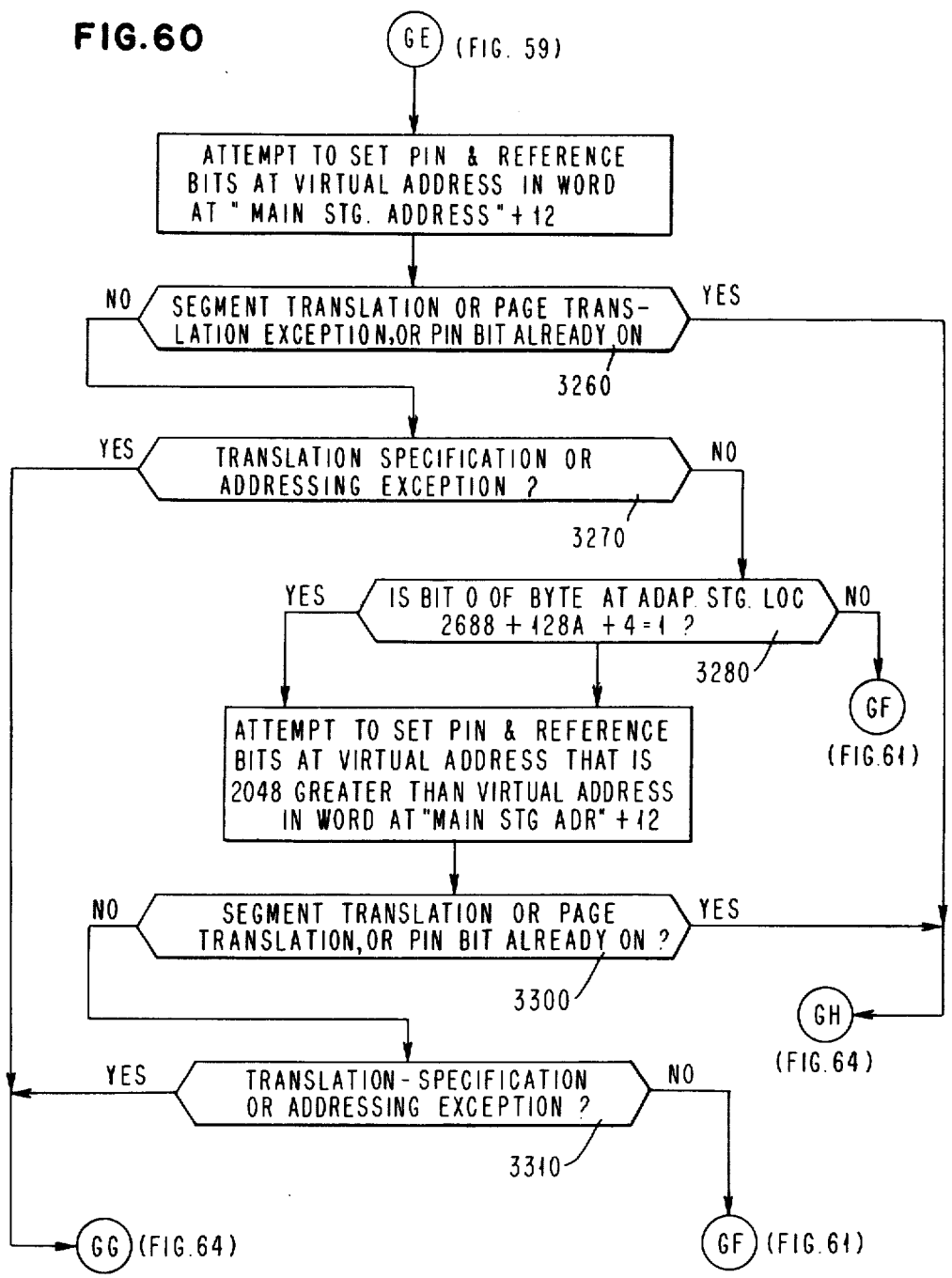

The sequence of FIG. 60 is used only if the SST operation code is B239, thus indicating that the data-area addresses (ADDR in 42 of FIG. 3) in the commands of the request message are virtual addresses. In this case these virtual addresses must be translated before they are placed in the data-area address list (10.6 of FIG. 10) of the message control element. In the sequence of FIG. 60, operations 3260 and 3300 detect translation exceptions, and operations 3270 and 3310 detect other exceptions (e.g. System/370 exceptions). When such exceptions are detected, connection is made to the sequence of FIG. 64 via connector "GH" or connector "GG". When no exceptions are detected, connection is made to the sequence of FIG. 61 via connector "GF".

Figure 61:
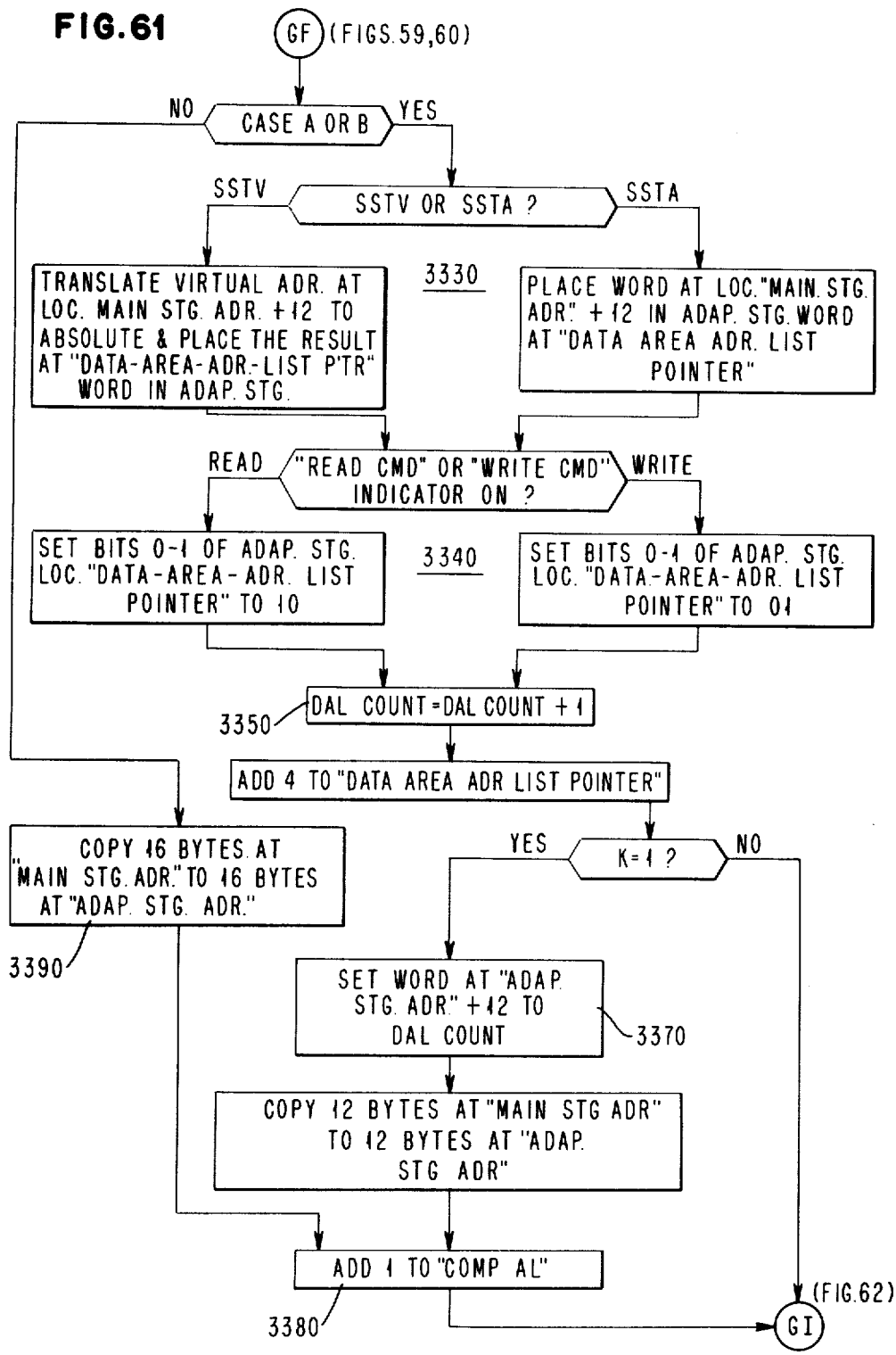

In the sequence of FIG. 61, the next 16 bytes of the array in main storage are transferred to the subchannel control space: operations 3330 transfer the address (ADDR in FIG. 3) to the next slot in the data-area address list (10.6 in FIG. 10) of the message control element, operations 3340 set a "read/write" indicator into bits 0–1 of the same slot in the same list (10.6 in FIG. 10), operations 3350 increment the "DAL" counter and "data-area address list pointer" to indicate the next available slot on the data-area address list (10.6 in FIG. 10), operations 3370 transfer 16 bytes of the command into the next text or command slot of the subchannel control space (10.4 of FIG. 10), and operations 3380 increment the "compacted SA" counter.

Figure 62:
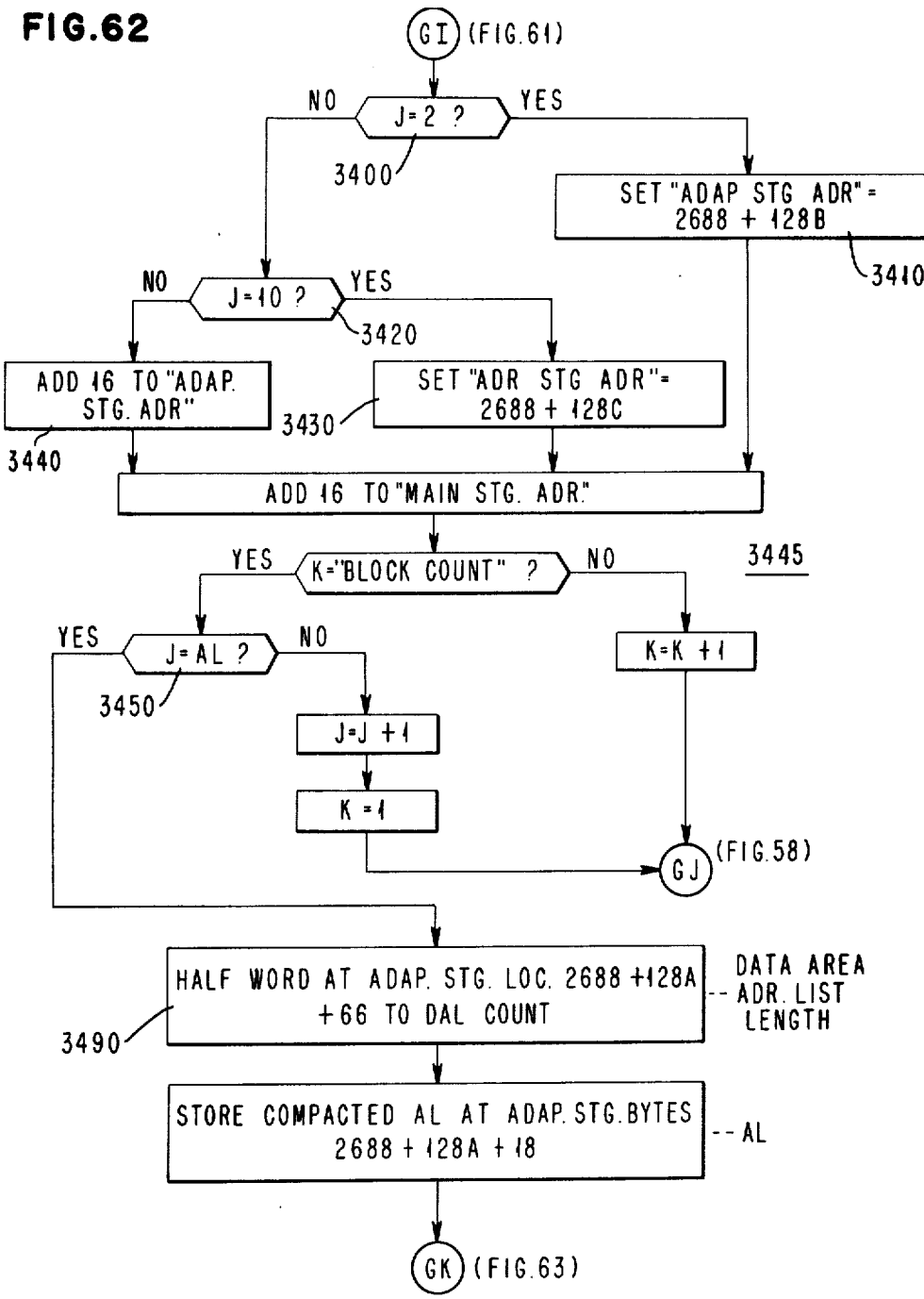

In the sequence of FIG. 62, CPU firmware operations are performed in order to prepare to process the next command block (FIG. 3) in the array. Operations 3410 set the "adapter storage address" register to address the first command-or-text-block slot in the first temporary message buffer of the subchannel control space when sequence branch 3400 determines that the third command block of the array is to be processed next, operations 3430 set the "adapter storage address" register to address the first command-or-text-block slot M in the second temporary message buffer of the subchannel control space when sequence branch 3420 determines that the eleventh command block of the array is to be processed next, and operations 3445 increment the "adapter storage address" register by 16 if neither the third nor the eleventh command block is to be processed next. Operations 3440 increment the "J index" and "K index". Operations 3490 transfer the DAL value indicating the number of addresses on the data-area address list (10.6 of FIG. 10) to the data-area-address-list length byte (10.11 of FIG. 10), transfer the value indicating the number of commands blocks in the compacted commands of the subchannel control space to the AL byte (10.12 of FIG. 10) of the message control element, and connect to the sequence of FIG. 63 via connector "GK" when sequence branch 3450 determines that the last command block in the array has been processed. Connection is then made back to the sequence of FIG. 58 via connector "GJ" when sequence branch 3450 determines that further command blocks are to be processed.

Figure 63:
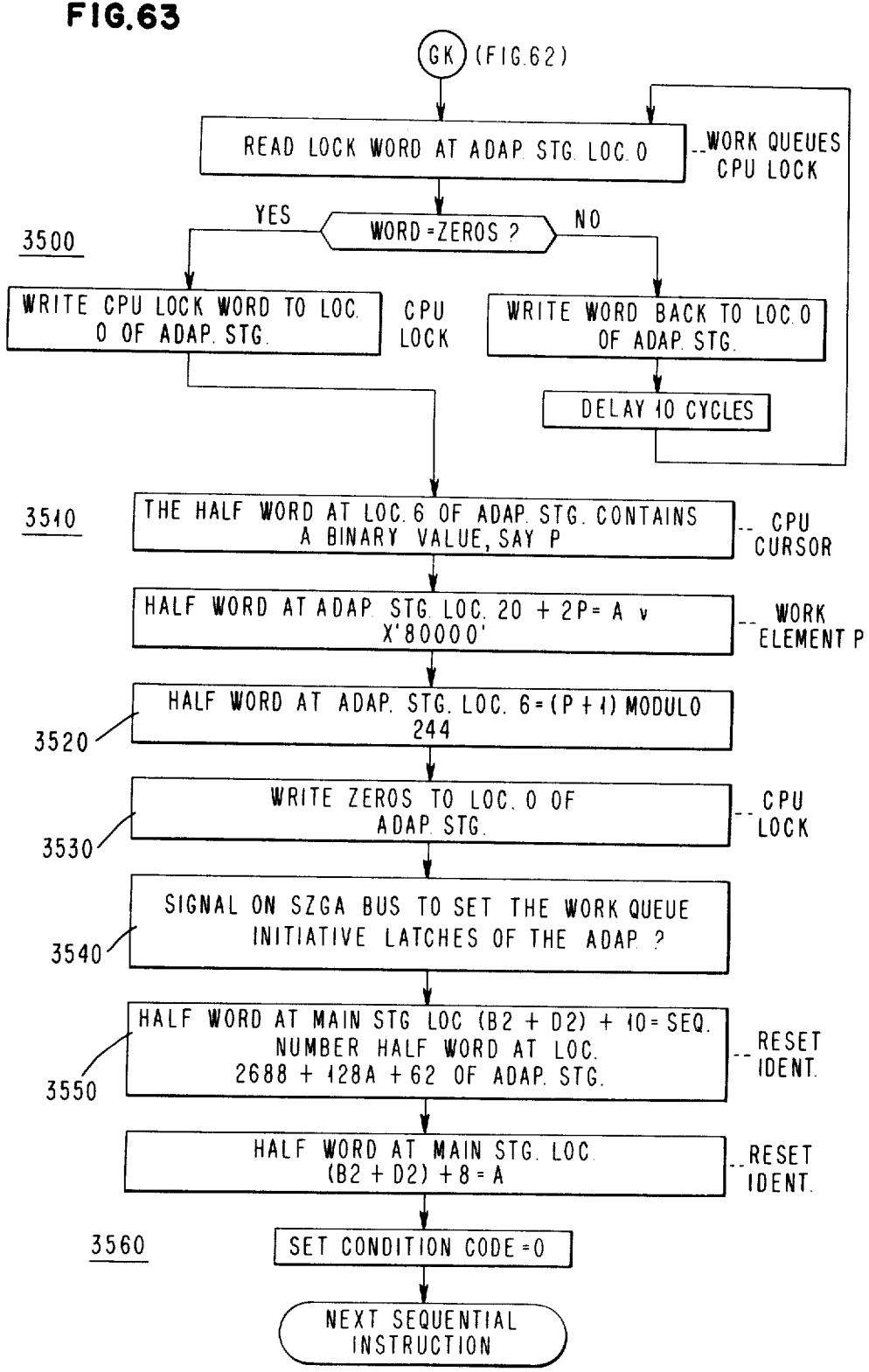

In the sequence of FIG. 63, CPU firmware operations are performed in order to place the subchannel control space on the adapter work queue (FIG. 9) and to complete execution of the SSTV instruction. Operations 3500 write the CPU's identifier in the work queue's CPU lock (9.1 of FIG. 9) when the value in the lock word is or becomes 0, operations 3510 locate the next work element (9.3 of FIG. 9) in the work queue via the value (say P) in the CPU cursor (9.2 of FIG. 9) and place the address of the subchannel control space's message control element (FIG. 10) in work element P. Operations 3520 place the incremented cursor value modulo 244 in the CPU cursor (9.2 in FIG. 9). Operations 3530 reset the CPU lock word (9.1 of FIG. 9) to zero operations 3540 pulse the work queue initiative latches (116 of FIG. 25) of all host adapter engines, operations 3550 set the reset identifier (5.2 in FIG. 5) in the message control block in host main storage. Operations 3560 set condition code 0 to complete the execution of the SST instruction, after which the CPU proceeds to execute the next instruction in the sequence of host supervisory program instructions.

Figure 64:
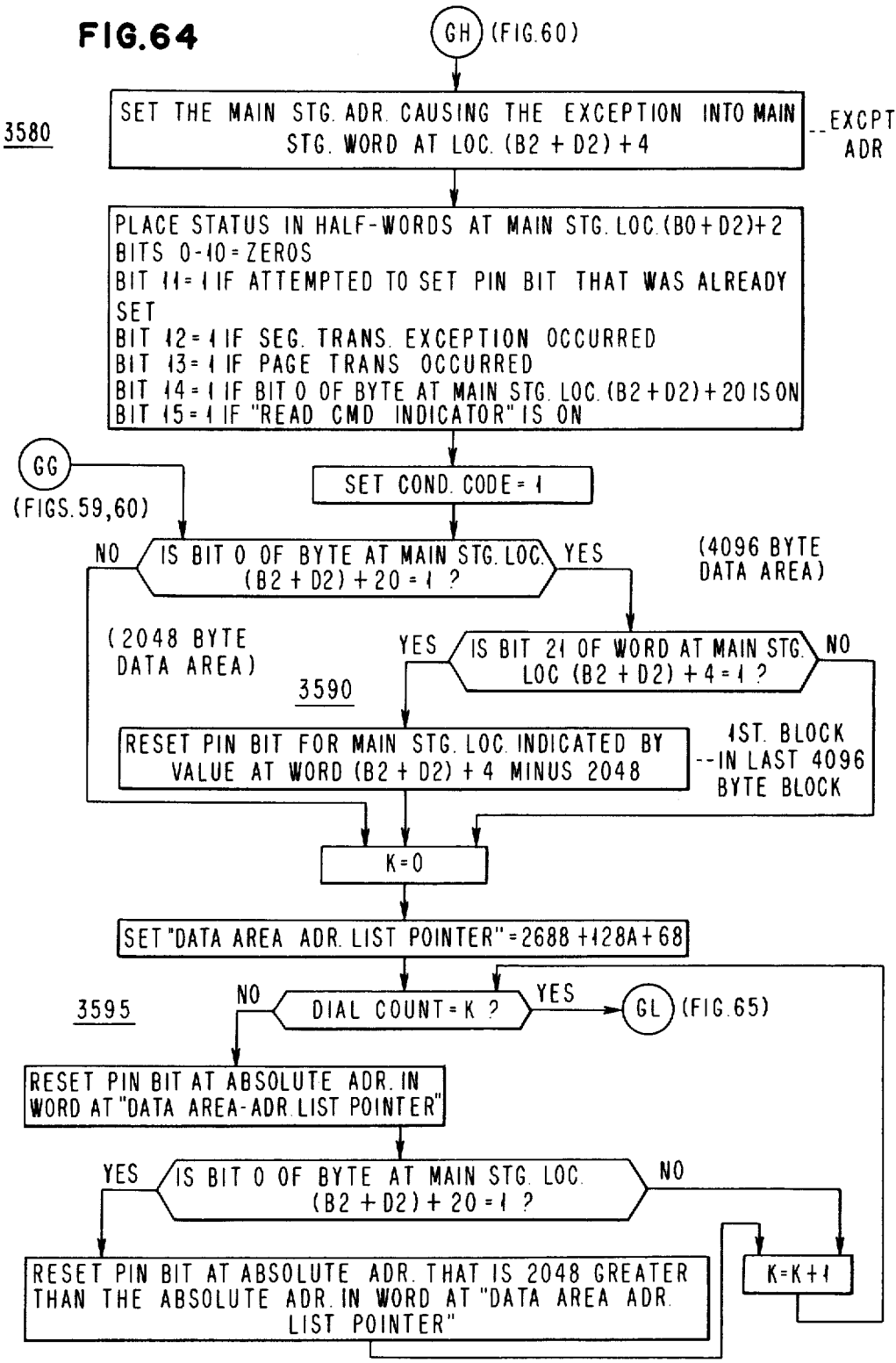
Figure 65:
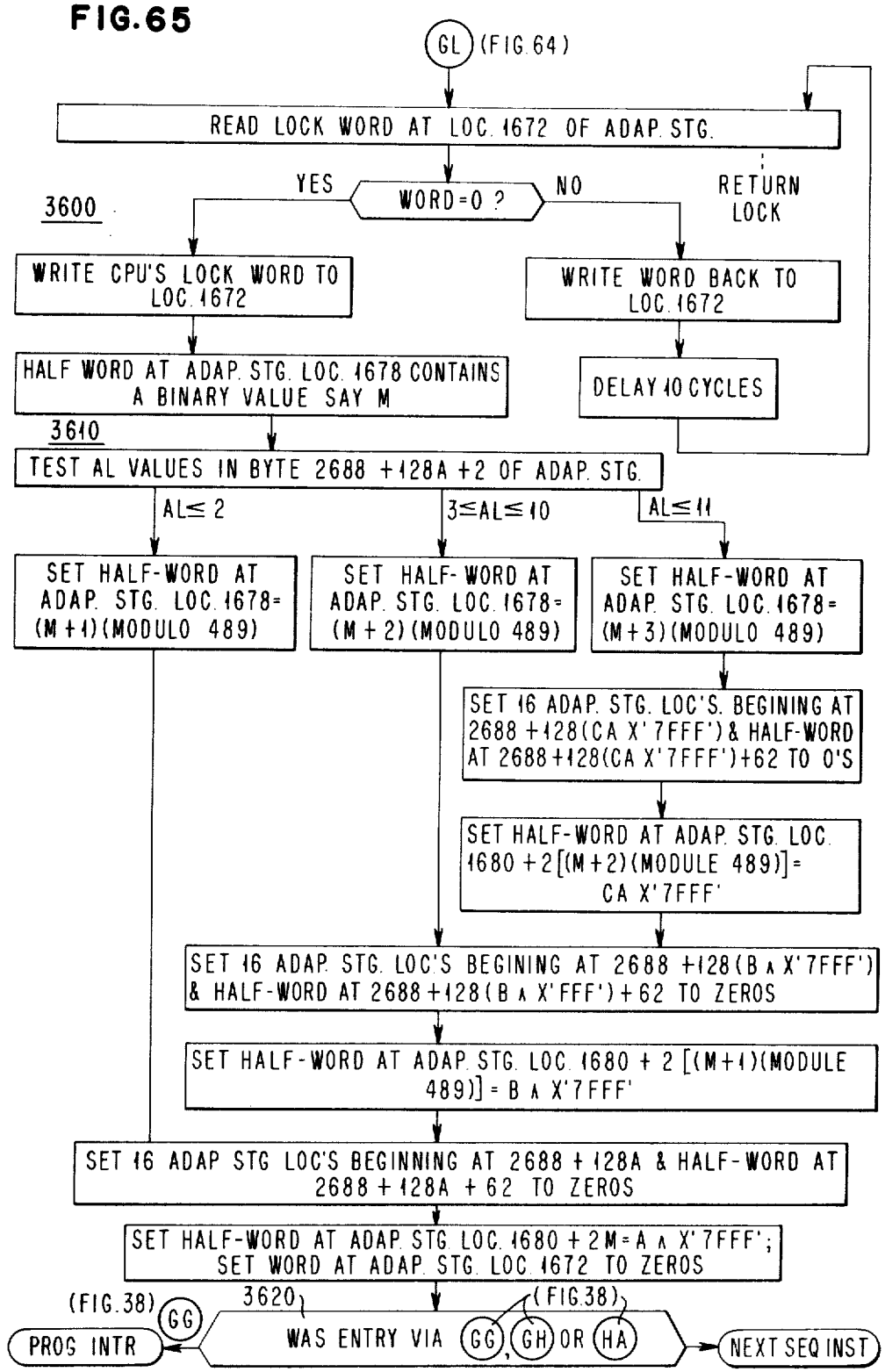

The sequences of FIGS. 64—65 perform CPU firmware operations required for the processing of exception conditions encountered in FIGS. 54—63. The sequence of FIG. 64 is entered from the virtual address translation sequence of FIG. 60 via connectors "GH" and "GG", and from the specification checking sequence of FIG. 59 via connector "GG". In the sequence of FIG. 64, operations 3580 place an exception address and status halfword in the message control block (5.8 and 5.7 respectively in FIG. 5) and set condition code 1 for the SST instruction, and operations 3590 and 3595 process translated virtual addresses that appear on the data-area address list (10.6 of FIG. 10) and connect to the sequence of FIG. 65 via connector "GL".

In the sequence of FIG. 65, operations 3600 write the CPU's identity into the return lock of the free buffer list (8.4 of FIG. 8) when the lock's value is or becomes 0; operations 3610 place the buffer element numbers of the buffer elements (7.1 in FIG. 7) in the subchannel control space into free elements (8.3 in FIG. 8) on the free buffer list, increment the return cursor (8.5 in FIG. 8), and reset the return lock of the free buffer list (8.4 of FIG. 8); and sequence branch 3620 connects the CPU's firmware to either the program interruption routine or the next sequential instruction execution routine.

FIGS. 66–68 illustrate, at the CPU firmware level, the process of CPU interruption. The sequence of FIG. 66 is executed when a CPU detects that its interruption queue initiative latch is on. In the sequence of FIG. 66, operations 3700 write the CPU's identity in the interruption queue's CPU lock word (11.3 of FIG. 11) when the value in the lock word is or becomes 0. Connection is then made to the operation of FIG. 67 via connector "E".

FIG. 67 illustrates the process for transferring the message in a subchannel control space to the interruption area in host main storage (locations 512-767 in main storage). In the sequence of FIG. 67, operations 3710 locate the next interruption element (11.2 of FIG. 11) on the interruption queue via the CPU cursor (11.4 of FIG. 11) value, say T; operations 3720 signal to reset the interruption queue initiative latches of all host CPU's, reset the CPU lock of the interruption queue (11.3 of FIG. 11), and connect to the firmware operations for executing the next sequential instruction when sequence branch 3715 determines that interruption element T (11.2 of FIG. 11) does not indicate a subchannel control space for interruption; operations 3730 determine the buffer element number (7.1 of FIG. 7), say H, of the message control element (FIG. 10) part of the subchannel control space containing the interruption message; operations 3740 initialize internal CPU registers and counters (not shown), "limit K", "main storage address", "adapter storage address", and "index L"; operations 3750 transfer the message in the subchannel control space to locations 512-767 of host main storage; operations 3770 set a CPU interruption code and connect to the sequence of FIG. 68 via connector "EA".

Within the sequence of operations 3750, operations 3760 use the first TMB value (10.7, FIG. 10) to reset the "adapter storage address" register to the first byte of the first temporary message buffer when sequence branch 3761 determines that command or text blocks 1 and 2 (10.4 of FIG. 10) have been transferred to main storage, operations 3765 use the second TMB value (10.8 of FIG. 10) to reset the "adapter storage address" register to the first byte of the second temporary message buffer when sequence branch 3766 determines that command or text blocks 3-9 have been transferred to main storage, and operations 3770 increment the "adapter storage address" register by eight when neither of these boundaries is crossed.

FIG. 68 continues the sequence of FIGS. 66–67 wherein H is the buffer element number (7.1 of FIG. 7) of the message control element (FIG. 10) of a subchannel control space. FIG. 68 illustrates the CPU firmware process for returning the elements of the subchannel control space to the free buffer list (FIG. 8). Operations 3800 write the CPU's identifier into the free buffer list's return lock (8.4 of FIG. 8) when the present value in the lock word is or becomes 0, operations 3810 use the value, say M, in the free buffer list's return cursor (8.5 of FIG. 8) to locate the next free element (8.3 of FIG. 8) of the free buffer list, sequence branch 3815 uses the AL value in the subchannel control space's message control element (10.12 of FIG. 10) to determine whether the subchannel control space is composed of 1, 2, or 3 buffer elements (7.1 of FIG. 7), operations 3820 then increment the return cursor (8.4 of FIG. 8) of the free buffer list by 1, 2, or 3; operations 3830 use the second TMB value (10.8 of FIG. 10), say J, from the message control element to return the second temporary message buffer element (FIG. 10C) of the subchannel control space to the free list (i.e., by setting the value J into the next free element of the free buffer list); operations 3840 use the first TMB value (10.7 of FIG. 10), say I, from the message control element to return the first temporary message buffer element (FIG. 10B) of the subchannel control space to the free buffer list (i.e., by setting the value I into the next free element of the free list); operations 3850 return the message control element (FIG. 10A) of the subchannel control space to the free buffer list (i.e., by setting the value H into the next free element of the free list); operations 3860 free special subchannel control space 489 by resetting bit 0 of free element 489 (8.3 of FIG. 8); and operations 3870 reset the CPU lock word of the interruption queue (11.3 of FIG. 11) and connect the CPU firmware to the sequence for handling I/0 interruptions.

FIGS. 69–70 illustrate, at the CPU firmware level, the process for directing the host adapter to use the response list method of forwarding completion messages to host supervisory programs. In the sequence of FIG. 69, sequence branch 3900 ensures that the CPU is in the supervisor state when the SIGA operation code X'B23A' is encountered, sequence branch 3910 ensures that the second operand specifies the "set response list" order X'02', sequence branch 3915 ensures that the response list length specified for the instruction is not 0, sequence branch 3920 ensures that the specified response list address indicates an 8-byte boundary, and operations 3930 write the CPU's identifier in the state lock (12.1 of FIG. 12) of the configuration element when its present value is or becomes 0. Connection is then made to the sequence of FIG. 70 via connector "SRLA".

In the sequence of FIG. 70, operations 3960 copy the count value from general register 2 into the primary length register (12.7 of FIG. 12) of the configuration element, set the primary cursor (12.5 of FIG. 12) to zeros, copy the address in general register 1 into the primary response-list address field (12.3), and direct the host adapter to present completion messages via the response list method by setting the state byte (12.2) to value X'01'. Operations 3960 are performed when sequence branch 3950 determines that the adapter is presently directed to present messages by the interruption method because no primary response list has been specified.

Other operations in the sequence of FIG. 70 are as follows: operations 3980 transfer the count value in general register 2 into the alternate length register (12.8 of FIG. 12) and the address value in general register 1 into the alternate response-list address slot (12.4) when sequence branch 3970 deternes that such alternate values are not presently specified; operations 3990 set condition code value 1 when both primary and alternate values have already been specified; and operations 4000 reset the state lock (12.1 of FIG. 12) and connect the CPU firmware to the routine that begins execution of the next sequential instruction.

16. Subsystem Adapter Organization a. Overview

The subsystem adapter comprises a plurality of adapter engines which operate concurrently on portions of different adapter tasks (i.e. receptions of host messages, presentations of received messages to subsystem CPU's and supervisory programs, data exchanges with host system adapters, and transfers of subsystem messages to host system adapters). Each subsystem task is partitioned into discrete portions which can be performed in piecemeal fashion by different adapter engines; i.e. by whichever engine happens to be available when a task portion becomes ready to be performed. The partitioning of tasks and the assignments of task portions are designed to maintain maximum productive activity on the aggregate of all links connected to the subsystem. Data block transfers are given special treatment. The individual data block transfers specified by a single command in a host request message are treated as discrete tasks (or subtasks) which may be concurrently performed. A special mechanism described herein provides this capability. The data blocks are transferred in association with control information which enables the host system to arrange them in host storage in the correct sequence.

The elements of a subsystem adapter engine are the same as those of a host adapter engine (FIGS. 25–27), with the exception that the work queue initiative latch (116 in FIG. 25) is replaced by a pair of similar latches, namely a data transfer work queue initiative (DWQI) latch and a message work queue initiative (MWQI) latch. These new work queue initiative latches are set and reset by signals conveyed through SIGA bus 117 which now consists of three lines.

The remainder of this paragraph describes those functions that differ for subsystem adapter engines as compared to host adapter engines. Areas of similarity are not described further herein.

b. Subsystem Adapter Engine Microinstructions

The microinstructions for subsystem adapter engines are the same as those described in paragraph 13d for host adapter engines with the exceptions listed in this paragraph.

Table 1' below lists the A array locations that differ from those in Table 1 of Paragraph 13d for subsystem adapter engines.

TABLE 1'

| Address In A Array | New Inputs To ALU A Side | |
|---|---|---|
| | Symbol | Represents |
| 14 | DLK | Location 14 in array 103 of FIG. 25 contains a buffer for the temporary storage of the address of data-transfer lock K (23.2 in FIG. 23) |
| 15 | DBLK | Location 15 in array 103 of FIG. 25 contains a buffer for the temporary storage of the address in adapter storage of data-transfer block K (21.2 in FIG. 21) |

Table 2' below lists the inputs to the ALU B side that differ from those of Table 2 of paragraph 13d for subsystem adapter engines.

TABLE 2'

New Inputs To ALU B Side For Subsystem Adapter Engines

| Micro-Order Code Value | Symbol | Represents |
|---|---|---|
| 8 | MOD | Location 8 in array 103 contains modulus value 235 (constant) |
| 11 | DAL | Location 11 in array 103 contains the address of the data-transfer work queue's adapter lock (18.12 of FIG. 18) |
| 12 | DF | Location 12 in array 103 contains the address of the data-transfer control register's occupancy bit (18.10 of FIG. 18) |
| 13 | DW0 | Location 13 in array 103 contains the address of data-transfer work queue element 0 (18.13 of FIG. 18) |
| 14 | MAL | Location 14 in array 103 contains the address of the message-transfer work queue's adapter lock (18.4 of FIG. 4) |
| 15 | MCR | Location 15 in array 103 contains the address of the message-transfer control register's CPU lock (18.3 of FIG. 4) |
| 17 | MCTL | Location 17 in array 103 contains the address of the message-transfer control halfword (18.6 in FIG. 18) |
| 18 | DCR | Location 18 in array 103 contains the address of the data-transfer control register (FIG. 23) |
| 19 | LK | Location 19 in array 103 contains the link control buffer address of the K byte (268) |
| 25 | LSI | Location 25 in array 103 contains the link control buffer address of the subchannel identifier (264) |
| 26 | LCT | Location 26 in array 103 contains the address in the link controller buffer in which the read-write flags are stored (262) |
| 27 | LCB | Location 27 in array 103 contains the address in the link controller buffer in which the command byte is stored (258) |

*NOTE:
Code values 32, 36, 38, 40, 46, 48 in the B-input micro-orders have significance for subsystem adapter engines as follows:
32 - (symbol REM) the address (0) of the free buffer list's removal lock (19.3 of FIG. 19)
36 - (symbol SEQ) the address (4) of the sequence number (19.3 of FIG. 19) of the free buffer list
38 - (symbol REMC) the address (6) of the removal cursor (19.1 of FIG. 19) of the free buffer list
40 - (symbol RET) the address (8) of thereturn lock (19.4 of FIG. 19) of the free buffer list
46 - (symbol RETC) the address (14) of the return cursor (19.5 of FIG. 19) of the free buffer list
48 - (symbol FE0) the address (16) of free element 0 (19.2 of FIG. 19) of the free buffer list Table 6' below lists the signals to "external" media which differ for subsystem adapter engines from those of Table 6.

TABLE 6'

New Extended Micro-order For Subsystem Adapter Engines

| Order Code Value | Symbol | Represents |
|---|---|---|
| 6 | RMWQI | Specifies reset signalling to all message transfer work queue initiative latches |
| 7 | SMWQI | Specifies set signalling to all message transfer work queue initiative latches |
| 14 | RDWQI | Specifies reset signalling to all data-transfer work queue initiative latches |
| 15 | SDWQI | Specifies set signalling to all data-transfer work queue initiative latches |

Tables 7' and 8' show the A test and B test micro-orders for subsystem adapter engines.

TABLE 7'

| Order Code Value | Symbol | Represents |
|---|---|---|
| 0 | 0 | First address bit is 0 |
| 1 | 1 | First address bit is 1 |
| 2 | DWQI | First address bit is 1 or 0 if data-transfer work queue initiative latch 116 is respectively set or reset |
| 3 | | Not used |
| 4 | Y4 | First address bit is 1 or 0 if Y4 latch is respectively set or reset |
| 5 | AL0 | First address bit is 1 or 0 if ALU output bit 0 is respectively 1 or 0 |
| 6 | Y6 | First address bit is 1 or 0 if Y6 latch is respectively set or reset |
| 7 | AL15 | First address bit is 1 or 0 if ALU output bit 15 is respectively 1 or 0 |

TABLE 8'

| Order Code Value | Symbol | Represents |
|---|---|---|
| 0 | 0 | Second address bit is 0 |
| 1 | 1 | Second address bit is 1 |
| 2 | ALZ | Second address bit is 1 if ALU result = 0 |
| 3 | MWQI | Second address bit is 1 if message-transfer work queue initiative latch is respectively set or reset |
| 4 | TC | Second address bit is 1 if carry latch is set |
| 5 | Y5 | Second address bit is 1 if Y5 latch is set |
| 6 | AL14 | Second address bit is 1 if ALU out bit 14 is 1 |
| 7 | Y7 | Second address bit is 1 if Y7 latch is set | c. Subsystem Adapter Engine Operations For Data-Transfer

Subsystem adapter engine operations for outgoing message transfers, incoming message reception, subchannel control space creation and dissolution, and interruption and response list processing are functionally analogous to those described for host adapters in Section 13 and therefore are not described further herein. Subsystem adapter operations for data-transfers are sufficiently unique to require further description. These operations are illustrated in FIGS. 71-90.

Figure 21A:
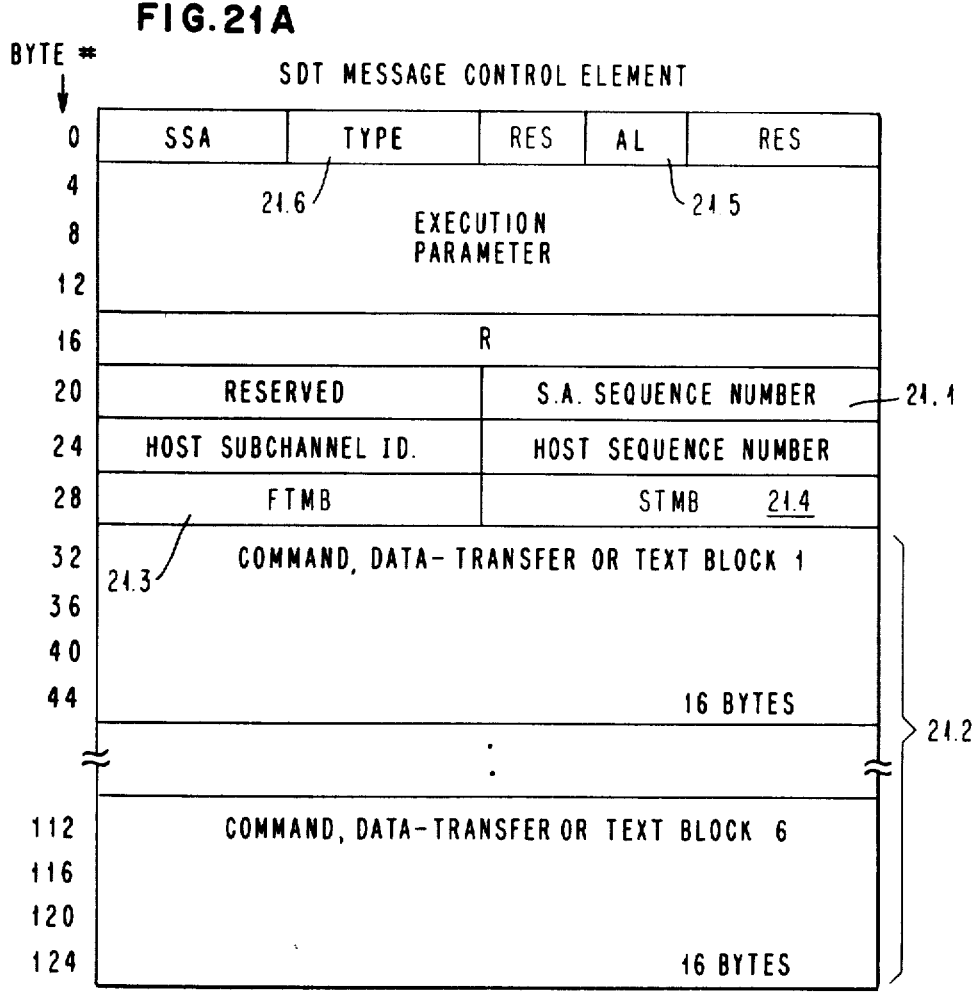
FIG. 21 shows the form of a message control element array portion of a subsystem adapter subchannel control space.

The operations of FIGS. 71-90 are performed by subsystem adapters when a subchannel control space containing control information and data-transfer information has been posted on the data-transfer work queue (FIG. 18B) by a CPU executing an SDT instruction as described in Section 11, supra. The subchannel control space consists of a message control element (FIG. 21A) and, optionally, first and second temporary message buffers (FIGS. 21B and 21C respectively). The buffer element number (20.1 of FIG. 20) of the message control element has been posted in a work queue element (18.11 of FIG. 18B) in the data-transfer work queue, and the buffer element numbers (20.1) of the first and second temporary message buffers appear in the first TMB and second TMB fields (21.3 and 21.4 of FIG. 21) of the message control element. Data-transfer block fields (21.2 of FIG. 21) contain data-transfer blocks (FIG. 17) copied from the "data-transfer array" in main storage (see Section 11).

Figure 71B:
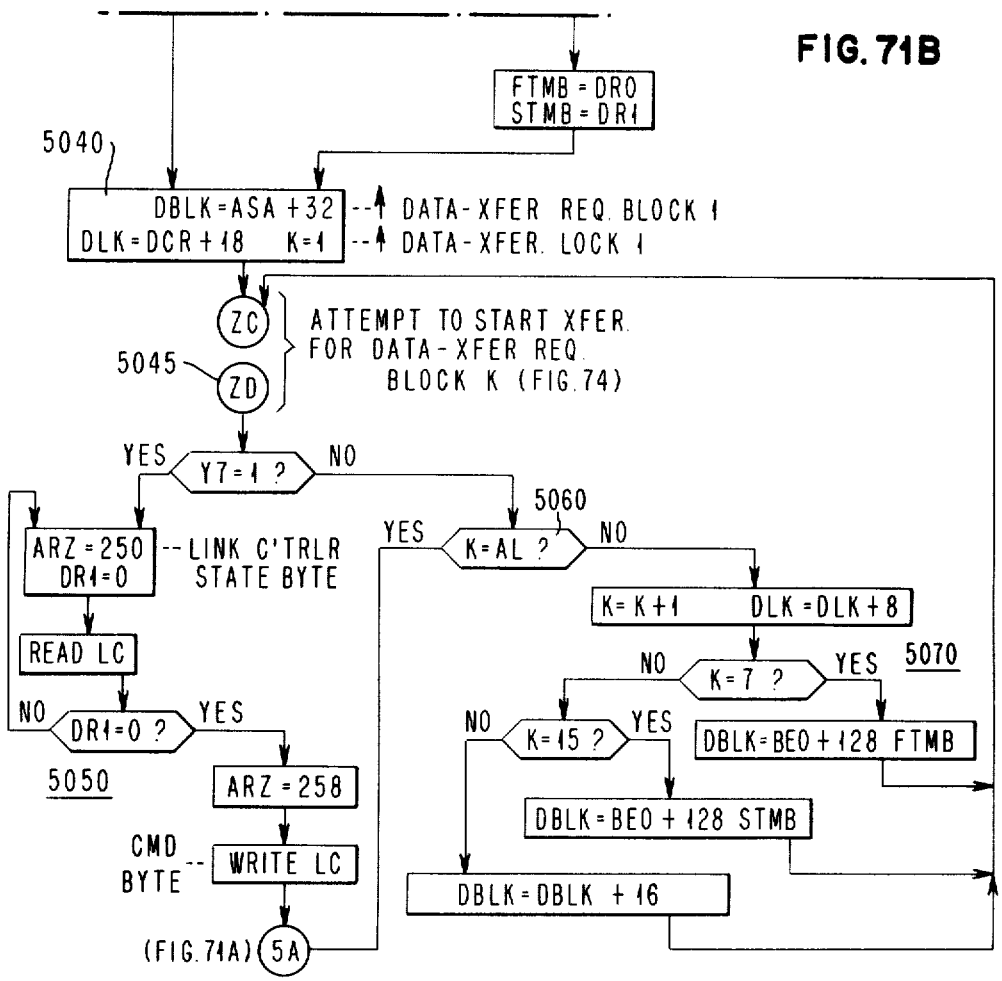
FIGS. 71–90 are schematic flow diagrams illustrating operations of subsystem adapter engines at the microinstruction level for processing transfers of data between the associated subsystem and one or more hosts.

The sequences of FIGS. 71-77 illustrate subsystem adapter engine operations for initiating data-transfers with host systems. The sequence of FIG. 71 is entered from the subsystem adapter's "work locating" sequence (not shown) via connector "Z". In said "work locating" sequence, the subsystem adapter's identifier is written into link lock J (24.1 of FIG. 24). The sequence of FIGS. 71-77, furthermore, connects back to the "work locating" sequence via connectors "SA". The subsystem adapter's "work locating" sequence is functionally analogous to the host adapter "work locating" sequence illustrated in FIG. 28 and described in Paragraph 13(e) supra.

In the sequence of FIG. 71, operations 5000 write the subsystem adapter's identifier into the data-transfer work queue's lock word (18.12 of FIG. 18) if its previous value was 0. Sequence branch 5005 connects to the data-transfer control register loading sequences of FIGS. 72-73 (via connector "ZA") if the register's occupancy bit (18.10 of FIG. 18B) indicates that said control register is not occupied. Operations 5010 obtain the AL value from the AL field of the data-transfer control register (23.3 of FIG. 23) and determine the address in adapter storage of the message control element (FIG. 21A) of the subchannel control space. Operations 5020 reset the data-transfer work queue's adapter lock (18.12 of FIG. 18). Operations 5030 obtain the buffer element numbers of the first and second temporary message buffer elements (FIGS. 21B and 21C) from the FTMB and STMB fields (21.3 and 21.4 of FIG. 21) of the message control element.

Further sequences of FIG. 71 attempt to initiate, in sequence, data block transfers associated with all data-transfer request blocks (FIG. 17) recorded in the subchannel control space (FIGS. 21A, 21B, 21C). That is, each data-transfer request block is scanned in the sequence of FIG. 71 and an attempt is made to initiate data-transfer for each in turn. In the remaining sequences of FIG. 71, operations 5040 initialize subsystem adapter engine registers and counters; including "index counter K", "data-transfer lock address" register DLK (23.2 FIG. 23), and "data-transfer request block address" register DBLK (21.2 of FIG. 21), so that the scan is started with data-transfer request block 1 (21.2 of FIG. 21). Then operations 5045 connect to the initiation sequences of FIG. 74-76 (via connector "ZC") thereby attempting an initiation of the data-block transfer associated with the data-transfer request block whose number is presently in "index counter K". The sequences of FIGS. 74-76 set status indicator Y7 (114 of FIG. 25) to 1 when link J is a link to the host system indicated in the SSA byte (17.1 of FIG. 17) of data-transfer block K and the link control buffers have been initialized in preparation for the data-transfer operations. In the sequence of FIG. 71 then, operations 5050 reset the link controller command byte for link controller J, and operations 5070 increment loop controls K, DLK, and DBLK when sequence branches 5045 and 5060 determine that data-transfer request block K was not newly started in the sequence of FIG. 74 and that further data-transfer request blocks remain to be processed.

Figure 72:
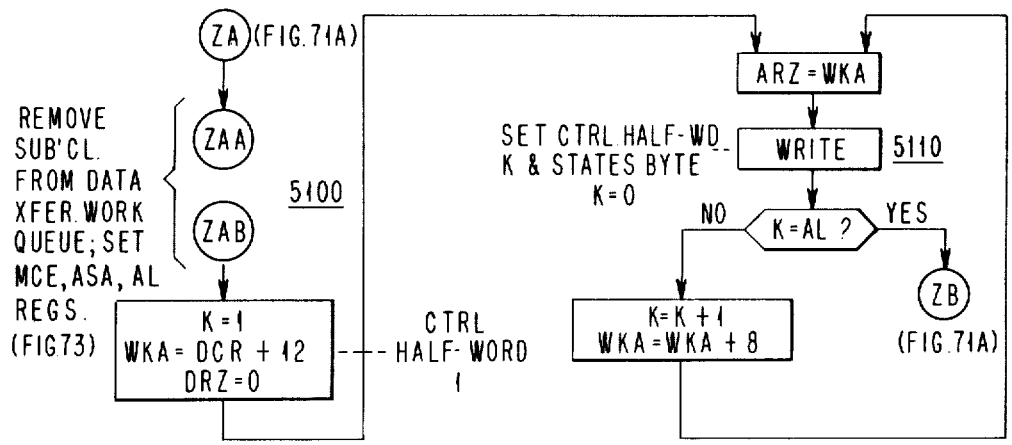

The data-transfer control register is shown in FIG. 23. The register contains, among other fields, a data-transfer lock (23.2), a control halfword (23.3), and a status byte (23.4) corresponding to each data-transfer request block (21.2 of FIG. 21) in the subchannel control space. The sequences of FIGS. 72-73 initialize the fields in the data-transfer control register. In the sequence of FIG. 72, operations 5100 connect to the sequence of FIG. 73 (via connector "FAA") in order to remove the subchannel control space from the data-transfer work queue (FIG. 18B) and operations 5110 reset the control halfwords (23.3 of FIG. 23) and status bytes (23.4 of FIG. 23) of the data-transfer control register. Connection is made back to the sequence of FIG. 71 via connector "ZB".

Figure 73:
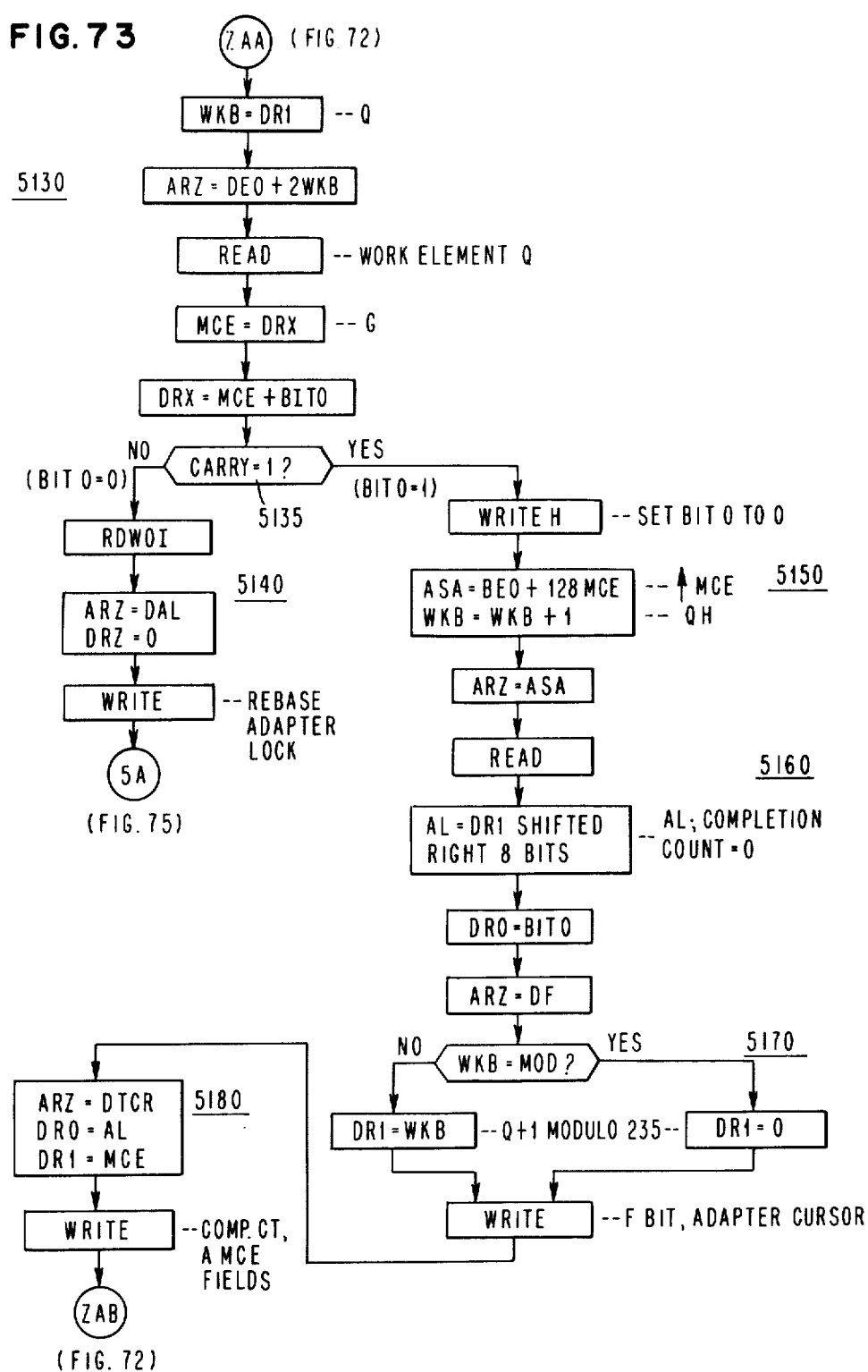

In the sequence of FIG. 73 (entered via connector "ZAA" from FIG. 72), operations 5130 determine the buffer element number (20.1 of FIG. 20) of the next message control element on the data-transfer work queue; operations 5140 signal to reset the data-transfer work queue initiative latches of all subsystem adapter engines if no such message control element resides on said queue; operations 5150 remove the message control element from the work queue; operations 5160 determine the number of data-transfer request blocks in the subchannel control space from the AL value (21.5 of FIG. 21) in the message control element; operations 5170 increment the adapter cursor (18.11 of FIG. 18) of the data-transfer control register, and operations set the AL value (23.3 of FIG. 23) and the MCE halfword (23.1 of FIG. 23) of the data-transfer control register. Connection is made back to the sequence of FIG. 72 via connector "ZAB".

Figure 74:
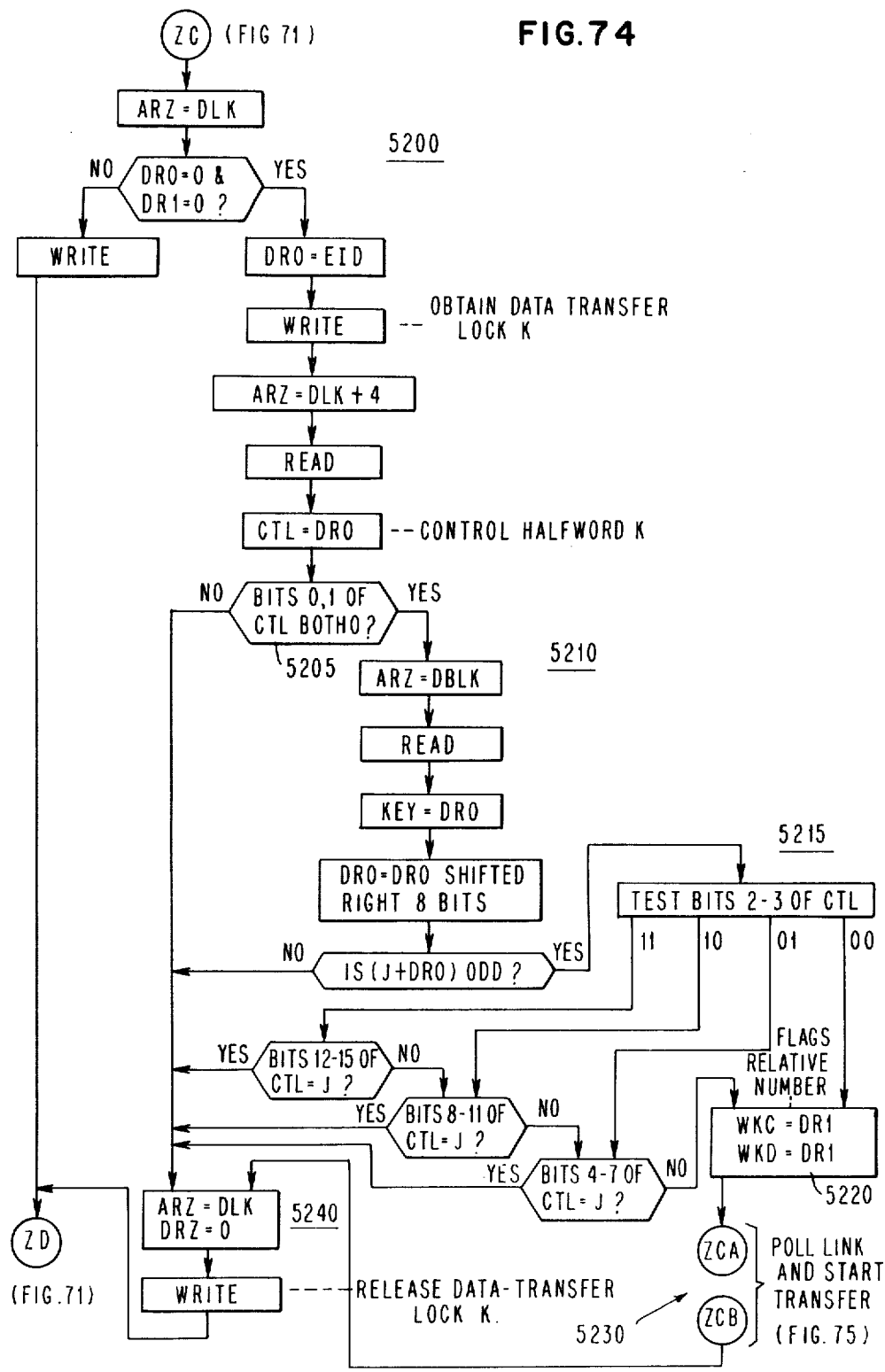
Figure 75:
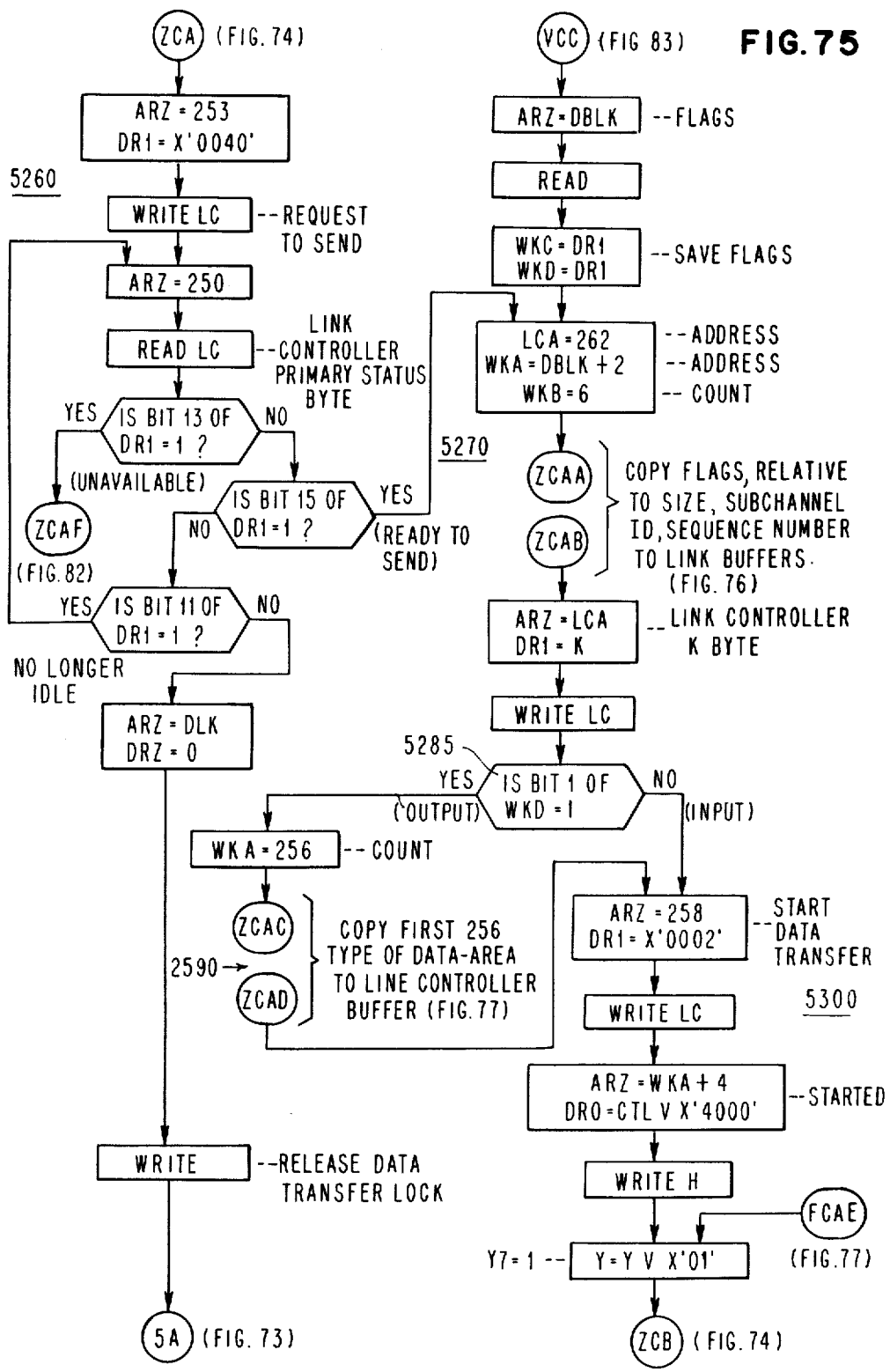
Figure 76:
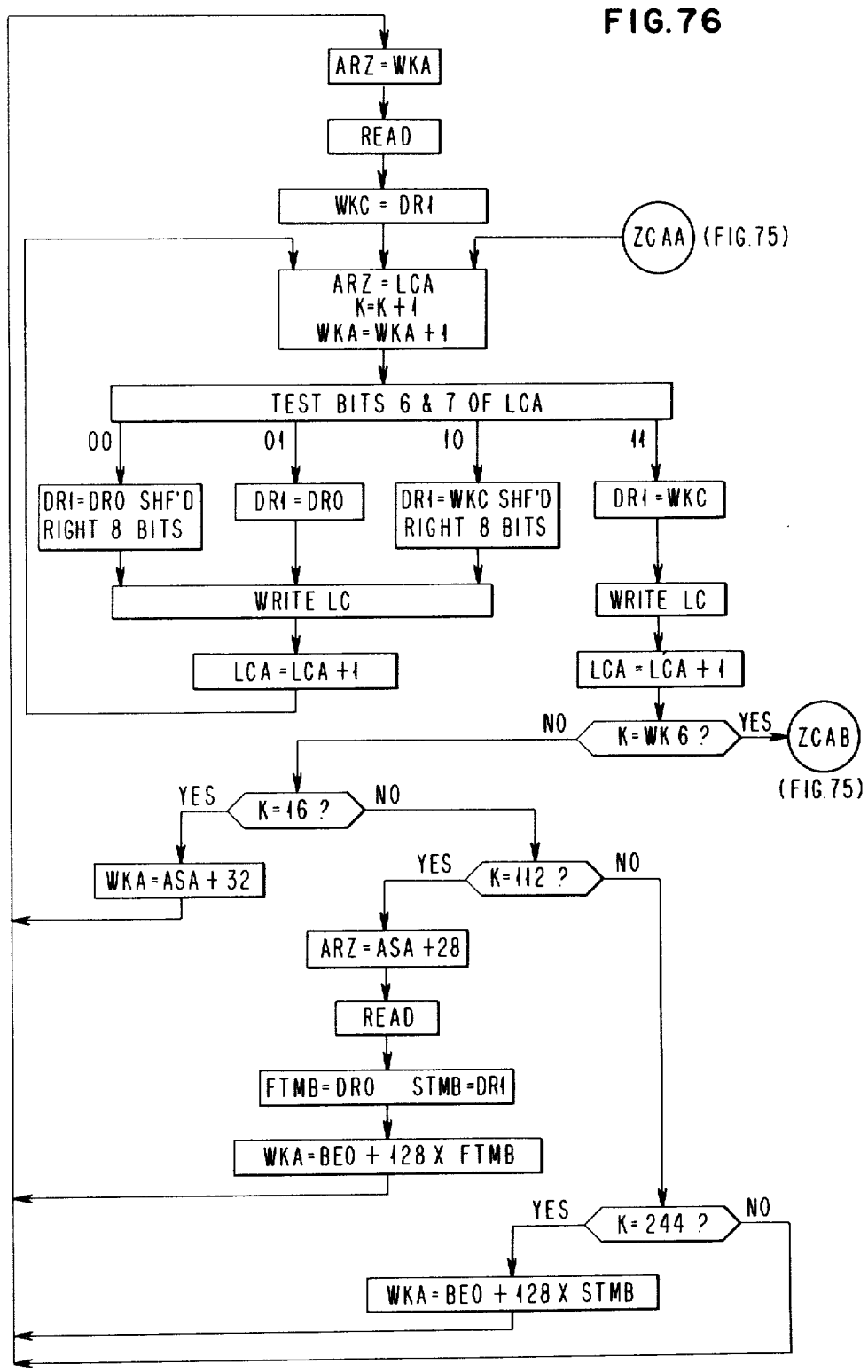

The sequences of FIGS. 74 - 76 attempt to initiate the data-block transfer associated with data-transfer request block K (where K is the value in "index counter K"). The sequence of FIG. 74 is used by the sequence of FIG. 71 via connector "ZC". In the sequence of FIG. 74, operations 5200 write the adapter's identifier into data-transfer lock K (23.2 of FIG. 23) if the value is presently 0; operations 5210 and 5220 obtain the storage protection key value (17.2 of FIG. 17), the flags (17.3 of FIG. 17), and the relative data-transfer unit number (17.4 of FIG. 17) from data-transfer request block K if control halfword K (23.3 of FIG. 23) indicates that the associated data-block transfer remains to be initiated; operations 5230 connect to the further initiation sequences of FIGS. 75-76 via connector "ZCA", and operations 6240 reset data-transfer lock K (23.2 of FIG. 23). Connection is made back to the sequence of FIG. 71 via connector "ZD".

Within the sequence of FIG. 74, sequence branches 5215 and 5205 test control halfword K (23.3 of FIG. 23) in order to determine whether or not to attempt to start data-transfer block K via link J. The 16 bits of control halfword K are assigned the following meanings:

| | |
|---|---|
| 0-1 | A field indicating the state of the transmission process for the transfer unit associated, via the corresponding data-transfer request block in the subchannel control space, with this control half-word: |
| 00 | Not started or suspended |
| 01 | Started |
| 10 | Successfully completed |
| 11 | Unsuccessfully completed |
| 2-3 | A transfer count indicating the number of attempts made to transfer the unit that were unsuccessful. |
| 4-7 | The link number of the first link used in an attempt to transfer the unit that was unsuccessful because of link-level errors. This field is valid if the transfer count is 1, 2, or 3. |
| 8-11 | The link number of the second link used in an attempt to transfer the unit that was unsuccessful because of link-level errors. This field is valid if the transfer count is 2 or 3. |
| 12-15 | The link number of the third link used in an attempt to transfer the unit that was unsuccessful because of link-level errors. This field is valid if the transfer count is 3. |

Connection is made to the further initiation sequences of FIGS. 75-76 from FIG. 74 via connector "ZCE". In the sequence of FIG. 75, operations 5260 analyze the link controller's primary status byte to determine if link controller J is "ready to send"; operations 5270 connect to the sequence of FIG. 76 via connector "ZCAA" in order to transfer information from the data-transfer control register to the link buffers for link controller J; operations 5290 connect to the sequence of FIG. 77 via connector "ZCAC" in order to transfer the first 256 bytes of data from subsystem main storage to the link buffers if sequence branch 5285 determines that data-transfer request block K requests an output data transfer from the subsystem to a host, and operations 5300 signal the link controller to start the data transfer and set status indicator Y7 (114 of FIG. 25). Connection is made back to the sequence of FIG. 74 via connector "ZCB", and to the sequence of FIG. 76 via connector "ZCAA".

In the sequence of FIG. 76, the following values are transferred from data-transfer request block K (FIG. 17) to the buffers of link controller J: flags (17.3), relative transfer unit number (17.4), subchannel identifier (17.5), and sequence number (17.6). Connection is made back to the sequence of FIG. 75 via connector "ZCAB".

Figure 77:
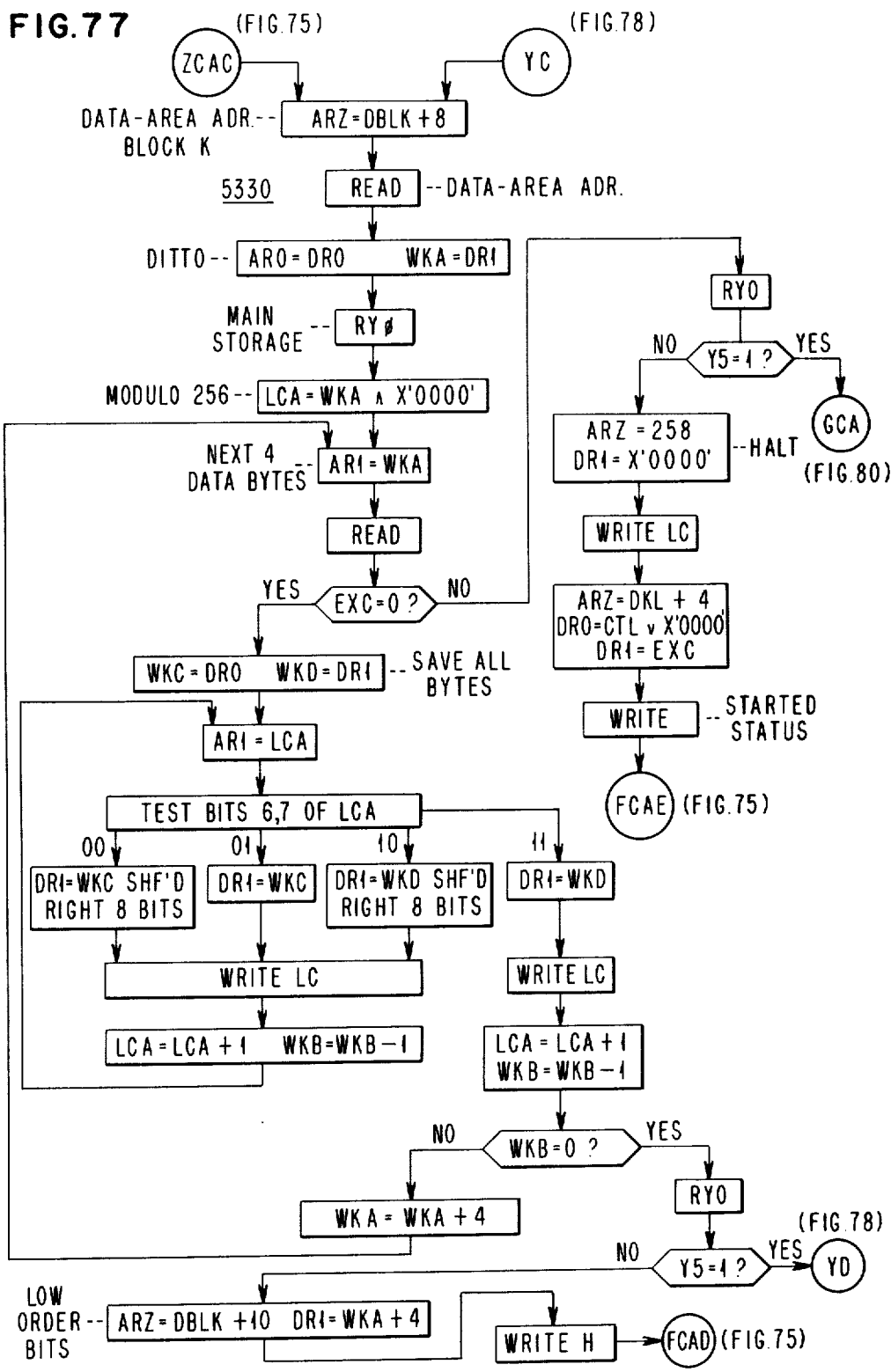
Figure 78:
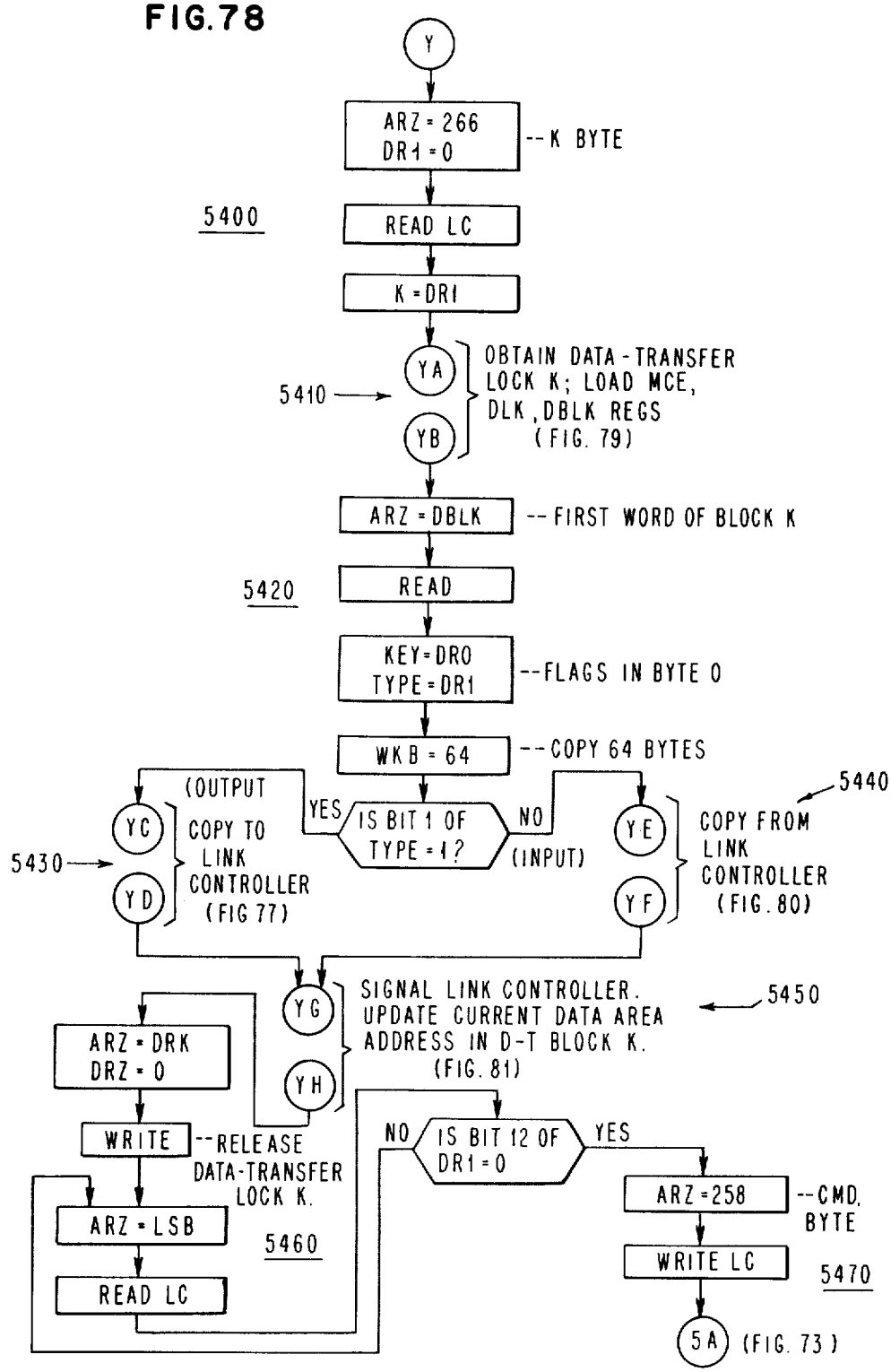

Connection is made to the sequence of FIG. 77 from the sequence of FIG. 75 via connector "ZCAC" and from the sequence of FIG. 78 via connector "YC". The sequence of FIG. 77 transfers either 64 bytes of data (entry via "ZCAC") or 256 bytes of data (entry via "ZCAC") from subsystem main storage to the buffer of link controller J. The main storage address is determined via data-transfer request block K (21.2 of FIG. 21) in the subchannel control space by operations 5330. The remainder of the sequence of FIG. 77 is functionally analogous to the sequence of FIG. 49 which is described in Paragraph 13(g).

The sequences of FIGS. 78-81 illustrate subsystem adapter operations for sustaining data-block transfers by servicing link controller requests for the transfer of further 64-byte sub-blocks of the 2,048-byte or 4,096-byte data-block transfer initiated in the sequences of FIGS. 71-77. The sequence of FIG. 78 is entered from the subsystem adapter's "work seeking" sequence (not shown) via connector "Y". In association with said "work seeking" sequence the adapter engine's identity is written into link lock J (24.1 of FIG. 24), link J is selected for communication by the engine, and the primary status byte of link controller J indicates "data for link J controller buffer request pending".

Figure 79:
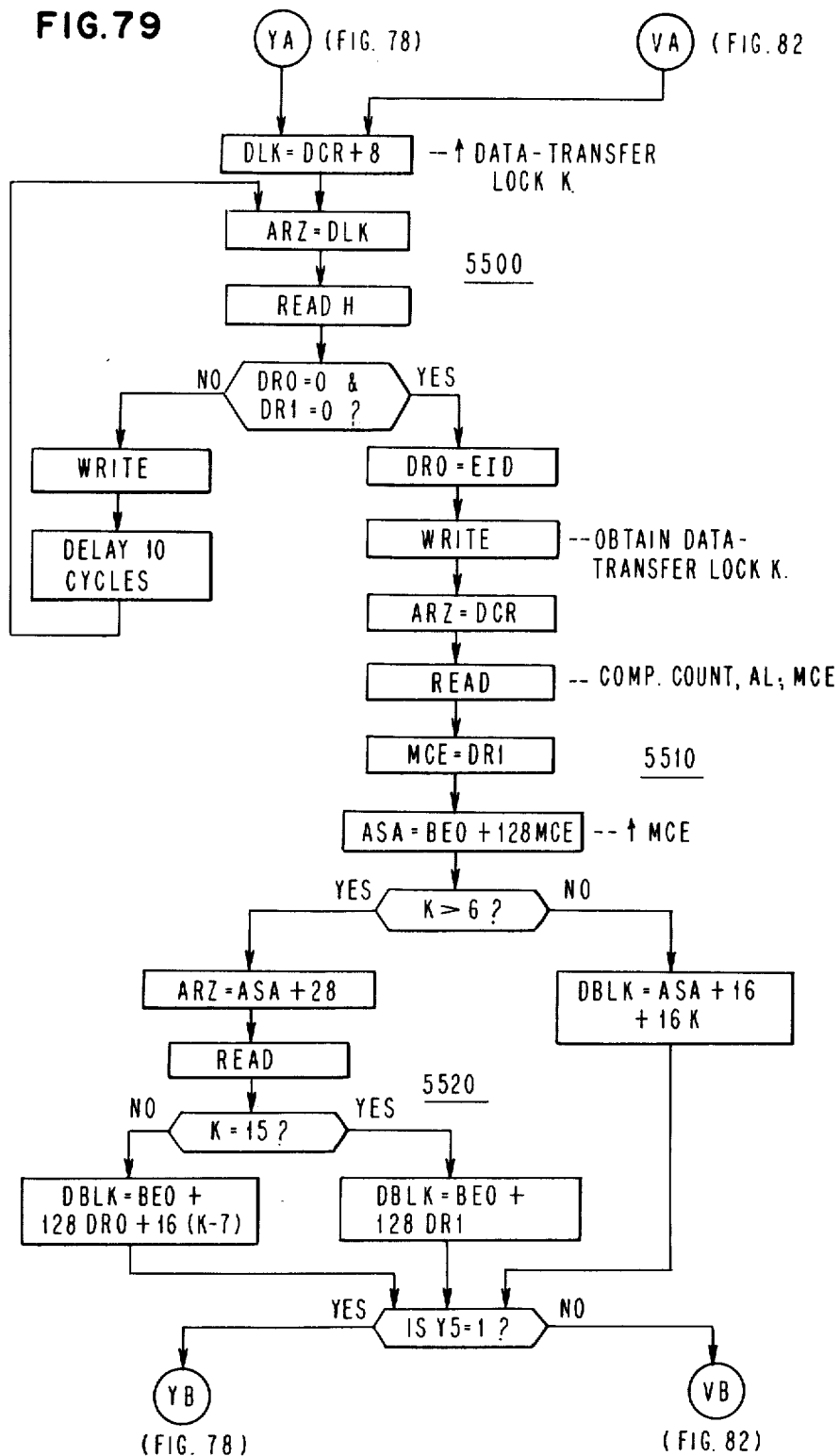
Figure 80:
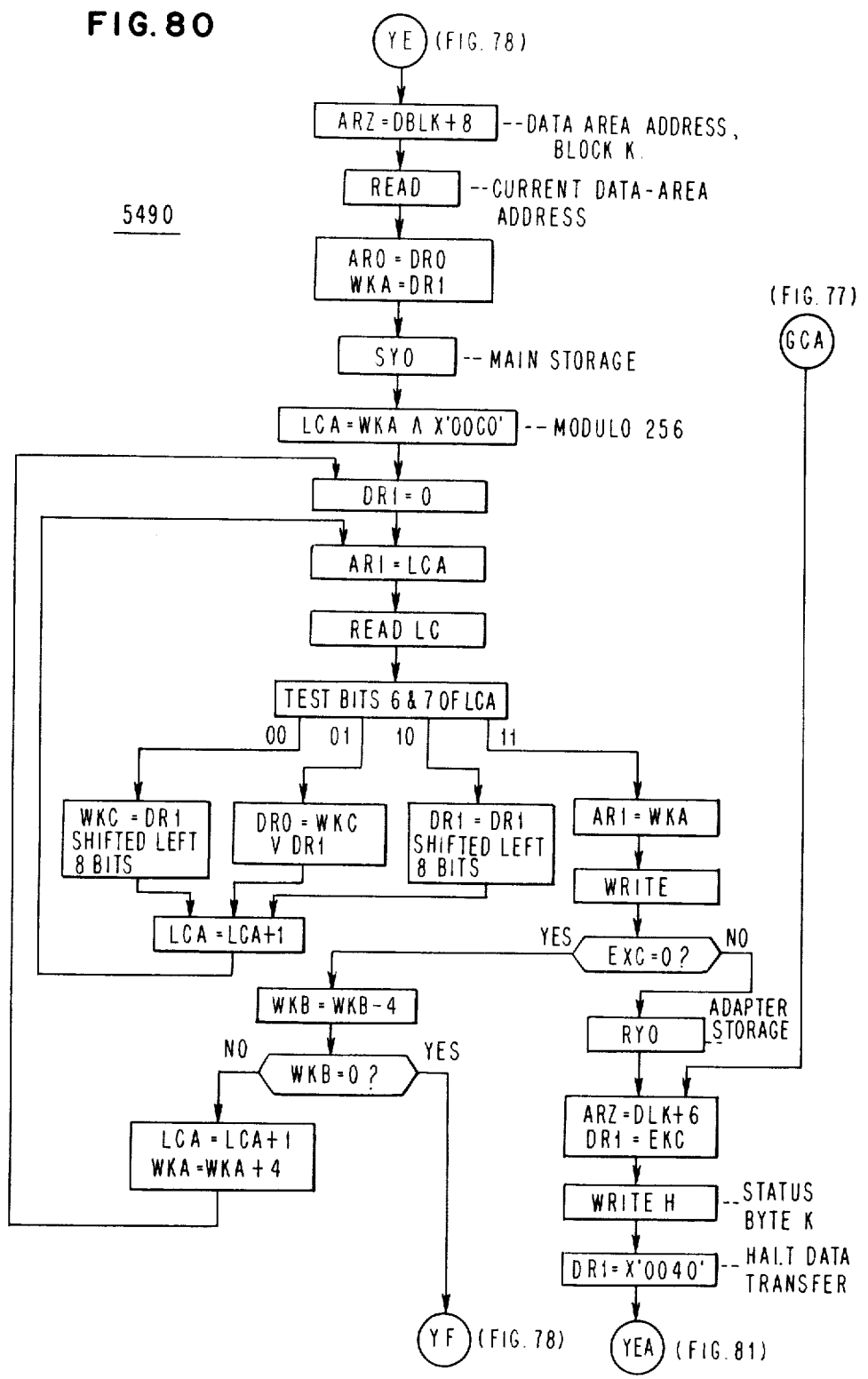
Figure 81:
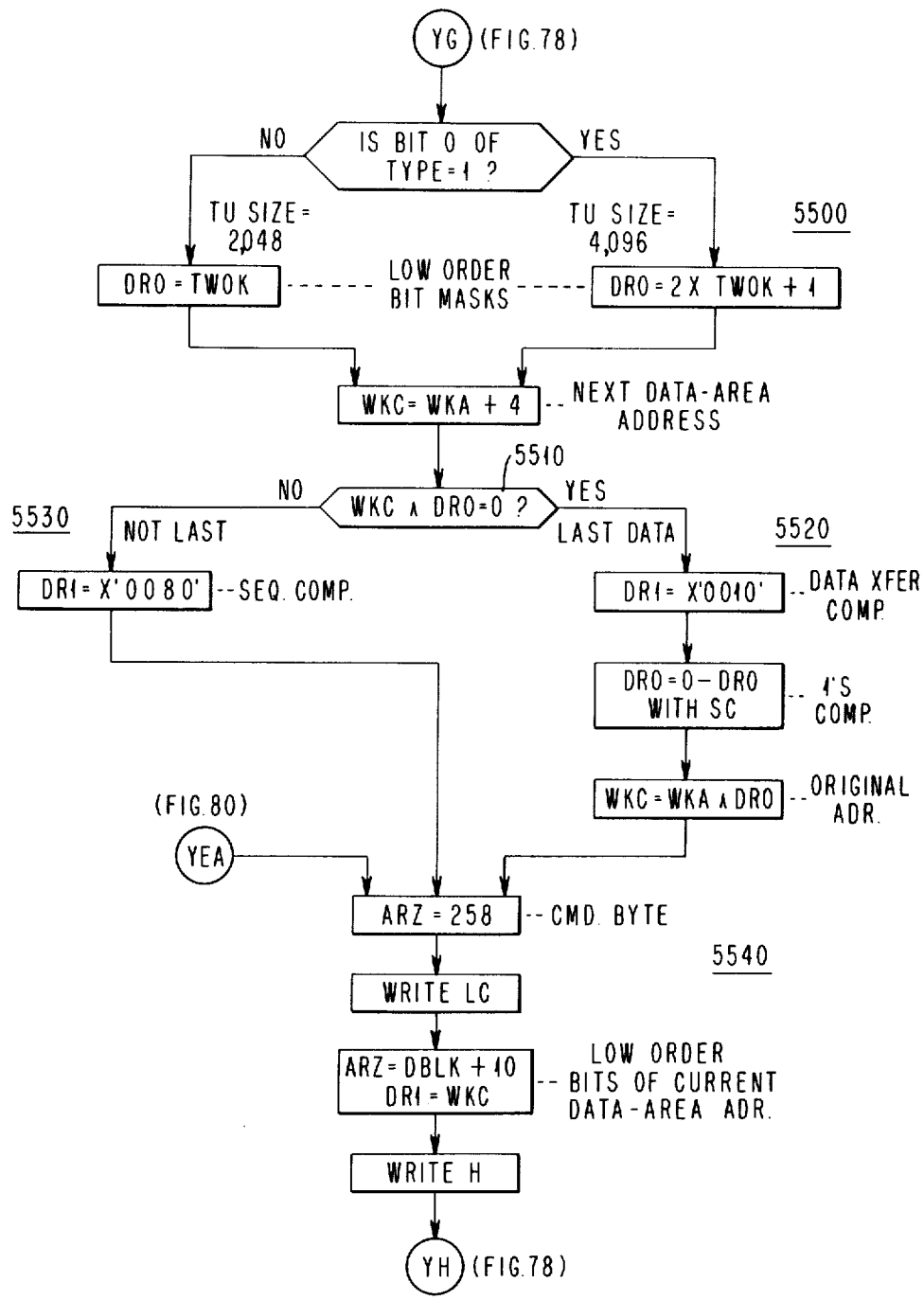

In the intermediate data-transfer sequence of FIG. 78, operations 5400 determine the "index value K" in the subchannel control space (21.2 of FIG. 21) of the data-transfer request block (FIG. 17) associated with the data-transfer operations initiated via FIGS. 71-77 on link J, operations 5410 connect to the sequences of FIG. 79 via connector "YA" in order to initialize counters and registers to support the transfer of 64 bytes of data between subsystem main storage and the link buffers, operations 5420 determine the protection key value (17.2 of FIG. 17) for the transfer; operations 5430 connect to the sequence of FIG. 77 via connector "YC" when the transfer is an output transfer from subsystem main storage to a host; operations 5440 connect to the sequence of FIG. 80 via connector "YE" when the transfer is an input operation from a host to subsystem main storage; operations 5450 connect to the link controller signalling sequence of FIG. 81 via connector "YG"; operations 5460 reset data-transfer lock K (23.2 of FIG. 23), and operations 5470 reset the link controller command byte and connect back to the adapter engine "work seeking" sequence (not shown).

Figure 82:
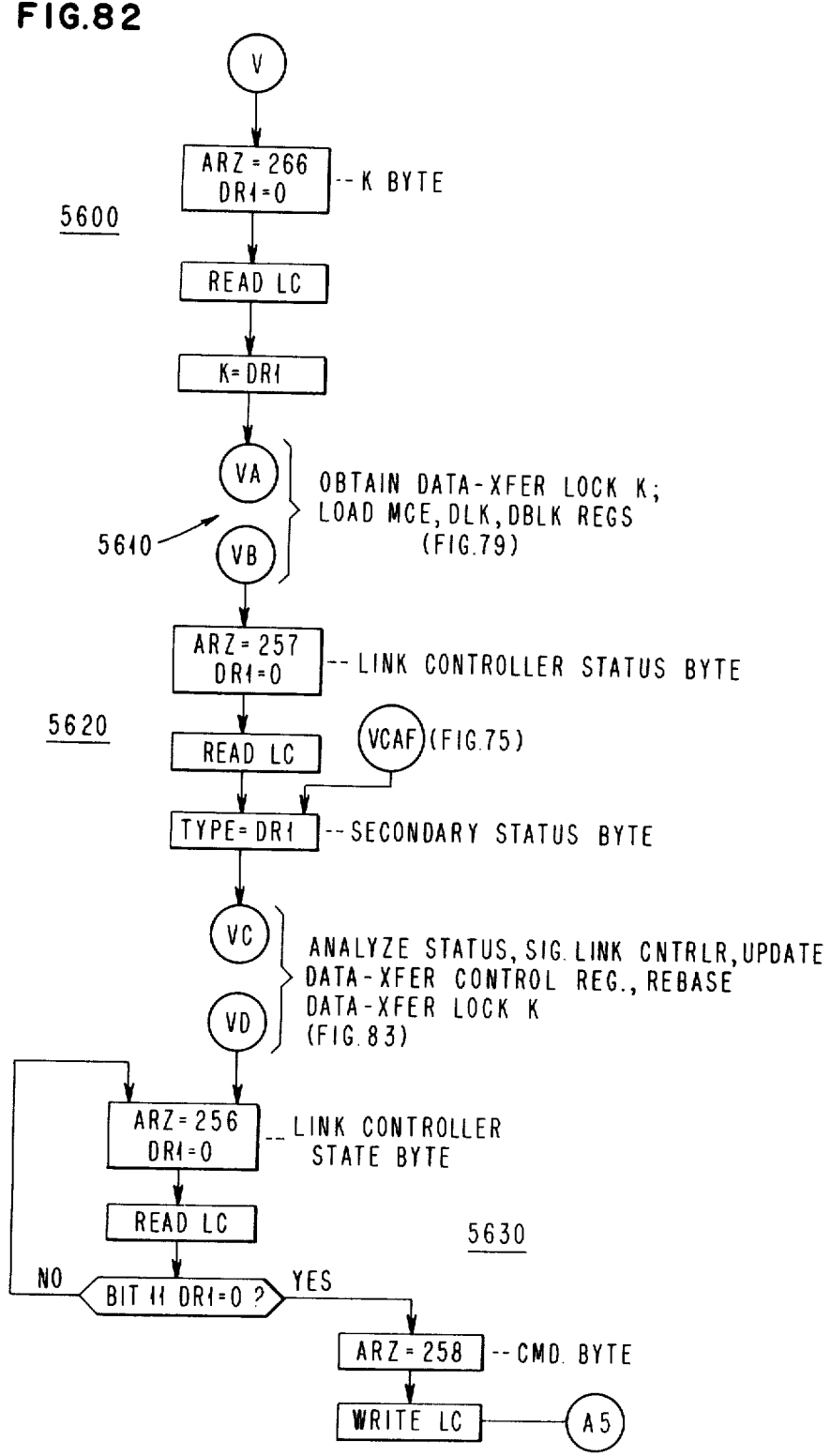

The register-initialization sequence of FIG. 79 is used by the intermediate data-transfer sequence of FIG. 78 via connector "YA" and the sequence of FIG. 82 via connector "VA". In the sequence of FIG. 79, operations 5500 write the adapter engine's identifier in data-transfer lock word K (23.2 of FIG. 23), where K is the value in "index value K", when the value of the lock word is or becomes 0; and operations 5510 set the "data-transfer request block" address register DBLK via the "index value K" and values in the message control element (FIG. 21). Connection is made back to the sequence of FIG. 78 via connector "YB" or the sequence of FIG. 87 via connector "VB".

Connection is made to the input copy sequence of FIG. 80 from the sequence of FIG. 78 via connector "YE". The sequence of FIG. 80 transfers 64 bytes of data from the buffer of link controller J to subsystem main storage. The main storage address is determined via data-transfer request block K (21.2 of FIG. 21) in the subchannel control space by operations 5490. The remainder of the sequence of FIG. 80 is functionally analogous to the sequence of FIG. 49 which is described in Paragraph 13(g), and is not described further herein.

Connection is made to the link controller signalling sequence of FIG. 81 from the intermediate data-transfer sequence of FIG. 78 via connector "YG". In the sequence of FIG. 81, operations 5500 set up bit masks appropriate to data-transfer unit sizes of 2,048 or 4,096 bytes; sequence branch 5510 uses the mask to determine if the last sub-block of 64 bytes has been transferred between subsystem main storage and link buffer J; operations 5530 generate the link controller command byte that indicates the full 2,048 or 4,096 byte block transfer is not yet complete; operations 5520 generate the link controller command byte that indicates the full 2,048 or 4,096 byte block transfer is complete; and operations 5540 transfer the command byte to the link controller and place the incremented data-area address (17.7 in FIG. 7) in data-transfer request block K within the subchannel control space (21.2 of FIG. 21). Connection is made back to the sequence of FIG. 78 via connector "YH".

The sequences of FIGS. 82–90 illustrate subsystem adapter operations for the completion of the data-block transfers that were initiated in the sequences of FIGS. 71–77 and given intermediate service in the sequences of FIGS. 78–81. The sequence of FIG. 82 is entered via connector "U" from the adapter's "work seeking" sequence (not shown). In said sequence, the adapter engine's identity has been written into link lock J (24.1 of FIG. 24), link controller J has been selected for communication by the adapter engine, and the primary status byte of the link controller indicates that "data-transfer on link J is complete".

Figure 83:
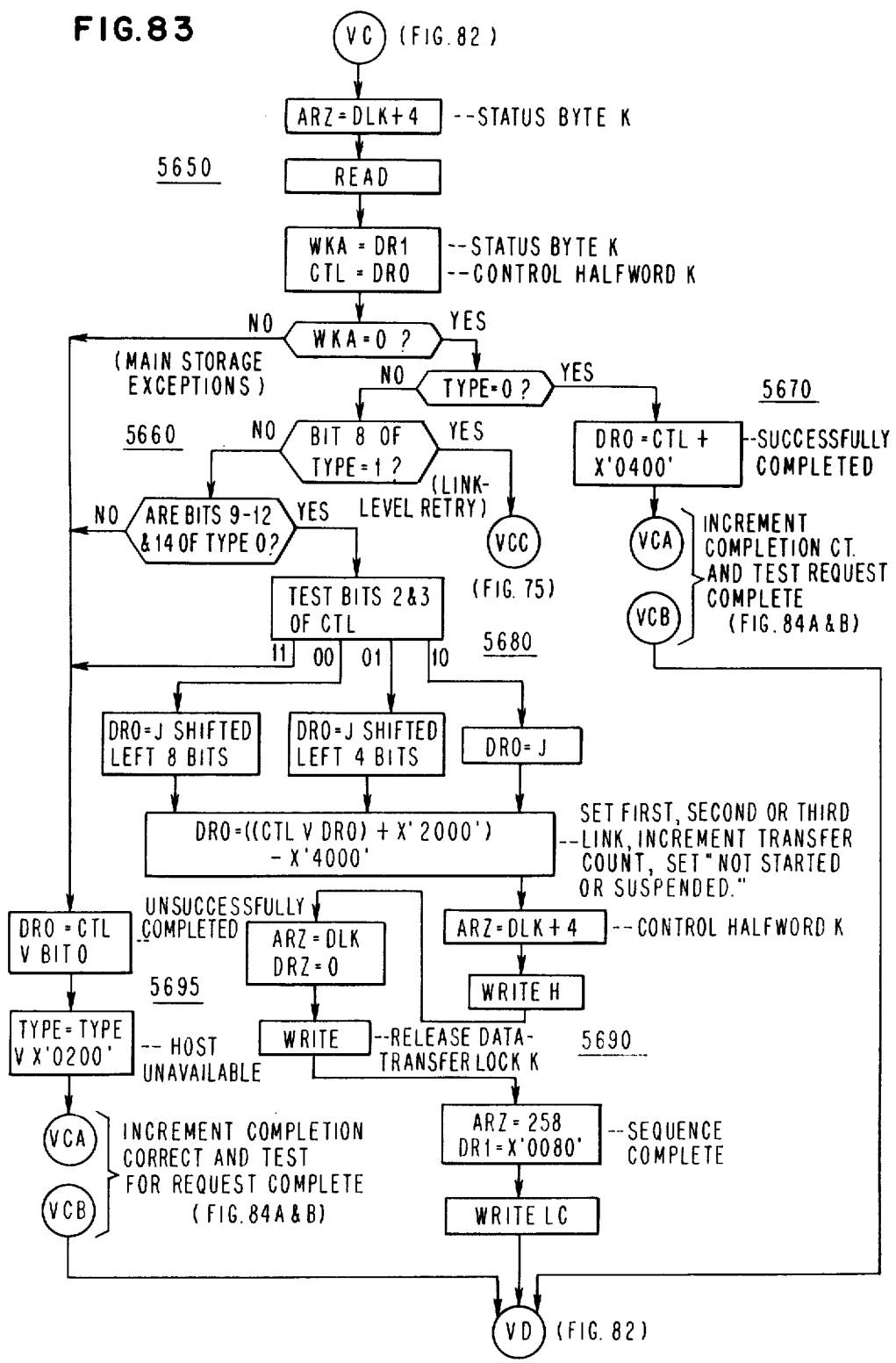

In the completion sequence of FIG. 82, operations 5600 and 5610 are identical to operations 5400 and 5410 of FIG. 78 described previously in Paragraph 13(c); operations 5620 obtain the link controller's secondary status byte and link to the sequence of FIG. 83 via connector "VC" in order to analyze the bit indicators in the status byte, and operations 5630 reset the command byte in the link controller buffer. Connection is made back to the "work seeking" sequence via connector "AS".

Connection is made to the status analysis sequence of FIG. 83 from the completion sequence of FIG. 82 via connector "VC". In the sequence of FIG. 83, operations 5650 transfer the following values from the data-transfer control register (FIG. 23) to adapter engine registers: control half-word K (23.3) and status byte K (23.4). Status byte K is non-zero only if storage protection or other storage exceptions have been detected during the sequences of FIGS. 71–90. Operations 5660 test status byte K and the link controller secondary status byte for the occurrence of exception conditions that preclude a successful retry of the data-block transfer; when such exceptions are detected, operations 5695 set bits in control halfword K (23.3 of FIG. 23) of the data-transfer control register to indicate such status and link to the completion-count incrementing sequence of FIG. 84 via connector "VCA".

When exception conditions that do not preclude successful retry are detected by operations 5660 of FIG. 83, operations 5680 write the link number J into the control half-word (23.3 of FIG. 23) of the data-transfer control register, set bits in the control halfword to indicate that the transfer for data-transfer request block K has been "suspended" pending selection of another link to the host, reset data-transfer lock K (23.2 of FIG. 23), and transfer the command word indicating "sequence complete" to link controller J.

Figures 84, 84A:
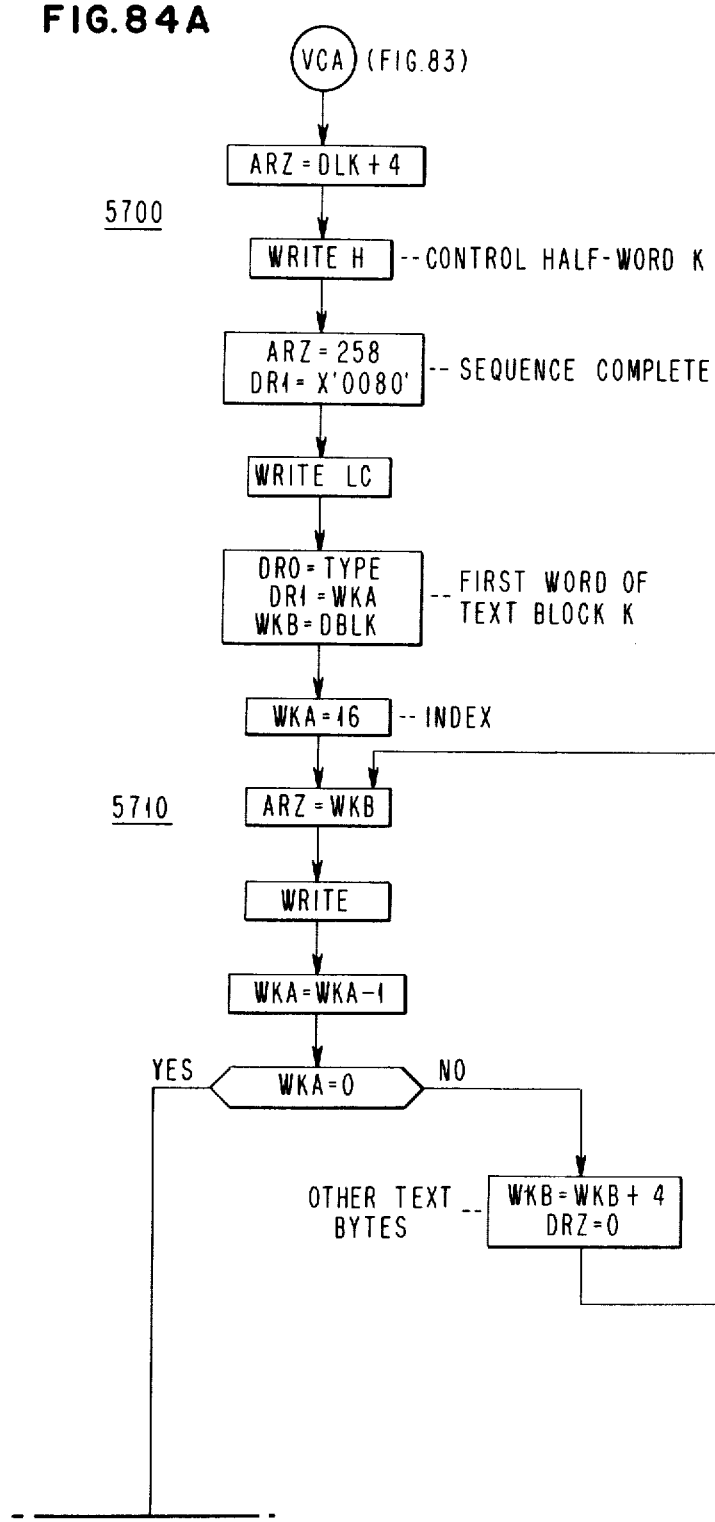
Figure 84B:
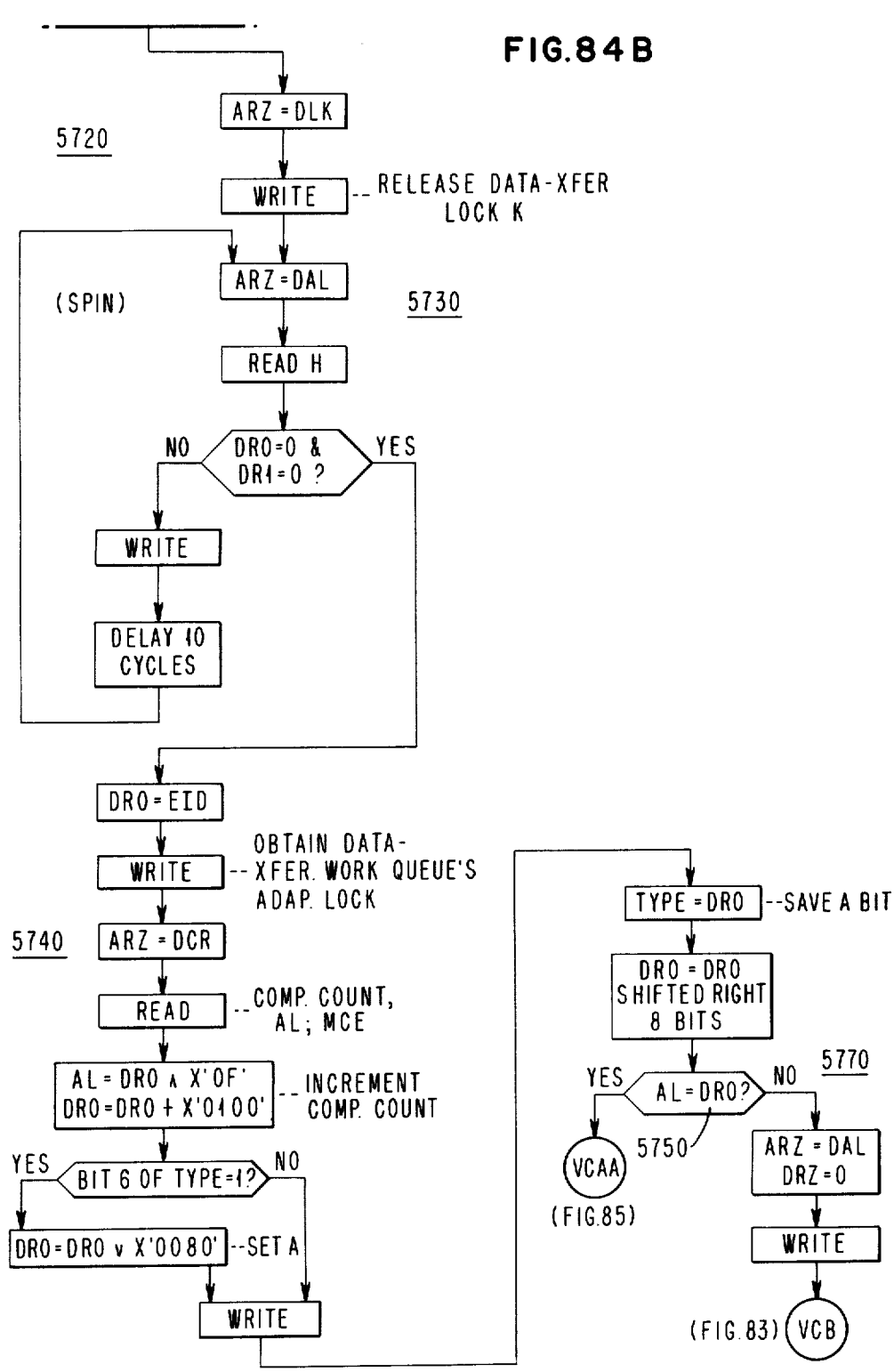

When no exception conditions are detected by operations 5660 of FIG. 83, operations 5670 set "successfully completed" indicator bits in control halfword K (23.3 of FIG. 23) and link to the completion-count incrementing sequence of FIG. 84 via connector "VCA".

Connection is made to the completion-count incrementing sequence of FIG. 84 from the status analysis sequence of FIG. 83 via connector "VCA". In the sequence of FIG. 84, operations 5700 transfer the "sequence complete" command byte to link controller J, and operations 5710 transfer completion status indicators to replace bytes 0–4 and zeroes to replace bytes 5–15 in data-transfer request block K (FIG. 17) in the subchannel control space; operations 5720 reset data-transfer lock K (23.2 of FIG. 23); operations 5730 write the adapter engine's identity into the data-transfer work queue's adapter lock (18.12 of FIG. 18) when the value in the lock is or becomes 0; operations 5740 increment the completion count value (23.5 in FIG. 23) in the data-transfer control register; operations 5770 reset the data-transfer work queue's adapter lock and connect back to the sequence of FIG. 83 via connector "VCB" when sequence branch 5750 determines that all data-transfer request blocks in the subchannel control space have not been completed; and operations 5760 link to the response-message generation sequence of FIG. 85 via connector "VCAA" when sequence branch 5750 determines that all data-transfer requests in the subchannel control space are complete.

Figure 85:
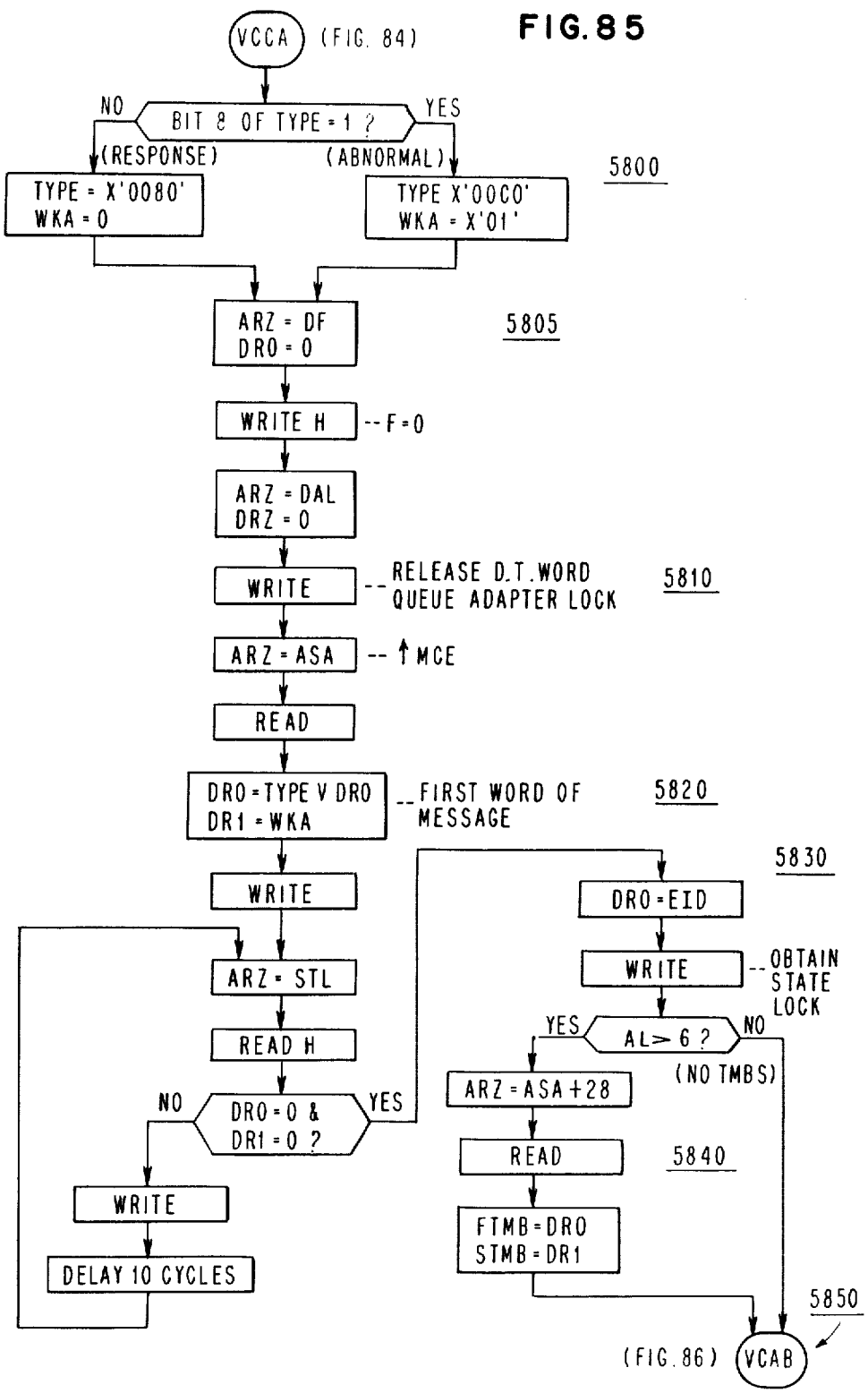

Connection is made to the response-message generation sequence of FIG. 85 from the sequence of FIG. 84 via connector "VCAA". The sequence of FIG. 85 alters bytes 0–3 of the message control element to transform it from a data-transfer request to a response message (note: prior to this operations 5710 of FIG. 84 for processing the several data-transfer request blocks have already transformed the data-transfer request blocks into text blocks for the response message). In the sequence of FIG. 85, operations 5800 generate a type value (21.6 in FIG. 21A) for a normal or abnormal response message; operations 5805 set the occupancy bit (18.10 of FIG. 18B) for the data-transfer control register to 0; operations 5810 reset the data-transfer work queue's adapter lock (18.11 of FIG. 18B); operations 5820 transfer the new byte to the type field (21.6 of FIG. 21) of the message control element; operations 5830 write the adapter engine's identifier into the configuration element's status lock (24.2 of FIG. 24) when the value in the lock word is or becomes 0; operations 5840 determine the buffer element numbers (20.1 of FIG. 20) of the first and second temporary message buffer elements (FIG. 21B and 21C) of the subchannel control space from the FTMB and STMB (21.3 and 21.4 of FIG. 21) of the message control element; and operations 5850 connect to the response-message presentation sequence of FIG. 86 via connector "VCAB".

Figure 86:
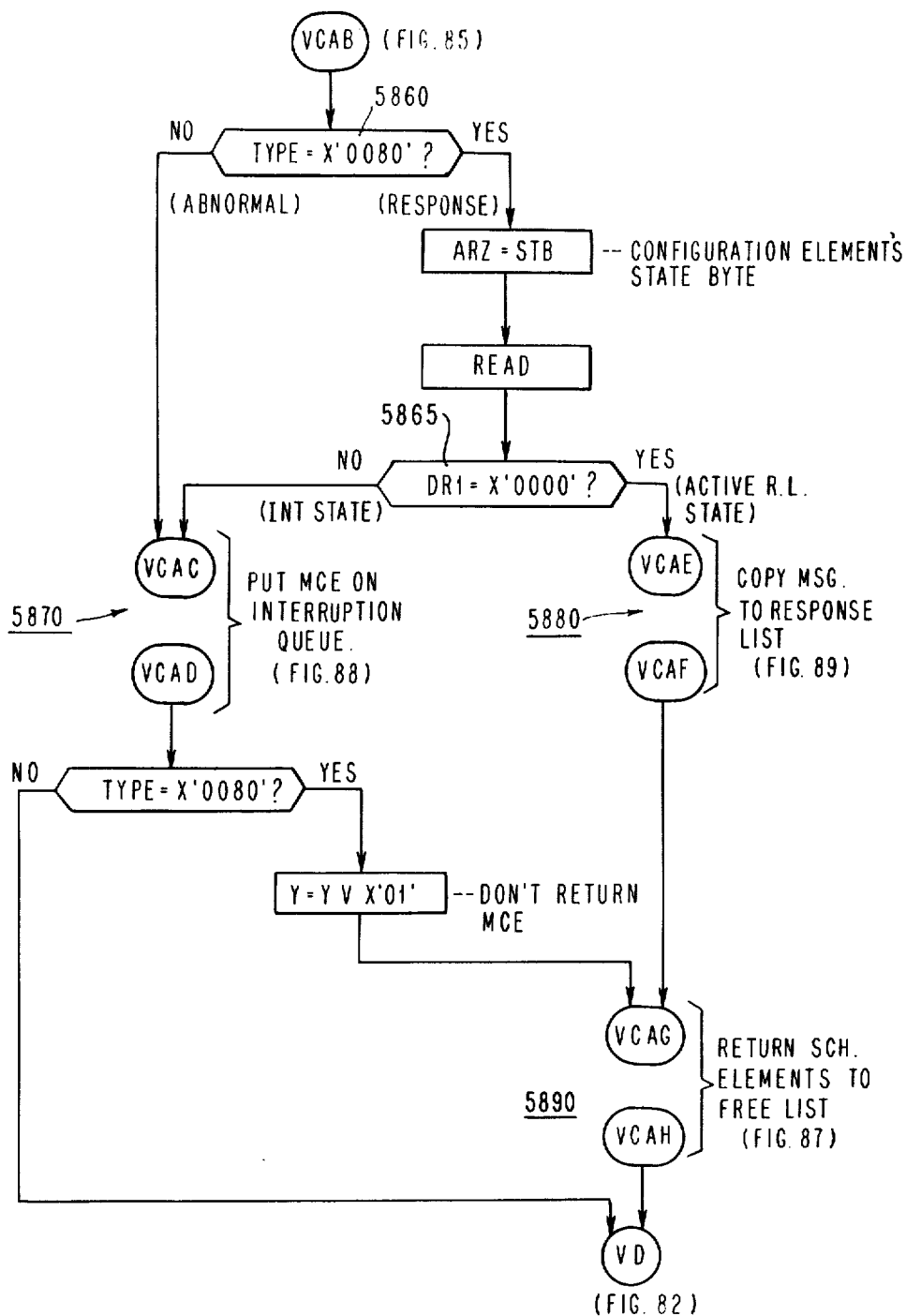

Connection is made to the response-message presentation sequence of FIG. 86 from the response-message generation sequence of FIG. 85 via connector "VCAB". In the sequence of FIG. 86, operations 5870 connect to the interruption-queue posting sequence of FIG. 88 via connector "VCAC" when sequence branch 5860 determines that the message is an abnormal response message or when sequence branch 5865 determines from the configuration element's state byte (24.3 of FIG. 24) that all response messages are to be presented via the interruption method; operations 5880 connect to the response-list posting sequence of FIGS. 89–90 via connector "VCAE", and operations 5890 connect to the subchannel dissolution sequence of FIG. 87 (via connector "VCAG") in order to return buffer elements of the subchannel control space to the free buffer list. The sequence of FIG. 86 connects back to the sequence of FIG. 82 via connector "VD".

Figure 87B:
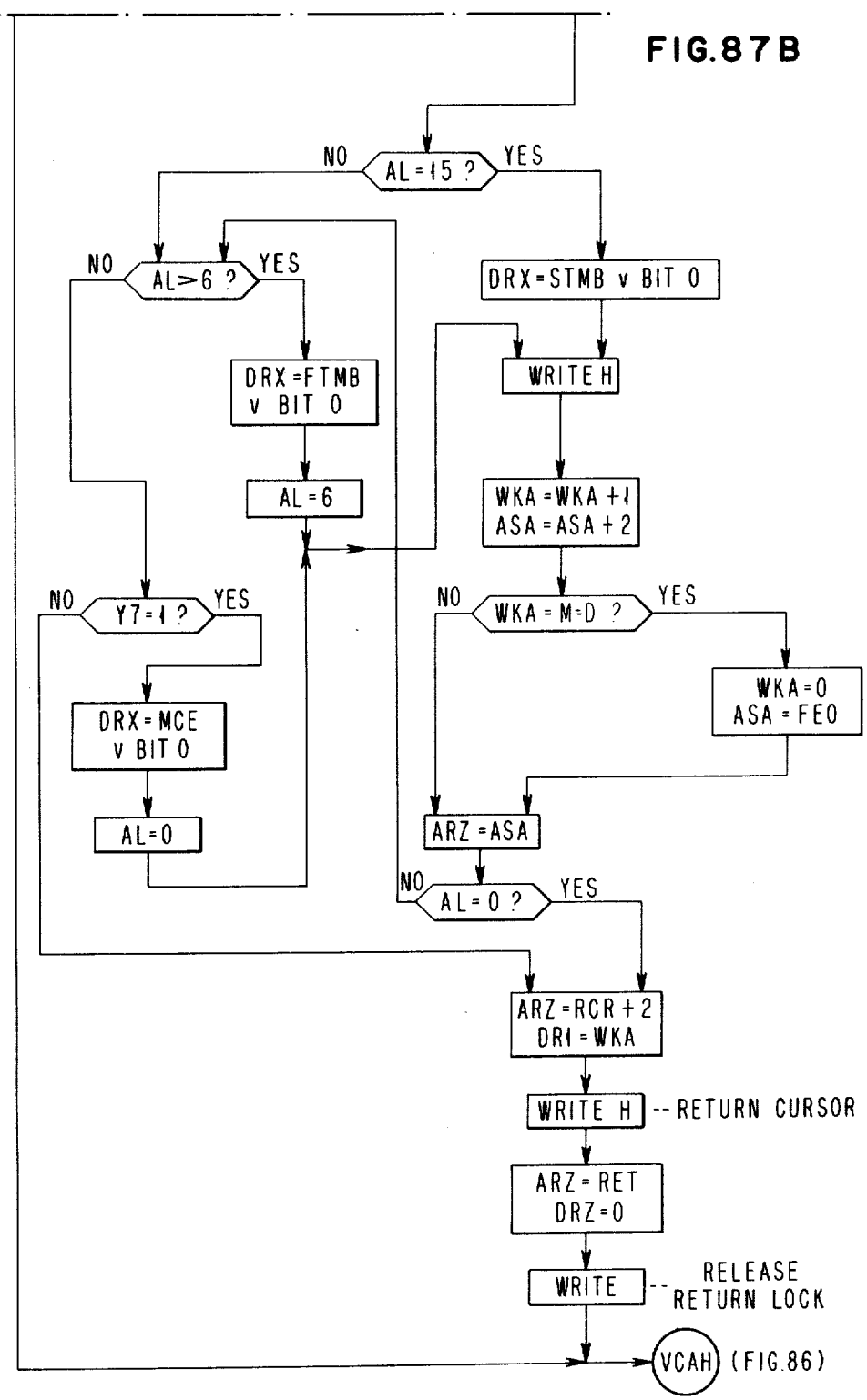

Connection is made to the subchannel dissolution sequence of FIG. 87 from the response-message presentation sequence of FIG. 86 via connector "VCAG". The sequence of FIG. 87 returns elements of the subchannel control space (FIG. 21) to the free buffer list (FIG. 19). The sequence of FIG. 87 is functionally analogous to the subchannel dissolution sequence of FIG. 44 that is described in Paragraph 13(i), supra. The subchannel dissolution sequence of FIG. 87 connects back to the response-message presentation sequence of FIG. 86 via connector "VAH". No further description of FIG. 87 is given herein.

Figure 88:
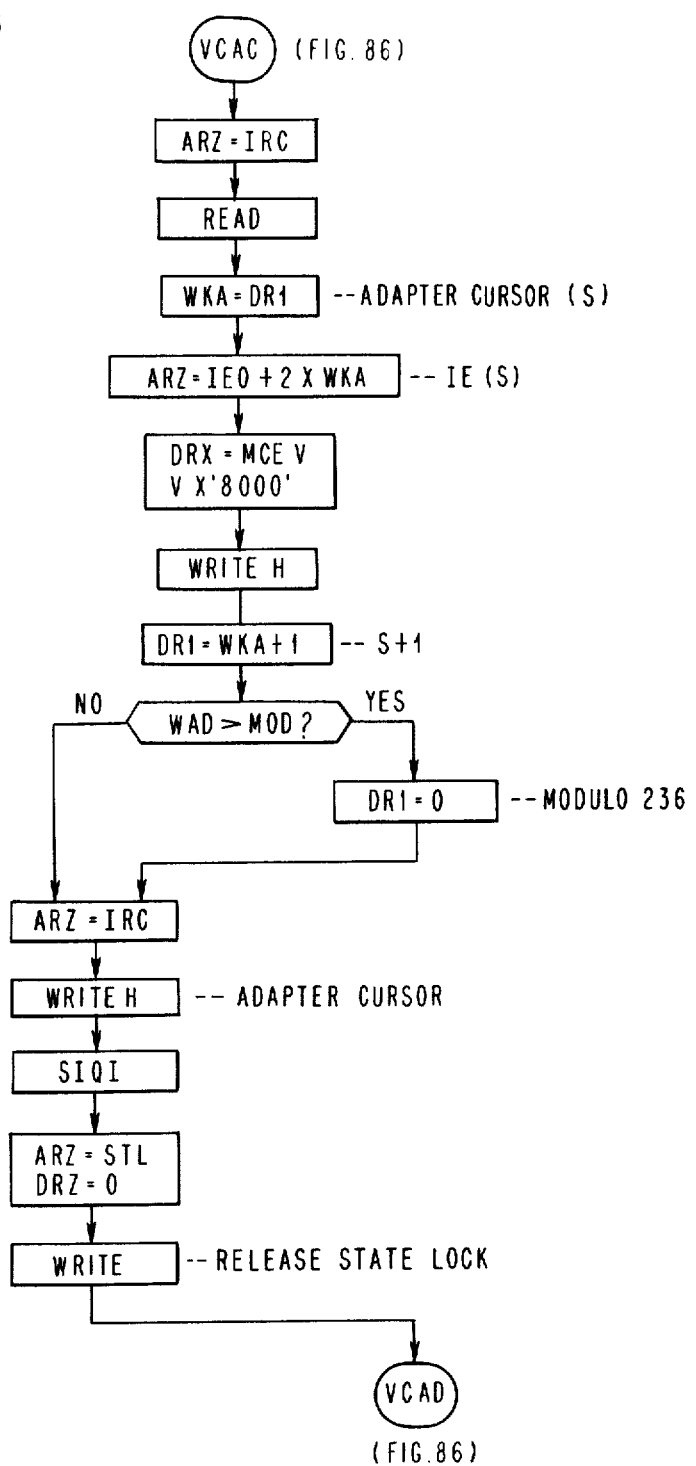

Connection is made to the interruption-queue posting sequence of FIG. 88 from the response-message presentation sequence of FIG. 86 via connector "VCAC". The sequence of FIG. 88 posts the subchannel control space containing the response message on the interruption queue (FIG. 22). The sequence of FIG. 88 is functionally analogous to the interruption-posting sequence of FIG. 45 that is described in Paragraph 13(j), supra. The interruption posting sequence of FIG. 88 connects back to the response-list presentation sequence of FIG. 86 via connector "VCAD". No further description of FIG. 88 is given herein.

Figure 89:
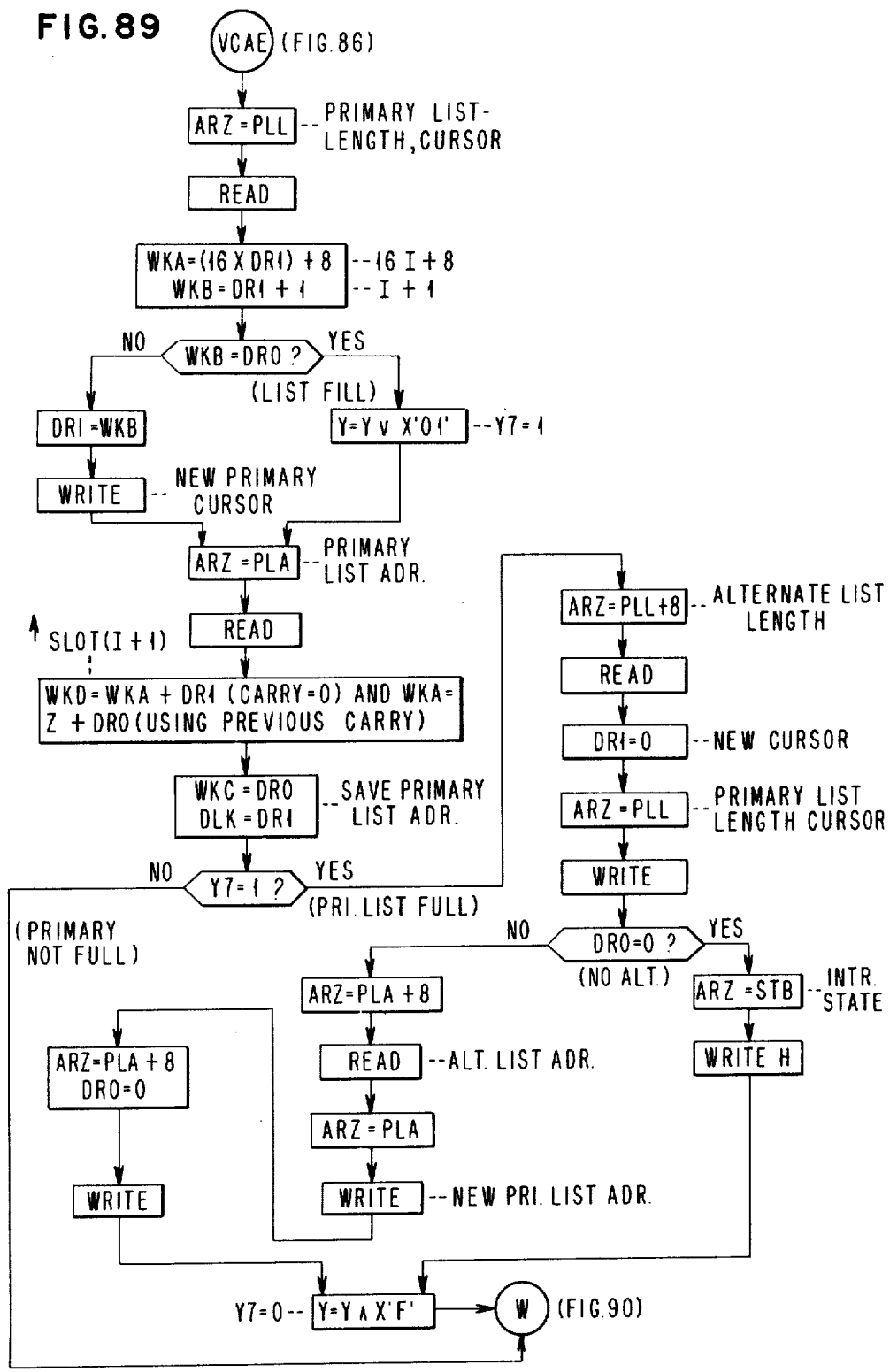
Figure 90:
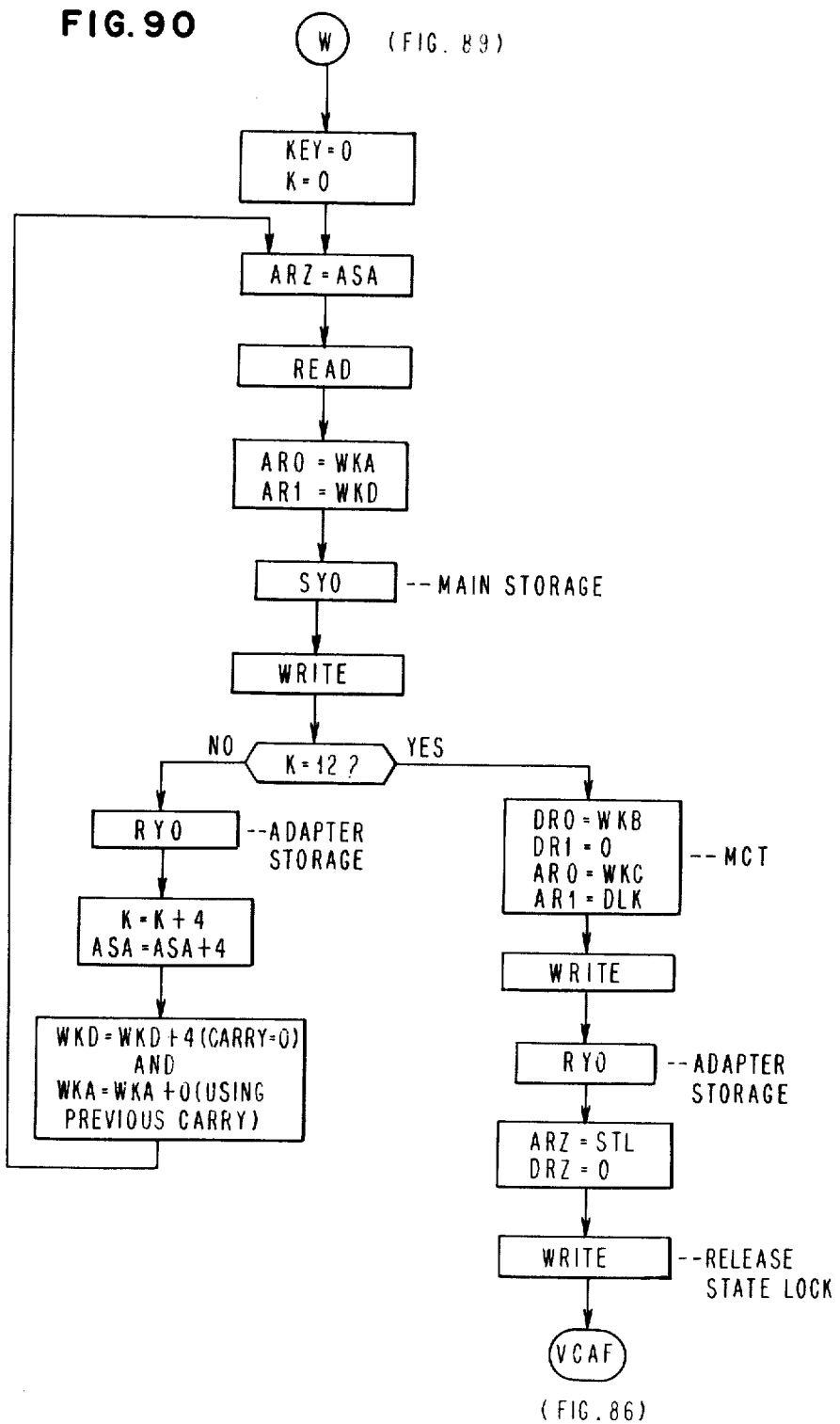

Connection is made to the response-list processing sequences of FIGS. 89-90 from the response-message generation sequence of FIG. 86 via connector "VCAE". The sequence of FIGS. 89-90 transfers the response message in the subchannel control space to the response list (FIG. 13) in subsystem main storage. The sequence of FIGS. 89-90 is functionally analogous to the response-list processing sequence of FIGS. 46-47 that are described in Paragraph 13(j), supra. The response-list sequence of FIG. 90 connects back to the sequence of FIG. 86 via connector "VCAF". No further description of FIGS. 89-90 is given herein.

17. Summary

We have thus described a novel system for effectively utilizing the available link bandwidth between host systems and secondary storage subsystems; in which sets of plural commands are "streamed" from host systems to secondary storage subsystems in "encapsulated" message units, and like pluralities of sets of status information "reports" are "streamed" from subsystems to host systems in encapsulated completion messages.

We have further described a novel system for enabling host systems to specify plural data block transfers in single command portions of request messages, and for enabling subsystems to initiate transfers of individual data blocks specified by such commands over plural links; whereby the transfers of plural data blocks specified by one command may be effectively processed in parallel and whereby plural links between a host and subsystem may be kept productively occupied on a maximal basis.

We have also described a system in which the various transfer processes mentioned above are carried out by host and subsystem adapters which operate on an asynchronous basis relative to "central" processing elements in the respective host systems and subsystems which perform the primary program processing functions in respective host systems and subsystems; and in which supervisory programs in the host systems and subsystems are capable of alternately requiring communications from respective adapters to respective central processing elements to be carried out in "interruption" and "response list" modes; whereby the interference presented by such communications to primary processing functions can be selectively restricted by system and subsystem programmers.

Accordingly the method and apparatus, by which these and other novel attributes of the present invention are achieved, are claimed in the following claims.

Having thus described our invention, what we claim as new, and desire to secure by Letters Patent is:

1. In a data processing system including a host system and a secondary storage subsystem, a method of transferring information between said host system and subsystem comprising, in sequence:

providing a pool of multiple storage spaces in said host system for use exclusively in controlling transfers of information between said host system and said subsystem;

in preparation for transfers of messages to said subsystem, allocating for each message an integral number of spaces in said pool on a temporary basis;

forming said messages, each message containing a plurality of commands, each command of a message specifying an operation to be performed at the initiative of said subsystem as part of a series of related operations;

forming information for controlling the transfers of the associated messages and storing said information in said allocated spaces for the associated message;

transferring each of said messages to said subsystem in a single continuous signalling operation while controlling each said transfer by means of said information pre-stored in the associated allocated space;

transferring subchannel identifiers in association with certain of said messages for identifying the associated space;

storing said messages and the associated subchannel identifiers in said subsystem;

initiating operations in said subsystem specified by the commands in said transferred messages;

transferring a representation of one of said subchannel identifiers associated with one of said certain messages from said subsystem to host system;

transferring data specified by a command in said one of said certain messages between said subsystem and said host system in association with said representation of said one subchannel identifier;

location the allocated space in said host system pool associated with said one of said certain messages by means of said one subchannel identifier; and controlling the transfer handling of said data within said host system while using control information stored in said space associated with said one message.

2. The method according to claim 1 including:

transferring information with each of said certain messages for indicating the number of commands contained in the respective message.

3. The method according to claim 2, wherein said one of said certain messages comprises a command defining a string of plural data block transfer operations associated with a string of contiguous data block storage spaces in said subsystem, said method including:

transferring a unique relative-data-transfer number from said subsystem to said host system in association with the transfer of each data block in said string, each said number defining the relative position of the associated block in said string.

4. The method according to claim 3 including:
transferring information to said subsystem in association with said string defining command for indicating a storage location in said subsystem which represents the source or destination of the first data block in said string.

5. The method according to claim 1 including:
generating status information in said subsystem denoting the status of completion or abnormal termination of each of the operations specified in said one message; and
transferring a completion message from said subsystem to said host system in one continuous signalling operation, said completion message containing all of said status information.

6. In a data processing system comprising a host system including a main store, and a subsystem including a secondary backing store, in combination:
first store means associated with said host system for storing a plurality of multi-bit commands forming a set of commands and being formed by said host system, said set of commands specifying a sequence of related operations to be performed at the initiative of said subsystem;
means coupled to said first store means and said subsystem for transferring said plurality of commands from said first store means to said subsystem in a single continuous signalling transaction;
second store means associated with said subsystem for storing said transferred commands;
first processor means in said subsystem connected to cooperate with said second store means for initiating and controlling operations specified by said commands at a pace, and in a sequence, suited for conditions of operation in said subsystem; certain of said operations being data transfer operations; and
second processor means connected to cooperate with said first store means for controlling said commands transferring means and for operating in coordination with said first processor means to perform said data transfer operations;
said first processor means in said subsystem connected to cooperate with said second storing means including,
means for generating a status message indicating the status of completion or abnormal termination of each of the operations specified in said plurality of commands transferred from said first storing means to said subsystem; and
means for transferring said status message to said second processor means;
and wherein said second processor means includes means for transferring the status information in said status message from said first processor means to supervisory programs in control of said host system;
said first storing means comprising
a pool of buffer storage elements, assignable on a temporary basis to store plural sets of plural commands which sets are to be transferred to said subsystem in discrete signalling transactions; and
a list storage area for defining the status of allocation of the buffer elements in said pool; and wherein said means for transferring said commands to said subsystem includes:
means for locating buffer elements in said pool containing individual ones of said sets of commands which are prepared to be transferred to said subsystem;
means associated with said locating means for transferring each said located set of commands to said subsystem in a discrete continuous signalling transaction; and
means for selectively modifying said list storage area after each said command signalling transaction to make at least a portion of the associated buffer storage element available to store commands for another command signalling transaction.

7. The combination of claim 6 wherein said means for locating comprises:
a work queue storage area in said first storage means, said area containing plural work element storage spaces for storing previously generated control information defining locations of command signalling transfer operations waiting to be performed by said second processor means and said command set transferring means.

8. The combination of claim 6 wherein said first and second processor means include:
means for revertively exchanging control information in association with said command set signalling transactions and said data transfer operations associated with respective command sets for controlling the transfer of data relative to storage facilities in said host system.

9. The combination of claim 6 wherein said first and second processor means include:
means for revertively exchanging control information in association with said command set and status message transfers; and
said second processor means includes means responsive to the control information received with said status messages for evaluating the sequence of transfer of said status messages in relation to the sequence of transfer of the associated command messages.

10. The combination of claim 6 wherein a single command in a said command set can be formatting to define a plurality of data block transfer operations, and wherein said first and second processor means include means for carrying out said data block transfers in a sequence arbitrarily determinable by said first processor means.

11. The combination of claim 7 wherein said second processor means includes means for storing command transfer signalling information in said work queue storage area.

12. In a data processing system including a host system, a secondary storage subsystem and means linking said system and subsystem for transferring information there between, a method of transferring information between said host system and subsystem comprising:
providing a pool of subchannel storage spaces,
generating plural command arrays in said host system defining data transfer operations to be conducted at the initiative of said subsystem;
storing said command arrays in said host system in one of said subchannel storage spaces;
storing sequence number and subchannel identifier number parameters in association with said arrays; each said sequence number parameter defining the sequence of storage of the associated command array in said pool in relation to other arrays; each said subchannel identifier number defining the location of the subchannel storage space containing the associated command array;

transferring each of said command arrays to said subsystem in a single continuous message signaling transaction;

transferring representations of the associated sequence number and subchannel identifier numbers in association with each said signaling transaction;

storing each said command array and the associated sequence number and subchannel identifier number in said subsystem in a subchannel storage space selected from a pool of storage spaces;

initiating operations in said subsystem to prepare for transfers of blocks of data defined by command elements in said command arrays;

transferring representations of the associated sequence number and subchannel identifier numbers from said subsystem to said host system in association with preparations of individual said data block transfer operations;

transferring said data blocks between said subsystem and said host system;

processing said identifier numbers in said host system to determine the sources or destinations of the respective data blocks relative to storage facilities in said host system; and processing said sequence numbers in said host system to evaluate the sequence of processing by said subsystem of messages originated by said host system.

13. A method of transferring information between a host system and a secondary storage subsystem in accordance with claim 12 comprising in addition:

generating for each of the operating arrays a completion message in said subsystem defining the status of completion or abnormal termination of each of the operations arrays; and transferring each said completion message to said host system in a single continuous signalling transaction.

* * * * *